US006771264B1

(12) United States Patent
Duluk et al.

(10) Patent No.: US 6,771,264 B1
(45) Date of Patent: Aug. 3, 2004

(54) METHOD AND APPARATUS FOR PERFORMING TANGENT SPACE LIGHTING AND BUMP MAPPING IN A DEFERRED SHADING GRAPHICS PROCESSOR

(75) Inventors: Jerome F. Duluk, Palo Alto, CA (US); Stephen L. Dodgen, Boulder Creek, CA (US); Joseph P. Bratt, San Jose, CA (US); Matthew Papakipos, Menlo Park, CA (US); Nathan Tuck, San Diego, CA (US); Richard E. Hessel, Pleasanton, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/213,990

(22) Filed: Dec. 17, 1999

(Under 37 CFR 1.47)

(51) Int. Cl.[7] .............................................. G06T 15/60
(52) U.S. Cl. ..................................... 345/426; 345/584
(58) Field of Search ................................ 345/426, 582, 345/583, 584

(56) References Cited

U.S. PATENT DOCUMENTS

| | | |
|---|---|---|
| 4,783,829 A | 11/1988 | Miyakawa et al. |
| 4,945,500 A | 7/1990 | Deering |
| 4,970,636 A | 11/1990 | Snodgrass et al. |
| 5,083,287 A | 1/1992 | Obata et al. |
| 5,123,085 A | 6/1992 | Wells et al. |
| 5,402,532 A | 3/1995 | Epstein et al. |
| 5,448,690 A | 9/1995 | Shiraishi et al. |
| 5,455,900 A | 10/1995 | Shiraishi et al. |
| 5,481,669 A | 1/1996 | Poulton et al. |
| 5,574,836 A | 11/1996 | Broemmelsiek ............ 395/127 |
| 5,579,455 A | 11/1996 | Greene et al. |
| 5,596,686 A | 1/1997 | Duluk, Jr. |

(List continued on next page.)

OTHER PUBLICATIONS

Angel (interactive computer graphics: a top–down approach with OpenGl: ISBN: 0–201–85571–2—sections 6.8 & 7.7.2).

Schilling et al., "Texram: a smart memory for texturing," IEEE computer graphics and applications, 5/96, 32–41.

*Primary Examiner*—Matthew Luu
(74) *Attorney, Agent, or Firm*—R. Michael Ananian; Dorsey & Whitney LLP

(57) ABSTRACT

A system and method for performing tangent space lighting in a deferred shading graphics processor (DSGP) encompasses blocks of the DSGP that preprocess data and a Phong shader that executes only after all fragments have been preprocessed. A preprocessor block receives texture maps specified in a variety of formats and converts those texture maps to a common format for use by the Phong shader. The preprocessor blocks provide the Phong shader with interpolated surface basis vectors ($v_s$, $v_t$, n), a vector Tb that represents in tangen/object space the texture/bump data from the texture maps, light data, material data, eye coordinates and other information used by the Phong shader to perform the lighting and bump mapping computations. The data from the preprocessor is provided for each fragment for which lighting effects need to be computed. The Phong shader computes the color of a fragment using the information provided by the preprocessor. The Phong shader performs all lighting computations in eye space, which requires it first to transform bump data from tangent space to eye space. In one embodiment the Phong hardware does this by multiplying a matrix M whose columns comprise eye space basis vectors ($b_s$, $b_t$, n) derived from the surface basis vectors ($v_s$, $v_t$, n) and the vector Tb of bump map data. The eye space basis vectors are derived by the DSGP preprocessor so that the multiplication (M×Tb) gives the perturbed surface normal N' in eye space, reflecting the bump effects. The perturbed surface normal N' is subsequently used in the lighting computations.

35 Claims, 41 Drawing Sheets

U.S. PATENT DOCUMENTS

| | | |
|---|---|---|
| 5,664,071 A | 9/1997 | Nagashima |
| 5,684,939 A | 11/1997 | Foran et al. |
| 5,699,497 A | 12/1997 | Erdahl et al. |
| 5,710,876 A | 1/1998 | Peercy et al. ............... 395/126 |
| 5,767,859 A | 6/1998 | Rossin et al. |
| 5,798,770 A | 8/1998 | Baldwin |
| 5,828,378 A | 10/1998 | Shiraishi |
| 5,841,447 A | 11/1998 | Drews |
| 5,850,225 A | 12/1998 | Cosman |
| 5,854,631 A | 12/1998 | Akeley et al. |
| 5,860,158 A | 1/1999 | Pai et al. |
| 5,864,342 A | 1/1999 | Kajiya et al. |
| RE36,145 E | 3/1999 | DeAguiar et al. |
| 5,880,736 A | 3/1999 | Peercy et al. ............... 345/426 |
| 5,889,997 A | 3/1999 | Strunk |
| 5,920,326 A | 7/1999 | Rentschler et al. ......... 345/503 |
| 5,949,424 A  * | 9/1999 | Cabral et al. ............... 345/426 |
| 5,949,428 A | 9/1999 | Toelle et al. |
| 5,977,977 A | 11/1999 | Kajiya et al. |
| 5,990,904 A | 11/1999 | Griffin |
| 6,002,410 A | 12/1999 | Battle |
| 6,002,412 A | 12/1999 | Schinnerer |
| 6,118,452 A | 9/2000 | Gannett |
| 6,128,000 A | 10/2000 | Jouppi et al. |
| 6,167,486 A | 12/2000 | Lee et al. |
| 6,204,859 B1 | 3/2001 | Jouppi et al. |
| 6,229,553 B1 | 5/2001 | Duluk, Jr. et al. |
| 6,246,415 B1 | 6/2001 | Grossman et al. |
| 6,259,452 B1 | 7/2001 | Coorg et al. |

* cited by examiner

GRAY FRAGMENTS

WHITE FRAGMENT

BLACK BACKGROUND

FILLED PIXELS

| STATE PARAMETER SET | DESCRIPTION | APPROXIMATE SIZE (IN 144 BIT WORDS) |
|---|---|---|
| TEXTUREAFRONT | IF THE FRONT (OR BACK) FACING PRIMITIVES ARE NOT CULLED OUT, SOFTWARE MAY CHOOSE TO ATTACH DIFFERENT TEXTURE AND MATERIAL PARAMETER TO THE FRONT AND BACK FACING PRIMITIVES. TEXTUREAFRONT PARTITION OF THE STATE VECTOR CONTAINS THE TEXA STATE APPLICABLE IF THE CURRENT PRIMITIVE IS FRONT FACING. | 2 |
| TEXTUREBFRONT | TEXTUREBFRONT PARTITION OF THE STATE VECTOR CONTAINS THE TEXB STATE APPLICABLE IF THE CURRENT PRIMITIVE IS FRONT FACING. | 6 |
| TEXTUREABACK | TEXTUREABACK PARTITION OF THE STATE VECTOR CONTAINS THE TEXA STATE APPLICABLE IF THE CURRENT PRIMITIVE IS BACK FACING. | 2 |
| TEXTUREBBACK | TEXTUREBBACK PARTITION OF THE STATE VECTOR CONTAINS THE TEXB STATE APPLICABLE IF THE CURRENT PRIMITIVE IS BACK FACING. | 6 |
| MATERIALFRONT | MATERIALFRONT PARTITION OF THE STATE VECTOR CONTAINS THE MATERIAL STATE APPLICABLE IF THE CURRENT PRIMITIVE IS FRONT FACING. | 10 |
| MATERIALBACK | MATERIALBACK PARTITION OF THE STATE VECTOR CONTAINS THE MATERIAL STATE APPLICABLE IF THE CURRENT PRIMITIVE IS BACK FACING. | 10 |
| LIGHT | CONTAINS THE CURRENT LIGHT STATE. | 18 |
| PIXELMODES | CONTAINS THE CURRENT PIXEL MODES. | 2 |
| STIPPLE | CONTAINS CURRENT STIPPLE PATTERN | 8 |
| CULLMODES | CONTAINS CURRENT CULL MODES | 0.33 |

FIG. 19

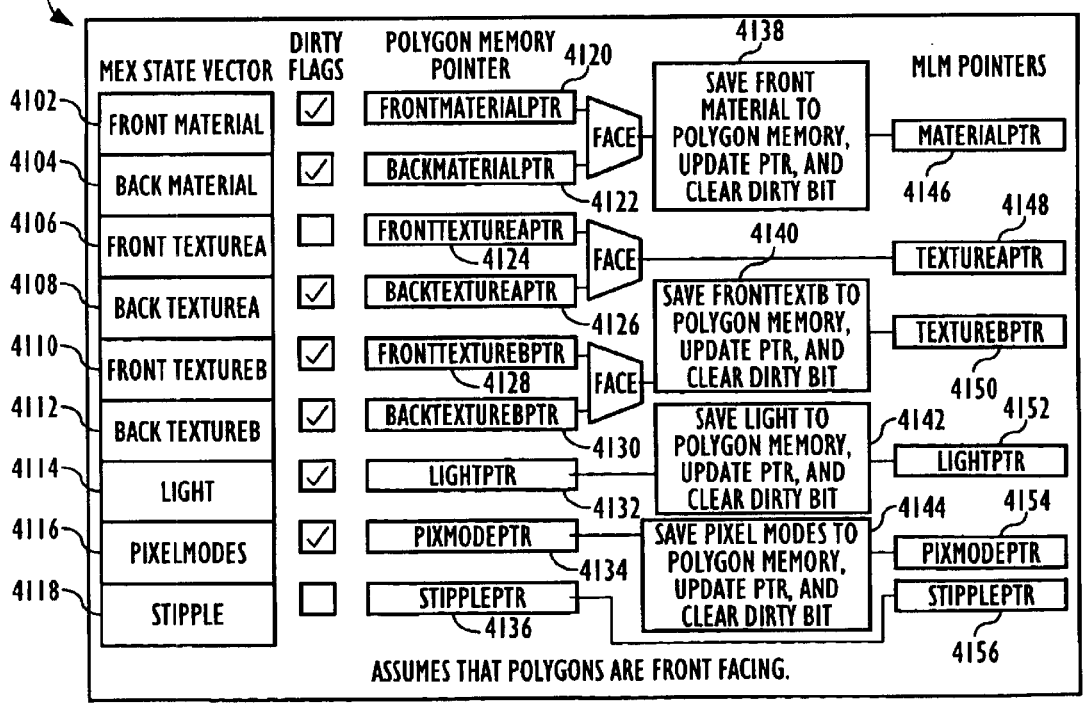

FIG. 20

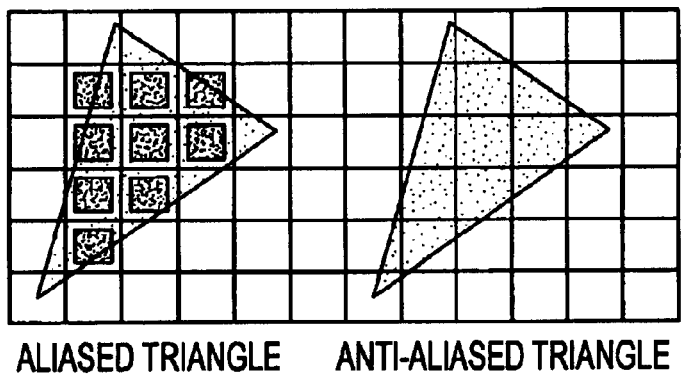
ALIASED TRIANGLE     ANTI-ALIASED TRIANGLE
FIG. 21
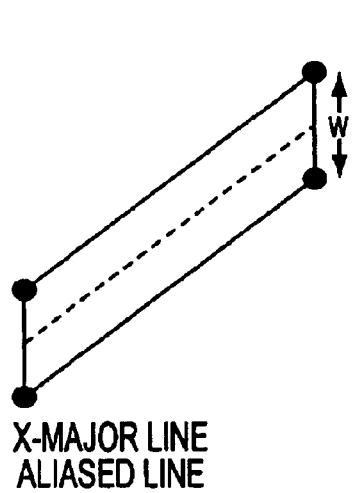 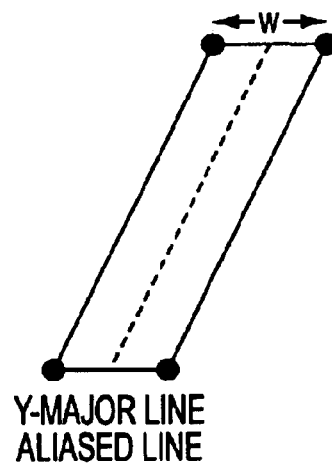 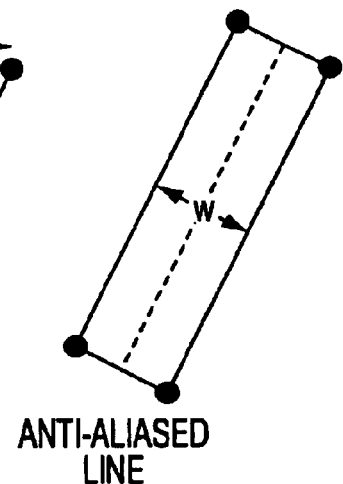
X-MAJOR LINE     Y-MAJOR LINE     ANTI-ALIASED
ALIASED LINE     ALIASED LINE         LINE
FIG. 22A     FIG. 22B     FIG. 22C

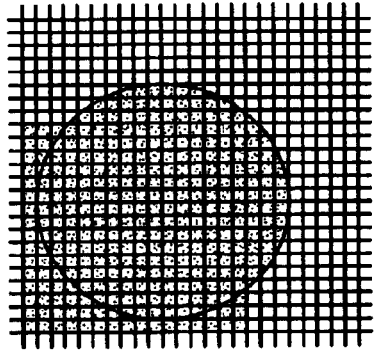
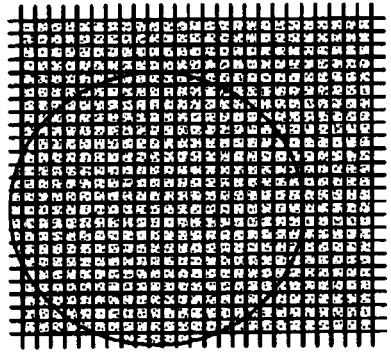
FIG. 23A    FIG. 23B
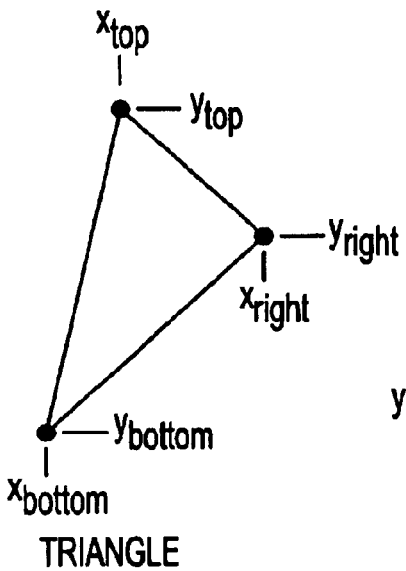
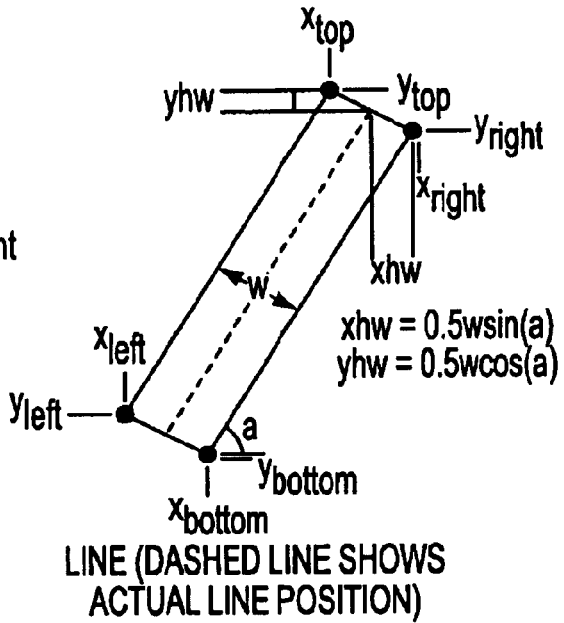
TRIANGLE
LINE (DASHED LINE SHOWS ACTUAL LINE POSITION)
FIG. 24A    FIG. 24B

X-MAJOR LINE    Y-MAJOR LINE

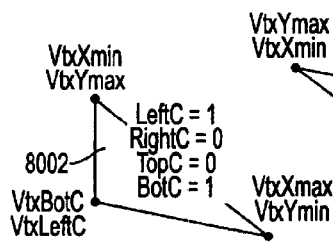
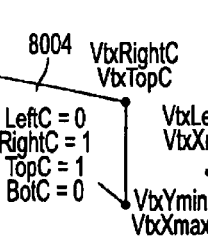
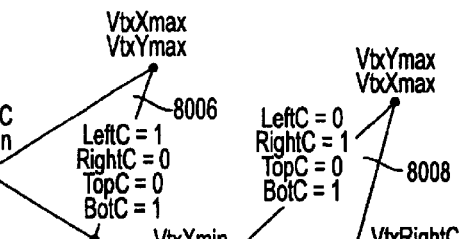
FIG. 26A  FIG. 26B  FIG. 26C  FIG. 26D
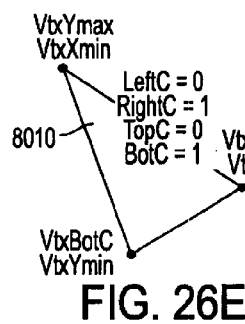
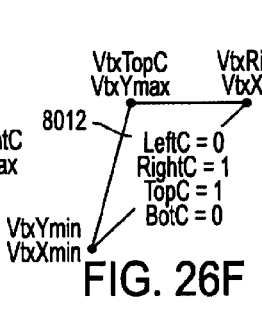
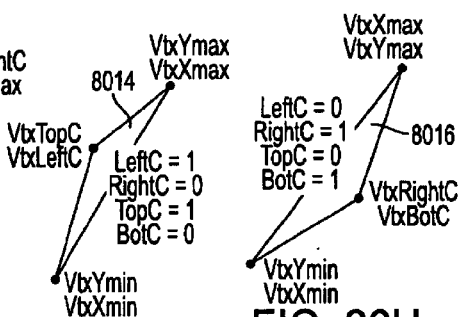
FIG. 26E  FIG. 26F  FIG. 26G  FIG. 26H
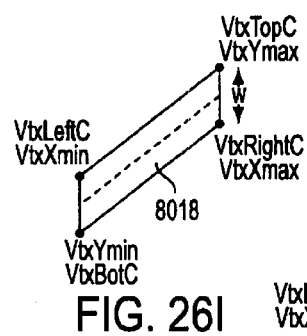
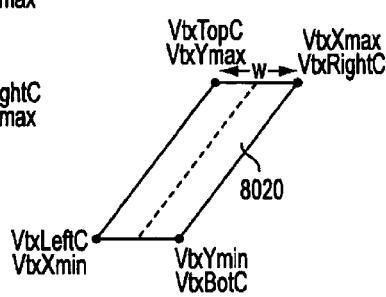
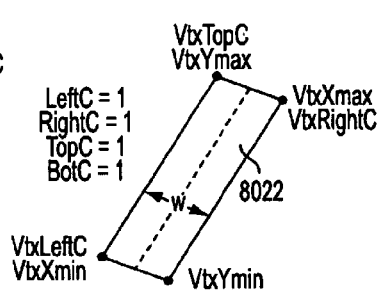
FIG. 26I  FIG. 26J  FIG. 26K

| CACHE | BLOCK | # ENTRIES | DATA CACHELINE SIZE IN (DUALOCTS) |
|---|---|---|---|
| COLORVERTEX | MIJ | .32 | 2 - 9 |
| MLM_PTR | MIJ | 32 | 1 |
| COLORDATA | FRG | 64 - 256 | 6 - 27 |
| TEXTUREA | TEX | 32 | 2 |
| TEXTUREB | TEX | 8 | 6 |
| MATERIAL | PHG | 32 | 10 |
| LIGHT | PHG | 8 | 18 |
| PIXELMODE | PIX | 16 | 2 |
| STIPPLE | PIX | 4 | 8 |

FIG. 31 pMASK 1000
sMASK 1000, 0000, 0000, 0000
COVERAGE 1/4, 0, 0, 0 pMASK 0100
sMASK 0000, 1110, 0000, 0000
COVERAGE 0, 3/4, 0, 0 pMASK 1000
sMASK 0010, 0000, 0000, 0000
COVERAGE 1/4, 0, 0, 0 pMASK 1111
sMASK 1111, 0001, 1100, 1100
COVERAGE 1, 1/4, 1/2, 1/2

INTERPOLATING VECTORS
OF UNEQUAL MAGNITUDE

INTERPOLATING UNIT VECTORS

METHOD AND APPARATUS FOR PERFORMING TANGENT SPACE LIGHTING AND BUMP MAPPING IN A DEFERRED SHADING GRAPHICS PROCESSOR

1 FIELD OF THE INVENTION

This invention relates to computing systems generally, to three-dimensional computer graphics, more particularly, and most particularly to a structure and method for performing tangent space lighting in a three-dimensional graphics processor implementing deferred shading features.

2 BACKGROUND OF THE INVENTION

2.1 Three-dimensional Computer Graphics

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

FIG. 1 shows a three-dimensional object, a tetrahedron, with its own coordinate axes ($x_{obj}, y_{obj}, z_{obj}$). The three-dimensional object is translated, scaled, and placed in the viewing point's coordinate system based on ($x_{eye}, y_{eye}, z_{eye}$). The object is projected onto the viewing plane, thereby correcting for perspective. At this point, the object appears to have become two-dimensional; however, the object's z-coordinates are preserved so they can be used later by hidden surface removal techniques. The object is finally translated to screen coordinates, based on ($x_{screen}, y_{screen}, z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z-buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: 1) the x-coordinate in pixel units (generally including a fraction); 2) the y-coordinate in pixel units (generally including a fraction); and 3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation. Thus, a z-coordinate value is generally included in each pixel value (along with the color value) as geometry is rendered.

2.2 Generic 3D Graphics Pipeline

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference). The Deering Reference includes a diagram of a generic 3D graphics pipeline (i.e., a renderer, or a rendering system) that it describes as "truly generic, as at the top level nearly every commercial 3D graphics accelerator fits this abstraction", and this pipeline diagram is reproduced here as FIG. 2. Such pipeline diagrams convey the process of rendering, but do not describe any particular hardware. This document presents a new graphics pipeline that shares some of the steps of the generic 3D graphics pipeline. Each of the steps in the generic 3D graphics pipeline will be briefly explained here, and are also shown in the method flow diagram of FIG. 3. Processing of polygons is assumed throughout this document, but other methods for describing 3D geometry could be substituted. For simplicity of explanation, triangles are used as the type of polygon in the described methods.

As seen in FIG. 2, the first step within the floating-point intensive functions of the generic 3D graphics pipeline after the data input (Step 212) is the transformation step (Step 214), which was described above. The transformation step is also shown in FIG. 3 as the first step in the outer loop of the method flow diagram, and also includes "get next polygon". The second step, the clip test, checks the polygon to see if it is at least partially contained in the view volume (sometimes shaped as a frustum) (Step 216). If the polygon is not in the view volume, it is discarded; otherwise processing continues. The third step is face determination, where polygons facing away from the viewing point are discarded (Step 218). Generally, face determination is applied only to objects that are closed volumes. The fourth step, lighting computation, generally includes the set up for Gouraud shading and/or texture mapping with multiple light sources of various types, but could also be set up for Phong shading or one of many other choices (Step 222). The fifth step, clipping, deletes any portion of the polygon that is outside of the view volume because that portion would not project within the rectangular area of the viewing plane (Step 224). Generally, polygon clipping is done by splitting the polygon into two smaller polygons that both project within the area of the viewing plane. Polygon clipping is computationally expensive. The sixth step, perspective divide, does perspective correction for the projection of objects onto the viewing plane (Step 226). At this point, the points representing vertices of polygons are converted to pixel space coordinates by step seven, the screen space conversion step (Step 228). The eighth step (Step 230), set up for incremental render, computes the various begin, end, and increment values needed for edge walking and span interpolation (e.g.: x, y, and z-coordinates; RGB color; texture map space u and v-coordinates; and the like).

Within the drawing intensive functions, edge walking (Step 232) incrementally generates horizontal spans for each raster line of the display device by incrementing values from the previously generated span (in the same polygon), thereby "walking" vertically along opposite edges of the polygon. Similarly, span interpolation (Step 234) "walks" horizontally along a span to generate pixel values, including a z-coordinate value indicating the pixel's distance from the viewing point. Finally, the z-buffered blending also referred to as Testing and Blending (Step 236) generates a final pixel color value. The pixel values also include color values, which can be generated by simple Gouraud shading (i.e., interpolation of vertex color values) or by more computationally expensive techniques such as texture mapping (possibly using multiple texture maps blended together), Phong shading (i.e., per-fragment lighting), and/or bump mapping (perturbing the interpolated surface normal). After drawing intensive functions are completed, a double-buffered MUX output look-up table operation is performed (Step 238). In this figure the blocks with rounded corners typically represent functions or process operations, while sharp cornered rectangles typically represent stored data or memory.

By comparing the generated z-coordinate value to the corresponding value stored in the Z Buffer, the z-buffered blend either keeps the new pixel values (if it is closer to the viewing point than previously stored value for that pixel location) by writing it into the frame buffer, or discards the new pixel values (if it is farther). At this step, antialiasing methods can blend the new pixel color with the old pixel color. The z-buffered blend generally includes most of the per-fragment operations, described below.

The generic 3D graphics pipeline includes a double buffered frame buffer, so a double buffered MUX is also included. An output lookup table is included for translating color map values. Finally, digital to analog conversion makes an analog signal for input to the display device.

A major drawback to the generic 3D graphics pipeline is its drawing intensive functions are not deterministic at the pixel level given a fixed number of polygons. That is, given a fixed number of polygons, more pixel-level computation is required as the average polygon size increases. However, the floating-point intensive functions are proportional to the number of polygons, and independent of the average polygon size. Therefore, it is difficult to balance the amount of computational power between the floating-point intensive functions and the drawing intensive functions because this balance depends on the average polygon size.

Prior art Z Buffers are based on conventional Random Access Memory (RAM or DRAM), Video RAM (VRAM), or special purpose DRAMs. One example of a special purpose DRAM is presented in "FBRAM: A new Form of Memory Optimized for 3D Graphics", by Deering, Schlapp, and Lavelle, pages 167 to 174 of SIGGRAPH94 Proceedings, Jul. 24–29, 1994, Computer Graphics Proceedings, Annual Conference Series, published by ACM SIGGRAPH, New York, 1994, Softcover ISBN 0201607956.

2.3 Pipeline State

OpenGL is a software interface to graphics hardware which consists of several hundred functions and procedures that allow a programmer to specify objects and operations to produce graphical images. The objects and operations include appropriate characteristics to produce color images of three-dimensional objects. Most of OpenGL (Version 1.2) assumes or requires a that the graphics hardware include a frame buffer even though the object may be a point, line, polygon, or bitmap, and the operation may be an operation on that object. The general features of OpenGL Oust one example of a graphical interface) are described in the reference "The OpenGL® Graphics System: A Specification (Version 1.2) edited by Mark Segal and Kurt Akeley, Version 1.2, March 1998; and hereby incorporated by reference. Although reference is made to OpenGL, the invention is not limited to structures, procedures, or methods which are compatible or consistent with OpenGL, or with any other standard or non-standard graphical interface. Desirably, the inventive structure and method may be implemented in a manner that is consistent with the OpenGL, or other standard graphical interface, so that a data set prepared for one of the standard interfaces may be processed by the inventive structure and method without modification. However, the inventive structure and method provides some features not provided by OpenGL, and even when such generic input/output is provided, the implementation is provided in a different manner.

The phrase "pipeline state" does not have a single definition in the prior-art. The OpenGL specification, for example, sets forth the type and amount of the graphics rendering machine or pipeline state in terms of items of state and the number of bits and bytes required to store that state information. In the OpenGL definition, pipeline state tends to include object vertex pertinent information including for example, the vertices themselves the vertex normals, and color as well as "non-vertex" information.

When information is sent into a graphics renderer, at least some object geometry information is provided to describe the scene. Typically, the object or objects are specified in terms of vertex information, where an object is modeled, defined, or otherwise specified by points, lines, or polygons (object primitives) made up of one or more vertices. In simple terms, a vertex is a location in space and may be specified for example by a three-space (x,y,z) coordinate relative to some reference origin. Associated with each vertex is other information, such as a surface normal, color, texture, transparency, and the like information pertaining to the characteristics of the vertex. This information is essentially "per-vertex" information. Unfortunately, forcing a one-to-one relationship between incoming information and vertices as a requirement for per-vertex information is unnecessarily restrictive. For example, a color value may be specified in the data stream for a particular vertex and then not respecified in the data stream until the color changes for a subsequent vertex. The color value may still be characterized as per-vertex data even though a color value is not explicitly included in the incoming data stream for each vertex.

Texture mapping presents an interesting example of information or data which could be considered as either per-vertex information or pipeline state information. For each object, one or more texture maps may be specified, each texture map being identified in some manner, such as with a texture coordinate or coordinates. One may consider the texture map to which one is pointing with the texture coordinate as part of the pipeline state while others might argue that it is per-vertex information.

Other information, not related on a one-to-one basis to the geometry object primitives, used by the renderer such as lighting location and intensity, material settings, reflective properties, and other overall rules on which the renderer is operating may more accurately be referred to as pipeline state. One may consider that everything that does not or may not change on a per-vertex basis is pipeline state, but for the reasons described, this is not an entirely unambiguous definition. For example, one may define a particular depth test (See later description) to be applied to certain objects to be rendered, for example the depth test may require that the z-value be strictly "greater-than" for some objects and "greater-than-or-equal-to" for other objects. These particular depth tests which change from time to time, may be considered to be pipeline state at that time.

Parameters considered to be renderer (pipeline) state in OpenGL are identified in Section 6.2 of the afore referenced OpenGL Specification (Version 1.2, at pages 193–217).

Essentially then, there are two types of data or information used by the renderer: (1) primitive data which may be thought of as per-vertex data, and (ii) pipeline state data (or simply pipeline state) which is everything else. This distinction should be thought of as a guideline rather than as a specific rule, as there are ways of implementing a graphics renderer treating certain information items as either pipeline state or non-pipeline state.

2.4 Per-Fragment Operations

In the generic 3D graphics pipeline, the "z-buffered blend" step actually incorporates many smaller "per-fragment" operational steps.

Application Program Interfaces (APIs), such as OpenGL (Open Graphics Library) and D3D, define a set of per-fragment operations (See Chapter 4 of Version 1.2 OpenGL Specification). We briefly review some exemplary OpenGL per-fragment operations so that any generic similarities and differences between the inventive structure and method and conventional structures and procedures can be more readily appreciated.

Under OpenGL, a frame buffer stores a set of pixels as a two-dimensional array. Each picture-element or pixel stored in the frame buffer is simply a set of some number of bits. The number of bits per pixel may vary depending on the particular GL implementation or context.

Corresponding bits from each pixel in the framebuffer are grouped together into a bitplane; each bitplane containing a single bit from each pixel. The bitplanes are grouped into several logical buffers referred to as the color, depth, stencil, and accumulation buffers. The color buffer in turn includes what is referred to under OpenGl as the front left buffer, the front right buffer, the back left buffer, the back right buffer, and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bitplanes, but particular implementations of context may not provide right buffers, back buffers, or auxiliary buffers at all, and an implementation or context may additionally provide or not provide stencil, depth, or accumulation buffers.

Under OpenGL, the color buffers consist of either unsigned integer color indices or R, G, B, and, optionally, a number "A" of unsigned integer values; and the number of bitplanes in each of the color buffers, the depth buffer (if provided), the stencil buffer (if provided), and the accumulation buffer (if provided), is fixed and window dependent. If an accumulation buffer is provided, it should have at least as many bit planes per R, G, and B color component as do the color buffers.

A fragment produced by rasterization with window coordinates of $(x_w, y_w)$ modifies the pixel in the framebuffer at that location based on a number of tests, parameters, and conditions. Noteworthy among the several tests that are typically performed sequentially beginning with a fragment and its associated data and finishing with the final output stream to the frame buffer are in the order performed (and with some variation among APIs): 1) pixel ownership test; 2) scissor test; 3) alpha test; 4) Color Test; 5) stencil test; 6) depth test; 7) blending; 8) dithering; and 9) logicop. Note that the OpenGL does not provide for an explicit "color test" between the alpha test and stencil test. Per-Fragment operations under OpenGL are applied after all the color computations. Each of these tests or operations is briefly described below.

2.4.1 Ownership Test

Under OpenGL, the pixel ownership test determines if the pixel at location (xw, yw) in the framebuffer is currently owned by the GL context. If it is not, the window system decides the fate of the incoming fragment. Possible results are that the fragment is discarded or that some subset of the subsequent per-fragment operations are applied to the fragment. This pixel ownership test allows the window system to properly control the GL's behavior.

Assume that in a computer having a display screen, one or several processes are running and that each process has a window on the display screen. For each process, the associated window defines the pixels the process wants to write or render to. When there are two or more windows, the window associated with one process may be in front of the window associated with another process, behind that window, or both windows may be entirely visible. Since there is only a single frame buffer for the entire display screen or desktop, the pixel ownership test involves determining which process and associated window owns each of the pixels. If a particular process does not "own" a pixel, it fails the pixel ownership test relative to the frame buffer and that pixel is thrown away. Note that under the typical paradigm, the pixel ownership test is run by each process, and that for a give pixel location in the frame buffer, that pixel may pass the pixel ownership test for one of the processes, and fail the pixel ownership test for the other process. Furthermore, in general, a particular pixel can pass the ownership test for only one process because only one process can own a particular frame buffer pixel at the same time.

In some rendering schemes the pixel ownership test may not be particularly relevant. For example, if the scene is being rendered to an off-screen buffer, and subsequently Block Transferred or "blitted" to the desktop, pixel ownership is not really even relevant. Each process automatically or necessarily passes the pixel ownership test (if it is executed) because each process effectively owns its own off-screen buffer and nothing is in front of that buffer.

If for a particular process, the pixel is not owned by that process, then there is no need to write a pixel value to that location, and all subsequent processing for that pixel may be ignored. In a typical workstation, all the data associated with a particular pixel on the screen is read during rasterization. All information for any polygon that feeds that pixel is read, including information as to the identity of the process that owns that frame buffer pixel, as well as the z-buffer, the color value, the old color value, the alpha value, stencil bits, and so forth. If a process owns the pixel, then the other downstream process are executed (for example, scissor test, alpha test, and the like). On the other hand, if the process does not own the pixel and fails the ownership test for that pixel, the process need not consider that pixel further and that pixel is skipped for subsequent tests.

2.4.2 Scissor Test

Under OpenGL, the scissor test determines if $(x_w, y_w)$ lies within a scissor rectangle defined by four coordinate values corresponding to a left bottom (left, bottom) coordinate, a width of the rectangle, and a height of the rectangle. The values are set with the procedure "void Scissor(int left, int bottom, sizei width, sizei height)" under OpenGL. If left$\leq x_w <$left+width and bottom$\leq y_w <$bottom+height, then the scissor test passes; otherwise the scissor test fails and the particular fragment being tested is discarded. Various initial states are provided and error conditions monitored and reported.

In simple terms, a rectangle defines a window which may be an on-screen or off-screen window. The window is defined by an x-left, x-right, y-top, and y-bottom coordinate (even though it may be expressed in terms of a point and height and width dimensions from that point). This scissor window is useful in that only pixels from a polygon fragment that fall in that screen aligned scissor window will change. In the event that a polygon straddles the scissor window, only those pixels that are inside the scissor window may change.

When a polygon in an OpenGL machine comes down the pipeline, the pipeline calculates everything it needs to in order to determine the z-value and color of that pixel. Once z-value and color are determined, that information is used to determine what information should be placed in the frame buffer (thereby determining what is displayed on the display screen).

Just as with the pixel ownership test, the scissor test provides means for discarding pixels and/or fragments before they actually get to the frame buffer to cause the output to change.

2.4.3 Alpha Test

Color is defined by four values, red (R), green (G), blue (B), and alpha (A). The RGB values define the contribution from each of the primary colors, and alpha is related to the transparency. Typically, color is a 32-bit value, 8-bits for each component, though such representation is not limited to 32-bits. Alpha test compares the alpha value of a given pixel to an alpha reference value. The type of comparison may also be specified, so that for example the comparison may be a greater-than operation, a less-than operation, and so forth. If the comparison is a greater-than operation, then the pixel's alpha value has to be greater than the reference to pass the alpha test. So if the pixel's alpha value is 0.9, the reference alpha is 0.8, and the comparison is greater-than, then that pixel passes the alpha test. Any pixel not passing the alpha test is thrown away or discarded. The OpenGL Specification describes the manner in which alpha test is implemented in OpenGL, and we do not describe it further here.

Alpha test is a per-fragment operation and happens after all of the fragment coloring calculations and lighting and shading operations are completed. Each of these per-fragment operations may be though of as part of the conventional z-buffer blending operations.

2.4.4 Color Test

Color test is similar to the alpha test described hereinbefore, except that rather than performing the magnitude or logical comparisons between the pixel alpha (A) value and a reference value, the color test performs a magnitude or logical comparison between one or a combination of the R, G, or B color components and reference value(s). The comparison test may be for example, greater-than, less-than, equal-to, greater-than-or-equal-to, "greater-than-$c_1$ and less-than $c_2$" where $c_1$ and $c_2$ are sore predetermined reference values, and so forth. One might for example, specify a reference minimum R value, and a reference maximum R value, such that the color test would be passed only if the pixel R value is between that minimum and maximum. Color test might, for example, be useful to provide blue-screen functionality. The comparison test may also be performed on a single color component or on a combination of color components. Furthermore, although for the alpha test one typically has one value for each component, for the color test there are effectively two values per component, a maximum value and a minimum value.

2.4.5 Stencil Test

Under OpenGL, stencil test conditionally discards a fragment based on the outcome of a comparison between a value stored in a stencil buffer at location ($x_w$, $y_w$) and a reference value. Several stencil comparison functions are permitted such that the stencil test passes never, always, if the reference value is less than, less than or equal to, equal to, greater than or equal to, greater than, or not equal to the masked stored value in the stencil buffer. The Under OpenGL, if the stencil test fails, the incoming fragment is discarded. The reference value and the comparison value can have multiple bits, typically 8 bits so that 256 different values may be represented. When an object is rendered into the frame buffer, a tag having the stencil bits is also written into the frame buffer. These stencil bits are part of the pipeline state. The type of stencil test to perform can be specified at the time the geometry is rendered.

The stencil bits are used to implement various filtering, masking or stenciling operations. For example, if a particular fragment ends up affecting a particular pixel in the frame buffer, then the stencil bits can be written to the frame buffer along with the pixel information.

2.4.6 Depth Buffer Test

Under OpenGL, the depth buffer test discards the incoming fragment if a depth comparison fails. The comparison is enabled or disabled with the generic Enable and Disable commands using the OpenGL symbolic constant DEPTH_TEST. When depth test is disabled, the depth comparison and subsequent possible updates to the depth buffer value are bypassed and a fragment is passed to the next operation. The stencil bits are also involved and are modified even if the test is bypassed. The stencil value is modified if the depth buffer test passed. If depth test is enabled, the depth comparison takes place and the depth buffer and stencil value may subsequently be modified. The manner in which the depth test is implemented in OpenGL is described in greater detail in the OpenGL specification at page 145.

Depth comparisons are implemented in which possible outcomes are as follows: the depth buffer test passes never, always, if the incoming fragment's $z_w$ value is less than, less than or equal to, equal to, greater than, greater than or equal to, or not equal to the depth value stored at the location given by the incoming fragment's ($x_w$, $y_w$) coordinates. If the depth buffer test fails, the incoming fragment is discarded. The stencil value at the fragment's ($x_w$, $y_w$) coordinate is updated according to the function currently in effect for depth buffer test failure. Otherwise, the fragment continues to the next operation and the value of the depth buffer at the fragment's ($x_w$, $y_w$) location is set to the fragment's $z_w$ value.

In this case the stencil value is updated according to the function currently in effect for depth buffer test success. The necessary OpenGL state is an eight-valued integer and a single bit indicating whether depth buffering is enabled or disabled.

2.4.7 Blending

Under OpenGL, blending combines the incoming fragment's R, G, B, and A values with the R, G, B, and A values stored in the framebuffer at the incoming fragment's ($X_w$, $Y_w$) location.

This blending is typically dependent on the incoming fragment's alpha value (A) and that of the corresponding frame buffer stored pixel. In the following discussion, Cs refers to the source color for an incoming fragment, Cd refers to the destination color at the corresponding framebuffer location, and Cc refers to a constant color in-the GL state. Individual RGBA components of these colors are denoted by subscripts of s, d, and c respectively.

Blending is basically an operation that takes color in the frame buffer and the color in the fragment, and blends them together. The manner in which blending is achieved, that is the particular blending function, may be selected from various alternatives for both the source and destination.

Blending is described in the OpenGL specification at page 146–149 and is hereby incorporated by reference. Various blend equations are available under OpenGL. For example, an additive type blend is available wherein a blend result (C) is obtained by adding the product of a source color (Cs) by a source weighting factor quadruplet (S) to the product of a destination color (Cd) and a destination weighting factor (D) quadruplet, that is $C=C_sS+C_dD$. Alternatively, the blend equation may be a subtraction ($C=C_sS-C_dD$), a reverse subtraction ($C=C_dD-C_sS$), a minimum function ($C=\min(C_s, C_d)$), a maximum function ($C=\max(C_s, C_d)$),. Under OpenGL, the blending equation is evaluated separately for each color component and its corresponding weighting coefficient. Each of the four R, G, B, A components has its own weighting factor.

The blending test (or blending equation) is part of pipeline state and can potentially change for every polygon, but more typically would chang only for the object made up or several polygons.

In generally, blending is only performed once other tests such as the pixel ownership test and stencil test have been passed so that it is clear that the pixel or fragment under consideration would or could have an effect in the output.

2.4.8 Dithering

Under OpenGL, dithering selects between two color values or indices. In RGBA mode, consider the value of any of the color components as a fixed-point value with m bits to the left of the binary point, where m is the number of bits allocated to that component in the framebuffer; call each such value c. For each c, dithering selects a value c1 such that $c1 \in \{\max\{0, [c]-1, [c]\}$. This selection may depend on the $x_w$ and $y_w$ coordinates of the pixel. In color index mode, the same rule applies with c being a single color index. The value of c must not be larger than the maximum value representable in the framebuffer for either the component or the index.

Although many dithering algorithms are possible, a dithered value produced by any algorithm must generally depend only the incoming value and the fragment's x and y window coordinates. When dithering is disabled, each color component is truncated to a fixed-point value with as many bits as there are in the corresponding framebuffer component, and the color index is rounded to the nearest integer representable in the color index portion of the framebuffer.

The OpenGL Specification of dithering is described more fully in the OpenGL specification, particularly at pages 149–150, which are incorporated by reference.

2.4.9 Logicop

Under OpenGL, there is a final logical operation applied between the incoming fragment's color or index values and the color or index values stored in the frame buffer at the corresponding location. The result of the logical operation replaces the values in the framebuffer at the fragment's (x, y) coordinates. Various logical operations may be implemented between source (s) and destination (d), including for example: clear, set, and, noop, xor, or, nor, nand, invert, copy, inverted and, equivalence, reverse or, reverse and, inverted copy, and inverted or. The logicop arguments and corresponding operations, as well as additional details of the OpenGL logicop implementation, are set forth in the OpenGL specification at pates 150–151. Logical operations are performed independently for each color index buffer that is selected for writing, or for each red, green, blue, and alpha value of each color buffer that is selected for writing. The required state is an integer indicating the logical operation, and two bits indicating whether the logical operation is enabled or disabled.

2.5 Antialiasing

In this document, pixels are referred to as the smallest individually controllable element of the display device. But, because images are quantized into discrete pixels, spatial aliasing occurs. A typical aliasing artifact is a "staircase" effect caused when a straight line or edge cuts diagonally across rows of pixels.

Some rendering systems reduce aliasing effects by dividing pixels into subpixels, where each sub-pixel can be colored independently. When the image is to be displayed, the colors for all sub-pixels within each pixel are blended together to form an average color for the pixel. A renderer that uses up to 16 sub-pixels per pixel is described in "RealityEngine Graphics", by Akeley, pages 109 to 116 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Akeley Reference).

Another prior art antialiasing method is the A-Buffer used to perform blending (this technique is also included in the Akeley Reference), and is described in "The A-buffer, an Antialiased Hidden Surface Method" by L. Carpenter, SIG-GRAPH 1984 Conference Proceedings, pp. 103–108 (hereinafter referred to as the Carpenter Reference). The A-buffer is an antialiasing technique that reduces aliasing by keeping track of the percent coverage of a pixel by a rendered polygon. The main drawback to this technique is the need to sort polygons front-to-back (or back-to-front) at each pixel in order to get acceptable antialiased polygons.

2.6 Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task. CAMs are presently used in translation look-aside buffers within a virtual memory systems in some computers. CAMs are also used to match addresses in high speed computer networks.

Magnitude Comparison CAM (MCCAM) is defined here as any CAM where the stored data are treated as numbers, and arithmetic magnitude comparisons (i.e. less-than, greater-than, less-than-or-equal-to, and the like) are performed on the data in parallel. This is in contrast to ordinary CAM which treats stored data strictly as bit vectors, not as numbers. An MCCAM patent, included herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent" (for example, "Duluk Patent MCCAM Bit Circuit").

The basic internal structure of an MCCAM is a set of memory bits organized into words, where each word can perform one or more arithmetic magnitude comparisons between the stored data and input data. In general, for an MCCAM, when a vector of numbers is applied in parallel to an array of words, all arithmetic comparisons in all words occur in parallel. Such a parallel search comparison operation is called a "query" of the stored data.

2.7 Conventional Lighting/Bump Mapping Approaches

The invention described herein is a system and method for performing tangent space lighting in a deferred shading architecture. As documented in the detailed description, in a deferred shading architecture implemented in accordance with the present invention floating point-intensive lighting computations are performed only after hidden surfaces have been removed from the graphics pipeline. This can result in dramatically fewer lighting computations than in the conventional approach described in reference to FIG. 2, where shading computations (FIG. 2, 222) are performed for nearly all surfaces before hidden pixels are removed in the z-buffered blending operation (FIG. 2, 236). To illustrate the advantages of the present invention a description is now provided of a few conventional approaches to performing lighting computations, including bump mapping. One of the described approaches is embodied in 3D graphics hardware sold by Silicon Graphics International (SGI).

The theoretical basis and implementation of lighting computations in conventional 3D graphics systems is well-known and is thoroughly documented in the following publications, which are incorporated herein by reference:

1) Phong, B. T., *Illumination for Computer Generated Pictures*, Communications of the ACM 18, 6 (June 1975), 311–317 (hereinafter referred to as the Phong reference);

2) Blinn, J. F., *Simulation of Wrinkled Surfaces*, In Computer Graphics (SIGGRAPH '78 Proceedings) (August 1978), vol. 12, pp. 286–292 (hereinafter referred to as the Blinn reference);

3) Watt, Alan, *3D Computer Graphics* (2nd ed.), p. 250 (hereinafter referred to as the Watt reference);

4) Peercy, M. et al., *Efficient Bump Mapping Hardware*, In Computer Graphics (SIGGRAPH '97 Proceedings) (July 1997), vol. 8, pp. 303–306 (hereinafter referred to as the Peercy reference).

Generally, lighting computations generate for each pixel of a surface an RGBA color value that accounts for the surface's color, orientation and material properties; the orientation and properties of the surface illumination; and the viewpoint from which the illuminated surface is observed. The material properties can include: fog, emissive color, reflective properties (ambient, diffuse, specular) and bump effects. The illumination properties can include for one or more lights: color (global ambient, light ambient, light diffuse, light specular) and attenuation, spotlight and shadow effects.

There are many different lighting models that can be implemented in a 3D graphics system, including Gouraud shading and Phong shading. In Gouraud shading, lighting computations are made at each vertex of an illuminated surface and the resulting colors are interpolated. This technique is computationally simple but provides many undesirable artifacts, such as mach banding. The most realistic lighting effects are provided by Phong shading, where lighting computations are made at each pixel based on interpolated and normalized vertex normals. Typically, a graphics system supports many different lighting models. However, as a focus of the present invention is to efficiently combine Phong shading and bump mapping, the other lighting models are not further described.

2.7.1 Lighting Computations

Referring to FIG. 3 there is shown a diagram illustrating the elements employed in the lighting computations of both the conventional approach and the present invention. This figure does not illustrate the elements used in bump mapping calculations, which are shown in FIG. 4. The elements shown in FIG. 3 are defined below.

2.7.1.1 Definitions of Elements of Lighting Computations

V the position of the fragment to be illuminated in eye coordinates ($V_x$, $V_y$, $V_z$).

$\hat{N}$ the unit normal vector at the fragment ($N_x$, $N_y$, $N_z$).

$P_L$ the location of the light source in eye coordinates ($P_{Lx}$, $P_{Ly}$, $P_{Lz}$).

$P_{Li}$ indicates whether the light is located at infinity (0=infinity). If the light is at infinity then $P_L$ represents the coordinates of a unit vector from the origin to the light, $\hat{P}_L$ $P_E$ the location of the viewer (viewpoint). In eye coordinates the viewpoint is at either (0,0,0) or (0,0,∞). This is specified as a lighting mode.

$\hat{E}$ is the unit vector from the vertex to the viewpoint, $P_E$, and is defined as follows:

$$\hat{E} = \begin{bmatrix} E_x \\ E_y \\ E_z \end{bmatrix} = \begin{cases} \frac{1}{d_E} \cdot [(-V_x) \ (-V_y) \ (-V_z)]^T & \text{for } P_E = (0, 0, 0) \\ [0 \ 0 \ 1]^T & \text{for } P_E = (0, 0, \infty) \end{cases}$$

where $$d_E = \sqrt{V_x^2 + V_y^2 + V_z^2}$$

$\hat{L}$ is the unit vector from the vertex to the light, $P_L$, and is defined as follows:

$$\hat{L} = \begin{bmatrix} L_x \\ L_y \\ L_z \end{bmatrix} = \begin{cases} \frac{1}{d_L} \cdot \begin{bmatrix} (P_{Lx} - V_x) \\ (P_{Ly} - V_y) \\ (P_{Lz} - V_z) \end{bmatrix} & \text{for } P_{Li} = \text{local} \\ \begin{bmatrix} P_{Lx} \\ P_{Ly} \\ P_{Lz} \end{bmatrix} & \text{for } P_{Li} = \infty \end{cases}$$

where $$d_L = \sqrt{(P_{Lx} - V_x)^2 + (P_{Ly} - V_y)^2 + (P_{Lz} - V_z)^2}$$

$\hat{H}$ is the unit vector half way between $\hat{E}$ and $\hat{L}$, and is defined as follows:

$$\hat{H} = \frac{\overset{\omega}{H}}{\|\overset{\omega}{H}\|}$$

where $$\overset{\omega}{H} = \hat{E} + \hat{L}$$

$h_n$ is the cosine of the angle between $\hat{N}$, and the half way vector, $\hat{H}$, and is defined as follows:

$$h_n = \hat{H} \cdot \hat{N} = H_x \cdot N_x + H_y \cdot N_y + H_z \cdot N_z$$

$p_n$ the cosine of the angle between $\hat{N}$, and the vector to the light, $\hat{L}$, and is defined as follows:

$$p_n = \hat{N} \cdot \hat{L}$$

$\hat{S}_D$ the unit vector in the direction of the spotlight. It is a Lighting Source Parameter and is provided as a unit vector.

$S_c$ is the cosine of the angle that defines the spotlight cone. It is a Lighting Source Parameter.

$S_{dv}$ the cosine of the angle between the spotlight direction, $\hat{S}_D$, and the vector from the light to the vertex, $-\hat{L}$, and is defined as follows:

$$s_{dv} = \hat{S}_D \cdot (-\hat{L})$$

$d_L$ the distance from the light to the vertex. See $\hat{L}$ above.

2.7.1.2 Lighting Equation

The "Lighting Color" of each pixel is computed according to the following lighting equation (Eq. (1)):

$$\text{LightingColor} = \text{EmissiveColor} + \qquad \text{Eq. (1)}$$
$$\text{GlobalAmbientColor} + \sum_{i=0}^{n-1} [\text{Attenuation} \cdot \text{SpotLightEffect} \cdot$$
$$(\text{AmbientColor} + \text{DiffuseColor} + \text{SpecularColor})]$$

2.7.1.3 Lighting Equation Terms

The terms used in the lighting equation (Eq. (1)) are defined for the purposes of the present application as follows. These definitions are consistent with prior art usage.

Emissive Color The color given to a surface by its self illuminating material property without a light.

Ambient Color The color given to a surface due to a lights ambient intensity and scaled by the materials ambient reflective property. Ambient Color is not dependent on the position of the light or the viewer. Two types of ambient lights are provided, a Global Ambient Scene Light, and the ambient light intensity associated with individual lights.

Diffuse Color The color given to a surface due to a light's diffuse intensity and scaled by the material's diffuse reflective property and the direction of the light with respect to the surface's normal. Because the diffuse light reflects in all directions, the position of the viewpoint has no effect on a surface's diffuse color.

Specular Color The color given to a surface due to a light's specular intensity and scaled by the material's specular reflective property and the directions of the light and the iewpoint with respect to the surface's normal. The rate at which a material's specular reflection fades off is an exponential factor and is specified as the material's shininess factor.

Attenuation The amount that a color's intensity from a light source fades away as a function of the distance from the surface to the light. Three factors are specified per light, a constant coefficient, a linear coefficient, and a quadratic coefficient.

Spotlight A feature per light source that defines the direction of the light and its cone of illumination. A spotlight has no effect on a surface that lies outside its cone. The illumination by the spotlight inside the cone depends on how far the surface is from the center of the cone and is specified by a spotlight exponent factor.

The meaning and derivation of each of these terms is now described.

2.7.1.3.1 Emissive Color

The emissive color is just the emissive attribute of the material ($E_{cm}$). I.e., EmissiveColor=$E_{cm}$ 2.7.1.3.2 Ambient Effects The ambient attribute of a material, $A_{cm}$, is used to scale the Global Scene Ambient Light, $A_{cs}$, to determine the global ambient effect. I.e., GlobalAmbientColor=$A_{cm} \cdot A_{cs}$ 2.7.1.3.3 Individual light effects Individual lights have an ambient, diffuse, and specular attribute associated with them. These attributes are effected by the ambient, diffuse, and specular attributes of the material, resp. Each light may also have a spotlight attribute and an attenuation factor, which are expressed as follows.

2.7.1.3.3.1 Attenuation

The Attenuation factor is a fraction that reduces the lighting effect from a particular light depending on the distance of the light's position to the position of the vertex, $d_L$. If the light's position is at infinity ($P_{Li}$=0), then the attenuation factor is one and has no effect. Three positive factors are provided per light that determine the attenuation value, $K_c$, $K_l$, and $Kq$. These are the constant, linear, and quadratic effects, resp. Note that eye coordinates of the surface are needed to determine the light's distance. Given these factors, Attenuation is expressed as follows:

$$Attenuation = \frac{1}{K_c + K_l \cdot d_L + K_q \cdot d_L^2}$$

2.7.1.3.3.2 Spotlight

Each light can be specified to act as a spotlight. The result of a spotlight is to diminish the effect that a light has on a vertex based upon the distance of the vertex from the direction that the spotlight is pointed. If the light is not a spotlight then there is no effect and the spotlight factor is one. The parameters needed to specify a spotlight are the position of the spotlight, $P_L$, $P_{Li}$, the unit length direction of the spotlight, $\hat{S}_D$ the cosine of the spotlight cutoff angle, $s_c$, and the spotlight exponent, $s_E$. The range of the cutoff angle cosine is 0 to 1. A negative value of $s_c$ indicates no spotlight effect. If the Vertex lies within the spotlight cutoff angle, then it is lit, otherwise, it is not lit. The amount that a vertex is lit is determined by the spotlight exponent, the further the vertex is from the center of the cone the less it is lit.

$S_{dv}$, the cosine of the angle between the spotlight direction and the vector from light to vertex, is used to determine whether the vertex is lit and how far the vertex is from the center of the spotlight cone.

$s_{dv}=\hat{S}_D \cdot (-\hat{L})$

If $s_{dv} \geq s_c$ then the vertex is lit. How much it is lit depends on $(s_{dv})^{s_E}$.

To summarize:

$$SpotlightEffect = \begin{cases} 1 & \text{, for } s_c = -1, \\ 0 & \text{, for } s_c \neq -1 \text{ and } s_c < s_{dv} \\ (s_{dv})^{s_E} & \text{, for } s_c \neq -1 \text{ and } s_c \geq s_{dv} \end{cases}$$

2.7.1.3.3.3 Local Ambient Effect

The ambient effect of local lights is the Local Ambient Light, $A_{cl}$, scaled by the ambient attribute of a material, $A_{cm}$.

AmbientColor=$A_{cl} \cdot A_{cm}$ 2.7.1.3.3.4 Diffuse Effect

The diffuse light effect is determined by the position of the light with respect to the normal of the surface. It does not depend on the position of the viewpoint. It is determined by the diffuse attribute of the material, $D_{cm}$, the diffuse attribute of the light, $D_{cl}$, the position of the light, $P_L$, $P_{Li}$, the position of the vertex, V, and the unit vector normal of the vertex, $\hat{N}$.

$\hat{L}$ is the unit length vector from the vertex to the light position. If the light position is at infinity ($P_{Li}$=0), then only the light position is used, $P_L$, and the eye coordinates of the vertex are not needed.

The diffuse effect can be described as $D_{cl}$, the diffuse light, scaled by, $D_{cm}$, the diffuse material, and finally scaled by $p_N$, the cosine of the angle between the direction of the light and the surface normal. This cosine is limited between 0 and 1. If the cosine is negative, then the diffuse effect is 0.

$$DiffuseColor = \begin{cases} 0 & \text{, for } p_N \leq 0 \\ D_{cl} \cdot D_{cm} \cdot p_N & \text{, for } p_N > 0 \end{cases}$$

where $p_N = \hat{N} \cdot \hat{L}$ 2.7.1.3.3.5 Specular Effect

The specular light effect is determined by the position of the light with respect to the normal of the surface and the position of the viewpoint. It is determined by the specular color of the material, $S_{cm}$, the specular exponent (shininess) of the material, $S_{nm}$, the specular attribute of the light, $S_d$, the position of the light, $P_L$, $P_{Li}$, the unit eye vector $\hat{E}$ (described below), the position of the vertex, V, and the unit vector normal of the vertex, $\hat{N}$.

$\hat{L}$ is the unit length vector from the vertex to the light position. If the light position is at infinity ($P_{Li}$=0), then only the light position, $P_L$, is used and $\hat{L}$ is independent of the vertex's eye coordinates.

$\hat{E}$ is the unit length vector from the vertex to the viewpoint. If the viewpoint position is at infinity, then $\hat{E}$=[0 0 1]$^T$=$\hat{Z}$ and is independent of the vertex's eye coordinates.

$\hat{H}$ is the unit length vector halfway between $\hat{L}$ and $\hat{E}$.

$$\hat{H} = \frac{\overset{\varpi}{H}}{\|\overset{\varpi}{H}\|} = \frac{\hat{L} + \hat{E}}{\|\hat{L} + \hat{E}\|}$$

If the light position is infinite and the viewpoint is infinite, then the halfway vector, $\hat{H}$, is independent of the vertex position and is provided as light parameter.

The specular effect can be described as $S_{cl}$, the diffuse light, scaled by, $S_{cm}$, the diffuse material, and finally scaled by $(h_N)^{S_{nm}}$, the cosine of the angle between the halfway vector and the surface normal raised to the power of the shininess. The cosine is limited between 0 and 1. If the cosine is negative, then the specular effect is 0.

$$SpecularColor = \begin{cases} 0 & , \text{for } h_N \leq 0 \\ S_{cl} \cdot S_{cm} \cdot (h_N)^{S_m} & , \text{for } h_N > 0 \end{cases}$$

where $h_N = \hat{N} \cdot \hat{H}$

2.7.1.3.4 Infinite Viewpoint and Infinite Light Effect

In OpenGL, a light's position can be defined as having a distance of infinity from the origin but still have a vector pointing to its position. This definition is used in simplifying the calculation needed to determine the vector from the vertex to the light (in other APIs, which do not define the light's position in this way, this simplification cannot be made). If a light is at infinity, then this vector is independent of the position of the vertex, is constant for every vertex, and does not need the vertex's eye coordinates. This simplification is used for spotlights, diffuse color, and specular color.

The viewpoint is defined as being at the origin or at infinity in the z direction. This is used to simplify the calculation for specular color. If the viewer is at infinity then the vector from the vertex to the viewpoint is independent of the position of the vertex, is constant for every vertex, and does not need the vertex's eye coordinates. This vector is then just the unit vector in the z direction, $\hat{Z}$.

2.7.1.4 Calculation Cases Summary

The following table (Table 1) summarizes the calculations needed for lighting depending on whether local or infinite light position and viewer are specified.

TABLE 1

| | Infinite Light | | Local Light | |
|---|---|---|---|---|
| | Infinite Viewpoint (0,0,∞) | Local Viewpoint (0,0,0) | Infinite Viewpoint (0,0,∞) | Local Viewpoint (0,0,0) |
| Emissive | $E_{CM}$ | | | |
| Global Ambient | $A_{CM} \cdot A_{CS}$ | | | |
| Ambient | $A_{CM} \cdot A_{CL}$ | | | |
| Diffuse $D_{CM} \cdot D_{CL} \cdot p_N$ | $\hat{L} = \hat{P}_L$ | | | |
| $p_N = \hat{N} \cdot \hat{L}$ | | $\hat{L} = \frac{\overset{\varpi}{P_L} - \overset{\varpi}{V}}{d_L}$ | | |
| Specular | | $\hat{E} = \hat{Z}$ | | |
| $S_{cl} \cdot S_{cm} \cdot (h_N)^{S_{rm}}$ | | | $\hat{E} = \frac{\overset{\varpi}{V}}{\|\overset{\varpi}{V}\|}$ | $\hat{E} = \frac{\overset{\varpi}{V}}{\|\overset{\varpi}{V}\|}$ |
| | $\hat{H}$ | | | |
| $h_N = \hat{N} \cdot \hat{H}$ | | | | $\hat{L} = \frac{\overset{\varpi}{P_L} - \overset{\varpi}{V}}{d_L}$ |
| | $(\overset{\varpi}{H} = \hat{Z} + \hat{P}_L)$ | | | |
| | $\hat{H} = \frac{\overset{\varpi}{H}}{\|\overset{\varpi}{H}\|}$ | | | $\hat{L} = \frac{\overset{\varpi}{P_L} - \overset{\varpi}{V}}{d_L}$ |
| | | $\overset{\varpi}{H} = \hat{E} + \hat{L}$ | $\hat{L} = \hat{P}_L$ | |
| Attenuation | | | | |
| No Attenuation | | | $\frac{1}{K_c + K_l \cdot d_L + K_q \cdot d_L^2}$ | |
| Spotlight | | | | |
| $(s_{dv})^{SE}$ | | $\hat{L} = \hat{P}_L$ | | $\hat{L} = \frac{\overset{\varpi}{P_L} - \overset{\varpi}{V}}{d_L}$ |
| $s_{dv} = \hat{S}_D \cdot (-\hat{L})$ | | | | |

2.7.2 Bump Mapping

In advanced lighting systems, the lighting computations can account for bump mapping effects. As described in the Blinn reference, bump mapping produces more realistic lighting by simulating the shadows and highlights resulting from illumination of a surface on which the effect of a three dimensional texture is imposed/mapped. An example of such a textured surface is the pebbled surface of a basketball or the dimpled surface of a golf ball.

Generally, in a lighting system that supports bump mapping a texture map (e.g., a representation of the pebbled basketball surface) is used to perturb the surface normal (N) used in the fragment-lighting calculation (described above). This gives a visual effect of 3-dimensional structure to the surface that cannot be obtained with conventional texture mapping. It also assumes per-fragment lighting is being performed. Bump mapping requires extensions to the OpenGL standard. The theoretical basis of bump mapping is now described with reference to FIG. 4. This approach is common to both of the most common bump mapping methods: the SGI approach and the Blinn approach.

Referring to FIG. 4, there are illustrated some of the elements employed in bump mapping computations. The illustrated approach is described at depth in the Blinn reference and is briefly summarized herein.

2.7.2.1 Bump Mapping Background

Bump Mapping is defined as a perturbation of the Normal Vector, $\vec{N}$ resulting in the perturbed Vector $\vec{N}'$.

The perturbed vector can be calculated by defining $\vec{V}'_e$ to be the location of a point, $\vec{V}_e$, after it has been moved ("bumped") a distance h in the direction of the Normal, $\vec{N}$. Define the unit vector in the Normal direction as, $$\hat{N} = \frac{\vec{N}}{\|\vec{N}\|}$$

Then, $$[1]\, \vec{V}'_e = \vec{V}_e + h \cdot \hat{N}$$

The surface tangents, $\vec{V}s$ and $\vec{V}t$, are defined as the partial derivatives of $\vec{V}$:

$$\vec{V}_s = \frac{\partial \vec{V}_e}{\partial s}, \; \vec{V}_t = \frac{\partial \vec{V}_e}{\partial t}$$

The Normal Vector can be defined as the cross product of the surface tangents:

$$\vec{N} = \vec{V}_s \times \vec{V}_t$$

Then the Perturbed Normal can be defined as the cross product of the surface tangents of the bumped point.

$$[2]\, \vec{N}' = \vec{V}'_s \times \vec{V}'_t$$

Expanding the partials from [1] gives:

$$\vec{V}'_s = \vec{V}_s + \frac{\partial h}{\partial s} \cdot \hat{N} + h \cdot \frac{\partial \hat{N}}{\partial s}$$

$$\vec{V}'_t = \vec{V}_t + \frac{\partial h}{\partial s} \cdot \hat{N} + h \cdot \frac{\partial \hat{N}}{\partial t}$$

Since $$\frac{\partial \hat{N}}{\partial s}$$

and $$\frac{\partial \hat{N}}{\partial t}$$

are relatively small, they are dropped.

Let $$h_s = \frac{\partial h}{\partial s}$$

and $$h_t = \frac{\partial h}{\partial t}$$

be defined as Height Gradients. Then, substituting back into [2], $$\vec{N}' = (\vec{V}_s + h_s \cdot \hat{N}) \times (\vec{V}_t + h_t \cdot \hat{N})$$
$$= (\vec{V}_s \times \vec{V}_t) + (\vec{V}_s \times h_t \cdot \hat{N}) + (h_s \cdot \hat{N} \times \vec{V}_t) + (h_s \cdot \hat{N} \times h_t \cdot \hat{N})$$

Define Basis Vectors:

$$[3]\, \vec{b}_s = \hat{N} \times \vec{V}_t, \; \vec{b}_t = \vec{V}_s \times \hat{N}$$

Then, since $\hat{N} \times \hat{N} = 0$, $$[4]\, \vec{N}' = \hat{N} + h_s \cdot \vec{b}_s + h_t \cdot \vec{b}_t$$

This equation [4] is used to perturb the Normal, $\vec{N}$, given Height Gradients, $h_s$ and $h_t$, and Basis Vectors, $\vec{b}_s$ and $\vec{b}_t$.

How the Height Gradients and Basis Vectors are specified depends on the model used.

2.7.2.2 Basis Vectors

Basis Vectors can be calculated using [5].

$$[5]\, \begin{array}{ll} b_{xs} = \hat{N}_y \cdot z_t - \hat{N}_z \cdot y_s & b_{xt} = \hat{N}_z \cdot y_t - \hat{N}_y \cdot z_s \\ b_{ys} = \hat{N}_z \cdot x_t - \hat{N}_x \cdot z_t & b_{ys} = \hat{N}_x \cdot z_s - \hat{N}_z \cdot x_s \\ b_{zs} = \hat{N}_x \cdot y_t - \hat{N}_y \cdot x_t & b_{zt} = \hat{N}_y \cdot x_s - \hat{N}_x \cdot y_s \end{array}$$

This calculation for Basis Vectors is the one proposed by Blinn and requires Surface Tangents, a unit Normal Vector, and a cross product.

From the diagram, if the Surface Tangents are orthogonal, the Basis can be approximated by:

$$[6]\, \begin{array}{ll} b_{xs} = -x_s & b_{xt} = -x_t \\ b_{ys} = -y_s & b_{yt} = -y_t \\ b_{zs} = -z_s & b_{zt} = -z_t \end{array}$$

2.7.2.3 Height Gradients

The Height Gradients, $h_s$ and $h_t$, are provided per fragment by in the conventional approaches.

2.7.2.4 Surface Tangent Generation

The partial derivatives, $$\vec{V}_g = \frac{\partial \vec{V}_e}{\partial s}$$

and $$\vec{V}_g = \frac{\partial \vec{V}_e}{\partial t}$$

are called Surface Tangents. If the user does not provide the Surface Tangents per Vertex, then they need to be generated. The vertices V1 and V2 of a triangle can be described relative to V0 as:

$$\vec{V}_1 = \vec{V}_0 + \frac{\partial \vec{V}_e}{\partial s} \cdot (s_1 - s_0) + \frac{\partial \vec{V}_e}{\partial t} \cdot (t_1 - t_0)$$

$$\vec{V}_2 = \vec{V}_0 + \frac{\partial \vec{V}_e}{\partial s} \cdot (s_2 - s_0) + \frac{\partial \vec{V}_e}{\partial t} \cdot (t_2 - t_0)$$

Let $$\hat{V}_1 = \vec{V}_1 - \vec{V}_0, \quad \hat{x}_1 = x_1 - x_0, \quad \hat{y}_1 = y_1 - y_0, \quad \hat{z}_1 = z_1 - z$$

$$\hat{V}_2 = \vec{V}_2 - \vec{V}_0, \quad \hat{x}_2 = x_2 - x_0, \quad \hat{y}_2 = y_2 - y_0, \quad \hat{z}_2 = z_2 - z$$

$$\hat{s}_1 = s_1 - s_0, \quad \hat{t}_1 = t_1 - t_0$$

$$\hat{s}_2 = s_2 - s_0, \quad \hat{t}_2 = t_2 - t_0$$

Then, $$\hat{V}_1 = \vec{V}_s \cdot \hat{s}_1 + \vec{V}_t \cdot \hat{t}_1 \quad \hat{V}_2 = \vec{V}_s \cdot \hat{s}_2 + \vec{V}_t \cdot \hat{t}_2$$

Solving for the partials:

$$\vec{V}_s = \frac{\hat{V}_1 \cdot \hat{t}_2 - \hat{V}_2 \cdot \hat{t}_1}{\hat{s}_1 \cdot \hat{t}_2 - \hat{s}_2 \cdot \hat{t}_1}, \quad \vec{V}_t = \frac{\hat{s}_1 \cdot \hat{V}_2}{\hat{s}_1 \cdot \hat{t}_2}$$

or $$\frac{\partial x_e}{\partial s} = \frac{D_{xt}}{D_{st}}, \quad \frac{\partial x_e}{\partial t} = \frac{D_{sx}}{D_{st}}$$

$$\frac{\partial y_e}{\partial s} = \frac{D_{yt}}{D_{st}}, \quad \frac{\partial y_e}{\partial t} = \frac{D_{sy}}{D_{st}}$$

$$\frac{\partial z_e}{\partial s} = \frac{D_{zt}}{D_{st}}, \quad \frac{\partial z_e}{\partial t} = \frac{D_{sz}}{D_{st}}$$

where:

$$D_{ij} = \hat{i}_1 \hat{j}_2 - \hat{i}_2 \hat{j}_1$$

Two different conventional approaches to implementing bump mapping in accordance with the preceding description are now described with reference to FIGS. 5A, 5B, 6A and 6B.

2.7.2.5 SGI Bump Mapping

Referring to FIG. 5A, there is shown a functional flow diagram illustrating a bump mapping approach proposed by Silicon Graphics (SGI). The functional blocks include: "compute perturbed normal" SGI10, "store texture map" SGI12, "perform lighting computations" SGI14 and "transform eye space to tangent space" SGI16. In the typical embodiment of this approach the steps SGI10 and SGI12 are performed in software and the steps SGI14 and SGI16 are performed in 3D graphics hardware. In particular, the step SGI16 is performed using the same hardware that is optimized to perform Phong shading. The SGI approach is documented in the Peercy reference.

A key aspect of the SGI approach is that all lighting and bump mapping computations are performed in tangent space, which is a space defined for each surface/object by orthonormal vectors comprising a unit surface normal (N) and two unit surface tangents (T and B). The basis vectors could be explicitly defined at each vertex by an application program or could be derived by the graphics processor from a reference frame that is local to each object. However the tangent space is defined, the components of the basis vectors are given in eye space. A standard theorem from linear algebra states that the matrix used to transform from coordinate system A (e.g., eye space) to system B (e.g., tangent space) can be formed from the coordinates of the basis vectors of system B in system A. Consequently, a matrix M whose columns comprise the basis vectors N, T and B represented in eye space coordinates can be used to transform eye space vectors into corresponding tangent space vectors. As described below, this transformation is used in the SGI pipeline to enable the lighting and bump mapping computations to be done in tangent space.

The elements employed in the illustrated SGI approach include the following:

u one coordinate of tangent space in plane of surface v one coordinate of tangent space in plane of surface N surface normal at each vertex of a fragment to be illuminated;

$P_u$ surface tangent along the u axis at each vertex of a fragment to be illuminated;

$P_v$ surface tangent along the v axis at each vertex of a fragment to be illuminated;

$f_u(u,v)$ partial derivative along the u axis of the input texture map computed at each point of the texture map (NOTE: according to the OpenGL standard, an input texture map is a 1, 2 or 3-dimensional array of values f(u,v) that define a height field in (u,v) space. In the SGI approach this height field is converted to a collection of partial derivatives $f_u(u,v)$, $f_v(u,v)$ that gives the gradient in two directions (u and v) for each point of the height field);

$f_v(u,v)$ partial derivative along the v axis of the input texture map computed at each point of the texture map (see discussion of $f_u(u,v)$);

L light vector in eye space;

H half angle vector in eye space;

$L_{TS}$ light vector in tangent space;

$H_{TS}$ half angle vector in tangent space;

T unit surface tangent along $P_u$;

B unit surface binormal, defined as the cross product of N and T.

Note: the preceding discussion uses notation from the Peercy paper, other portions of this application (e.g., the remainder of the background and the detailed description) use different notation for similar parameters. The correspondence between the two systems is shown below, with the Peercy notation listed under the column labelled "SGI" and the other notation listed under the column labelled "Raycer".

| SGI | Raycer |
| --- | --- |
| N | N |
| L | L |
| H | H |
| u | s |
| v | t |
| ∂h/∂s | $f_u(u,v)$ |
| ∂h/∂t | $f_v(u,v)$ |
| $P_u$ | $V_s$ |
| $P_v$ | $V_t$ |
| T | T |
| B | B |

In the SGI approach an input texture map comprising a set of partial derivatives $f_u(u,v)$, $f_v(u,v)$ is used in combination with the surface normal (N) and tangents ($P_u$, $P_v$) and basis vectors B and T to compute the perturbed normal in tangent space ($N'_{TS}$) at each point of the height field according to the following equations (step SGI10):

$$N'_{TS} = (a,b,c)/\sqrt{a^2+b^2+c^2}$$

where:

$a = -f_u(B \cdot P_v)$ $b = -f_v|P_u| - f_u(T \cdot P_v)$ $c = |P_u \times P_v|$ The coefficients a, b and c are the unnormalized components of the perturbed normal $N'_{TS}$ in tangent space (i.e., the coefficient c is in the normal direction and the coefficients a and b represent perturbations to the normal in the u and v directions). In step (SGI12) these coefficients are stored as a texture map TMAP, which is provided to the SGI 3D hardware in a format specified by an appropriate API (e.g, OpenGL).

Using the linear algebra theorem mentioned above, the light and half angle vectors (L, H) are transformed to the tangent space using a matrix M (shown below) whose columns comprise the eye space (i.e, x, y and z) coordinates of the tangent, binormal and normal (T, B, N) (SGI16):

$$M = \begin{vmatrix} T_x & B_x & N_x \\ T_y & B_y & N_y \\ T_z & B_z & N_z \end{vmatrix}$$

Thus, the vectors $L_{TS}$ and $H_{TS}$ are computed as follows:

$L_{TS} = L \cdot M$ $H_{TS} = H \cdot M$

The resulting tangent space versions $L_{TS}$ and $H_{TS}$ of the light and half angle vectors are output to the Phong lighting and bump mapping step (SGI14) along with the input normal N and the texture map TMAP. In the Phong lighting and bump mapping step (SGI14) the graphics hardware performs all lighting computations in tangent space using the tangent space vectors previously described. In particular, if bump mapping is required the SGI system employs the perturbed vector $N'_{TS}$ (represented by the texture map TMAP components) in the lighting computations. Otherwise, the SGI system employs the input surface normal N in the lighting computations. Among other things, the step SGI14 involves:

1. interpolating the $N'_{TS}$, $L_{TS}$, $H_{TS}$ and $N_{TS}$ vectors for each pixel for which illumination is calculated;
2. normalizing the interpolated vectors;
3. performing the illumination computations.

A disadvantage of the SGI approach is that it requires a large amount of unnecessary information to be computed (e.g., for vertices associated with pixels that are not visible in the final graphics image). This information includes:

$N'_{TS}$ for each vertex of each surface;

$L_{TS}$ for each vertex of each surface;

$H_{TS}$ for each vertex of each surface.

The SGI approach requires extension to the OpenGL specification. In particular, extensions are required to support the novel texture map representation. These extensions are defined in: SGI OpenGL extension: SGIX_fragment_lighting_space, which is incorporated herein by reference.

FIG. 5B shows a hypothetical hardware implementation of the SGI bump mapping/Phong shading approach that is proposed in the Peercy reference. In this system note that the surface normal N and transformed light and Half-angle vectors $L_{TS}$, $H_{TS}$ are interpolated at the input of the block SGI14. The $L_{TS}$ and $H_{TS}$ interpolations could be done multiple times, once for each of the active lights. The switch S is used to select the perturbed normal $N'_{TS}$ when bump mapping is in effect or the unperturbed surface normal N when bump mapping is not in effect. The resulting normal and interpolated light and half-angle vectors are then normalized and the normalized resulting normalized vectors are input to the illumination computation, which outputs a corresponding pixel value.

Problems with SGI bump mapping include:

1. The cost of transforming the L and H vectors to tangent space, which increases with the number of lights in the lighting computation;
2. It is only suited for use in 3D graphics pipelines where most graphics processing (e.g., lighting and bump mapping) is performed fragment by fragment; in other embodiments, where fragments are processed in parallel, the amount of data that would need to be stored to allow the bump mapping computations to be performed would be prohibitive;
3. Interpolating in the lighting hardware, which is a time consuming operation that also requires all vertex information to be available (this is not possible in a deferred shading environment); and
4. Interpolating whole vectors (e.g., $L_{TS}$, $H_{TS}$) results in approximation errors that result in visual artifacts in the final image.

2.7.2.6 "Blinn" Bump Mapping

Referring to FIG. 6A, there is shown a functional flow diagram illustrating the Blinn bump mapping approach. The functional blocks include: generate gradients B10, "compute perturbed normal" B12 and "perform lighting computations" B14. In the typical embodiment of this approach the step B10 is performed in software and the steps B12 and B14 are performed in dedicated bump mapping hardware. The Blinn approach is described in the Blinn and Peercy references.

The elements employed in the illustrated Blinn approach include the following:

s one coordinate of bump space grid t one coordinate of bump space grid

N surface normal at each vertex of a fragment to be illuminated;

$v_s$ surface tangent along the s axis at each vertex of a fragment to be illuminated;

$v_t$ surface tangent along the t axis at each vertex of a fragment to be illuminated;

$h_s(s,t)$ partial derivative along the s axis of the bump height field computed at each point of the height field (NOTE: according to the OpenGL standard, an input texture map is a 1, 2 or 3-dimensional array of values h(s,t) that define a height field in (s,t) space. The API converts this height field to a collection of partial derivatives $h_s(s,t)$, $h_t(s,t)$ that gives the gradient in two directions (s and t) at each point of the height field);

$h_t(s,t)$ partial derivative along the t axis of the bump height field computed at each point of the texture map (see discussion of $h_s(s,t)$);

L light vector in eye space;

H half angle vector in eye space;

$b_s$ basis vector enabling bump gradients $h_s$ to be mapped to eye space;

$b_t$ basis vector enabling bump gradients $h_t$ to be mapped to eye space.

The Blinn approach presumes that a texture to be applied to a surface is initially defined by a height field h(s, t). The Blinn approach does not directly use this height field, but requires that the texture map representing the height field be provided by the API as a set of gradients $h_s(s, t)$ and $h_t(s, t)$ (SGI10). That is, rather than providing the perturbed normal N' (as in the SGI approach), the Blinn texture map provides two scalar values $h_s$, $h_t$ that represent offsets/perturbations to the normal. For the offsets to be applied to the normal N two basis vectors $b_s$ and $b_t$ are needed that define (in eye space) the reference frame in which the offsets are provided. The two possible sources of these vectors are:

1) Provision of the vectors by the user.
2) Automatic generation by the graphics hardware by forming partial derivatives of the per-vertex texture coordinates with respect to eye space. The justification for this definition can be found in the Watt reference.

In step (B12) the Blinn bump mapping approach perturbs the Normal vector N according to the following equation:

$$\vec{N'} = \vec{N} + h_s \cdot \vec{b_s} + h_t \cdot \vec{b_t}$$

where $h_s$ and $h_t$ are the height gradients read from texture memory and $$\vec{b_s}$$

and $$\vec{b_t}$$

are the basis vectors. See the Watt reference for a derivation of this equation, including derivation of the basis vectors $b_s$ and $b_t$. Computation of the perturbed normal includes:

1. interpolation of elements ($-V_t \times N$, $-N \times V_s$, $V_s \times V_t$) used to compute the perturbed normal N';
2. computation of the perturbed normal N' using the interpolated elements.

Once the perturbed normal N' has been computed the graphics hardware performs the lighting computations (B14). Functions performed in the step B14 include:

1. interpolation of the L and H vectors;
2. normalization of the perturbed normal N' and the L and H vectors; and
3. lighting computations.

FIG. 6B shows a hypothetical hardware implementation of the Blinn bump mapping approach that is proposed in the Peercy reference. In this system note that the multiple vector cross-products that must be computed and the required number of interpolations and normalizations. The extra operations are required in the Blinn approach to derive the basis vectors at each pixel (i.e., for each illumination calculation). Moreover, the three interpolation operations applied to the cross-products ($B_t \times N$), ($N \times B_s$), ($N_s \times B_t$) are required to be wide floating point operations (i.e., 32 bit operations) due to the possible large range of the cross-product values.

3 SUMMARY OF THE INVENTION

Overview of Aspects of the Invention—Top Level Summary

Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor is hereinafter referred to as the DSGP (for Deferred Shading Graphics Processor), or the DSGP pipeline, but is sometimes referred to as the pipeline.

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D APIs. The OpenGL specification, entitled "The OpenGL Graphics System: A Specification (Version 1.2)" by Mark Segal and Kurt Akeley, edited by Jon Leech, is included incorporated by reference.

An exemplary embodiment, or version, of a Deferred Shading Graphics Pipeline is now described. Several more exemplary embodiments of a Deferred Shading Graphics Pipeline are described in U.S. Provisional Patent Application Serial No. 60/097,336, filed Aug. 20, 1998, entitled "Graphics Processor with Deferred Shading," which is incorporated herein by reference.

Following description of this embodiment, a description is provided of an exemplary embodiment of a Phong shading system and method that can be employed in any of the Deferred Shading Graphics Pipelines. The described Phong shading system and method is compatible with the conventional approaches to bump mapping that are supported by 3D graphics standards, such as the OpenGL specification.

3.1 Versions of the Deferred Shading Graphics Pipeline

Several versions or embodiments of the Deferred Shading Graphics Pipeline are described here, and embodiments having various combinations of features may be implemented. Furthermore, features of the invention may be implemented independently of other features. Most of the important features described above can be applied to all versions of the DSGP pipeline.

3.1.1 Tiles, Stamps, Samples, and Fragments

Each frame (also called a scene or user frame) of 3D graphics primitives is rendered into a 3D window on the display screen. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per tile, but stamps could be any size within a tile). Each pixel includes one or more of samples, where each sample has its own color values and z-value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

3.1.2 Deferred Shading

In ordinary Z-buffer rendering, the renderer calculates the color value (RGB or RG BA) and z value for each pixel of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z-buffer rendering works well and requires no elaborate hardware. However, it typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. The number of surfaces per pixel, averaged over an entire frame, is called the depth complexity of the frame. In conventional z-buffered renderers, the depth complexity is a measure of the renderer's inefficiency when rendering a particular frame.

In a pipeline that performs deferred shading, hidden surface removal (HSR) is completed before any pixel coloring is done. The objective of a deferred shading pipeline is to generate pixel colors for only those primitives that appear in the final image (i.e., exact HSR). Deferred shading generally requires the primitives to be accumulated before HSR can begin. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending (as defined in the afore referenced OpenGL specification) of primitives (generally due to transparency), there are some samples that are colored by two or more primitives. This means the HSR process must determine a set of visible primitives per sample.

In some APIs, such as OpenGL, the HSR process can be complicated by other operations (that is by operation other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z-value) can be discarded by alpha test, thereby causing it to not obscure the more distant primitive. An HSR process that does not take alpha test into account could mistakenly discard the more distant primitive. Hence, there may be an inconsistency between deferred shading and alpha test (similarly, with color test and stencil test); that is, pixel coloring is postponed until after hidden surface removal, but hidden surface removal can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when needed, but this potential solution would complicate the data flow considerably. Therefore, neither of these choices is attractive. A third alternative, called conservative hidden surface removal (CHSR), is one of the important innovations provided by the inventive structure and method. CHSR is described in great detail in subsequent sections of the specification.

Another complication in many APIs is their ability to change the depth test. The standard way of thinking about 3D rendering assumes visible objects are closer than obscured objects (i.e., at lesser z-values), and this is accomplished by selecting a "less-than" depth test (i.e., an object is visible if its z-value is "less-than" other geometry). However, most APIs support other depth tests such as: greater-than, less-than, greater-than-or-equal-to, equal, less-than-or-equal-to, less-than, not-equal, and the like algebraic, magnitude, and logical relationships. This essentially "changes the rules" for what is visible. This complication is compounded by an API allowing the application program to change the depth test within a frame. Different geometry may be subject to drastically different rules for visibility. Hence, the time order of primitives with different rendering rules must be taken into account. For example, in the embodiment illustrated in FIG. 4, three primitives are shown with their respective depth test (only the z dimension is shown in the figure, so this may be considered the case for one sample). If they are rendered in the order A, B, then C, primitive B will be the final visible surface. However, if the primitives are rendered in the order C, B, then A, primitive A will be the final visible surface. This illustrates how a deferred shading pipeline must preserve the time ordering of primitives, and correct pipeline state (for example, the depth test) must be associated with each primitive.

3.1.3 Deferred Shading Graphics Pipeline, First Embodiment (Version 1)

A conventional 3D graphics pipeline is illustrated in FIG. 2. We now describe a first embodiment of the inventive 3D Deferred Shading Graphics Pipeline Version 1 (hereinafter "DSGPv1"), relative to FIG. 8. It will be observed that the inventive pipeline (FIG. 8) has been obtained from the generic conventional pipeline (FIG. 2) by replacing the drawing intensive functions 231 with: (1) a scene memory 250 for storing the pipeline state and primitive data describing each primitive, called scene memory in the figure; (2) an exact hidden surface removal process 251; (3) a fragment coloring process 252; and (4) a blending process 253.

The scene memory 250 stores the primitive data for a frame, along with their attributes, and also stores the various settings of pipeline state throughout the frame. Primitive data includes vertex coordinates, texture coordinates, vertex colors, vertex normals, and the like In DSGPv1, primitive data also includes the data generated by the setup for incremental render, which includes spatial, color, and edge derivatives.

When all the primitives in a frame have been processed by the floating-point intensive functions 213 and stored into the scene memory 250, then the HSR process commences. The scene memory 250 can be double buffered, thereby allowing the HSR process to perform computations on one frame while the floating-point intensive functions perform computations on the next frame. The scene memory can also be triple buffered. The scene memory could also be a scratch-pad for the HSR process, storing intermediate results for the HSR process, allowing the HSR process to start before all primitive have been stored into the scene memory.

In the scene memory, every primitive is associated with the pipeline state information that was valid when the primitive was input to the pipeline. The simplest way to associate the pipeline state with each primitive is to include the entire pipeline state within each primitive. However, this would introduce a very large amount of redundant information because much of the pipeline state does not change between most primitives (especially when the primitives are in the same object). The preferred way to store information in the scene memory is to keep separate lists: one list for pipeline state settings and one list for primitives. Furthermore, the pipeline state information can be split into a multiplicity of sub-lists, and additions to each sub-list occurs only when part of the sub-list changes. The preferred way to store primitives is done by storing a series of vertices, along with the connectivity information to re-create the primitives. This preferred way of storing primitives eliminates redundant vertices that would otherwise occur in polygon meshes and line strips.

The HSR process described relative to DSGPv1 is required to be an exact hidden surface removal (EHSR) because it is the only place in the DSGPv1 where hidden surface removal is done. The exact hidden surface removal (EHSR) process 251 determines precisely which primitives affect the final color of the pixels in the frame buffer. This process accounts for changes in the pipeline state, which introduces various complexities into the process. Most of these complications stem from the per-fragment operations (ownership test, scissor test, alpha test, and the like), as described above. These complications are solved by the innovative conservative hidden surface removal (CHSR) process, described later, so that exact hidden surface removal is not required.

The fragment coloring process generates colors for each sample or group of samples within a pixel. This can include: Gouraud shading, texture mapping, Phong shading, and various other techniques for generating pixel colors. This process is different from edged walk 232 and span interpolation 234 because this process must be able to efficiently generate colors for subsections of primitives. That is, a primitive may be partially visible, and therefore, colors need to be generated for only some of its pixels, and edge walk and span interpolation assume the entire primitive must be colored. Furthermore, the HSR process may generate a multiplicity of visible subsections of a primitive, and these may be interspersed in time amongst visible subsections of other primitives. Hence, the fragment coloring process 252 should be capable of generating color values at random locations within a primitive without needing to do incremental computations along primitive edges or along the x-axis or y-axis.

The blending process 253 of the inventive embodiment combines the fragment colors together to generate a single color per pixel. In contrast to the conventional z-buffered blend process 236, this blending process 253 does not include z-buffer operations because the exact hidden surface removal process 251 as already determined which primitives are visible at each sample. The blending process 253 may keep separate color values for each sample, or sample colors may be blended together to make a single color for the entire pixel. If separate color values are kept per sample and are stored separately into the Frame buffer 240, then final pixel colors are generated from sample colors during the scan out process as data is sent to the digital to analog converter 242.

3.2 Overviews of Important Innovations

The pipeline renders primitives, and the invention is described relative to a set of renderable primitives that include: 1) triangles, 2) lines, and 3) points. Polygons with more than three vertices are divided into triangles in the Geometry block, but the DSGP pipeline could be easily modified to render quadrilaterals or polygons with more sides. Therefore, since the pipeline can render any polygon once it is broken up into triangles, the inventive renderer effectively renders any polygon primitive.

To identify what part of a 3D window on the display screen a given primitive may affect, the pipeline divides the 3D window being drawn into a series of smaller regions, called tiles and stamps. The pipeline performs deferred shading, in which pixel colors are not determined until after hidden-surface removal. The use of a Magnitude Comparison Content Addressable Memory (MCCAM) allows the pipeline to perform hidden geometry culling efficiently.

3.2.1 Conservative Deferred Shading

One of the central ideas or inventive concepts provided by the invention pertains to Conservative Hidden Surface Removal (CHSR). The CHSR processes each primitive in time order and, for each sample that a primitive touches, makes conservative decision based on the various API state variables, such at depth test and alpha test. One of the important features of the CHSR process is that color computation does not need to be done during hidden surface removal even though non-depth-dependent tests from the API, such as alpha test, color test, and stencil test can be performed by the DSGP pipeline. The CHSR process can be considered a finite state machine (FSM) per sample. Hereinafter, each per-sample FSM is called a sample finite state machine (SFSM). Each SFSM maintains per-sample data including: (1) z-coordinate information; (2) primitive information (any information needed to generate the primitive's color at that sample or pixel); and (3) one or more sample state bits (for example, these bits could designate the z-value or z-values to be accurate or conservative). While multiple z-values per sample can be easily used, multiple sets of primitive information per sample would be expensive. Hereinafter, it is assumed that the SFSM maintains primitive information for one primitive. The SFSM may also maintain transparency information, which is used for sorted transparencies, described in the next section.

3.2.2 Two Modes of DSGP Operation

The DSGP can operate in two distinct modes: 1) Time Order Mode, and 2) Sorted Transparency Mode. Time Order Mode is described above, and is designed to preserve, within any particular tile, the same temporal sequence of primitives. The Sorted Transparency mode is described immediately below. In the preferred embodiment, the control of the pipeline operating mode is done in the Sort Block.

The Sort Block is located in the pipeline between a Mode Extraction Unit (MEX) and Setup (STP) unit. Sort Block operates primarily to take geometry scattered around the display window and sort it into tiles. Sort Block also manages the Sort Memory, which stores all the geometry from the entire scene before it is rasterized, along with some mode information. Sort memory comprises a double-buffered list of vertices and modes. One page collects a scene's geometry (vertex by vertex and mode by mode), while the other page is sending its geometry (primitive by primitive and mode by mode) down the rest of the pipeline.

When a page in sort memory is being written, vertices and modes are written sequentially into the sort memory as they are received by the sort block. When a page is read from sort memory, the read is done on a tile-by-tile basis, and the read process operates in two modes: (1) time order mode, and (2) sorted transparency mode.

3.2.3 Time-Ordered Mode

In time ordered mode, time order of vertices and modes are preserved within each tile, where a tile is a portion of the display window bounded horizontally and vertically. By time order preserved, we mean that for a given tile, vertices and modes are read in the same order as they are written.

3.2.4 Sorted Transparency Mode

In sorted transparency mode, reading of each tile is divided into multiple passes, where, in the first pass, guaranteed opaque geometry is output from the sort block, and in subsequent passes, potentially transparent geometry is output from the sort block. Within each sorted transparency mode pass, the time ordering is preserved, and mode date is inserted in its correct time-order location. Sorted transparency mode by be performed in either back-to-front or front-to-back order. In the preferred embodiment, the sorted transparency method is performed jointly by the Sort Block and the Cull Block.

3.2.5 Multiple-step Hidden Surface Removal

Conventionally hidden surfaces are removed using either an "exact" hidden surface removal procedure, or using z-buffers. In one embodiment of the inventive structure and method, a two-step approach is implemented wherein a (i) "conservative" hidden surface removal is followed by (ii) a z-buffer based procedure. In a different embodiment, a three-step approach is implemented: (i) a particular spatial Cull procedure, (ii) conservative hidden surface removal, and (iii) z-buffer. Various embodiments of conservative hidden surface removal (CHSR) has already been described elsewhere in this disclosure.

3.2.6 Pipeline State Preservation and Caching

Each vertex includes a color pointer, and as vertices are received, the vertices including the color pointer are stored in sort memory data storage. The color pointer is a pointer to a location in the polygon memory vertex storage that includes a color portion of the vertex data. Associated with all of the vertices, of either a strip or a fan, is an Material-Lighting-Mode (MLM) pointer set. MLM includes six main pointers plus two other pointers as described below. Each of the six main pointers comprises an address to the polygon memory state storage, which is a sequential storage of all of the state that has changed in the pipeline, for example, changes in the texture, the pixel, lighting and so forth, so that as a need arises any time in the future, one can recreate the state needed to render a vertex (or the object formed from one or more vertices) from the MLM pointer associated with the vertex, by looking up the MLM pointers and going back into the polygon memory state storage and finding the state that existed at the time.

The Mode Extraction Block (MEX) is a logic block between Geometry and Sort that collects temporally ordered state change data, stores the state in Polygon memory, and attaches appropriate pointers to the vertex data it passes to Sort Memory. In the normal OpenGL pipeline, and in embodiments of the inventive pipeline up to the Sort block, geometry and state data is processed in the order in which it was sent down the pipeline. State changes for material type, lighting, texture, modes, and stipple affect the primitives that follow them. For example, each new object will be preceded by a state change to set the material parameters for that object.

In the inventive pipeline, on the other hand, fragments are sent down the pipeline in Tile order after the Cull block. The Mode Injection Block figures out how to preserve state in the portion of the pipeline that processes data in spatial (Tile) order instead of time order. In addition to geometry data, Mode Extraction Block sends a subset of the Mode data (cull_mode) down the pipeline for use by Cull. Cull_mode packets are produced in Geometry Block. Mode Extraction Block inserts the appropriate color pointer in the Geometry packets.

Pipeline state is broken down into several categories to minimize storage as follows: (1) Spatial pipeline state includes data headed for Sort that changes every vertex; (2) Cull_mode state includes data headed for Cull (via Sort) that changes infrequently; (3) Color includes data headed for Polygon memory that changes every vertex; (4) Material includes data that changes for each object; (5) TextureA includes a first set of state for the Texture Block for textures 0&1; (6) TextureB includes a second set of state for the Texture Block for textures 2 through 7; (7) Mode includes data that hardly ever changes; (8) Light includes data for Phong; (9) Stipple includes data for polygon stipple patterns. Material, Texture, Mode, Light, and Stipple data are collectively referred to as MLM data (for Material, Light and Mode). We are particularly concerned with the MLM pointers for state preservation.

State change information is accumulated in the MEX until a primitive (Spatial and Color packets) appears. At that time, any MLM data that has changed since the last primitive, is written to Polygon Memory. The Color data, along with the appropriate pointers to MLM data, is also written to Polygon Memory. The spatial data is sent to Sort, along with a pointer into Polygon Memory (the color pointer). Color and MLM data are all stored in Polygon memory. Allocation of space for these records can be optimized in the micro-architecture definition to improve performance.

All of these records are accessed via pointers. Each primitive entry in Sort Memory contains a Color Pointer to the corresponding Color entry in Polygon Memory. The Color Pointer includes a Color Address, Color Offset and Color Type that allows us to construct a point, line, or triangle and locate the MLM pointers. The Color Address points to the final vertex in the primitive. Vertices are stored in order, so the vertices in a primitive are adjacent, except in the case of triangle fans. The Color Offset points back from the Color Address to the first dualoct for this vertex list. (We will refer to a point list, line strip, triangle strip, or triangle fan as a vertex list.) This first dualoct contains pointers to the MLM data for the points, lines, strip, or fan in the vertex list. The subsequent dualocts in the vertex list contain Color data entries. For triangle fans, the three vertices for the triangle are at Color Address, (Color Address-1), and (Color Address—Color Offset+1). Note that this is not quite the same as the way pointers are stored in Sort memory.

State is a time varying entity, and MEX accumulates changes in state so that state can be recreated for any vertex or set of vertices. The MIJ block is responsible for matching state with vertices down stream. Whenever a vertex comes into MEX and certain indicator bits are set, then a subset of the pipeline state information needs to be saved. Only the states that have changed are stored, not all states, since the complete state can be created from the cumulative changes to state. The six MLM pointers for Material, TextureA, TextureB, Mode, Light, and Stipple identify address locations where the most recent changes to the respective state information is stored. Each change in one of these state is identified by an additional entry at the end of a sequentially ordered state storage list stored in a memory. Effectively, all state changes are stored and when particular state corresponding to a point in time (or receipt of a vertex) is needed, the state is reconstructed from the pointers.

This packet of mode that are saved are referred to as mode packets, although the phrase is used to refer to the mode data changes that are stored, as well as to larger sets of mode data that are retrieved or reconstructed by MIJ prior to rendering.

We particularly note that the entire state can be recreated from the information kept in the relatively small color pointer.

Polygon memory vertex storage stores just the color portion. Polygon memory stores the part of pipeline stat that is not needed for hidden surface removal, and it also stores the part of the vertex data which is not needed for hidden surface removal (predominantly the items needed to make colors.)

3.2.7 Texel Reuse Detection and Tile Based Processing

The inventive structure and method may advantageously make use of trilinear mapping of multiple layers (resolutions) of texture maps.

Texture maps are stored in a Texture Memory which may generally comprise a single-buffered memory loaded from the host computer's memory using the AGP interface. In the exemplary embodiment, a single polygon can use up to four textures. Textures are MIP-mapped. That is, each texture comprises a series of texture maps at different levels of detail or resolution, each map representing the appearance of the texture at a given distance from the eye point. To produce a texture value for a given pixel fragment, the Texture block performs tri-linear interpolation from the texture maps, to approximate the correct level of detail. The Texture block can alternatively performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

The multiple layers are MIP layers, and interpolation is within and between the MIP layers. The first interpolation ii within each layer, then you interpolate between the two adjacent layers, one nominally having resolution greater than required and the other layer having less resolution than required, so that it is done 3-dimensionally to generate an optimum resolution.

The inventive pipeline includes a texture memory which includes a texture cache really a textured reuse register because the structure and operation are different from conventional caches. The host also includes storage for texture, which may typically be very large, but in order to render a texture, it must be loaded into the texture cache which is also referred to as texture memory. Associated with each VSP are S and T's. In order to perform trilinear MIP mapping, we necessarily blend eight (8) samples, so the inventive structure provides a set of eight content addressable (memory) caches running in parallel. n one embodiment, the cache identifier is one of the content addressable tags, and that's the reason the tag part of the cache and the data part of the cache is located are located separate from the tag or index. Conventionally, the tag and data are co-located so that a query on the tag gives the data. In the inventive structure and method, the tags and data are split up and indices are sent down the pipeline.

The data and tags are stored in different blocks and the content addressable lookup is a lookup or query of an address, and even the "data" stored at that address in itself and index that references the actual data which is stored in a different block. The indices are determined, and sent down the pipeline so that the data referenced by the index can be determined. In other words, the tag is in one location, the texture data is in a second location, and the indices provide a link between the two storage structures.

In one embodiment of the invention Texel Reuse Detection Registers (TRDR) comprise a multiplicity of associate memories, generally located on the same integrated circuit as the texel interpolator. In the preferred embodiment, the texel reuse detection method is performed in the Texture Block.

In conventional 3-D graphics pipelines, an object in some orientation in space is rendered. The object has a texture map on it, and its represented by many triangle primitives. The procedure implemented in software, will instruct the hardware to load the particular object texture into a DRAM. Then all of the triangles that are common to the particular object and therefore have the same texture map are fed into the unit and texture interpolation is performed to generate all of the colored pixels need to represent that particular object. When that object has been colored, the texture map in DRAM can be destroyed since the object has been rendered. If there are more than one object that have the same texture map, such as a plurality of identical objects (possibly at different orientations or locations), then all of that type of object may desirably be textured before the texture map in DRAM is discarded. Different geometry may be fed in, but the same texture map could be used for all, thereby eliminating any need to repeatedly retrieve the texture map from host memory and place it temporarily in one or more pipeline structures.

In more sophisticated conventional schemes, more than one texture map may be retrieved and stored in the memory, for example two or several maps may be stored depending on the available memory, the size of the texture maps, the need to store or retain multiple texture maps, and the sophistication of the management scheme. Each of these conventional texture mapping schemes, spatial object coherence is of primary importance. At least for an entire single object, and typically for groups of objects using the same texture map, all of the triangles making up the object are processed together. The phrase spatial coherency is applied to such a scheme because the triangles form the object and are connected in space, and therefore spatially coherent.

In the inventive deferred shader structure and method we do not necessarily rely on or derive appreciable benefit from this type of spatial object coherence. Embodiments of the inventive deferred shader operate on tiles instead. Any given tile might have an entire object, a plurality of objects, some entire objects, or portions of several objects, so that spatial object coherence over the entire tile is typically absent.

Well we break that conventional concept completely because the inventive structure and method are directed to a deferred shader. Even if a tile should happen to have an entire object there will typically be different background, and the inventive Cull Block and Cull procedure will typically generate and send VSPs in a completely jumbled and spatially incoherent order, even if the tile might support some degree of spatial coherency. As a result, the pipeline and texture block are advantageously capable of changing the texture map on the fly in real-time and in response to the texture required for the object primitive (e.g. triangle) received. Any requirement to repeatedly retrieve the texture map from the host to process the particular object primitive (for example, single triangle) just received and then dispose of that texture when the next different object primitive needing a different texture map would be problematic to say the least and would preclude fast operation.

In the inventive structure and method, a sizable memory is supported on the card. In one implementation 128 megabytes are provided, but more or fewer megabytes may be provided. For example, 34 Mb, 64 Mb, 256 Mb, 512 Mb, or more may be provided, depending upon the needs of the user, the real estate available on the card for memory, and the density of memory available.

Rather than reading the 8 textels for every visible fragment, using them, and throwing them away so that the 8 textels for the next fragment can be retrieved and stored, the inventive structure and method stores and reuses them when there is a reasonable chance they will be needed again.

It would be impractical to read and throw away the eight textels every time a visible fragment is received. Rather, it is desirable to make reuse of these textels, because if you're marching along in tile space, your pixel grid within the tile (typically processed along sequential rows in the rectangular tile pixel grid) could come such that while the same texture map is not needed for sequential pixels, the same texture map might be needed for several pixels clustered in a n area of the tile, and hence needed only a few process steps after the first use. Desirably, the invention uses the textels that have been read over and over, so when we need one, we read it, and we know that chances are good that once we have seem one fragment requiring a particular texture map, chances are good that for some period of time afterward while we are in the same tile, we will encounter another fragment from the same object that will need the same texture. So we save those things in this cache, and then on the fly we look up from the cache (texture reuse register) which ones we need. If there is a cache miss, for example, when a fragment and texture map are encountered for the first time, that texture map is retrieved and stored in the cache.

3.2.8 Fragment Coloring

Fragment coloring is performed for two-dimensional display space and involves an interpolation of the color from for example the three vertices of a triangle primitive, to the sampled sub-sample of the displayed pixel. Essentially, fragment coloring involves applying an interpolation function to the colors at the three fragment vertices to determine a color for a location spatially located between or among the three vertices. Typically, but optionally, some account will be taken of the perspective correctness in performing the interpolation.

3.2.9 Interpolation of Normals

Various compromises have conventionally been accepted relative to the computation of surface normals, particularly a surface normal that is interpolated between or among other surface normals, in the 3D graphics environment. The compromises have typically traded-off accuracy for computational ease or efficiency. Ideally, surface normals should be interpolated angularly, that is based on the actual angular differences in the angles of the surface normals on which the interpolation is based. In fact such angular computation is not well suited to 3D graphics applications.

Therefore, more typically, surface normals are interpolated based on linear interpolation of the input normals. For low to moderate quality rendering, linear interpolation of the composite surface normals may provide adequate accuracy; however, considering a two-dimensional interpolation example, when one vector (surface normal) has for example a larger magnitude that the other vector, but comparable angular change to the first vector, the resultant vector will be overly influenced by the larger magnitude vector in spite of the comparable angular difference between the two vectors. This may result in objectionable error, for example, some surface shading or lighting calculation may provide an anomalous result and detract from the output scene.

In the inventive structure and method the magnitude is interpolated separately from the direction or angle. The interpolated magnitude are computed then the direction vectors which are equal size. The separately interpreted magnitudes and directions are then recombined, and the direction is normalized.

While the ideal angular interpretation would provide the greatest accuracy, however, the interpolation involves three points on the surface of a sphere and various great-circle calculations. This sort of mathematical complexity is not well suited for real-time fast pipeline processing. The single step linear interpolation is much easier but is susceptible to greater error. In comparison to each of these procedures, the inventive surface normal interpolation procedure has greater accuracy than conventional linear interpolation, and lower computational complexity that conventional angular interpolation.

3.2.10 Variable Scale Bump Maps

Generating variable scale bump maps involves one or both of two separate procedures: automatic basis generation and automatic gradient field generation. Consider a gray scale image and its derivative in intensity space. Automatic gradient field takes a derivative, relative to gray scale intensity, of a gray scale image, and uses that derivative as a surface normal perturbation to generate a bump for a bump map. Automatic basis generation saves computation, memory storage in polygon memory, and input bandwidth in the process.

For each triangle vertex, an s,t and surface normal are specified. But the s and t aren't color, rather they are two-dimensional surface normal perturbations to the texture map, and therefore a texture bump map. The s and t are used to specify the directions in which to perturb the surface normals in order to create a usable bump map. The s,t give us an implied coordinate system and reference from which we can specify perturbation direction. Use of the s,t coordinate system at each pixel eliminates any need to specify the surface tangent and the bi-normal at the pixel location. As a result, the inventive structure and method save computation, memory storage and input bandwidth.

3.2.11 Performing Tangent Space Lighting in a Deferred Shading Environment

The background describes two exemplary approaches to performing bump mapping in a conventional 3D graphics system. These approaches compute for each vertex of a surface a perturbed surface normal N' that accounts for bump effects and then employ in lighting computations the perturbed normal N' instead of the input surface normal N.

One of the approaches (the "SGI approach") attempts to reduce the number of bump mapping computations by storing in a texture map precomputed components of the perturbed normals N' of the surfaces involved in the lighting computation. The components of the perturbed surface normals N' are defined in "tangent space", which differs from the "eye space" in which many elements of the lighting equation are defined.

To efficiently use this tangent space information the SGI approach performs all lighting computations in tangent space. This allows the perturbed normals N' to be used directly from the texture map. However, this also requires that vectors used in the lighting equation (e.g., the light and halfangle vectors L and H) first be transformed from eye space to tangent space. As described in the background, this transformation is done for each vertex using a transformation matrix comprising surface tangent, binormal and normal vectors (T, B, N).

In the conventional manner, the SGI approach performs all graphics processing steps prior to the final pixel output step one primitive (i.e., polygon, triangle, etc.) at a time. One result of this approach is that unnecessary, numerically intensive tangent space transformations and lighting computations are likely to be performed for hidden surfaces whose pixels will be discarded in the z-buffer removal step. Another result of this approach is that in the SGI pipeline there is no need to retain any of the lighting state for primitives other than the one being currently processed.

In contrast, in a deferred shading graphics pipeline (DSGP) implemented in accordance with the present invention, the lighting computations are not performed until after hidden surfaces have been conservatively removed. Implementing the SGI approach to bump mapping in such a DSGP would require the graphics pipeline to retain the lighting state for all visible surfaces. Retaining this lighting state could require significant storage per fragment. For this reason it would not be practical to implement the SGI approach in a deferred shading environment.

Even though it is not practical to employ the Blinn and SGI approaches in a DSGP implemented in accordance with the present invention, many graphics applications that employ bump mapping provide texture/bump maps in the Blinn or SGI formats, or other tangent space formats (e.g., 3D Studio Max). Additionally, these formats are supported in 3D graphics specifications, such as OpenGL. For these reasons, it is desirable for all graphics pipelines, including the DSGP of the present invention, to support the Blinn, SGI and other common texture map formats. Therefore, it is a goal of the present invention to provide systems and methods for use in a DSGP that efficiently perform lighting and bump mapping using conventional lighting and texture map information provided to the DSGP.

In accordance with this goal, the present invention is a system and method for performing tangent space lighting in a DSGP. In particular, the present invention is a system and method for performing bump mapping and lighting computations in eye space using texture information represented in tangent space.

One embodiment encompasses blocks of the DSGP that preprocess data (referred to collectively as the preprocessor hereinafter) and a Phong shader (implemented as hardware or software). The preprocessor receives texture maps specified in a variety of formats and converts those texture maps to a common format for use by the Phong shader. The preprocessor also provides basis vectors ($b_s$, $b_t$, n), a vector Tb that represents in tangent/object space texture/bump data, light data, material data, eye coordinates and other information used by the Phong shader to perform the lighting and bump mapping computations. The data from the preprocessor is provided for each fragment for which lighting effects need to be computed.

The Phong shader computes the RGBA value for the pixels in a fragment using the information provided by the preprocessor. The Phong shader performs all lighting computations in eye space, which requires it first to transform bump data from tangent space to eye space. In one embodiment the Phong hardware does this by multiplying a matrix M whose columns comprise the eye space basis vectors ($b_s$, $b_t$, n) and the vector Tb of bump map data. The eye space basis vectors are defined by the DSGP preprocessor so that the multiplication (M×Tb) gives the perturbed normal N' in eye space in accordance with the Blinn bump mapping equation:

$$N'=N+b_s h_s+b_t h_t.$$

The Phong shader uses the resulting perturbed normal N' in the lighting equations. One advantage of this approach over the prior art is that it is necessary to transform only a single vector (the perturbed normal) to eye space whereas, in the SGI approach, it is necessary to transform both the light and half angle vectors (L, H) to tangent space for multiple lights.

In one embodiment, the preprocessor provides the basis vectors ($b_s$, $b_t$, n) as a set of unit vectors ($\hat{b}_s$, $\hat{b}_t$, $\hat{n}$) and their associated magnitudes ($m_{bs}$, $m_{bt}$, $m_n$), which allows the Blinn bump equation to be rewritten as follows:

$$N'=\hat{n}m_n+\hat{b}_s m_{bs} h_s+\hat{b}_t m_{bt} h_t.$$

Providing the basis information in this way allows the Phong hardware to compute the perturbed normal N' in eye space using the following matrix computation:

$$N' = |\hat{b}_s \hat{b}_t \hat{n}| \begin{vmatrix} m_{bs} h_s \\ m_{bt} h_t \\ m_n \end{vmatrix},$$

where $|\hat{b}_s\ \hat{b}_t\ \hat{n}|=M'$ is expanded as:

$$\begin{vmatrix} \hat{b}_{xs} \hat{b}_{xt} \hat{n}_x \\ \hat{b}_{ys} \hat{b}_{yt} \hat{n}_y \\ \hat{b}_{zs} \hat{b}_{zt} \hat{n}_z \end{vmatrix}.$$

In one embodiment the Phong shader performs the bump mapping and lighting computations using floating point hardware.

In another embodiment the Phong shader is optimized to store each component of the matrix M' as a fixed point value. In yet another embodiment, the components of the updated bump vector Tb'=($m_{bs}h_s$, $m_{bt}h_t$, $m_n$) are scaled by scale factors ($s_s$, $s_t$, $s_n$) selected to allow the each component of the resulting bump vector Tb"=($m_{bs}h_s s_s$, $m_{bt}h_t s_t$, $m_n s_n$) to be stored as a vector of fixed-point values. This enables the Phong shader to be configured to perform all or a substantial portion of the matrix multiplication M×Tb using fixed point hardware, which reduces hardware complexity.

A significant advantage of the present invention is that the Phong shader does not need to interpolate any vectors (e.g., the tangent space perturbed normal N', light L or half angle H vectors). Instead, the preprocessor performs whatever vertex interpolations are necessary and provides the interpolated vectors to the Phong shader referenced to the (s, t) bump grid along with a fragment located at the same grid position. This greatly reduces the complexity of the bump operations, which, as a result can be integrated with the Phong shader whether implemented in hardware or software.

Note that the preprocessor performs vector interpolation by separating each vector into a unit vector and an associated magnitude, interpolating the unit vectors and magnitudes separately, and combining the interpolated unit vector and magnitude. This procedure is more accurate and produces fewer artifacts than when non-normalized vectors are directly interpolated, as in the prior art. For example, one artifact that results from normalizing non-unit vectors is an approximation error directly related to the magnitudes of the vectors being interpolated.

In one embodiment of the DSGP the preprocessor passes the Phong shader at least one packet of texture information (a texel) for each fragment to be illuminated. Among other things, a texel provides the bump mapping data to be used for fragment. In one embodiment, the information content of a texel used to provide bump mapping data depends on the format of the texture information provided to the DSGP. For example, when the texture information is provided in the SGI format the texel vector Tb provides the components $n'_x$, $n'_y$, $n'_z$ of the perturbed surface normal. When the input is provided in the Blinn format, the texel vector Tb provides the surface gradients $h_s$, $h_t$ of the unperturbed surface normal.

Accordingly, in one embodiment, when the texel provides SGI-type data the Phong hardware determines the perturbed normal in eye space by multiplying the matrix M by a vector Tb that comprises the three texel components ($n'_x$, $n'_y$, $n'_z$). When the texel provides Blinn-type data the Phong hardware determines the perturbed normal in eye space by multiplying the matrix M by a vector Tb that comprises the two texel components $h_s$, $h_t$ and a third component that is 1. The third component that is 1 accounts for the fact that the Blinn approach applies the height gradients ($h_s$, $h_t$) to the unperturbed surface normal.

In one embodiment the preprocessor passes the Phong hardware the following fragement information for each fragment being illuminated:

tangent space components $n_x$, $n_y$, $n_z$ of the surface normal unit vector;

magntude $m_n$ of the surface normal;

surface tangent unit vector $b_s$ along the s tangent space axis;

surface tangent unit vector $b_t$ along the t tangent space axis;

surface tangent $b_s$ magnitude;

surface tangent $b_t$ magnitude;

eye coordinates x, y, z.

In one embodiment, the preprocessor computes the basis vectors in a manner that is consistent with the content of the lighting information input to the DSGP. That is, when the lighting information is in the SGI format the preprocessor defines the basis vectors as: $b_s=-v_s$, $b_t=-v_t$; or, defined as unit vectors and associated magnitudes: $\hat{b}_s=-\hat{v}_s$, $m_{bs}=m_{vs}$ and $\hat{b}_t=-\hat{v}_t$, $m_{bt}=m_{vt}$. When the lighting texture information is in the Blinn format the preprocessor defines the basis vectors as: $b_s=\hat{n}\times v_t$, $b_t=v^s\times\hat{n}$ or, defined as unit vectors and associated magnitudes: $b_s=\hat{n}\times\hat{v}_t$, $m_{bs}=m^{vt}$ and $b_t=\hat{v}_s\times\hat{n}$, $m_{bt}=m_{vs}$.

Defining the basis vectors in this manner enables the same Phong shader to perform bump computations in a variety of formats, including, at a minimum, Blinn and SGI formats.

BRIEF DESCRIPTION OF THE DRAWINGS

Additional objects and features of the invention will be more readily apparent from the following detailed description and appended claims when taken in conjunction with the drawings, in which:

FIG. 19 is a diagramatic illustration showing an embodiment of the on-chip state vector partitioning of the exemplary Mode Extraction Block.

FIG. 20 is a diagrammatic illustration showing aspects of a process for saving information to polygon memory.

FIG. 21 is a diagrammatic illustration showing DSGP triangles arriving at the STP Block and which can be rendered in the aliased or anti-aliased mode.

FIG. 22 is a diagrammatic illustration showing the manner in which DSGP renders lines by converting them into quads and various quads generated for the drawing of aliased and anti-aliased lines of various orientations.

FIG. 23 is a diagrammatic illustration showing the manner in which the user specified point is adjusted to the rendered point in the Geometry Unit.

FIG. 24 is a diagrammatic illustration showing the manner in which anti-aliased line segments are converted into a rectangle in the CUL unit scan converter that rasterizes the parallelograms and triangles uniformly.

FIG. 26 is a diagrammatic illustration showing an aspect of how Setup represents lines and triangles, including the vertex assignment.

FIG. 31 is a diagrammatic illustration of exemplary embodiments of tag caches which are fully associative and use Content Addressible Memories (CAMs) for cache tag lookup.

DETAILED DESCRIPTION OF PREFERRED EMBODIMENTS OF THE INVENTION

4 SYSTEM LEVEL OVERVIEW

Figure 15:
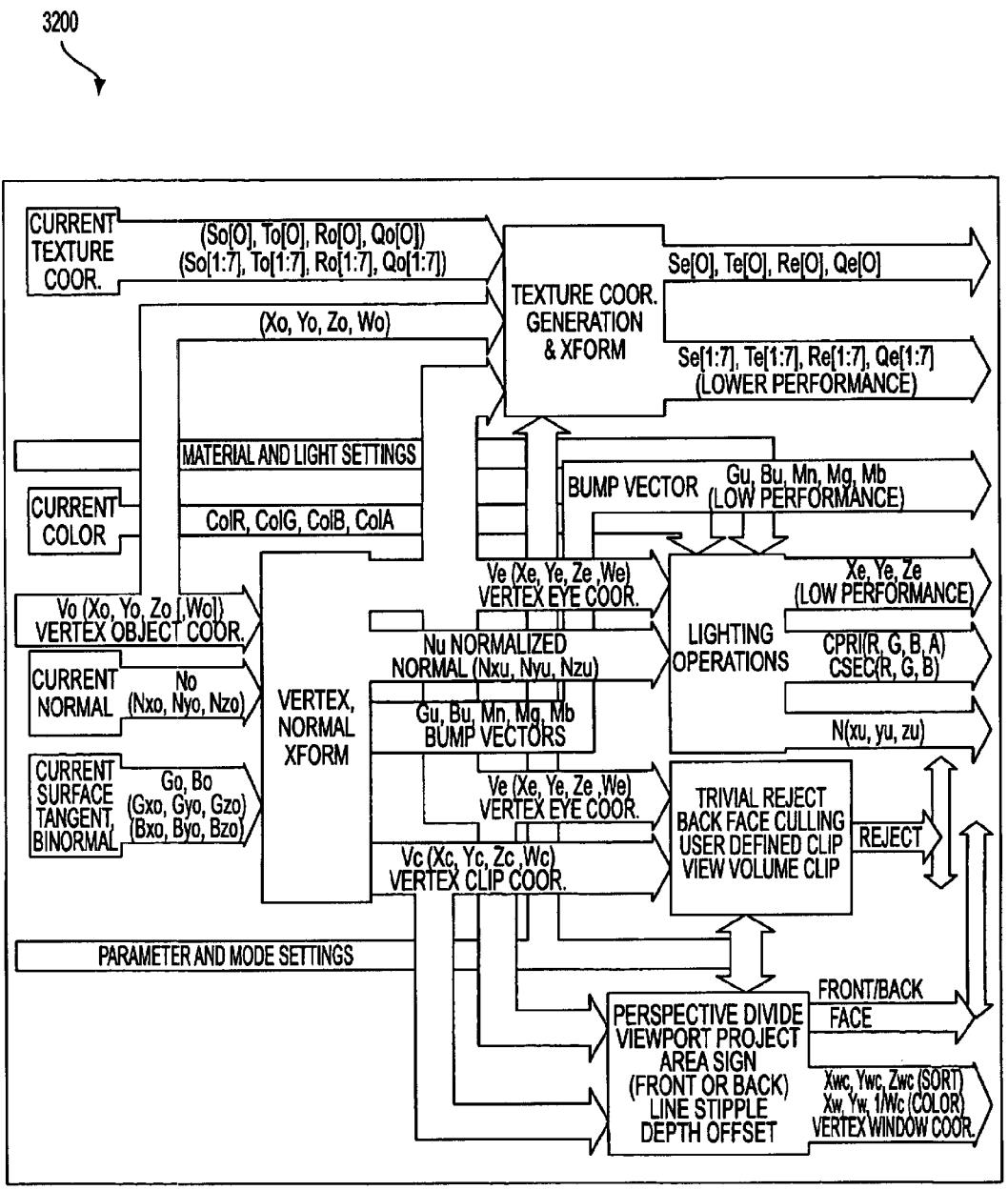
FIG. 15 is a diagrammatic illustration showing a functional block diagram of the Geometry Block (GEO).

The pipeline takes data from the host computer's I/O bus, processes it, and sends it to the computer's display. The pipeline is divided into twelve blocks, plus three memory stores and the frame buffer. FIG. 15 shows the flow of data through the pipeline 1000. The blocks that make up the pipeline are discussed below.

4.1 Command Fetch and Decode (CFD)

Command Fetch and Decode (CFD) 2000 handles communication with the host computer through the I/O bus. It converts its input into a series of packets, which it passes to the Geometry block. Most of the input stream consists of geometrical data-lines, points, and polygons. The descriptions of these geometrical objects can include colors, surface normals, texture coordinates, and so on. The input stream also contains rendering information, such as lighting, blending modes, and buffer functions.

4.2 Geometry (GEO)

The Geometry block 3000 handles four major tasks: transforms, decomposition of all polygons into triangles, clipping, and per-vertex lighting calculations needed for Gouraud shading.

First, the Geometry block transforms incoming graphics primitives into a uniform coordinate space ("world space"). Then it clips the primitives to the viewing volume, or frustum. In addition to the six planes that define the viewing volume (left, right, top, bottom, front and back), the DSGP pipeline provides six user-definable clipping planes. After clipping, the Geometry block breaks polygons with more than three vertices into sets of triangles, to simplify processing.

Finally, if there is any Gouraud shading in the frame, the Geometry block calculates the vertex colors that the Fragment block uses to perform the shading.

4.3 Mode Extraction (MEX)

The Mode Extraction block 4000 separates the data stream into two parts: 1) vertices, and 2) everything else. Vertices are sent to the Sort block. The "everything else"—lights, colors, texture coordinates, and so on—is stored in a special buffer called the Polygon Memory, where it can be retrieved by the Mode Injection block. The Polygon Memory is double buffered, so the Mode Injection block can read data for one frame, while the Mode Extraction block is storing data for the next frame. The mode data stored in the Polygon Memory falls into three major categories: per-frame data (such as lighting), per-primitive data (such as material properties) and per-vertex data (such as color). The Mode Extraction and Mode Injection blocks further divide these categories to optimize efficiency.

For each vertex, the Mode Extraction block sends the Sort block a packet containing the vertex data and a pointer into the Polygon Memory. (The pointer is called the color pointer, which is somewhat misleading, since it is used to retrieve all sorts of other information besides color.) The packet also contains fields indicating whether the vertex represents a point, the endpoint of a line, or the corner of a triangle. The vertices are sent in a strict time sequential order, the same order in which they were fed into the pipeline. The packet also specifies whether the current vertex forms the last one in a given primitive (i.e., "completes" the primitive). In the case of triangle strips or fans, and line strips or loops, the vertices are shared between adjacent primitives. In this case, the packets indicate how to identify the other vertices in each primitive.

4.4 Sort (SRT)

The Sort block 6000 receives vertices from the Mode Extraction block and sorts the resulting points, lines, and triangles by tile. In the double-buffered Sort Memory 7000, it maintains a list of vertices representing the graphic primitives, and a set of Tile Pointer Lists—one list for each tile in the frame. When it receives a vertex that completes a primitive (such as the third vertex in a triangle), it checks to see which tiles the primitive touches. For each Tile a primitive touches, the Sort block adds a pointer to the vertex to that tile's Tile Pointer List.

When the Sort block has finished sorting all the geometry in a frame, it sends the data to Setup. Each Sort block output packet represents a complete primitive. Sort sends its output in tile-by-tile order: all of the primitives that touch a given tile, then all of the primitives that touch the next tile, and so on. Note that this means that Sort may send the same primitive many times, once for each tile it touches.

4.5 Setup (STP)

The Setup block 8000 calculates spatial derivatives for lines and triangles. It processes one tile's worth of data, one primitive at a time. When it's done with a primitive, it sends the data on to the Cull block. The Setup block also breaks stippled lines into separate line segments (each a rectangular region), and computes the minimum z value for each primitive within the tile. Each primitive packet output from Setup represents one primitive: a triangle, line segment or point.

4.6 Cull (CUL)

Figure 16:
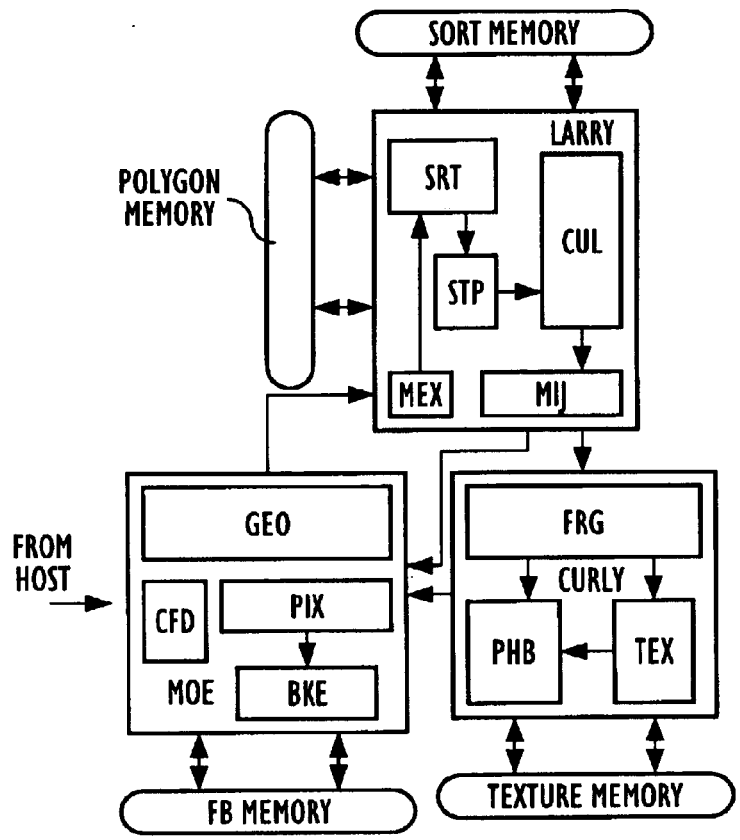
FIG. 16 is a diagrammatic illustration showing relationships between functional blocks on semiconductor chips in a three-chip embodiment of the inventive structure.

The Cull block 9000 is one of the more complex blocks, and processing is divided into two steps: Magnitude Comparison Content Addressable Memory (MCCAM) Cull, and Subpixel Cull. The Cull block accepts data one tile's worth at a time. The MCCAM Cull discards primitives that are hidden completely by previously processed geometry. The Subpixel Cull takes the remaining primitives (which are partly or entirely visible), and determines the visible fragments. The Subpixel Cull outputs one stamp's worth of fragments at a time, called a Visible Stamp Portion (VSP). FIG. 16 shows an example of how the Cull block produces fragments from a partially obscured triangle.

Note that a Visible Stamp Portion produced by the Cull block contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later, in the Pixel block.

Each pixel in a VSP is divided up into a number of samples to determine how much of the pixel is covered by a given fragment. The Pixel block uses this information when it blends the fragments to produce the final color for the pixel.

4.7 Mode Injection (MIJ)

The Mode Injection block 10000 retrieves mode information—such as colors, material properties, and so on—from the Polygon Memory 5000 and passes it downstream as required. To save bandwidth, the individual downstream blocks cache recently used mode information. The Mode Injection block keeps track of what information is cached downstream, and only sends information as necessary.

4.8 Fragment (FRG)

The Fragment block 11000 is somewhat misleadingly named, since its main work is interpolation. It interpolates color values for Gouraud shading, surface normals for Phong shading and texture coordinates for texture mapping. It also interpolates surface tangents for use in the bump mapping algorithm, if bump maps are in use.

The Fragment block performs perspective corrected interpolation using barycentric coefficients.

4.9 Texture (TEX)

The Texture block 2000 applies texture maps to the pixel fragments. Texture maps are stored in the Texture Memory 13000. Unlike the other memory stores described previously, the Texture Memory is single-buffered. It is loaded from the host computer's memory using the AGP interface. A single polygon can use up to four textures.

Textures are mip-mapped. That is, each texture comprises a series of texture maps at different levels of detail, each map representing the appearance of the texture at a given distance from the eye point. To produce a texture value for a given pixel fragment, the Texture block performs tri-linear interpolation from the texture maps, to approximate the correct level of detail. The Texture block also performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

4.10 Phong (PHG)

The Phong block 14000 performs Phong shading for each pixel fragment. It uses the material and lighting information supplied by the Mode Injection block, the texture colors from the Texture block, and the surface normal generated by the Fragment block to determine the fragment's apparent color. If bump mapping is in use, the Phong block uses the interpolated height field gradient from the Texture block to perturb the fragment's surface normal before shading.

4.11 Pixel (PIX)

The Pixel block 15000 receives VSPs, where each fragment has an independent color value. The Pixel block performs pixel ownership test, scissor test, alpha test, stencil operations, depth test, blending, dithering and logic operations on each sample in each pixel (see OpenGL Spec 1.1, Section 4.1, "Per-Fragment Operations," p. 109). When the Pixel block has accumulated a tile's worth of finished pixels, it blends the samples within each pixel (thereby performing antialiasing of pixels) and sends them to the Backend, to be stored in the framebuffer.

Figure 17:
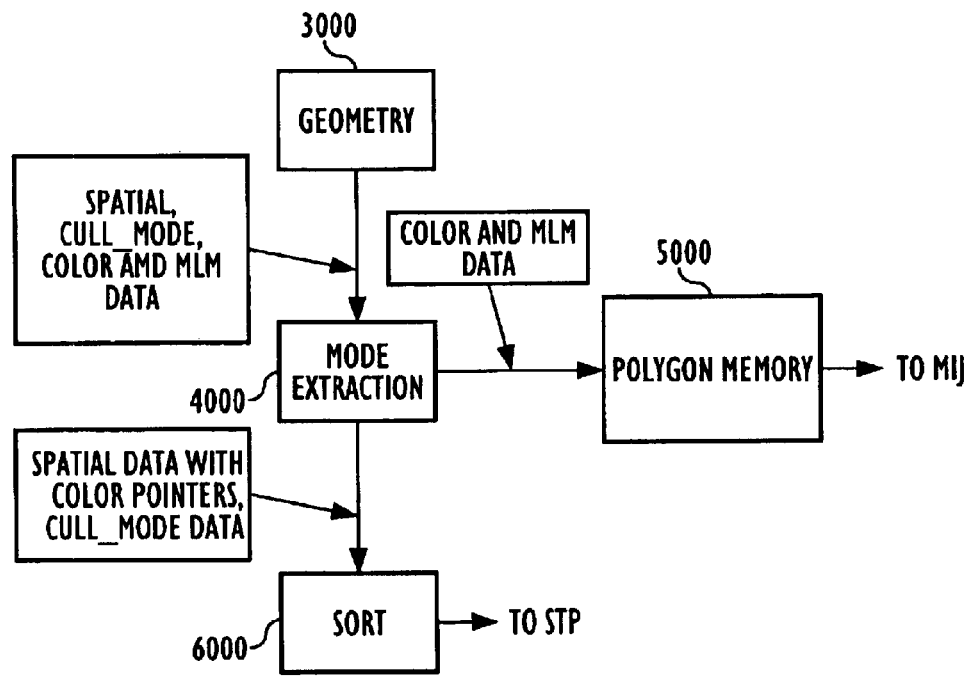
FIG. 17 is a diagramatic illustration exemplary data flow in one embodiment of the Mode Extraction Block (MEX).

FIG. 17 demonstrates how the Pixel block processes a stamp's worth of fragments. In this example, the Pixel block receives two VSPs, one from a gray triangle and one from a white triangle. It then blends the fragments and the background color to produce the final pixels. It weights each fragment according to how much of the pixel it covers—or to be more precise, by the number of samples it covers.

In addition to this blending, the Pixel Processing block performs stencil testing, alpha blending, and antialiasing of pixels. When it accumulates a tile's worth of finished pixels, it sends them to the Backend, to be stored in the framebuffer.

4.12 Backend (BKE)

The Backend 16000 receives a Tile's worth of pixels at a time from the Pixel block, and stores them into the framebuffer 17000. The Backend also sends a Tile's worth of pixels back to the Pixel block, because specific framebuffer values can survive from frame to frame. For example, stencil bit values can constant over many frames, but can be used in all those frames.

In addition to controlling the framebuffer, the Backend performs 2D drawing and sends the finished frame to the output devices. It provides the interface between the framebuffer and the computer monitor and video output.

4.13 Communication Between Blocks in the Pipeline

The inventive structure and method provided for packetized communication between the functional blocks of the pipeline. The nature of these packets is described in the individual functional block sections as well as in the earlier description of the operation in Section 3.

5 DETAILED DESCRIPTION OF SYSTEM BLOCKS

5.1 Bus Interface Block (AGI)

The AGI block is responsible for implementing all the functionality mandated by the AGP and/or PCI specifications in order to send and receive data to host memory or the CPU. This block should completely encapsulate the asynchronous boundary between the AGP bus and the rest of the chip. The AGI block should implement the optional Fast Write capability in the AGP 2.0 spec in order to allow fast transfer of commands by PIO. The AGI block is connected to the Read/Write Controller, the DMA Controller and the Interrupt Control Registers on CFD.

5.2 Command Fetch and Decode Block (CFD)
5.2.1 Overview

The CFD block is the unit between the AGP interface and the hardware that actually draws pictures. There is a lot of control and data movement units, with little to no math. Most of what the CFD block does is to route data for other blocks. Commands and textures for the 2D, 3D, Backend, and Ring come across the AGP bus and are routed by the front end to the units which consume them. CFD does some decoding and unpacking of commands, manages the AGP interface, and gets involved in DMA transfers and retains some state for context switches. It is one of the least glamorous, but most essential components of the DSGP system.

Figure 9:
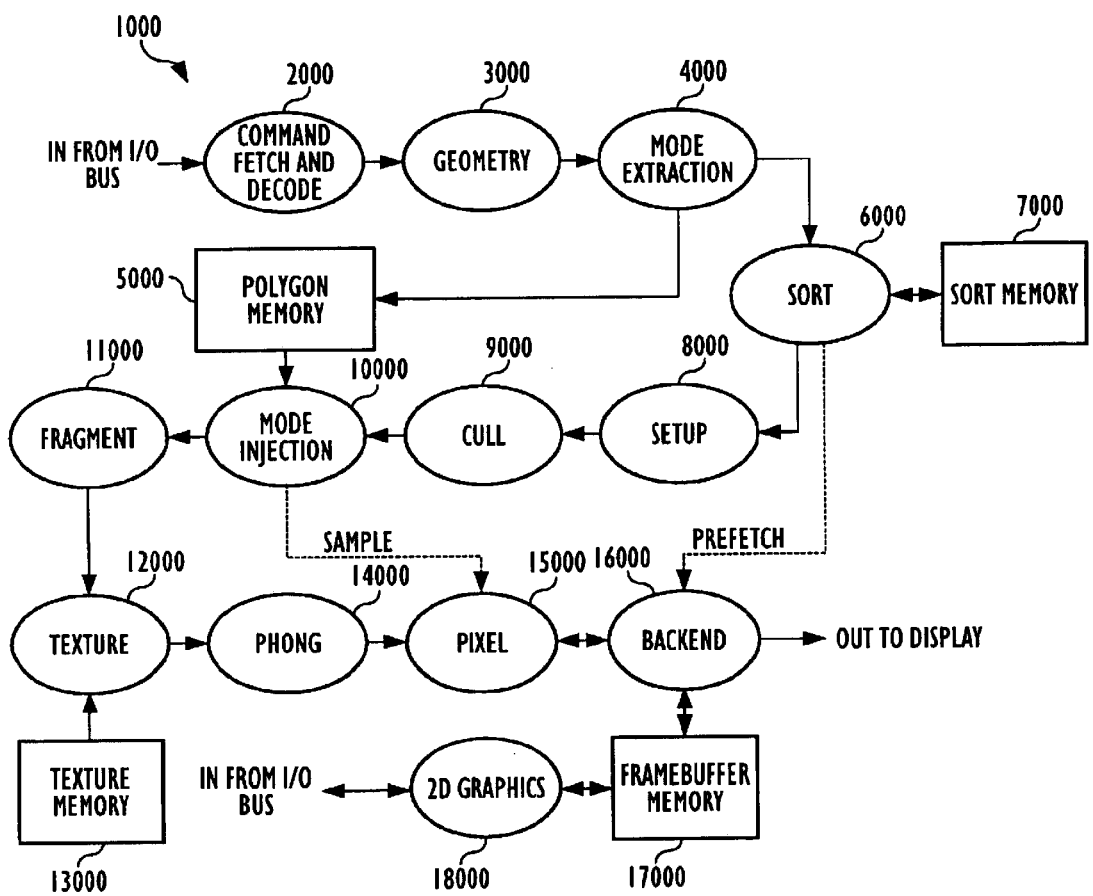
FIG. 9 is a diagramatic illustration showing an exemplary block diagram of an embodiment of the pipeline showing the major functional units in the front-end Command Fetch and Decode Block (CFD) 2000.
Figure 10:
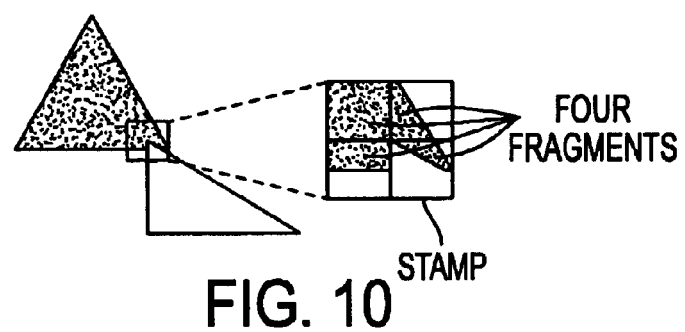
FIG. 10 shows the flow of data through one embodiment of the DSGP 1000.
Figure 11A:
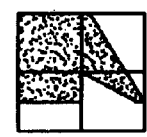
FIG. 11 shows an example of how the Cull block produces fragments from a partially obscured triangle.
Figure 11B:
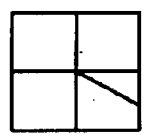
Figure 11C:
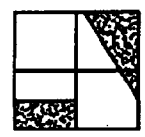
Figure 11D:
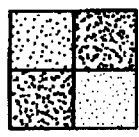
Figure 12:
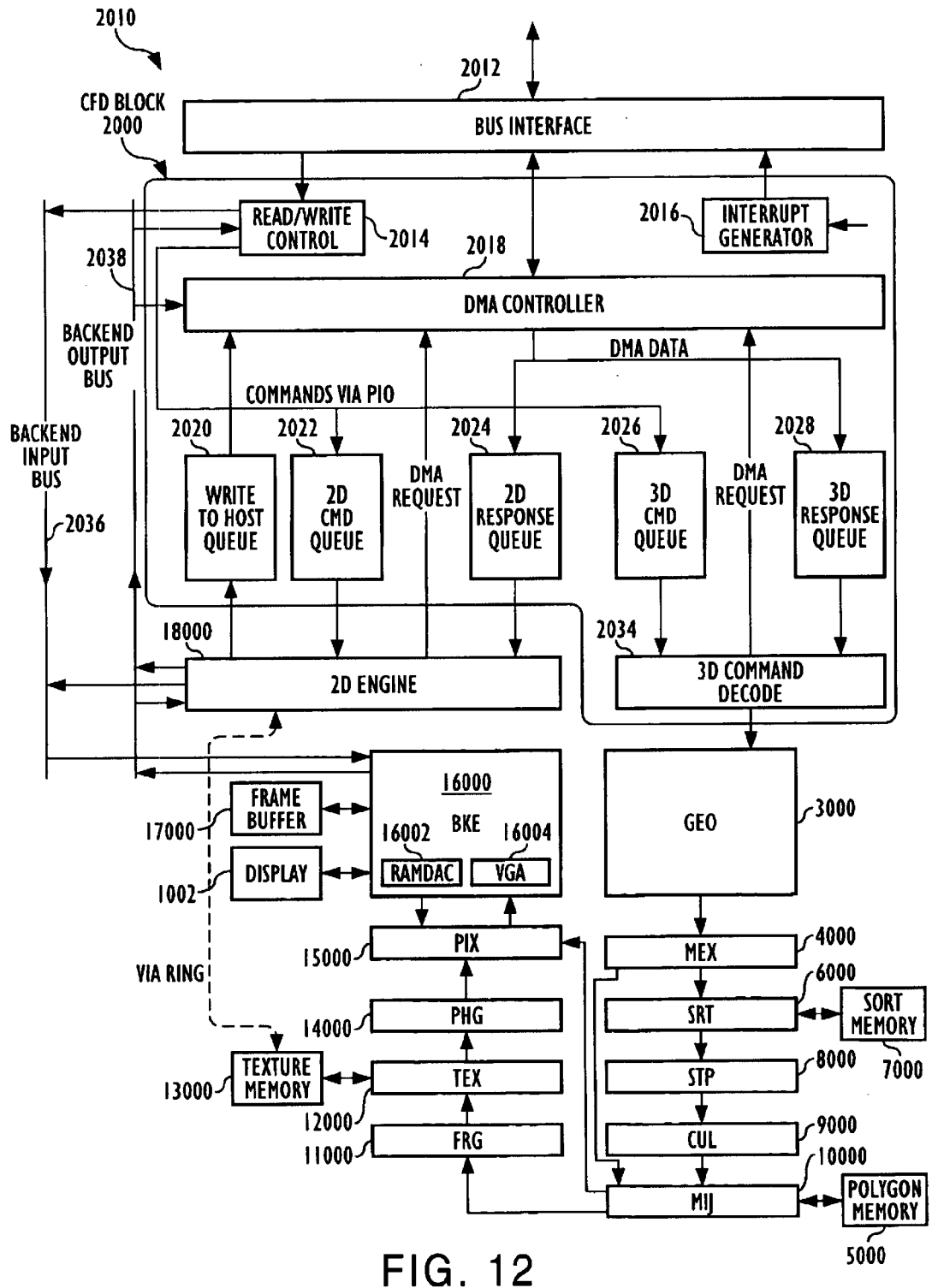
FIG. 12 demonstrates how the Pixel block processes a stamp's worth of fragments.

FIG. 9 shows a block diagram of the pipeline showing the major functional units in the CFD block 2000. The front end of the DSGP graphics system is broken into two sub-units, the AGI block and the CFD block. The rest of this section will be concerned with describing the architecture of the CFD block. References will be made to AGI, but they will be in the context of requirements which CFD has in dealing with AGI.

5.3 Geometry Block (GEO)
5.3.1 Graphical Pipeline Position

The GEO block is the first computation unit at the front end of the graphical pipeline. It deals mainly with per-vertex operations, like the transformation of vertex coordinates and normals. The Frontend (i.e., AGI and CFD Blocks) deals with fetching and decoding the Graphics Hardware Commands. The Frontend loads the necessary transform matrices, material and light parameters and other mode settings into the input registers of the GEO block. The GEO block sends transformed vertex coordinates, normals, generated and/or transformed texture coordinates, and per-vertex colors, to the Mode Extraction and Sort blocks. Mode Extraction stores the "color" data and modes in the Polygon memory. Sort organizes the per-vertex "spatial" data by Tile and writes it into the Sort Memory.

5.3.2 Operation Modes

The pipeline can operate in maximum performance mode when only a certain subset of its features is in use. In this mode, the GEO block carries out only a subset of all possible operations for each primitive. As more features are enabled, the pipeline moves through a series of lower-performance modes. The Geometry engine reuses the available computational elements to process primitives at a slower rate for the non-performance mode settings. The mapping of features to performance modes is described in the following sections.

5.3.3 Functional Overview of the GEO Block

The GEO block operates on vertices that define geometric primitives: points, lines, triangles, quads, and polygons. It performs coordinate transformations and Gouraud shading operations on a per-vertex basis. Only during the Primitive Assembly phase does it group vertices together into lines and triangles (in the process, it breaks down quads and polygons into sets of triangles). It performs clipping and surface tangent generation for each primitive.

5.3.3.1 Vertex Coordinate Transformation

Each vertex is specified by a set of object coordinates ($X_o$, $Y_o$, $Z_o$, $W_o$). The addition of the fourth coordinate enables the vertices to be expressed in homogeneous coordinates. In a homogeneous system, a series of transformations involving rotation, scaling and translation can be combined in a single transform matrix called the Model-View matrix. The vertex object coordinates are transformed to vertex eye coordinates by multiplying them with the 4×4 Model-View matrix:

$$(X_e, Y_e, Z_e, W_e)^T = M_{MV} * (X_o, Y_o, Z_o, W_o)^T$$

Another matrix, called the projection matrix, is applied to the eye coordinates to yield the clip coordinates. A perspective division is carried out on clip coordinates to yield normalized device coordinates. A final viewport transformation is applied to convert these coordinates into window coordinates.

$$(X_c, Y_c, Z_c, W_c)^T = M_p * (X_e, Y_e, Z_e, W_e)^T$$

$$(X_d, Y_d, Z_d)^T = (X_c, Y_c, Z_c)^T / W_c$$

$$(X_w, Y_w, Z_w)^T = (X_d, Y_d, Z_d)^T . (S_x, S_y, S_z)^T + (O_x, O_y, O_z)^T$$

In full performance mode the pipeline doesn't need to preserve eye coordinates. Therefore, it uses a single combined matrix to transform the vertex-object coordinates to clip coordinates.

$$(Xc,Yc,Zc,Wc)^T = M_{MVP} * (Xo,Yo,Zo,Wo)^T$$

Figure 13:
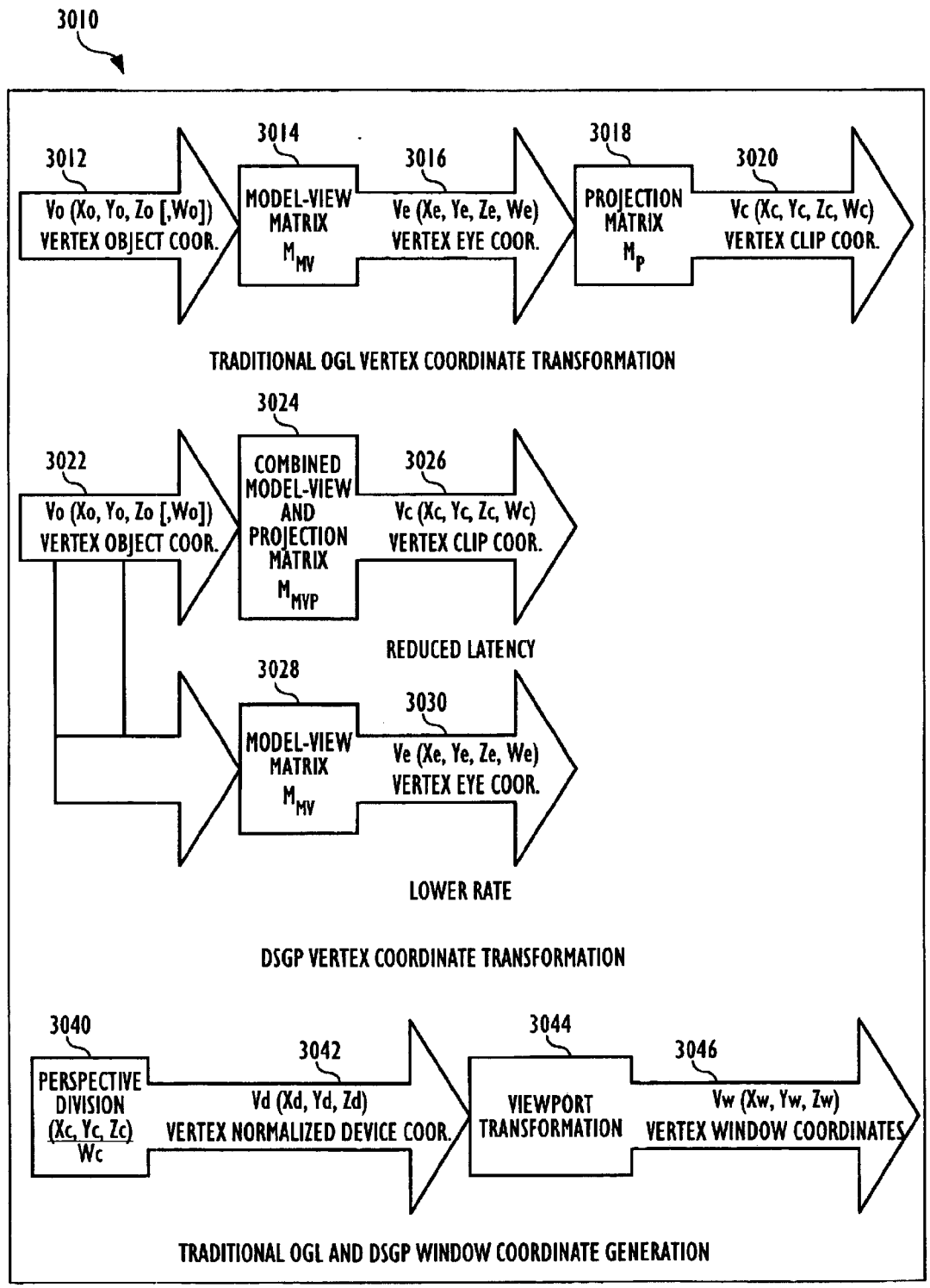
FIG. 13 is a diagramatic illustration highlighting the manner in which one embodiment of the Deferred Shading Graphics Processor (DSGP) transforms vertex coordinates.

FIG. 13 summarizes how the DSGP transforms vertex coordinates.

5.3.3.2 Normal, Tangent, and Binormal Evaluation

In addition to spatial coordinates, the GEO block may have to process a current normal, current texture coordinates, and current color for each vertex. Normals affect the lighting calculations. The current normal is a three-dimensional vector (Nxo, Nyo, Nzo). Texture coordinates determine how a texture image is mapped onto a primitive.

The GEO block receives normals represented in object coordinates. It uses the inverse Model-View matrix to transform the normals into eye coordinates:

$$(Nxe,Nye,Nze)^T = M_{MVI} * (Nxo,Nyo,Nzo)^T$$

Inverting the upper leftmost 3×3 matrix taken from Mmv forms the matrix Mmvi. After transforming the normals, the GEO block renormalizes them to unit length.

$$(Nxu,Nyu,Nzu)^T = (Nxe,Nye,Nze)^T * (1/SQRT(Nxe^2+Nye^2+Nze^2))$$

For bump mapping, user may provide up to two more vectors, the [surface] tangent and the binormal. The GEO block transforms and renormalizes these as it does the normal. It can also generate these vectors if the user doesn't supply them. The GEO block generates the tangent using the texture coordinates and the vertex eye coordinates, and the binormal from a cross product of the normal and the tangent. The GEO block produces tangents and binormals needed for bump mapping at half rate.

Figure 14:
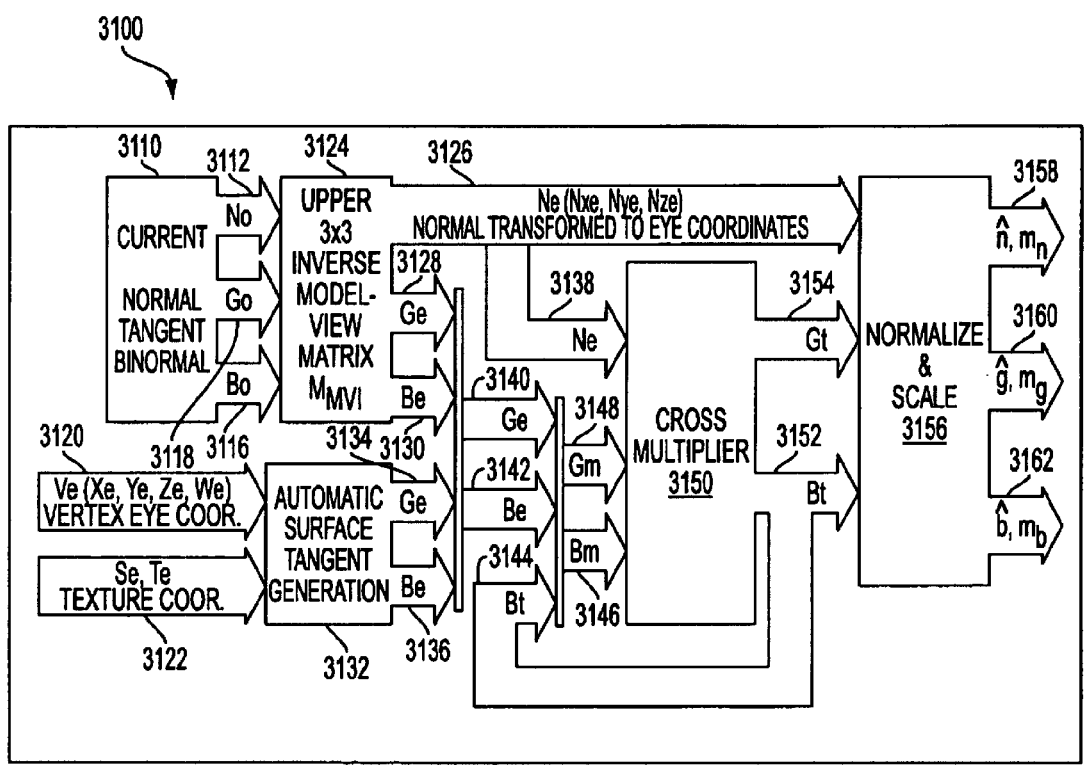
FIG. 14 is a diagramatic illustration highlighting the manner in which one embodiment of the Deferred Shading Graphics Processor (DSGP) transforms normals, tangents, and binormals.

FIG. 14 summarizes how DSGP transforms normals, tangents, and binormals. An overview of the Geometry Block (GEO) is provided in FIG. 15. FIG. 16 is a diagrammatic illustration showing relationships between functional blocks on semiconductor chips in a three-chip embodiment of the inventive structure.

5.3.3.3 Vertex Colors

When lighting is disabled, the current color determines the vertex color. When lighting is enabled, the GEO block uses the vertex normal, lighting and material parameters to evaluate the vertex color. The material colors can also be derived optionally from the current color. Colors are specified as four values: R, G, B, and A; or a single color index value. Colors are converted by CFD to floating point numbers before they are used in the GEO block. At the end of the vertex lighting evaluation, the resulting colors are clamped back into eight-bit fixed point representing a range of 0.0 to 1.0, inclusive.

5.3.3.4 Texture Coordinate Processing

Texture coordinates can also be generated using vertex coordinates or the normal instead of being provided by the user. A transformation matrix can be optionally applied to the texture coordinates. Texture coordinates are specified using the homogeneous coordinates named s, t, r, and q. The transformation matrix is a 4×4 matrix. In the performance case, the resulting q is 1, r is ignored and s and t are used to access the texture map. At reduced performance, q is used to divide the texture coordinates for perspective scaling. The texture coordinate r is used for three dimensional textures and shadows. Up to eight sets of texture coordinates are supported in the GEO block. Two texture coordinates can be transformed and transformed at half performance. Five texture coordinates can be handled at one-third of the full performance rate. Finally, all eight texture coordinates can be generated and transformed at quarter performance rate.

5.3.3.5 Clipping

The GEO block compares vertex clip coordinates to the clip planes generate outcodes. It uses these outcodes to reject primitives that are outside the view volume (for example, if all of the vertices in a primitive are above the top clipping plane, the primitive is rejected). Some primitives can not be trivially rejected even if they are completely outside of the view volume. If the outcodes indicate that the primitive is entirely inside the view volume and doesn't intersect any clipping planes, the primitive is accepted and no further clipping calculations are required.

Primitives that are not trivially accepted or rejected will be clipped against the view volume and user defined clip planes for which the outcodes indicate an edge intersecting a clip plane. When one vertex of a primitive is clipped, the GEO block must generate one or more new vertices. The GEO block doesn't interpolate "color" data for these new vertices: they share the "color" data from the vertices of the original primitive. This is done by assigning the same color pointer by Mode Extract to all clipped vertices generated from the same triangle specified by the last color vertex.

The window coordinates of the current vertex and previous vertices are used to determine the face direction of polygons and optionally perform back face culling.

5.3.3.6 Lighting

In the full performance mode lighting operations are done for two lights at infinity, no local viewer, and no spot lights.

For Gouraud shading two sets of colors are evaluated per vertex. The primary color includes the Ambient, the Emissive and the Diffuse components of the color, attenuated and highlighted by spotlights. It has Red, Green, Blue, and Alpha components (RGBA). All lights and the current material settings contribute to the primary color. The secondary color corresponds to the Specular component of the vertex lighting. It has R, G, and B components. It is also attenuated by distance and includes the spot light effects. If separate Specular color mode setting is not on, then the primary color includes also the Specular component, and secondary color is cleared (R=0, G=0, B=0).

The Fragment block interpolates the primary and secondary colors separately. The primary color is blended with the texture color before the secondary color is applied for a given fragment to determine the final pixel color.

For Phong shading the GEO block does not do any extra work. The DSGP pipeline supports both Phong and Gouraud shading simultaneously for separate lights. This increases the total number of lights significantly using Gouraud and the quality of the lighting using up to eight Phong lights. Phong uses the GEO block Primary and Secondary color output as the "current" colors for color material.

5.4 Mode Extraction Block (MEX)

The Mode Extraction block (MEX) in conjunction with the Mode Injection (MIJ) block is responsible for the management of graphics state related information. In a traditional graphics pipeline the state changes are incremental; that is, the value of a state parameter remains in effect until it is changed. Therefore, the applications only need to update the parameters that change. Furthermore, the rendering is linear; that is, primitives are rendered in the order received. Points, lines, triangle strips, triangle fans, polygons, quads, and quad strips are examples of graphical primitives. Thus, state changes are accumulated until the spatial information for a primitive is received, and those accumulated states are in effect during the rendering of that primitive.

In the DSGP pipeline, rendering is deferred until after hidden surface removal. The Geometry (GEO) block receives the primitives in order, performs all vertex operations (transformations, vertex lighting, clipping, and primitive assembly), and sends the data down the pipeline. The Sort block receives the time ordered data and bins it by the tiles it touches. (Within each tile, the list is in time order.) The CUL block receives the data from the SRT block in tile order, and culls out parts of the primitives that definitely do not contribute to the rendered images. The CUL block generates the VSPs. A VSP corresponds to the visible portion of a polygon on the stamp. The TEX and PHG units receive the VSPs and are responsible for the texturing and lighting of the fragments respectively. The last block, i.e. the Pixel block consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline, and recall it every time it is visited by the pipeline stages downstream from SRT. MEX is a logic block between Geometry and Sort blocks that collects and saves the temporally ordered state change data, and attaches appropriate pointers to the primitive vertices in order to associate the correct state with the primitive when it is rendered. The Mode Injection (MIJ) block is responsible for the retrieval of the state and any other information associated with the state pointer (in this document, generally called the MLM Pointer) when it is needed. It is also responsible for the repackaging of the information as appropriate. An example of the repackaging occurs when the vertex data in polygon memory is retrieved and bundled into triangle input packets for fragment.

We first discuss the theory of operation and general principles behind DSGP state management. We then discuss the MEX block and interfaces to the MEX block. We describe how the data associated with various state pointers is organized in RDRAM. We discuss the any repackaging or processing needed by MEX. This is followed with enumeration of MEX input and output packets and a brief discussion of memory size and bandwidth analysis.

5.4.1 State Management

The graphics state affects the appearance of the rendered primitives. Different parts of the DSGP pipeline use different state information. Here, we are only concerned with the pipeline stages downstream from the GEO block. DSGP breaks up the graphics state into several categories based on how that state information is used by the various pipeline stages. The proper partitioning of the state is very important. It can affect the performance (by becoming bandwidth and access limited), size of the chips (larger caches and/or logic complications), and the pin count.

5.4.1.1 Mode Extraction Block Functionality

The MEX block is responsible for the following:

1. Receiving the data packets from Geometry.
2. Performing any reprocessing needed on those data packets.
3. Appropriately saving the information needed by the shading portion of the pipeline (for retrieval later by MIJ) in Polygon memory.
4. Attaching state pointers to primitives sent to the Sort unit, so that MIJ knows the state associated with this primitive.
5. Sending the information needed by Sort, Setup, and Cull to the Sort block.
6. Handling polygon and sort memory overflow.

Another view of the MEX data flow is shown in FIG. 17.

The state saved in Polygon memory is the one used by the blocks downstream from MIJ, e.g. Fragment, Texture, Phong and Pixel blocks. This state is partitioned as described elsewhere in this description.

5.4.1.2 Mode Injection Block

The MIJ is responsible for the following:

1. Routing various control packets such as BeginFrame, EndFrame, and BeginTile to Fragment and Pixel units.
2. Associating the state with each VSP received from the CUL block.
3. Retrieving the state packets from the polygon memory.
4. Constructing primitives. Polygon memory stores per-vertex data. Depending on the primitive type of the VSP, MIJ retrieves the required vertices (3 for triangle, 2 for line, and 1 for point primitives) from the polygon memory.
5. Keeping track of the contents of the Color, TexA, TexB, Light, Material, PixelMode, and Stipple caches and associating the appropriate cache pointer to each cache miss data packet.
6. Sending data to the fragment and pixel blocks.
7. Processing stalls in the pipeline.

Mode injection thus deals with the retrieval of state as well as the per-vertex data needed for computing the final colors for each fragment in the VSP.

5.4.1.3 Graphics State Partitioning

DSGP partitions the graphics state into a plurality of parts, and hereinafter seven parts is assumed. This is in addition to the per-vertex information stored for each primitive. This section provides an overview of the state information.

5.4.1.3.1 State and Spatial Data Needed by Sort, Setup, and Cull

This is the state information needed by the Sort, Setup and Cull blocks. This is not saved in the Polygon memory. This information is received as three packets. A CullModes packet, a VertexModes packet and a Spatial packet. These packets are destined for the SRT block and come from the Geometry unit. The information in the cull packet includes the target draw buffer(s) and control bits needed by the CUL block.

The VertexModes packet contains the mode information generated by the host computer (i.e., software) that MEX attaches to each spatial packet before it is passed on to the Sort block. The VertexModes packet includes: line width, point size, line stipple information, and depth test operation control bits.

The Spatial packet contains the window coordinates of the vertex and other per-vertex information generated by the Geometry block such as the start bit for the stipple pattern for line primitives. The spatial packet includes: window coordinates of the vertex, polygon winding, vertex reuse in polygon fans and strips, edge flags, and blending operation control bits (such as alpha test and alpha blending). The vertex modes are generated by software.

Geometry block receives the cull modes and vertex modes from software. It sends cull and vertex modes to MEX as described above. MEX construct a spatial packet for sort by attaching the vertex modes to the spatial packet. MEX block also attaches state MLM Pointers to this packet before passing it on to the Sort block. Furthermore, the MEX block collapses the line width and point width parameters into one parameter, since the primitive can not be both a point and a line at the same time. It uses the Sort primitive type to determine if the primitive is a point, a line or a polygon. If the primitive is a point it sends the point width down to Sort otherwise it sends the line width. Other fields are left untouched.

5.4.1.3.2 Texture Parameters

Because texturing has many parameters, especially when multiple textures are included, it is advantageous to have a multiplicity of texture packets. Hereinafter, it is assumed there are two texture parameter packets (called TexA and TexB), but the parameters could be split into additional packets. The texture parameter packets contain information needed for retrieval and filtering of texels. This document assumes there are eight possible textures assigned to each vertex. TexA parameter packet contains parameters for the first two textures and TexB parameter packet contains the same (per-texture) information for up to 6 additional textures. This non-symmetrical partition is chosen because, in most cases, there will be only one or two textures active at a time. In some rare cases, more than two textures may be used. This helps keep the size of the texture parameter cache on-chip small. The TexA and TexB packets are received from the Geometry unit. Per-texture information includes: texture ID, number of texture dimensions (i.e., 1D, 2D, or 3D), texture size (i.e., width, height, and depth), texture boarder information, texture format, texture filter control bits, texture wrapping control bits, texture clamping control bits, level of detail control bits, and texture comparison operation control bits.

Once again, the TexA packet contains one or two of these entries and the TexB packet can contain up to 6 entries. TexA and TexB packets are generated by the software and sent to MEX via the GEO block. MEX manages TexA and TexB as two state partitions, and saves them in the Polygon memory. Each TexA and TexB state partition has a pointer associated with it. Mode Injection block retrieves these packets as needed later on. Geometry block does not use any of this information.

Given the texture id, its (s, t, r) coordinates, and the mipmap level, the Texture block is responsible for retrieving the texels, unpacking and filtering the texel data as needed. Fragment block sends texture id, s, t, r, mip level, as well as the texture mode information to Texture block. Note that s, t, r, and mip level coming from Fragment are floating point values. For each texture, TEX block outputs one 36 bit texel value to PHG. Texture block does not combine the fragment and texture colors; that happens in the Phong block. Texture block needs the texture parameters and the texture coordinates. Texture parameters are obtained from the two texture parameter caches in the Texture block. Fragment block uses the texture width and height parameters in the miplevel computation. Fragment uses the TextureDimension field to determine if the texture dimension and if it is enabled (0 means that the texture is disabled) and TexCoordSet to associate a coordinate set with it.

5.4.1 .3.3 Lighting Parameters

The "lighting" partition of the state contains information for a multiplicity of lights (hereinafter, this document assumes a maximum of 8 lights) used in fragment lighting computations as well as the global state affecting the lighting of a fragment such as the fog parameters etc. Light cache packet includes the following per-light information: light type, attenuation constants, spotlight parameters, light positional information, and light color information (including ambient, diffuse, and specular colors). The light cache packet also includes the following global lighting information: global ambient lighting, fog parameters, and number of lights in use.

A light cache entry is about 300 bytes, (approximately 300 bits for each of the eight lights plus 120 bits of global light modes). The LightCache packet is generated by the software and sent to MEX via the GEO block. MEX manages the LightCache packet as one of the state partitions, and saves it in the Polygon memory when necessary. The LightCache state partition has a pointer associated with it. Mode Injection block retrieves this packet from polygon memory as needed later on. Geometry block does not use any of this information.

As an alternate way of caching lighting state, per-light cache entries could be used rather than caching the entire lighting state. This would allow less data to be transmitted down the pipeline when there is a light parameter cache miss. Thus, application programs would be provided "lighter weight" switching of lighting parameters when a single light is changed. This would, however, require additional complexity in management of the lighting state.

5.4.1.3.4 Fragment Material Parameters

The material partition of the graphics state contains all the information about the material used in fragment lighting computation. Note that the fragment material state is different from the material state attached to the vertex of a primitive. The fragment-material state information is not used during the vertex lighting computations performed in the GEO block. This packet includes: texture enable control bits (selection of active textures), texture environment parameters, material color parameters (emissive, ambient, diffuse, and specular colors, and shininess), shininess cutoff value, and color material parameters.

Because there can be up to eight textures, up to eight texels for each fragment can be received by the PHG from TEX. The texels are received in the same order as the texture entries in the material state packet.

5.4.1.3.5 Pixel Modes

Pixel modes affect the per-fragment operations in the PIX block. Software creates the pixel mode packet and it is sent to MEX via GEO. MEX saves the packet in Polygon memory. MIJ retrieves the packet, and sends it to the PIX block. Pixel modes include the following information: frame buffer write masks (depth, color, and stencil masks), blending operations, depth function, stencil function, and scissor operations.

Note that some of the information in this packet is the same as that included in the VertexModes destined for SRT. Software is responsible for duplicating the state information as needed in various mode packets.

5.4.1.3.6 Stipple

The stipple packet specifies the polygon stipple pattern. It is efficient for the stipple pattern to be cached separately because it is not used often, and when used, does not change often. It is a large number of bytes (usually 128 bytes due to the need for 32×32 bit pattern), so to include it in any other parameter cache would add a large additional overhead to the associated packet.

5.4.1.3.7 Per-Vertex Data for Fragment-Texture-Phong Blocks

For each VSP, the fragment block interpolates the supplied per-vertex data and generates the information needed for the blocks downstream from the Fragment block. The interpolated parameters may consist of some or all of the possible parameters depending on the state pointer attached to the VSP. To account for the variability in the number of parameters, the packet size stored into Polygon Memory is variable, depending on the number and type of parameters used for a particular vertex. These parameters include: primitive type, vertex reuse to construct polygon fans and strips, unclipped vertex x, y, and 1/w values, vertex eye coordinates ($x_{eye}$, $y_{eye}$, $z_{eye}$), inverse perspective term, vertex primary and secondary colors, vertex normal vector, tangent vector, binormal vectors, and up to 8 sets of texture coordinates. The normal, tangent, and binormal vectors can each be represented as either a single vector or as a unit vector (i.e., the vector's direction) and a corresponding magnitude.

Unclipped vertex x, y, and 1/w values are particularly useful because interpolated primitive parameters (such as colors, normals, texture coordinates, etc.) can be generated from the original vertex parameters of the primitive, even if the primitive gets clipped to the display screen. Thus, when a primitive is clipped, new vertices are created in order to keep all primitives on-screen. This would usually require all vertex parameters to be interpolated at these new vertex locations (along the display screen edges), which is an expensive set of operations. The interpolation of these parameters at clip-generated vertices is avoided by storing clipped values into Sort Memory (i.e., the spatial x, y, and z values), but storing unclipped vertex parameters into Polygon Memory. Thus, there is a many-to-one correspondence between primitives in Sort Memory to those in Polygon Memory. This saves both computation and storage space in Polygon Memory.

Separating the normal, tangent, and binormal vectors into separate direction and magnitude makes it easy to interpolate the direction separately from the magnitude. Interpolating the direction separately from the magnitude provides a truer angular interpolation, especially when the magnitudes of the original vectors (i.e., the vectors at the vertices) differ by a large factor.

The Geo block generates per-vertex information that is stored in polygon memory. The MIJ block is responsible for retrieving the needed state and vertices from the polygon memory in order to reconstruct the primitive that includes the VSP.

Note that the triangle vertex texture coordinates are sent to Fragment unit and not the texture unit. The texture unit receives the interpolated and perspective corrected texture coordinates for each fragment from the Fragment block.

Figure 18:
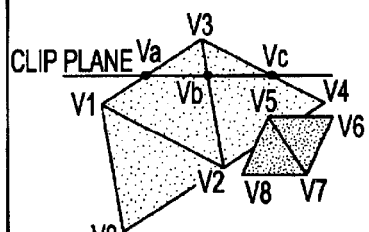
FIG. 18 is a diagramatic illustration showing packets sent to and exemplary Mode Extraction Block.

5.4.2 Functional Details of MEX Block 5.4.2.1 Functional Overview of the MEX Block In order to understand what MEX needs to accomplish and how it does it, let us consider an example shown in FIG. 18.

MEX receives a sequence of packets from GEO. For each primitive, MEX first receives the relevant state packets and then it receives the geometry packets. (Color vertex information is received before the sort vertex information.) The sort vertex data consists of the information needed for sorting and culling of primitives such as the clipped window coordinates. The VtxMode packet contains information about depth test etc. The information in CullMode, VtxMode and sort vertex packets is sent to the Sort-Setup-Cull part of the pipeline. The "color" vertex data consists of information needed for lighting and texturing of primitive fragments such as the vertex eye-coordinates, vertex normals, texture coordinates etc and is saved in polygon memory to be retrieved later. The Sort-Setup-Cull part of the pipeline converts the primitives into VSPs. These VSPs are then textured and lit by the Fragment-Texture-Phong part of the pipeline. The VSPs output from the Cull block to MIJ block are not necessarily ordered by primitives. In most cases, they will be in the VSP scan order on the tile, i.e. the VSPs for different primitives may be interleaved. Clearly, Fragment-Texture-Phong part of the pipeline needs to know which primitive a particular VSP belongs to; as well as the graphics state at the time that primitive was first introduced. MEX associates a "color pointer" with each Sort Vertex (which is then passed on to each VSP in this primitive). MIJ decodes the pointer, and retrieves needed information from the Polygon memory.

MEX thus needs to accumulate any state changes that have happened since the last state save. The state changes become effective as soon as a vertex is encountered. MEX keeps a state vector on chip. This state vector has 10 partitions as shown in FIG. 19. MEX needs nearly 1170 bytes of on-chip memory to store the state vector.

The VertexModes are held in a register in MEX and are appended to the vertices passed on to the Sort-Setup-Cull part of the pipeline. The CullModes are sent to Sort as Mex2SrtCullModePkt. MEX keeps a dirty bit and a pointer (in polygon memory) for each partition in the state vector. Thus there are 10 dirty bits and 9 mode pointers, since cull modes do not get saved in the polygon memory and therefore do not require a pointer. Every time MEX receives an input packet corresponding to a state partition from the Geo block, it updates that partition in the state vector. MEX also sets the dirty bit corresponding to that partition. When MEX receives a color vertex, it examines the dirty bits to see if any part of the state has been updated since the last save. All state partitions that have been updated and are relevant to the rendering of the current primitive are saved to the polygon memory and their pointers updated. Their dirty bits are also cleared. Note that the dirty bits are only cleared for the primitives that are saved to the polygon memory. Which TextureA, TextureB, and Material gets saved to the polygon memory depends on the "face" of the primitive and the dirty bits. This is schematically outlined in FIG. 20.

MEX constructs a composite color pointer called the MLM Pointer containing the pointer to the last saved location of the applicable TextureA, TextureB, Material, Light, Stipple, and PixelMode. This pointer is attached to the vertices passed on to the Sort block.

Note that Clear packets are also processed similarly. When a clear packet is received, MEX examines the SendToPixel flag. If sendToPixel flag is set, then MEX checks to see if the PixelModes are dirty. If PixelMode dirty bit is set, then MEX saves the PixModes to polygon memory, updates the PixModePtr, clears the PixMode dirty bit, creates a new MLM Pointer and attaches that pointer to the clear packet before passing it on to the Sort block.

5.5 Sort Block (SRT)

5.5.1 Functional Overview of the SRT Block

The Sort Block is located in the pipeline between Mode Extraction (MEX) and Setup (STP). The primary function of the Sort Block is to take geometry scattered around the display window and sort it into tiles. The Sort Block manages the Sort Memory, which stores all the geometry for an entire scene before it is rasterized, along with a small amount of mode information. The Sort Memory is a double buffered list of vertices and modes. One page collects a scene's geometry (vertex by vertex and mode by mode), while the other page is sending its geometry (primitive by primitive and mode by mode) down the rest of the pipeline.

As described in the chapter "Architectural Overview", the window (the display area on the screen) is divided horizontally and vertically into a set of tiles, and Sort keeps an ordered list for each tile. When a page of Sort Memory is being written, vertices and modes are written sequentially into the Sort Memory as they are received by the Sort Block. When a page of Sort Memory is read, it is done on a tile-by-tile basis. The read process operates in two modes: 1) Time Order Mode; and 2) Sorted Transparency Mode. In Time Order Mode, time order of vertices and modes are preserved within each tile. That is, for a given tile, vertices and modes are read in the same order as they are written. In Sorted Transparency Mode, reading of each tile is divided into multiple passes, where, in the first pass, guaranteed opaque geometry is output from the Sort Block, and, in subsequent passes, potentially transparent geometry is output from the Sort Block. Within each pass, the time ordering is preserved, and mode data is inserted in its correct time-order location.

At the input to the Sort Block, the beginning of a frame is designated by the reception of a MEX Output Begin Frame Packet, and always corresponds to the start of a user frame (that is, the application is starting to draw a new picture). These begin frame packets are passed from Sort down the pipeline to Setup when Sort Memory Pages are swapped. The ending of a frame is designated by the reception of a MEX Output End Frame Packet, but only corresponds to the end of a user frame if a memory overflow did not occur and software did not force the user frame to split. A memory overflow occurs when either Sort Memory or Polygon Memory becomes full. Therefore, there are two kinds of end frame packets that come into the Sort Block: 1) end of a user frame; and 2) end of a frame caused by the need to split a user frame into multiple frames within the pipeline. The second half of the pipeline (Setup and beyond) will be asked to process a tile multiple times when a user frame is split into multiple frames. Because each frame is independent, and could be input from different contexts, all the pipeline state information must be stored into either Sort Memory (as mode packets) or Polygon Memory on a per-frame basis.

Within frames, the Sort Block receives and outputs Sort Primitives, which are: points, lines, and triangles. A Sort Primitive triangle can be either a filled triangle or a line mode triangle. However, primitives are sorted according to Cull Primitives, which include: points, lines, filled triangles, and lines that are edges of triangles.

The primary difference between Sort Primitives and Cull Primitives is that edges of line mode triangles are considered separate primitives. If a line mode triangle is received by the Sort Block, it is sorted according to the tiles its edges touch. Any edge of the triangle (that has its LineFlag TRUE) causes the entire triangle to be sorted into the tiles that the edge touches, but a triangle with multiple edges in the same tile only cause one Pointer Entry per tile. This reduces the number of primitives per tile, because, for example, if a large line mode triangle surrounds several tiles without any of its edges touching the tiles, no Cull Primitives are read for this triangle in these tiles. The Cull Primitive is further described in the Setup Block document, but the CullType parameter is essentially the SortPrimitiveType parameter with an additional bit to choose amongst the three edges of a line mode triangle.

5.6 Setup Block (STP)

The Setup (STP) block receives a stream of packets from the Sort (SRT) block. These packets have spatial information about the primitives to be rendered. The output of the STP block goes to the Cull (CUL) block. The primitives received from SRT can be filled triangles, line triangles, lines, stippled lines, and points. Each of these primitives can be rendered in aliased or anti-aliased mode. The SRT block sends primitives to STP (and other pipeline stages downstream) in tile order. Within each tile the data is organized in time order or in sorted transparency order. The CUL block receives data from the STP block in tile order (in fact in the order that STP receives primitives from SRT), and culls out parts of the primitives that definitely do not contribute to the rendered images. This is accomplished in two stages. The first stage, MCCAM Cull, allows detection of those elements in a rectangular memory array whose content is greater than a given value. The second stage refines on this search by doing a sample by sample content comparison. The STP block prepares the incoming primitives for processing by the CUL block. STP produces a tight bounding box and minimum depth value Zmin for the part of the primitive intersecting the tile for MCCAM culling. MCCAM cull stage marks the stamps in the bounding box that may contain depth values less than Zmin. The Z cull stage takes these candidate stamps, and if they are a part of the primitive, computes the actual depth value for samples in that stamp. This more accurate depth value is then used for comparison and possible discard on a sample by sample basis. In addition to the bounding box and Zmin for MCCAM culling, STP also computes the depth gradients, line slopes, and other reference parameters such as depth and primitive intersection points with the tile edge for the Z cull stage. The CUL unit produces the VSPs used by the other pipeline stages.

To set the context, we briefly describe various STP primitives.

5.6.0.1 Polygons

Polygons arriving at the STP block are essentially triangles. The triangles can be rendered in the aliased or anti-aliased mode. FIG. 21 shows DSGP triangles. The STP unit processes the aliased and anti-aliased triangles identically. The pipeline units downstream render aliased triangles by locating all samples at the center of the pixel. In the anti-aliased case the sample locations are determined by the SampleLocSel parameters passed down with one of the control packets. A sample belongs to the triangle if it falls within the geometric boundary of the triangle. If the sample falls exactly on the edge of the triangle, then the inclusion rules are used to determine whether or not that sample belongs to the triangle.

5.6.0.2 Lines

DSGP renders lines by converting them into quads. FIG. 22 shows various quads generated for the drawing of aliased and anti-aliased lines of various orientations. The width of the lines is rounded to the nearest supported width. The width adjustment needs to be done prior to the SORT stage. It can be done by the software. STP does not modify the incoming line widths.

Note that the quads are generated differently for aliased and anti-aliased lines. For aliased lines the quad vertices also depend on whether the line is x-major or y-major.

5.6.0.3 Points

DSGP renders anti-aliased points as circles and aliased points as squares. The circles are centered at the user specified position. The diameter of the circle is the width specified by the user rounded to the nearest supported width. For drawing of aliased points, the user specified position of the point is snapped to the center of the pixel or rounded to a corner of the pixel depending on whether the resulting width is odd or even respectively. As in the case of lines the adjustment of point size and position should happen in the pipeline prior to the SORT block. Since the position of the point is subject to transformations, Geometry unit seems like the right place to do this. FIG. 23 shows the rendered point. The user specified point is indicated by the circle.

5.6.1 Setup Block Functional Details

The processing of various primitives as outlined in the preceding sections has a lot of commonality. We represent primitives in a unified way to leverage this commonality.

5.6.1.1 Unified Primitive Representation

As mentioned earlier, Setup converts the line segments into parallelograms which consists of four vertices. A triangle has three vertices. Setup describes the each primitive with a set of four points. Note that not all values are needed for all primitives. For a triangle, Setup uses top, bottom, and either left or right corner, depending on the triangle's orientation. A line segment is treated as a parallelogram, so Setup uses all four points. FIGS. 26–30 show how Setup represents triangles and lines. Note that while the triangle's vertices are the same as the original vertices, Setup generates new vertices to represent the lines as quads.

The unified representation of primitives uses primitive descriptors which are assigned to the original set of vertices in the window coordinates. In addition, there are flags which indicate which descriptors have valid and meaningful values: VtxYmin, VtxYmax, VtxLeftC, VtxRightC, LeftCorner, and RightCorner.

For triangles, these descriptors are obtained by sorting the triangle vertices by their y coordinates. For line segments these descriptors are assigned when the line quad vertices are generated. VtxYmin is the vertex with the minimum y value. VtxYmax is the vertex with the maximum y value. VtxLeftC is the vertex that lies to the left of the long y-edge (the edge of the triangle formed by joining the vertices VtxYmin and VtxYmax) in the case of a triangle, and to the left of the diagonal formed by joining the vertices VtxYmin and VtxYmax for parallelograms. If the triangle is such that the long y-edge is also the left edge, then the flag LeftCorner is FALSE (0) indicating that the VtxLeftC is invalid. Similarly, VtxRightC is the vertex that lies to the right of the long y-edge in the case of a triangle, and to the right of the diagonal formed by joining the vertices VtxYmin and VtxYmax for parallelograms. If the triangle is such that the long edge is also the right edge, then the flag RightCorner is FALSE (0) indicating that the VtxRightC is invalid. These descriptors are used for clipping of primitives on top and bottom tile edge. Note that in practice VtxYmin, VtxYmax, VtxLeftC, and VtxRightC are indices into the original primitive vertices.

Additional descriptors are: VtxXmin, VtxXmax, VtxTopC, VtxBotC, TopCorner, and BottomCorner. For triangles, these descriptors are obtained by sorting the triangle vertices by their x coordinates. For line segments these descriptors are assigned when the line quad vertices are generated. VtxXmin is the vertex with the minimum x value. VtxXmax is the vertex with the maximum x value. VtxTopC is the vertex that lies above the long x-edge (edge joining vertices VtxXmin and VtxXmax) in the case of a triangle, and above the diagonal formed by joining the vertices VtxXmin and VtxXmax for parallelograms. If the triangle is such that the long x-edge is also the top edge, then the flag TopCorner is FALSE (0) indicating that the VtxTopC is invalid. Similarly, VtxBotC is the vertex that lies below the long x-axis in the case of a triangle, and below the diagonal formed by joining the vertices VtxXmin and VtxXmax for parallelograms. If the triangle is such that the long x-edge is also the bottom edge, then the flag BottomCorner is FALSE (0) indicating that the VtxBotC is invalid. These descriptors are used for clipping of primitives on the left and right tile edges. Note that in practice VtxXmin, VtxXmax, VtxTopC, and VtxBotC are indices into the original primitive vertices.

FIG. 26 shows the vertex assignment graphically. In addition, we use the slopes ($\delta x/\delta y$) of the four polygon edges—represented as {SlYmaxLeft, SlYmaxRight, SlLeftYmin, SlRightYmin} and the inverse of slopes (dy/dx) {rSlXminTop, rSlXminBot, rSlTopXmax, rSlBotXmax}. Slope naming convention used is SlStrtEnd. Sl is for slope, Strt is first vertex identifier and End is the second vertex identifier of the edge. Thus SlYmaxLeft is the slope of the left edge—connecting the VtxYMax and VtxLeftC. If leftC is not valid then, SlYmaxLeft is the slope of the long edge. The letter r in front indicates that the slope is reciprocal, i.e. represents ($\delta y/\delta x$) instead of ($\delta x/\delta y$). FIG. 27 shows the slope assignments graphically.

All of these descriptors have valid values for quadrilateral primitives, but all of them may not be valid for triangles. Initially, it seems like a lot of descriptors to describe simple primitives like triangles and quadrilaterals. However, as we shall see later, they can be obtained fairly easily, and they provide a nice uniform way to setup primitives.

An examination of the steps in the processing of various primitives by STP yields the following functional units:

1. Triangle descriptors.
2. Depth gradient and offset computation.
3. Vertex generation for converting lines into quads.
4. Stippled line preprocessing.
5. Quad clipping to tile.
6. Zmin, Zref, Bbox computation.
7. Point Processor Following subsections detail the architecture of each of these units.

5.6.1.2 Triangle Descriptors

For triangles, Setup starts with a set of vertices, ($x_0$, $y_0$, $z_0$), ($x_1$, $y_1$, $z_1$), and ($x_2$, $Y_2$, $z_2$). The three indices i0, i1, and i2 for the vertices sorted by y (in the ascending order) are determined, as are the indices j0, j1, j2 for vertices sorted by x (in the ascending order).

The indices i0, i1, and i2 are used to compute a set of (dx/dy) derivatives. And indices j0, j1, and j2 are used to compute the (dy/dx) derivatives for the edges.

$$\frac{dx2}{dy} = \frac{v[i2]\cdot x - v[i1]\cdot x}{v[i2]\cdot y - v[i1]\cdot y}; \frac{dy2}{dx} = \frac{v[j2]\cdot y - v[j1]\cdot y}{v[j2]\cdot x - v[j1]\cdot x};$$

$$\frac{dx1}{dy} = \frac{v[i1]\cdot x - v[i0]\cdot x}{v[i1]\cdot y - v[i0]\cdot y}; \frac{dy1}{dx} = \frac{v[j1]\cdot y - v[j0]\cdot y}{v[j1]\cdot x - v[j0]\cdot x};$$

$$\frac{dx0}{dy} = \frac{v[i2]\cdot x - v[i0]\cdot x}{v[i2]\cdot y - v[i1]\cdot y}; \frac{dy0}{dx} = \frac{v[j2]\cdot y - v[j0]\cdot y}{v[j2]\cdot x - v[j0]\cdot x};$$

We discard edge-on triangles, i.e. triangles having two edges with equal slopes. Whether the middle vertex is on the left or the right is determined by comparing the slopes dx2/dy of line formed by vertices v[i2] and v[i1], and dx0/dy of the line formed by vertices v[i2] and v[i0]. If (dx2/dy>dx0/dy) then the middle vertex is to the right of the long edge else it is to the left of the long edge. The computed values are then assigned to the primitive descriptors. Assigning the x descriptors is similar. We thus have the edge slopes and vertex descriptors we need for the processing of triangles.

5.6.1.3 Depth Gradient, and Offset Computation

Depth gradients are the partial derivatives of z along the x- and y-axes. We use the following equations:

$$\frac{\delta z}{\delta x} = \frac{(y_2 - y_0)(z_1 - z_0) - (y_1 - y_0)(z_2 - z_0)}{(x_1 - x_0)(y_2 - y_0) - (x_2 - x_0)(y_1 - y_0)}$$

$$\frac{\delta z}{\delta y} = \frac{(x_1 - x_0)(z_2 - z_0) - (x_2 - x_0)(z_1 - z_0)}{(x_1 - x_0)(y_2 - y_0) - (x_2 - x_0)(y_1 - y_0)}$$

Setup receives 26 bits (s25) for each vertex z-value from Sort unit. The partial derivatives are computed as 1.24.10 precision values. The x, y coordinates are 14 bit integers with precision corresponding to the (8×8) sub-raster grid per pixel. The partial derivatives are computed on the scale of the sub-raster grid.

The polygon offset is given by:

offset=8×factor×Max($|\delta z|\delta x|, |\delta z|\delta y|$)+($r$×unit)

The "factor" is passed down to from the SRT block. The ($r$ * unit) offset part is taken care of in GEO. We compute the first term only in STP. Multiplication by 8 is done to account for the gradient scale. The depth values are represented as 24 bit integers. This offset is added to each of the vertex z values. The computed offset is clamped to 24 bits (in fact s24) before being added to the z values.

5.6.1.4 Quad Vertex Generation

Figure 25A:
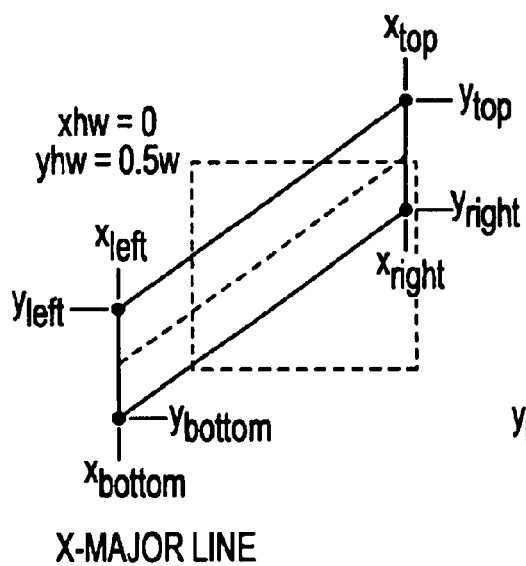
FIG. 25 is a diagrammatic illustration showing the manner in which the end points of aliased lines are computed using a parallelogram, as compared to a rectangle in the case of anti-aliased lines.
Figure 25B:
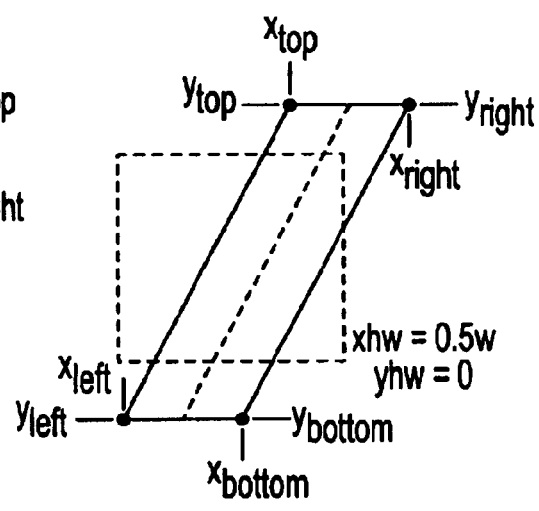
Figure 27A:
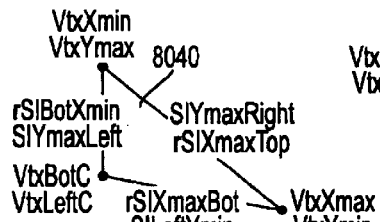
FIG. 27 is a diagrammatic illustration showing an aspect of how Setup represents lines and triangles, including the slope assignments.
Figure 27B:
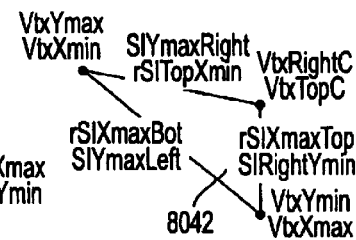
Figure 27C:
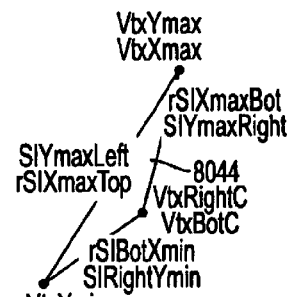
Figure 27D:
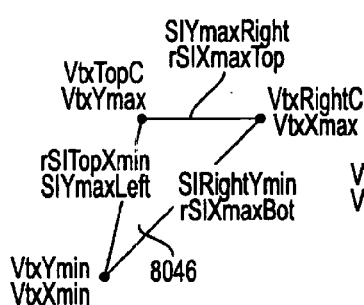
Figure 27E:
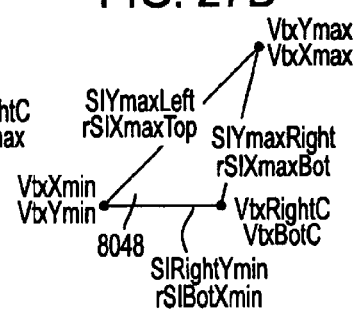
Figure 27F:
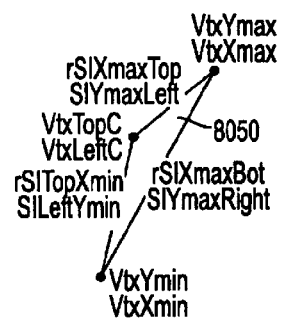
Figure 27G:
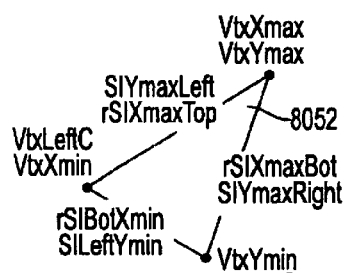
Figure 27H:
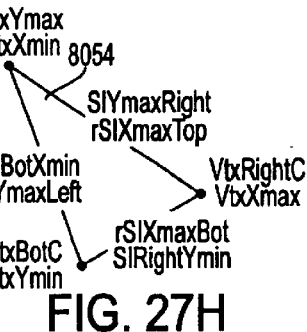
Figure 27I:
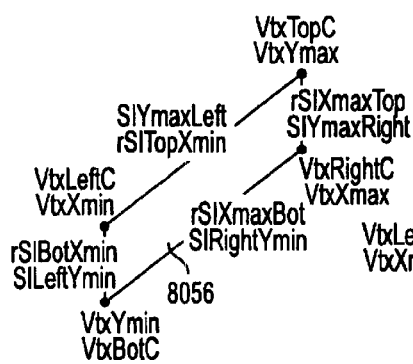
Figure 27J:
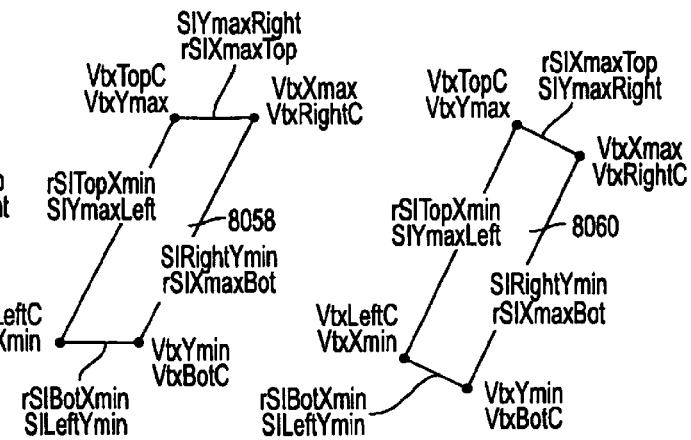
Figure 27K:
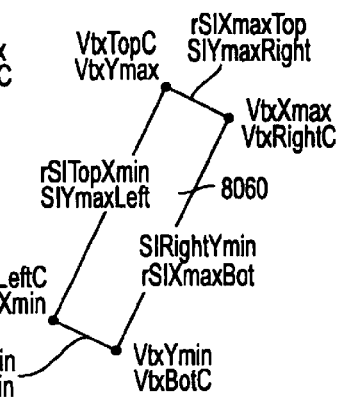
Figure 28:
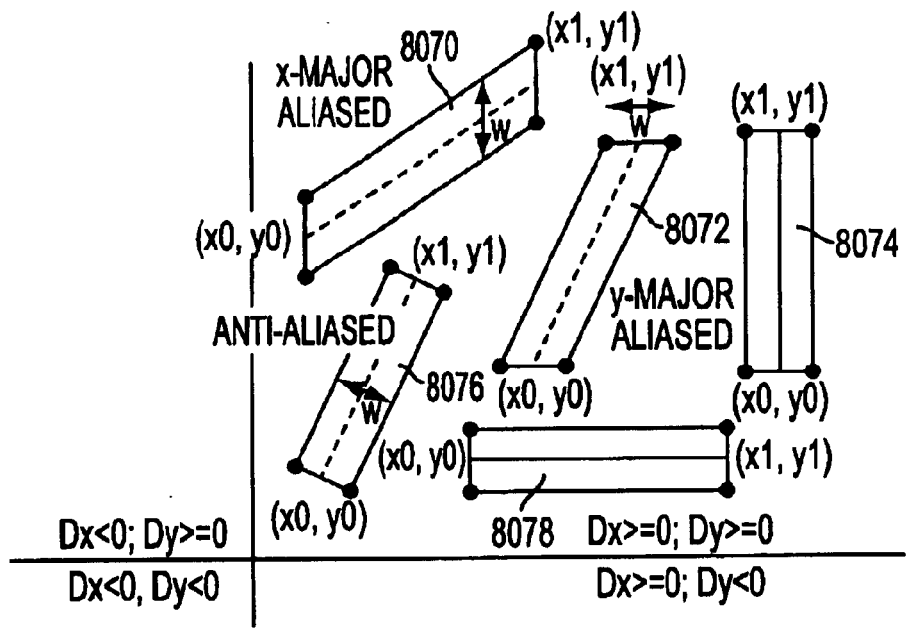
FIG. 28 is a diagrammatic illustration showing an aspect of how Setup represents lines and triangles, including the quadrant assignment based on the orientation of the line.
Figure 29:
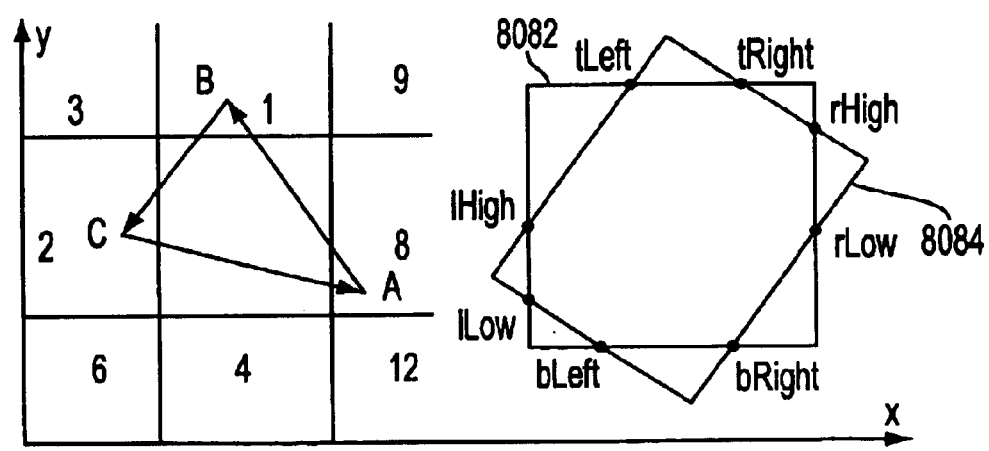
FIG. 29 is a diagrammatic illustration showing how Setup represents lines and triangles, including the naming of the clip descriptors and the assignment of clip codes to verticies.
Figure 30:
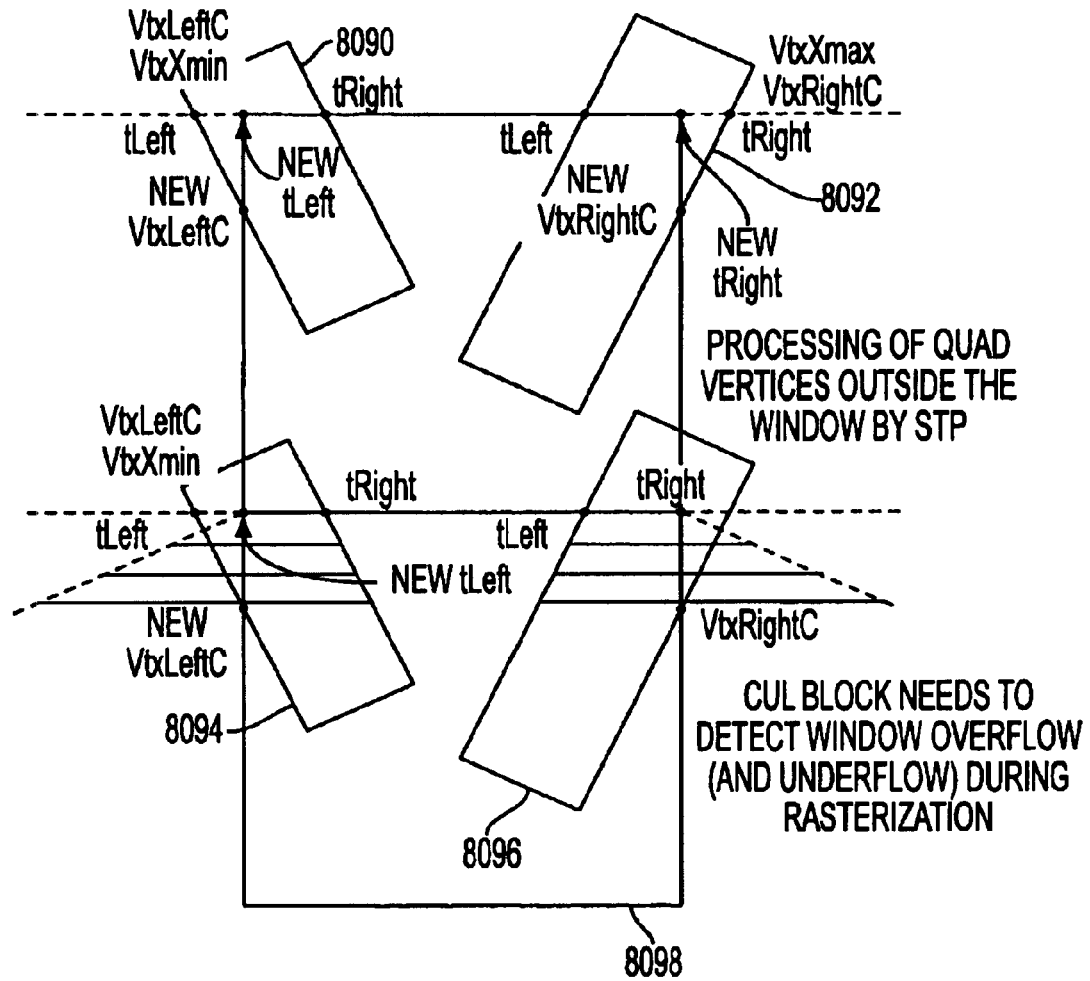
FIG. 30 is a diagrammatic illustration showing an aspect of how Setup represents lines and triangles, including aspects of how Setup passes particular values to CUL.

We convert the line segments into parallelograms of width w. We discard the end-on lines, i.e. lines with co-incident end points. Not discarding the end-on lines will generate a quad of zero width for the line. This would cause an unnecessary packet to be sent down the pipe, which, in the rare event might even generate a VSP, causing anomalous pixel intensity. The process of computing the offset and assigning the vertices to the descriptors has been indicated earlier and is quite intuitive. The architectural pipeline though requires watching out for possible pitfalls. Given the line end-points, we compute the trigonometric functions as follows:

run=$|(x1-x0)|$; rise=$|(y1-y0)|$;
tan($a$)=rise/run;
cos($a$)=1/sqrt(1+tan($a$)*tan($a$));
sin($a$)=tan($a$)/sqrt(1+tan($a$)*tan($a$));

Let us also assume that width of the line is w, and that the horizontal and vertical vertex displacement at the end points is given by xhw and yhw respectively as shown in FIGS. 24 and 25. The four quad vertices are then assigned as:

V[0]=(x0−xhw, y0+yhw); V[1]=(x0+xhw, y0−yhw);
V[2]=(x1−xhw, y1+yhw); V[3]=(x1+xhw, y1−yhw);

The computation of xhw and yhw and hence quad vertices is done based on the orientation of the line and its aliasing state. FIG. 28 shows the quadrant assignment based on the orientation of the line.

Which quadrant the line lies in is determined by looking at the relative position of (x1, y1) with respect to (x0, y0). The xhw, yhw and the primitive descriptors for each quadrant are determined. We also added assignment of StrtClipX, StrtClipY, EndClipX, EndClipY, OpX, and OpY here. These six parameters are used during the processing of stippled lines. StrtClipX, StrtClipY, OpX, and OpY are used during the initial removal of any stipple segments wholly outside the tile. EndClipX, EndClipY along with the ops are used to determine when the line has exited the tile.

This gives us the vertices and the primitive descriptors for the quad for further processing.

5.7 Cull Block (CUL)

5.7.1 Functional Overview of the CUL Block

The Cull unit is responsible for: 1) pre-shading hidden surface removal; and 2) breaking down primitive geometry entities (triangles, lines and points) to stamp based geometry entities called Visible Stamp Portions (VSPs). The Cull unit does, in general, a conservative culling of hidden surfaces. Cull can only conservatively remove hidden surfaces because it does not handle some "fragment operations" such as alpha test and stencil test. The Cull block's sample z-buffer can hold two depth values, but the Cull block can only store the attributes of one primitive per sample. Thus, whenever a sample requires blending colors from two pieces of geometry, Cull has to send the first primitive (using time order) down the pipeline, even though there may be later geometry that hides both pieces of the blended geometry.

The Cull Unit receives Setup Output Primitive Packets that each describe, on a per tile basis, either a triangle, a line or a point. Sort is the unit that bins the incoming geometry entities to tiles. Setup is the unit that pre-processed the primitives to provide more detailed geometric information for Cull to do the hidden surface removal. Setup will pre-calculate the slope value for all the edges, the bounding box of the primitive within the tile, minimum depth value (front most) of the primitive within the tile, and other relevant data. Prior to Sort, Mode Extraction has already extracted the information of color, light, texture and related mode data, Cull only gets the mode data that is relevant to Cull and a pointer, called Color Pointer, that points to color, light and texture data stored in Polygon Memory.

The Cull Unit sends one Visible Stamp Portion (VSP) at a time to the Mode Injection unit. A VSP is a visible portion of a geometry entity within a stamp. Mode Injection reconnects the VSP with its color, light and texture data and sends it to Fragment and later stages in the pipeline.

The Cull Unit performs two main functions. The primary function is to remove geometry that is guaranteed to not affect the final results in the frame buffer (i.e., a conservative form of hidden surface removal). The second function is to break primitives into units of stamp portions (SPs). A stamp portion is the intersection of a primitive with a given stamp. The portion amount is determined by sampling. Any stamp will have 16 predetermined sample points (actually each pixel within a stamp has 4 predetermined sample points). The portion "size" is then given by the number and the set of sample points covered by a primitive in a given stamp.

Cull processes primitives one tile at a time. However, for the current frame, the pipeline is in one of two modes: 1) Time Order Mode; or 2) Sorted Transparency Mode. In Time Order Mode, time order of vertices and modes are preserved within each tile, and the tile is processed in a single pass through the data. That is, for a given tile, vertices and modes are read in the same order as they are written, but are skipped if they do not affect the current tile. In Sorted Transparency Mode, the processing of each tile is divided into multiple passes, where, in the first pass, guaranteed opaque geometry is processed (the Sort Block only send non-transparent geometry for this pass). In subsequent passes, potentially transparent geometry is processed (the Sort Block repeatedly sends all the transparent geometry for each pass). Within each pass, the time ordering is preserved, and mode data is inserted in its correct time-order location.

5.8 Mode Injection Block (MIJ)

5.8.1 Introduction

The Mode Injection (MIJ) block in conjunction with the Mode Extraction block is responsible for the management of graphics state related information. In a traditional graphics pipeline the state changes are incremental, i.e. the value of a state parameter remains in effect until it is changed. Therefore, the applications only need to update the parameters that change. Furthermore, the rendering is linear, i.e. primitives are rendered in the order received. Points, lines, triangle strips, triangle fans, polygons, quads, and quad strips are examples of graphical primitives. Thus, all state changes accumulated until the spatial information about a primitive is received are effective during the rendering of that primitive.

In the one embodiment of the invention, referred to as the APEX pipeline, rendering is tile based. The Geometry (GEO) block receives the primitives in order, performs all vertex operations (transformations, vertex lighting, clipping, and primitive assembly), and sends the data down the pipeline. The Sort block receives the time ordered data and bins it by the tiles it touches. (Within each tile, the list is in time order.) The CUL block receives the data from the SRT block in tile order, and culls out parts of the primitives that definitely do not contribute to the rendered images. The CUL block generates the VSPs. A VSP corresponds to the visible portion of a polygon on the stamp. A stamp is a 2×2 pixel area of the image. The TEX and PHG units receive the VSPs and are responsible for the texturing and lighting of the fragments respectively. The last block, i.e. the Pixel block consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline, and recall it every time it is visited by the pipeline stages downstream from SRT. MEX is a logic block between Geometry and Sort blocks that collects and saves the temporally ordered state change data, and attaches appropriate pointers to the primitive vertices in order to associate the correct state with the primitive when it is rendered.

The Mode Injection (MIJ) block is responsible for the retrieval of the state and any other information associated with the state pointer (aka the MLM Pointer) when it is needed. It is also responsible for the repackaging of the information as appropriate. An example of the repackaging occurs when the vertex data in polygon memory is retrieved and bundled into primitive (triangle, line, point) input packets for fragment.

Theory of operation and general principles behind APEX state management are discussed in the architecture specification of the MEX block. The organization of various data packets in polygon memory is also described in detail in the MEX block specification. We recommend that the readers of this document go through the MEX block architecture specification first.

In this document, we first describe the functional requirements of the MIJ block. We then discuss the input and output interfaces to the MIJ block. This is followed by the functional details and algorithms used by the MIJ block. Lastly, we discuss the performance and memory bandwidth requirements.

5.8.2 Functional Overview of MIJ Block

As outlined earlier, MIJ receives VSP packets from the CUL block. Each VSP packet corresponds to the visible portion of a primitive on the 2×2 pixel stamp. The VSPs output from the Cull block to MIJ block are not necessarily ordered by primitives. In most cases, they will be in the VSP scan order on the tile, i.e. the VSPs for different primitives may be interleaved. In order to light, texture and composite the fragments in the VSPs, the pipeline stages downstream from the MIJ block need information about the type of the primitive (i.e. point, line, triangle, line-mode triangle); its geometry such as window and eye coordinates, normal, color, and texture coordinates at the vertices of the primitive; and the rendering state such as the PixelModes, TextureA, TextureB, Light, Material, and Stipple applicable to the primitive. This information is saved in the polygon memory by MEX. MEX also attaches ColorPointers {ColorAddress, ColorOffset, and ColorType} to each primitive sent to Sort, which is in turn passed on to each of the VSPs of that primitive. MIJ decodes this pointer to retrieve the necessary information from the polygon memory.

MIJ starts working on a frame after it receives a Begin-Frame packet from CUL. The VSP processing for the frame begins when CUL is done with the first tile in the frame and MIJ receives the first VSP for that tile.

5.8.2.1 Color Pointer Decode

The color pointer consists of three parts, the ColorAddress, ColorOffset, and ColorType. (We refer the reader to the Mode Extraction Architecture Specification for details of the ColorPointer and the MLM_Pointer.) The ColorAddress points to the ColorVertex that completes the primitive. ColorOffset provides the number of vertices separating the ColorAddress from the dualoct that contains the MLM_Pointer. ColorType contains information about the type of the primitive, size of each ColorVertex, and the enabled edges for line mode triangles. The ColorVertices making up the primitive may be 2, 4, 6, or 9 dualocts long. MIJ decodes the ColorPointer to obtain addresses of the dualocts containing the MLM_Pointer, and all the Color-Vertices that make up the primitive. The MLM_Pointer contains the dualoct address of the six state packets in polygon memory.

5.8.2.2 Cache Management 5.8.2.2.1 Problem Overview

The MIJ block is responsible for making sure that the Fragment, Texture, Phong and Pixel blocks have all the information they need for processing the fragments in the VSP, before the VSP arrives at that stage. In other words, the ColorVertices of the primitive as well as the six state packets pointed to by the pointers in the MLM_Pointer need to be resident in the blocks that need them, before the VSP fragments can be processed. If MIJ was to retrieve the MLM_pointer, the state packets, and ColorVertices for each of the VSPs, it will amount to nearly 1 KB of data per VSP. This is equivalent to 125 GB/sec of polygon memory bandwidth for reading the data, and as much for writing out the data to FRG and PIX blocks. Clearly, it is not possible to retrieve the data for each VSP—and some form of caching is required.

It is reasonable to assume that there will be some coherence in VSPs and the primitives; i.e. we are likely to get a sequence of VSPs corresponding to the same primitive. We use this coherence to reduce the amount of data read from polygon memory and transferred to Fragment and Pixel blocks. If the current VSP originates from the same primitive as the preceding VSP, we do not need to do any data retrieval. As pointed out earlier, the VSPs do not arrive at MIJ in primitive order. Instead, they are in the VSP scan order on the tile, i.e. the VSPs for different primitives crossing the scan-line may be interleaved. Because of this reason, the caching scheme based on the current and previous VSP alone will cut down the bandwidth by approximately 80%. Other schemes will provide even greater performance. For example, a scheme that takes advantage of primitive coherence on the entire tile, in fact on the quad-tile. Clearly, we can do this by keeping caches for MLM_Pointers, each of state partitions, and the color primitives in MIJ. The size of each of the caches is determined be their frequency of incidence on the tile. Note that while this scheme can solve the problem or retrieving the data from the polygon memory, we still need to deal with data transfer from MIJ to Fragment and Pixel blocks every time the data changes. We resolve this in the following way.

5.8.2.2.2 Decoupling of Cached Data and Tags

The data retrieved by MIJ is consumed by other blocks. Therefore, we store the cache data within those blocks. Each of the Fragment, Texture, Phong, and Pixel blocks have a set of caches. These caches hold the actual data that goes in their cache-line entries. Since MIJ is responsible for retrieving the relevant data for each of the units from Polygon memory and sending it down to the units—it needs to know the current state of each of the caches in the four aforementioned units. This is accomplished by keeping tags for each of the caches and allowing MIJ to do all cache management. Thus cache data resides in the block that needs it and the cache tags reside in MIJ.

MIJ manages seven caches for the downstream blocks—one for FRG (ColorData Cache 10016) and two each for the TEX (TexA 10018, TexB 10020), PHG (Light 10024, Material 10022), and PIX (PixMode 10026 and Stipple 10028) blocks. For each of these caches the tags are cached in MIJ and the data is cached in the corresponding block. MIJ also maintains the index of the data entry along with the tag. In addition to these seven caches, MIJ also maintains two caches internally for efficiency, one is the ColorVertex cache 10012 and the other is the MLM_Pointer cache 10014. For these, both the tag and the data reside in MIJ. All of these nine tag caches are fully associative and we use CAMs for Cache tag lookup. These caches are listed in FIG. 31.

5.8.3 Functional Units

The Mode Injection block resides between the CUL block and the rest of the pipeline downstream from CUL. MIJ receives the control and VSP packets from the CUL block. On the output side, MIJ interfaces with the Fragment and Pixel blocks.

The MIJ is responsible for the following:
1. Routing various control packets such as BeginFrame, EndFrame, and BeginTile to Fragment and Pixel units.
2. Routing prefetch packets from SORT to Pixel.
3. Determining the ColorPointer for all the vertices of the primitive corresponding to the VSP.
4. Determining the location of the MLMpointer in polygon memory and retrieving it.
5. Determining the location of various state packets in the polygon memory.
6. Determining which packets need to be retrieved.
7. Keeping track of the contents of the Color, TexA, TexB, Light, and Material caches (for the Fragment, Texture, and Phong blocks) and PixelMode and Stipple caches (for the Pixel block) and associating the appropriate cache pointer to each cache miss data packet.
8. Retrieving the state and color vertex packets from the polygon memory.
9. Constructing primitives. Polygon memory stores per-vertex data. Depending on the primitive type of the VSP, MIJ retrieves the required vertices (3 for a triangle, 2 for a line, and 1 for point primitives) from the polygon memory.
10. Sending data to the fragment and pixel blocks.
11. Processing stalls in the pipeline.
12. Signaling to MEX when done.

Mode injection thus deals with the retrieval of state as well as the per-vertex data needed for computing the final colors for each fragment in the VSP.

5.9 Fragment Block (FRG)

5.9.1 Overview

The Fragment block is located after Cull and Mode Injection and before Texture, Phong, and Bump. It receives Visible Stamp Portions (VSPs) that consist of up to 4 fragments that need to be shaded. The fragments in a VSP always belong to the same primitive, therefore the fragments share the primitive data defined at vertices including all the mode settings. A sample mask, sMask, defines which sub-pixel samples of the VSP are active. If one or more of the four samples for a given pixel is active. This means a fragment is needed for the pixel, and the vertex-based data for primitive will be interpolated to make fragment-based data. The active subpixel sample locations are used to determine the corresponding x and y coordinates of the fragment.

Figure 32:
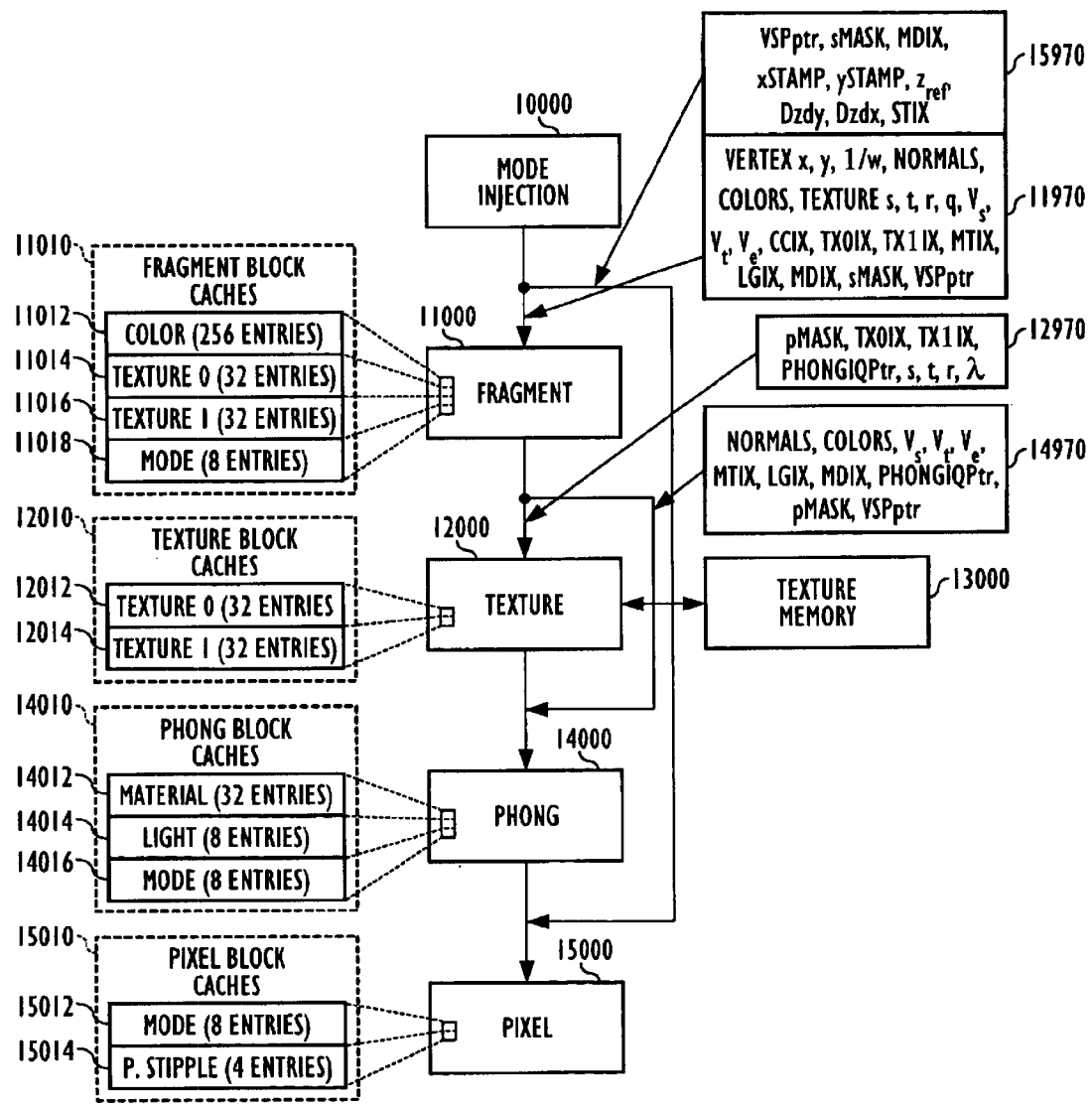
FIG. 32 is a diagrammatic illustration showing the manner in which mde data flows and is cached in portions of the DSGP pipeline.

In order to save bandwidth, the Fragment block caches the color data to be reused by multiple VPSs belonging to the same primitive. Before sending a VSP, Mode Injection identifies if the color cache contains the required data. If it is a hit, Mode Injection sends the VSP, which includes an index into the cache. On a cache miss, Mode Injection replaces an entry from the cache with the new color data, prior to sending the VSP packet with the Color cache index pointing to the new entry. Similarly all modes, materials, texture info, and light info settings are cached in the blocks in which they are used. An index for each of these caches is also included in the VSP packet. In addition to the polygon data, the Fragment block caches some texture and mode info. FIG. 32 shows the flow and caching of mode data in the last half of the DSGP pipeline.

The Fragment block's main function is the interpolation of the polygon information provided at the vertices for all active fragments in a VSP. At the output of the Fragment block we still have stamps, with all the interpolated data per fragment. The Fragment block can perform the interpolations of a given fragment in parallel and fragments within a VSP can be done in an arbitrary order. Fully interpolated stamps are forwarded to the Texture, Phong and Bump blocks in the same order as received. In addition, the Fragment block generates Level of Detail (LOD or $\lambda$) values for up to four textures and sends them to the Texture block.

The Fragment block will have an adequately sized FIFO in its input to smooth variable stamp processing time and the Color cache fill latency.

Figure 33:
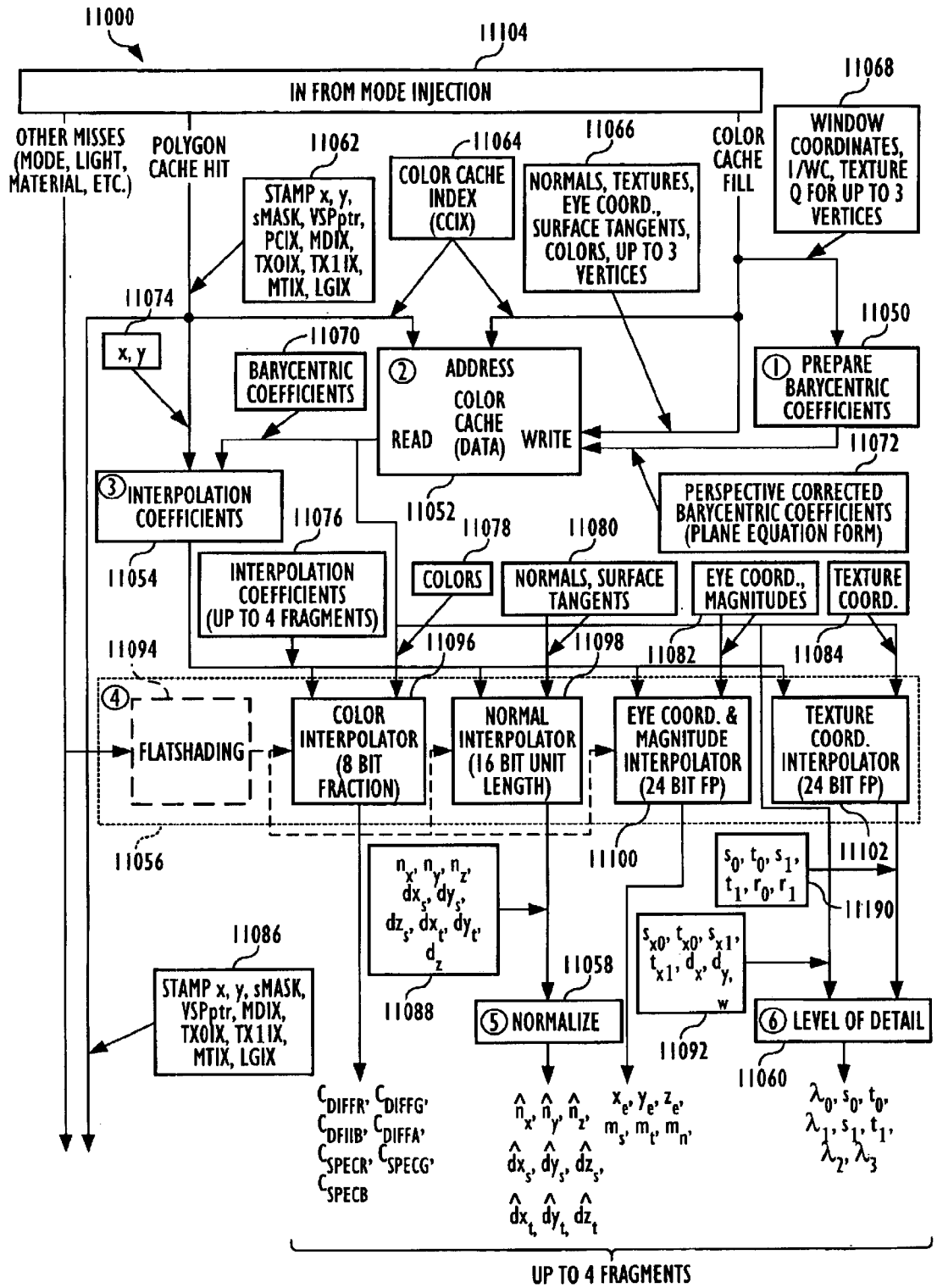
FIG. 33 is a diagrammatic illustration of an exemplary embodiment of the Fragment Block.
Figure 34A:
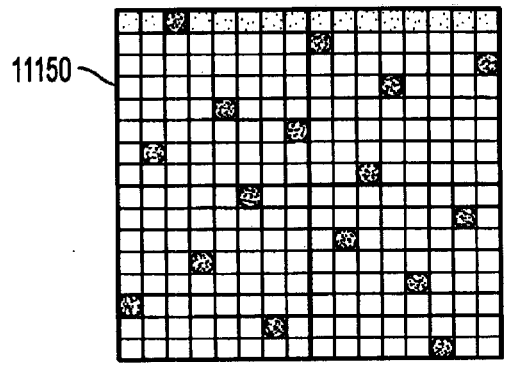
FIG. 34 is a diagrammatic illustration showing examples of VSPs with the pixel fragments formed by various primitives.
Figure 34B:
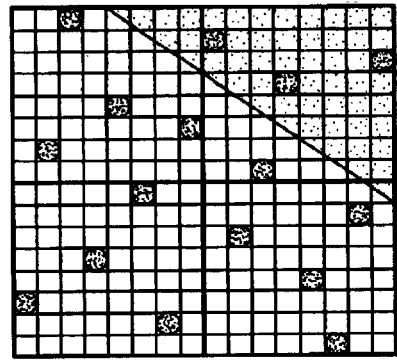
Figure 34C:
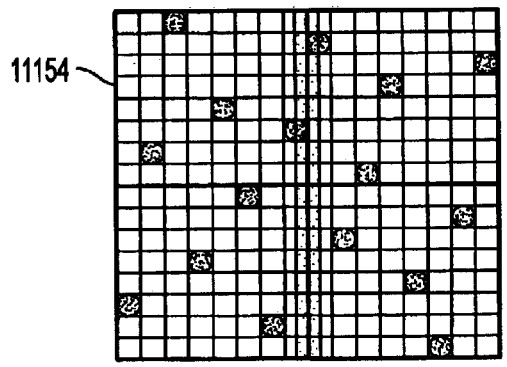
Figure 34D:
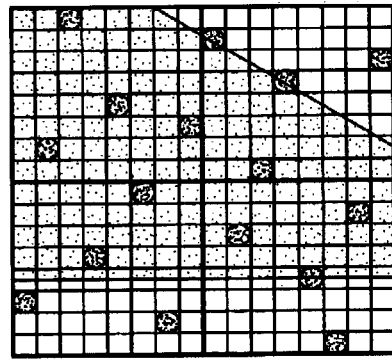

FIG. 33 shows a block diagram of the Fragment block.

The Fragment block can be divided into six sub-blocks. Namely:
1. The cache fill sub-block 11050
2. The Color cache 11052
3. The Interpolation Coefficients sub-block 11054
4. The Interpolation sub-block 11056
5. The Normalization sub-block 11058
6. The LOD sub-block 11060

The first block handles Color cache misses. New polygon data replaces old data in the cache. The Color cache index, CCIX, points to the entry to be replaced. The block doesn't write all of the polygon data directly into the cache. It uses the vertex coordinates, the reciprocal of the w coordinate, and the optional texture q coordinate to calculate the barycentric coefficients. It writes the barycentric coefficients into the cache, instead of the info used to calculate them.

The second sub-block implements the Color cache. When Fragment receives a VSP packet (hit), the cache entry pointed to by CCIX is read to access the polygon data at the vertices and the associated barycentric coefficients.

The third sub-block prepares the interpolation coefficients for the first fragment of the VSP. The coefficients are expressed in plane equation form for the numerator and the denominator to facilitate incremental computation of the next fragment's coefficients. The total area of the triangle divides both the numerator and denominator, therefore can be simplified. Also, since the barycentric coefficients have redundancy built-in (the sum of the fractions are equal to the whole), additional storage and bandwidth is saved by only providing two out of three sets of barycentric coordinates along with the denominator. As a non-performance case, texture coordinates with a q other than 1 will be interpolated using 3 more coefficients for the denominator.

The x and y coordinates given per stamp correspond to the lower left pixel in the stamp. Only the position of the stamp in a tile is determined by these coordinates. A separate packet provides the coordinates of the tile that subsequent stamps belong to. A lookup table is used with the corresponding bits in sMask to determine the lower bits of the fragment x and y coordinates at subpixel accuracy. This choosing of an interpolation location at an active sample location ensures that the interpolation coefficients will always be positive with their sum being equal to one.

The fourth sub-block interpolates the colors, normals, texture coordinates, eye coordinates, and Bump tangents for each covered pixel. The interpolators are divided in four groups according to their precision. The first group interpolates 8 bit fixed point color fractions. The values are between 0 and 1, the binary representation of the value 1 is with all the bits set to one. The second set interpolates sixteen bit, fixed point, unit vectors for the normals and the surface tangent directions. The third set interpolates 24 bit floating point numbers with sixteen bit mantissas. The vertex eye coordinates and the magnitudes of the normals and surface tangents fall into this category. The last group interpolates the texture coordinates which are also 24 bit FP numbers but may have different interpolation coefficients. All interpolation coefficients are generated as 24 bit FP values but fewer bits or fixed point representation can be used when interpolating 8 bit or 16 bit fixed point values.

The fifth sub-block re-normalizes the normal and surface tangents. The magnitudes obtained during this process are discarded. The original magnitudes are interpolated separately before being forwarded to the Phong and Bump block.

The texture map u, v coordinates and Level of Detail (LOD) are evaluated in the sixth sub-block. The barycentric coefficients are used in determining the texture LOD. Up to four separate textures associated with two texture coordinates are supported. Therefore the unit can produce up to four LODs and two sets of s, t coordinates per fragment, represented as 24 bit FP values.

5.9.1.1 sMask and pMask

FIG. 34 shows examples of VSPs with the pixel fragments formed by various primitives. A copy of the sMask is also sent directly to the Pixel block, bypassing the shading blocks (Fragment, Texture, Phong and Bump). The bypass packet also includes the z values, the Mode and Polygon Stipple Indices and is written in the reorder buffer at the location pointed to by the VSPptr. The pMask is generated in the Fragment block and sent Texture and Phong instead of the sMask. The actual coverage is evaluated in Pixel.

5.9.1.2 Barycentric Interpolation for Triangles

The Fragment block interpolates values using perspective corrected barycentric interpolation. This section describes the process.

Figure 35:
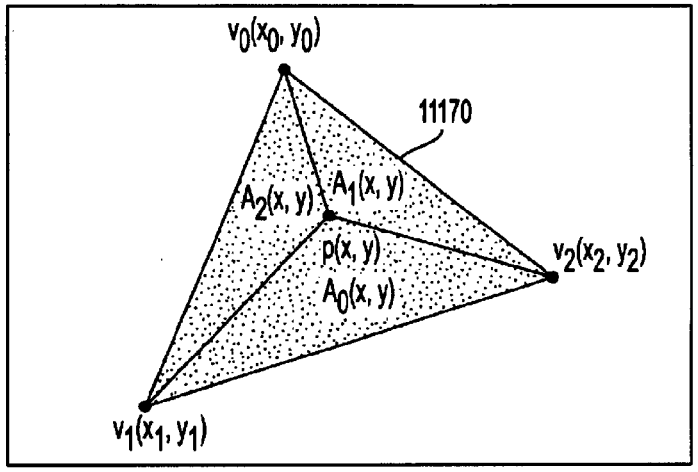
FIG. 35 is a diagrammatic illustration showing aspects of Fragment Block interpolation using perspective corrected barycentric interpolation for triangles.

As for the data associated with each fragment produced by rasterizing a triangle, we begin by specifying how these values are produced for fragments in a triangle. We define barycentric coordinates for a triangle 11170 (FIG. 35). Barycentric coordinates are a set of three numbers, $A_0$, $A_1$, and $A_2$, each in the range of $[0,1]$, with $A_0+A_1+A_2=1$. These coordinates uniquely specify any point p within the triangle or on the triangle's boundary as:

$$p(x, y) = A_0(x, y) \times V_0 + A_1(x, y) \times V_1 + A_2(x, y) \times V_2$$

where $V_0$, $V_1$, and $V_2$ are the vertices of the triangle. $A_0$, $A_1$, and $A_2$ can be found as:

$$A_0(x, y) = \frac{\text{Area}(p, V_1, V_2)}{\text{Area}(V_0, V_1, V_2)},$$

$$A_1(x, y) = \frac{\text{Area}(p, V_0, V_2)}{\text{Area}(V_0, V_1, V_2)}, A_2(x, y) = \frac{\text{Area}(p, V_0, V_1)}{\text{Area}(V_0, V_1, V_2)}$$

where Area(i,j,k) denotes the area in window coordinates of the triangle with vertices i, j, and k. One way to compute this area is:

$$\text{Area}(V_0, V_1, V_2) = \tfrac{1}{2}(x_{w0}y_{w1} - x_{w1}y_{w0} + x_{w1}y_{w2} - x_{w2}y_{w1} + x_{w2}y_{w0} - x_{w0}y_{w2})$$

Denote a datum at $V_0$, $V_1$, and $V_2$ as $f_0$, $f_1$, and $f_2$, respectively. Then the value f(x,y) of a datum at a fragment with window coordinate x and y produced by rasterizing a triangle is given by:

$$f(x, y) = \frac{A_0(x, y) \times f_0/w_{c0} + A_1(x, y) \times f_1/w_{c1} + A_2(x, y) \times f_2/w_{c2}}{A_0(x, y) \times a_0/w_{c0} + A_1(x, y) \times a_1/w_{c1} + A_2(x, y) \times a_2/w_{c2}}$$

where $w_{c0}$, $w_{c1}$, $w_{c2}$, are the clip w coordinates of $V_0$, $V_1$, and $V_2$, respectively. $A_0$, $A_1$, and $A_2$, are the barycentric coordinates of the fragment for which the data are produced.

$$a_0 = a_1 = a_2 = 1$$

except for texture s and t coordinates for which:

$$a_0 = q_0, a_1 = q_1, a_2 = q_2$$

5.9.1.3 Interpolation for Lines

For interpolation of fragment data along a line a slightly different formula is used:

Let the window coordinates of a produced fragment center be given by $p_r = (x,y)$ and let the $p_2 = (x_2, y_2)$ and $p_1 = (x_1, y_1)$ the endpoints (vertices) of the line. Set t as the following and note that $t = 0$ at $p_1$ and $t = 1$ at $p_2$:

$$t = \frac{(p_r - p_1) \cdot (p_2 - p_1)}{\|p_2 - p_1\|^2}$$

$$f(x, y) = \frac{(1-t) \times f_1/w_{c1} + t \times f_2/w_{c2}}{(1-t) \times a_1/w_{c1} + t \times a_2/w_{c2}}$$

5.9.1.4 Interpolation for Points

If the primitive is a point no interpolation is done. Vertex 2 is assumed to hold the data. In case q is not equal to one the s, t, and r coordinates need to be divided by q.

5.9.1.5 Vector Interpolation

For bump mapping the normal and surface tangents may have a magnitude associated with directional unit vectors. In this case we interpolate the unit vector components separately from the scalar magnitudes. This apparently gives a better visual result than interpolating the x, y and z components with their magnitudes. This is especially important when the direction and the magnitude are used separately.

Figure 36A:
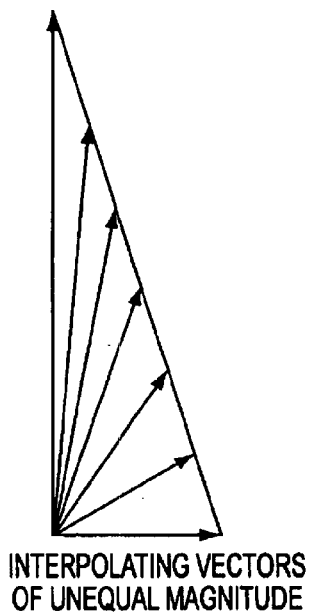
FIGS. 36(a) and 36(b) shows an example of how interpolating between vectors of unequal magnitude may result in uneven angular granularity and why the inventive structure and method does not interpolate normals and tangents this way.
Figure 36B:
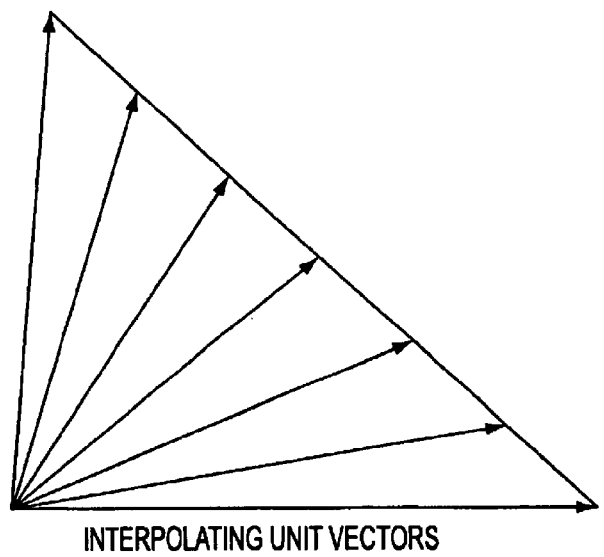

FIG. 36 shows how interpolating between vectors of unequal magnitude results in uneven angular granularity, which is why we do not interpolate normals and tangents this way.

5.9.1.6 Fragment x and y Coordinates

Figure 37:
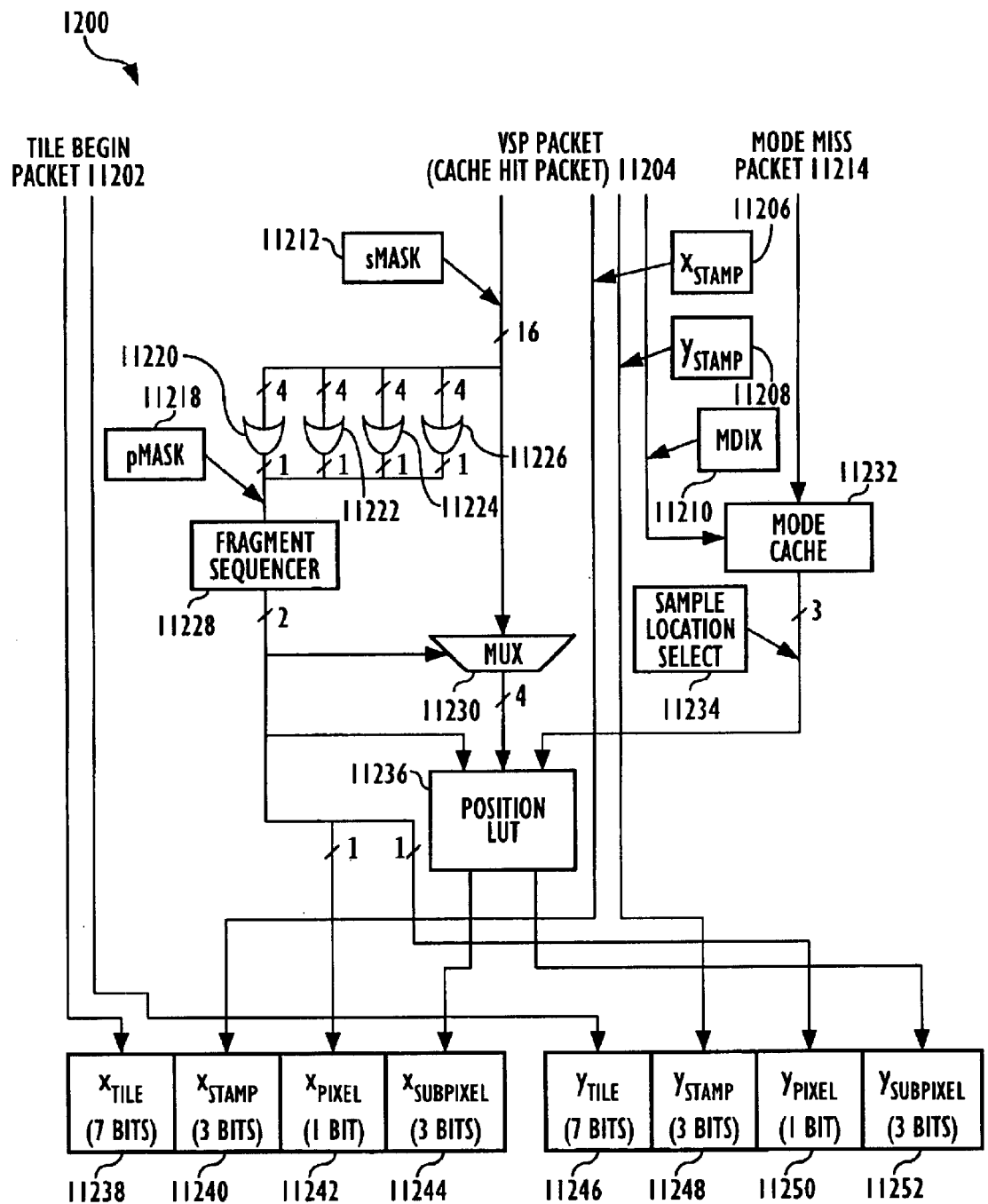
FIG. 37 is a diagrammatic illustration showing how the fragment x and y coordinates used to form the interpolation coefficients in the Fragment Block are formed

FIG. 37 shows how the fragment x and y coordinates used to form the interpolation coefficients are formed. The tile x and y coordinates, set at the beginning of a tile processing form the most significant bits. The sample mask (sMask) is used to find which fragments need to be processed. A lookup table provides the least significant bits of the coordinates at sub-pixel accuracy. We may be able to reduce the size of the LUT if we can get away with 2 bits of sample location select.

5.9.2 Equations 5.9.2.1 Cache Miss Calculations

First barycentric coefficients will need to be evaluated in the Fragment Unit on a Color cache miss. For a triangle:

$$b_{x0} = y_{w1} - y_{w2}; \quad b_{y0} = x_{w2} - x_{w1}; \quad b_{k0} = x_{w1} \times y_{w2} - x_{w2} \times y_{w1}$$
$$b_{x1} = y_{w2} - y_{w0}; \quad b_{y1} = x_{w0} - x_{w2}; \quad b_{k1} = x_{w2} \times y_{w0} - x_{w0} \times y_{w2}$$
$$b_{x2} = y_{w0}y_{w1}, \quad b_{y2} = x_{w1} - x_{w0}, \quad b_{k2} = x_{w0} \times y_{w1} - x_{w1} \times y_{w0}$$

In the equations above, $x_{w0}$, $x_{w1}$, $x_{w2}$, are the window x-coordinates of the three triangle vertices. Similarly, $y_{w0}$, $y_{w1}$, $y_{w2}$, are the three y-coordinates of the triangle vertices. With the actual barycentric coefficients, all the components need to be divided by the area of the triangle. This is not necessary in our case because of the perspective correction, that forms a denominator with coefficients also divided by the area.

For a line with vertex coordinates $x_{w1}$, $x_{w2}$ and $y_{w1}$, $y_{w1}$:

$$b_{x2} = x_{w2} - x_{w1}; \quad b_{y2} = y_{w2} - y_{w1}; \quad b_{k2} = -(x_{w1} \times b_{x2} + y_{w1} \times b_{y2})$$
$$b_{x1} = -b_{x2}; \quad b_{y1} = -b_{y2}; \quad b_{k1} = x_{w2} \times b_{x2} + y_{w2} \times b_{y2}$$
$$b_{x0} = 0; \quad b_{y0} = 0; \quad b_{k0} = 0$$

We now form the perspective corrected barycentric coefficient components:

$$C_{x0} = b_{x0} \times w_{ic0}; \quad C_{y0} = b_{y0} \times w_{ic0}; \quad C_{k0} = b_{k0} \times w_{ic0}$$
$$C_{x1} = b_{x1} \times w_{ic1}; \quad C_{y1} = b_{y1} \times w_{ic1}; \quad C_{k1} = b_{k1} \times w_{ic1}$$
$$C_{x2} = b_{x2} \times w_{ic2}; \quad C_{y2} = b_{y2} \times w_{ic2}; \quad C_{k2} = b_{k2} \times w_{ic2}$$

Where $w_{ic0}$ is the reciprocal of the clip w-coordinate of vertex 0 (reciprocal done in Geometry):

$$w_{ic0} = \frac{1}{w_{c0}}; \quad w_{ic1} = \frac{1}{w_{c1}}; \quad w_{ic2} = \frac{1}{w_{c2}}$$

The denominator components can be formed by adding the individual constants in the numerator:

$$D_x = C_{x0} + C_{x1} + C_{x2}; \quad D_y = C_{y0} + C_{y1} + C_{y2}; \quad D_k = C_{k0} + C_{k1} + C_{k2}$$

The above calculations need to be done only once per triangle. The color memory cache is used to save the coefficients for the next VSP of the same triangle. On a cache miss the coefficients need to be re-evaluated.

5.9.2.2 Interpolation Coefficients

Next, we prepare the barycentric coordinates for the first pixel of the VSP with coordinates (x,y):

$$W_i(x, y) = D_x \times x + D_y \times y + D_k$$
$$G_0(x, y) = C_{x0} \times x + C_{y0} \times y + C_{k0}$$
$$G_1(x, y) = C_{x1} \times x + C_{y1} \times y + C_{k1}$$
$$G_2(x, y) = W_i(x, y) - G_0(x, y) - G_1(x, y)$$

-continued $$L_0(x, y) = \frac{G_0(x, y)}{W_i(x, y)}; \quad L_1(x, y) = \frac{G_1(x, y)}{W_i(x, y)}; \quad L_2(x, y) = \frac{G_2(x, y)}{W_i(x, y)}$$

Then, for the next pixel in the x direction:

$$W_i(x+1, y) = W_i(x, y) + D_x$$
$$G_0(x+1, y) = G_0(x, y) + C_{x0}$$
$$G_1(x+1, y) = G_1(x, y) + C_{x1}$$
$$G_2(x+1, y) = G_2(x, y) + C_{x2}$$
$$L_0(x+1, y) = \frac{G_0(x+1, y)}{W_i(x+1, y)};$$
$$L_1(x+1, y) = \frac{G_1(x+1, y)}{W_i(x+1, y)}; \quad L_2(x+1, y) = \frac{G_2(x+1, y)}{W_i(x+1, y)}$$

Or, for the next pixel in the y direction:

$$W_i(x+1, y) = W_i(x, y) + D_x$$
$$G_0(x+1, y) = G_0(x, y) + C_{x0}$$
$$G_1(x+1, y) = G_1(x, y) + C_{x1}$$
$$G_2(x+1, y) = G_2(x, y) + C_{x2}$$
$$L_0(x+1, y) = \frac{G_0(x+1, y)}{W_i(x+1, y)};$$
$$L_1(x+1, y) = \frac{G_1(x+1, y)}{W_i(x+1, y)}; \quad L_2(x+1, y) = \frac{G_2(x+1, y)}{W_i(x+1, y)}$$

As a non-performance case (half-rate), when texture coordinate $q_n[m]$ is not equal to one, where n is the vertex number (0 to 2) and m is the texture number (0 to 3), an additional denominator for interpolating texture coordinates is evaluated:

$$D_{qx}[m] = C_{x0} \times q_0[m] + C_{x1} \times q_1[m] + C_{x2} \times q_2[m]$$
$$D_{qy}[m] = C_{y0} \times q_0[m] + C_{y1} \times q_1[m] + C_{y2} \times q_2[m] \text{ if } q_n[m] \neq 1;$$
$$n = 0, 1, 2; m = 0, 1, 2, 3$$
$$D_{qz}[m] = C_{z0} \times q_0[m] + C_{z1} \times q_1[m] + C_{z2} \times q_2[m]$$
$$W_{qi}(x, y)[m] = D_{qx}[m] \times x + D_{qy}[m] \times y + D_{qk}[m]$$
$$L_{q0}(x, y)[m] = \frac{G_0(x, y)}{W_{qi}(x, y)[m]};$$
$$L_{q1}(x, y)[m] = \frac{G_1(x, y)}{W_{qi}(x, y)[m]}; \quad L_{q2}(x, y)[m] = \frac{G_2(x, y)}{W_{qi}(x, y)[m]}$$

When the barycentric coordinates for a given pixel with (x,y) coordinates are evaluated we use them to interpolate. For a line L0 is not needed but is assumed to be zero in the following formulas.

5.9.2.3 Interpolation Equations

For full performance mode, we interpolate one set of texture coordinates:

$$s[0] = L_0(x,y) \times s_0[0] + L_1(x,y) \times s_1[0] + L_2(x,y) \times s_2[0]$$
$$t[0] = L_0(x,y) \times t_0[0] + L_1(x,y) \times t_1[0] + L_2(x,y) \times t_2[0]$$
$$R_{Diff} = L_0(x,y) \times R_{Diff_0} + L_1(x,y) \times R_{Diff_1} + L_2(x,y) \times R_{Diff_2}$$
$$G_{Diff} = L_0(x,y) \times G_{Diff_0} + L_1(x,y) \times G_{Diff_1} + L_2(x,y) \times G_{Diff_2}$$
$$B_{Diff} = L_0(x,y) \times B_{Diff_0} + L_1(x,y) \times B_{Diff_1} + L_2(x,y) \times B_{Diff_2}$$

$A_{Diff} = L_0(x,y) \times A_{Diff_0} + L_1(x,y) \times A_{Diff_1} + L_2(x,y) \times A_{Diff_2}$ $R_{Spec} = L_0(x,y) \times R_{Spec_0} + L_1(x,y) \times R_{Spec_1} + L_2(x,y) \times R_{Spec_2}$ $G_{Spec} = L_0(x,y) \times G_{Spec_0} + L_1(x,y) \times G_{Spec_1} + L_2(x,y) \times G_{Spec_2}$ $B_{Spec} = L_0(x,y) \times B_{Spec_0} + L_1(x,y) \times B_{Spec_1} + L_2(x,y) \times B_{Spec_2}$ Diffuse and specular colors:

Note that the 8-bit color values are actually fraction between 0 and 1 inclusive. By convention, the missing represented number is $1-2^{-8}$. The value one is represented with all the bits set taking the place of the missing representation. When color index is used instead of R, G, B and A, the 8-bit index value replaces the R value of the Diffuse and the Specular component of the color.

And surface normals:

$n_x = L_0(x,y) \times n_{ux0} + L_1(x,y) \times n_{ux1} + L_2(x,y) \times n_{ux2}$ $n_y = L_0(x,y) \times n_{uy0} + L_1(x,y) \times n_{uy1} + L_2(x,y) \times n_{ux2}$ $n_z = L_0(x,y) \times n_{uz0} + L_1(x,y) \times n_{uz1} + L_2(x,y) \times n_{ux2}$ The normal vector has to be re-normalized after the interpolation:

$$\left\| \begin{matrix} 0 \\ h \end{matrix} \right\|^{-1} = \frac{1}{\sqrt{n_x^2 + n_y^2 + n_z^2}}$$

$$\hat{n}_x = n_x x \left\| \begin{matrix} 0 \\ h \end{matrix} \right\|^{-1}$$

$$\hat{n}_y = n_y x \left\| \begin{matrix} 0 \\ h \end{matrix} \right\|^{-1}$$

$$\hat{n}_z = n_x x \left\| \begin{matrix} 0 \\ h \end{matrix} \right\|^{-1}$$

At half-rate (accumulative) we interpolate the vertex eye coordinate when needed:

$x_e = L_0(x,y) \times x_{e0} + L_1(x,y) \times x_{e1} + L_2(x,y) \times x_{e2}$ $y_e = L_0(x,y) \times y_{e0} + L_1(x,y) \times y_{e1} + L_2(x,y) \times y_{e2}$ $z_e = L_0(x,y) \times z_{e0} + L_1(x,y) \times z_{e1} + L_2(x,y) \times z_{e2}$ At half-rate (accumulative) we interpolate up to four texture coordinates. This is done either using the plane equations or barycentric coordinates. The r-texture coordinates are also interpolated for volume texture rendering but at one third of the full rate.

$s[1] = L_0(x,y) \times s_0[1] + L_1(x,y) \times s_1[1] + L_2(x,y) \times s_2[1]$ $t[1] = L_0(x,y) \times t_0[1] + L_1(x,y) \times t_1[1] + L_2(x,y) \times t_2[1]$ $r[0] = L_0(x,y) \times r_0[0] + L_0(x,y) \times r_1[0] + L_2(x,y) \times s_2[0]$ $r[1] = L_0(x,y) \times r_0[1] + L_1(x,y) \times r_1[1] + L_2(x,y) \times s_2[1]$ In case the partials are provided by the user as the bump tangents per vertex, we need to interpolate them. As a simplification the hardware will always interpolate the surface tangents at half rate:

$\frac{\partial x_e}{\partial s} = L_0(x,y) \times \frac{\partial x_{e0}}{\partial s} + L_1(x,y) \times \frac{\partial x_{e1}}{\partial s} + L_2(x,y) \times \frac{\partial x_{e2}}{\partial s}$ -continued $\frac{\partial x_e}{\partial t} = L_0(x,y) \times \frac{\partial x_{e0}}{\partial t} + L_1(x,y) \times \frac{\partial x_{e1}}{\partial t} + L_2(x,y) \times \frac{\partial x_{e2}}{\partial t}$ $\frac{\partial y_e}{\partial s} = L_0(x,y) \times \frac{\partial y_{e0}}{\partial s} + L_1(x,y) \times \frac{\partial y_{e1}}{\partial t} + L_2(x,y) \times \frac{\partial y_{e2}}{\partial s}$ $\frac{\partial y_e}{\partial t} = L_0(x,y) \times \frac{\partial y_{e0}}{\partial s} + L_1(x,y) \times \frac{\partial y_{e1}}{\partial s} + L_2(x,y) \times \frac{\partial y_{e2}}{\partial s}$ $\frac{\partial z_e}{\partial s} = L_0(x,y) \times \frac{\partial z_{e0}}{\partial s} + L_1(x,y) \times \frac{\partial z_{e1}}{\partial s} + L_2(x,y) \times \frac{\partial z_{e2}}{\partial s}$ $\frac{\partial z_e}{\partial t} = L_0(x,y) \times \frac{\partial z_{e0}}{\partial t} + L_1(x,y) \times \frac{\partial z_{e1}}{\partial t} + L_2(x,y) \times \frac{\partial z_{e2}}{\partial t}$ The surface tangents also have to be normalized, like the normals, after interpolation.

We also use the barycentric coefficients to evaluate the partial derivatives of the texture coordinates s and t with respect to window x and y-coordinates:

$\frac{\partial s}{\partial x}[m] = \frac{\partial L_0(x,y)}{\partial x} \times s_0[m] + \frac{\partial L_1(x,y)}{\partial x} \times s_1[m] + \frac{\partial L_2(x,y)}{\partial x} \times s_2[m]$ $\frac{\partial t}{\partial x}[m] = \frac{\partial L_0(x,y)}{\partial x} \times t_0[m] + \frac{\partial L_1(x,y)}{\partial x} \times t_1[m] + \frac{\partial L_2(x,y)}{\partial x} \times t_2[m]$ $\frac{\partial s}{\partial y}[m] = \frac{\partial L_0(x,y)}{\partial y} \times s_0[m] + \frac{\partial L_1(x,y)}{\partial y} \times s_1[m] + \frac{\partial L_2(x,y)}{\partial y} \times s_2[m]$ $\frac{\partial t}{\partial y}[m] = \frac{\partial L_0(x,y)}{\partial y} \times t_0[m] + \frac{\partial L_1(x,y)}{\partial y} \times t_1[m] + \frac{\partial L_2(x,y)}{\partial y} \times t_2[m]$ $\frac{\partial L_0(x,y)}{\partial x} = \frac{C_{x0} - D_x \times L_0(x,y)}{W_i(x,y)}$ $\frac{\partial L_1(x,y)}{\partial x} = \frac{C_{x1} - D_x \times L_1(x,y)}{W_i(x,y)}$ $\frac{\partial L_2(x,y)}{\partial x} = \frac{C_{x2} - D_x \times L_2(x,y)}{W_i(x,y)}$ $\frac{\partial L_0(x,y)}{\partial y} = \frac{C_{y0} - D_y \times L_1(x,y)}{W_i(x,y)}$ $\frac{\partial L_1(x,y)}{\partial y} = \frac{C_{y1} - D_y \times L_1(x,y)}{W_i(x,y)}$ $\frac{\partial L_2(x,y)}{\partial y} = \frac{C_{y2} - D_y \times L_2(x,y)}{W_i(x,y)}$ $\frac{\partial s}{\partial x}[m] = \frac{C_{x0} \times s_0[m] + C_{x1} \times s_1[m] + C_{x2} \times s_2[m] - D_x \times s[m]}{W_i(x,y)}$ $\frac{\partial t}{\partial x}[m] = \frac{C_{x0} \times t_0[m] + C_{x1} \times t_1[m] + C_{x2} \times t_2[m] - D_x \times t[m]}{W_i(x,y)}$ $\frac{\partial s}{\partial y}[m] = \frac{C_{y0} \times s_0[m]_{C_{y1}} \times s_1[m] + C_{y2} \times s_2[m] - D_y \times s[m]}{W_i(x,y)}$ $\frac{\partial t}{\partial y}[m] = \frac{C_{y0} \times t_0[m] + C_{y1} \times t_1[m] + C_{y2} \times t_2[m] - D_y \times t[m]}{W_i(x,y)}$ In the event of $q_{rt}[m]$ is not equal to one, $W_i(x,y)$ is replaced by $W_{qt}[m](x,y)$.

This is a good introduction for an alternative way of evaluating the interpolated s, t and their partials:

$s[m] = \frac{S_x[m] \times x + S_y[m] \times y + S_k[m]}{W_i(x,y)}$ $s_x[m] = C_{x0} \times s_0[m] + C_{x1} \times s_1[m] + C_{x2} \times s_2[m]$ $s_y[m] = C_{y0} \times s_0[m] + C_{y1} \times s_1[m] + C_{y2} \times s_2[m]$ $s_k[m] = C_{k0} \times s_0[m] + C_{k1} \times s_1[m] + C_{k2} \times s_2[m]$ -continued $$\frac{\partial s}{\partial x}[m] = \frac{S_x[m] - D_x \times s[m]}{W_l(x, y)}$$

$$s[m](x+1, y) = \frac{s_n(x, y)[m]_{s_x}(m)}{W_l(x, y) + D_x}$$

$$s_n(x, y)[m] = S_x[m] \times x + S_y[m] \times y + S_k[m]$$

Other terms can be evaluated similarly. Note that all values that need to be interpolated, like colors and normals could be expressed in this plane equation mode and saved in the triangle info cache to reduce the computation requirements with the incremental evaluation approach.

We define:

$$u(x,y)=2^n \times s(x,y)$$

$$v(x,y)=2^m \times t(x,y)$$

$$\rho(x, y) = \max\left\{\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right\}$$

$$\lambda = \log_2[\rho(x,y)]$$

Here, $\lambda$ is called the Level of Detail (LOD) and $\rho$ is called the scale factor that governs the magnification or minification of the texture image. n and m are the width and the height of a two dimensional texture map. The partial derivatives of u and v are obtained using the partials of s and t. For one dimension texture map t, v, and the partial derivatives $\delta v/\delta x$ and $\delta v/\delta y$ are set to zero. For a line the formula is:

$$\Delta x = x_2 - x_1; \Delta y = y_2 - y_1$$

The DSGP pipeline supports up to four textures with two sets of texture coordinates. Specifically, for i=0.3 if:

TEXTURE_1D[i]==1 or TEXTURE_2D[i]==1 then we compute $\lambda$ using the texture coordinates TEXTURE_COORD_SET_SOURCE[i].

The Fragment block passes s, t, r, and $\lambda$ to the Texture block for each active texture. Note that $\lambda$ is not the final LOD. The Texture block applies additional rules such as LOD clamping to obtain the final value for $\lambda$.

5.9.3 Memory Caching Schemes

Fragment uses three caches to perform the needed operations. The primary cache is the Color cache. It holds the color data for the primitive (triangle, line, or point). The cache miss determination and replacement logic is actually located in the Mode Inject block. The Fragment block normally receives a "hit" packet with an index pointing to the entry that hold the associated Color data. If a miss is detected by the Mode Inject block, a "fill" packet is sent first to replace an entry in the cache with the new data before any "hit" packets are sent to use the new data. Therefore it is important not to change the order of packets sent by Mode Inject, since the cache replacement and use logic assumes that the incoming packets are processed in order.

The Fragment block modifies some of the data before writing in the Color cache during cache fills. This is done to prepare the barycentric coefficients during miss time. The vertex window coordinates, the reciprocal of the clip-w coordinates at the vertices and texture q coordinates at the vertices are used and replaced by the $C_{x[1:0]}$, $C_{y[1:0]}$, $C_{k[1:0]}$, $D_x$, $D_y$, $D_k$ barycentric coefficients. Similarly the $S_x$, $S_y$, $T_x$, and $T_y$, values are evaluated during cache misses and stored along with the other data.

The Color cache is currently organized as a 256 entry, four set associative cache. The microArchitecture of the Mode Inject and Fragment Units may change this organization provided that the performance goals are retained. It assumed that at full rate the Color cache misses will be less than 15% of the average processed VSPs.

The data needed at half rate is stored as two consecutive entries in the Color cache. The index provided in this case will be always an even number.

For the texture information used in the Fragment block two texture mode caches are used. These are identically organized caches each holding information for two textures. Two texture indices, TX0IX and TX1IX, are provided in every "hit" packet to associate the texture coordinates with up to four textures. Per texture the following data is read from the texture mode caches:

TEXTURE_1D, TEXTURE_2D, TEXTURE_3D are the enable bits for a given texture.

TEXTURE_HIGH, TEXTURE_WIDTH define respectively the m and n values used in the u and v calculations.

TEXTURE_COORD_SET_SOURCE identifies which texture coordinate is bound to a given texture.

The texture mode caches are organized as a 32 entry fully associative cache. The assumed miss rate for texture mode cache 0 is less than 0.2% per VSP.

In addition, modes are also cached in Fragment in a Mode Cache. The Mode Cache is organized as a fully associative, eight-entry cache. The assumed miss rate is 0.001% per VSP (negligible). The following info is cached in the Mode Cache:

SHADE_MODEL (1 bit),
BUMP_NO_INTERPOLATE (1 bit)
SAMPLE_LOCATION_SELECT (3 bits)

5.10 Texture Block (TEX)

5.10.1 Overview

Polygons are used in 3D graphics to define the shape of objects. Texture mapping is a technique for simulating surface textures by coloring polygons with detailed images. Typically, a single texture map will cover an entire object that consists of many polygons. A texture map consists of one or more rectangular arrays of RGBA color (up to 2 K by 2 K in Apex). The user supplies coordinates, either manually or automatically in the Geometry Block, into the texture map at each vertex. These coordinates are interpolated for each fragment, the texture values are looked up in the texture map and the color assigned to the fragment. Bump map coefficients are obtained similarly using the light_texture extension. See the Phong Block for details.

Because objects appear smaller when they're farther from the viewer, texture maps must be scaled so that the texture pattern appears the same size relative to the object being textured. Of course, scaling and filtering a texture image for each fragment is an expensive proposition. Mipmapping allows the renderer to avoid some of this work at run-time. The user provides a series of texture arrays at successively lower resolutions, each array representing the texture at a specified level of detail (LOD or $\lambda$). The Fragment Block calculates a level of detail value for each fragment, based on its distance from the viewer, and the Texture Block interpolates between the two closest mipmap arrays to produce a texture value for the fragment. For example, if a fragment has $\lambda=0.5$, the Texture Block interpolates between the arrays representing $\lambda=0$ and $\lambda=1$.

The Apex Board supports texture mapping with tri-linear mipmapping at 250M textured fragments/sec. Up to eight texture maps and eight sets of texture coordinates per fragment are supported at proportionally lower performance. Apex handles bump maps as textures, using either the SGI extensions or height gradient fields. It will perform 3-D texture mapping at a somewhat slower rate, because the texel cache will perform less efficiently due to less optimal texel reuse.

We will support the following extensions to OpenGL 1.1 in Apex:

Multitexture . . . up to 8 texture maps and 8 sets of texture coordinates per fragment 3D textures . . . 3D textures are supported with bi-linear blending. Tri-linear mip-mapping for 3D textures is handled in software.

LOD clamping . . . requiring that only a subset of the texture LODs be used for mip-mapping.

Edge Clamp . . . a sane way to do clamped textures.

Shadow . . . a simple extension to support multipass shadows.

signed data type support for bump and depth textures (12-12-12 and 16-16) Edge Clamping, LOD clamping, and 3D textures are part of OpenGL 1.2.

The Texture Block caches texels to get local reuse. Texture maps are stored in texture memory in 2×2 blocks of RGBA data (16 bytes per block) except for normal vectors, which may be stored in 18 byte blocks (6-6-6).

5.10.1.1 Virtual Texture Numbers

The user provides a texture number when the texture is passed from user space with OpenGL calls. The user can send some triangles to be textured with one map and then change the texture data associated with the same texture number to texture other triangles in the same frame. Our pipeline requires that all sets of texture data for a frame be available to the Texture Block. In software, we assign a virtual texture number to each texture map.

5.10.2 Texture Memory

Texture Memory stores texture arrays that the Texture Block is currently using. Software manages the texture memory, copying texture arrays from host memory into Texture Memory. It also maintains a table of texture array addresses in Texture Memory.

5.10.2.1 Texture Addressing

Figure 38:
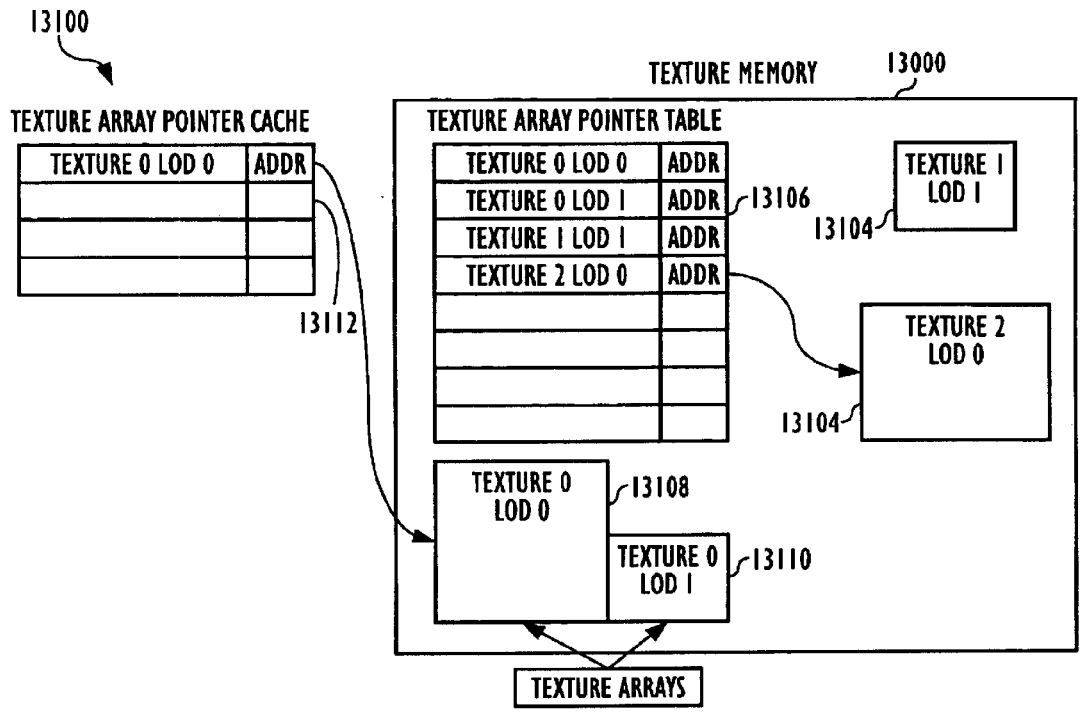
FIG. 38 is a diagrammatic illustration showing an overview of texture array addressing.
Figure 39:
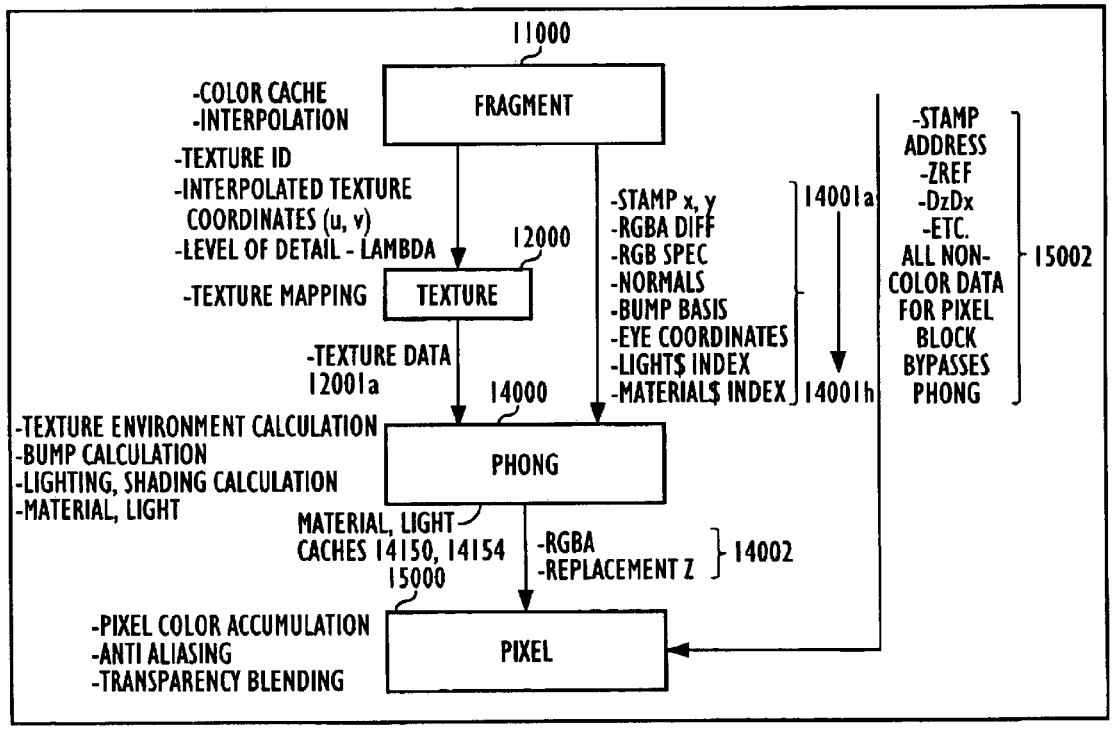
FIG. 39 is a diagrammatic illustration showing the Phong unit position in the pipeline and relationship to adjacent blocks.

The Texture Block identifies texture arrays by virtual texture number and LOD. The arrays for the highest LODs are lumped into a single record. (In one embodiment, seven LOD s each contain 21 kilobytes.) A texture array pointer table associates a texture array ID (virtual texture number concatenated with the LOD) with an address in Texture Memory. We need to support thousands of texture array pointers, so the texture array pointer table will have to be stored in Texture Memory. We need to map texture array IDs to addresses ~500M times per second. Fortunately, adjacent fragments will usually share the same the texture array, so we should get good hit rates with a cache for the texture array pointers. (In one embodiment, the size of the texture array cache is 128 entries, but other sizes, larger or smaller, may be implemented.) FIG. 38 gives an overview of texture array addressing.

The Texture Block implements a double hashing algorithm to search the pointer table in memory. Software manages the texture array pointer table, using the hardware hashing algorithm to store table elements.

5.1 0.2.2 Texture Memory Allocation

Software handles allocation of texture memory. The Texture Block sends an interrupt to the host when it needs a texture array that is not already in texture memory. The host copies the texture array from main memory to texture memory, and updates the texture array pointer table, as described above. The host controls which texture arrays are overwritten by new data.

The host will need to rearrange texture memory to do garbage collection, etc. The hardware will support the following memory copies:

host to memory
memory to host
memory to memory

A synchronization scheme will be implemented to insure correct behavior. A brute force approach would be to flush the Texture Block prior to any memory copy activity. However, we can probably get away with a more relaxed scheme based around the texture array pointer table 13106. Software can control synchronization through a few commands to start, stop, and flush the texture pipeline. See "Host Commands," below.

5.10.2.3 Contents of Texture Memory

A texture array is divided into 2×2 texel blocks. Each texel block in an array is represented in Texture Memory by a 16 or 18 byte record containing RGBA, RGB, or height gradient data for four texels. Texturing a given fragment with tri-linear mip-mapping requires accessing 2 to 8 of these blocks, depending on where the fragment falls relative to the 2×2 blocks.

5.10.2.4 Texture Memory Data Paths

In addition to the normal path between Texture Memory and the Texture Block, there is a path from host memory to Texture Memory. The bandwidth should be about 500 MB/s. This "Back Door Bus" path connects the framebuffer and Texture Memory to the host. We also support memory to memory copies in Texture Memory under the control of software.

5.10.2.5 Texture Formats

In hardware, we support the OpenGL internal formats RGBA8, RGB12 (signed), and LUMINANCE16_ALPHA16 (signed). Software will support the other formats that use a subset of the storage of these formats, e.g., RGB8. Some uses of Texture Memory, e.g., for bump map coefficients, may interpret the texel bits in other ways. We will support 16-bit interpolations for bump map textures. After the Texture Block, all colors are treated as 8 bit quantities except for light_texture quantities like normals, depth, and height fields.

To support the formats described above, we need to perform linear interpolation calculations on two sets 16-bit values, three sets of 12-bit values, or four sets of 8-bit values. The Texture Block uses four sets of arithmetic units for the calculations: two with 16 bit precision, one with 12 bit precision, and one with 8 bit precision.

Note that all 16 and 12 bit operations are signed. Treating regular colors as signed 12 bit numbers will still preserve more than 8 bits unsigned.

5.10.2.5.0.1 Video Textures

Video feed will be in one of several YUV (or YIQ) formats. We will do the conversion to RGB and pack the values into texel format (2×2 blocks instead of scanline order) by using the 2D core to translate to RGB and using the Rambus masked writes to store the texels in 2×2 blocks. This data will be stored in Texture Memory and displayed as a normal texture.

5.11 Phong and Bump Mapping Block (PHB)

5.11.1 Overview

The Phong Block calculates the color of a fragment by combining the color, material, geometric, and lighting information from the Fragment Block with the texture information from the Texture Block. The result is a colored fragment that is forwarded to the Pixel Block where it is blended with any color information already residing in the frame buffer.

Note that Phong does not care about the concepts of frames, tiles, or screen-space.

In accordance with the present invention the Phong Block embodies a number of features for performing tangent space lighting in a deferred shading environment. These features include:

performing bump mapping in eye space using bump maps represented in tangent space;

supporting tangent space bump maps without needing to interpolate and translate light and half-angle vectors (L and H) used in the lighting computation;

performing bump mapping using matrix multiplication;

performing bump mapping using a fixed point matrix of basis vectors derived by separating each basis vector into a unit vector and a magnitude and combining the magnitudes with respective tangent space bump map components;

performing bump mapping using fixed point matrix multiplication using the fixed point matrix of basis vectors and a fixed point vector of tangent space bump map components derived by scaling each bump map component by a respective scale factor;

using the Phong lighting matrix to perform bump mapping calculations;

compatibility with tangent space bump maps provided in a variety of API formats, including Blinn, SGI and 3D Studio Max;

deriving the basis vectors differently depending on the format of the provided bump map so the same matrix multiplication can be used to perform bump mapping regardless of the API format of the bump map;

performing lighting and bump mapping without interpolating partials, normals or basis vectors;

hardware implementation of Blinn bump mapping;

One feature of the Phong block 14000 is that it does not interpolate partials or normals. Instead, these interpolations are done in the Fragment block 11000, which passes the interpolated results to Phong. The method by which Fragment 11000 performs these interpolations is described above; however, features of this method and its advantages are briefly recited herein:

Fragment does not interpolate partials or normals of arbitrary magnitude;

Instead, per-vertex partials and normals are provided to Fragment as unit vectors and associated magnitudes, which Fragment separately interpolates (see discussion above of barycentric interpolation for triangles and other inventive interpolation methods performed by Fragment);

Fragment normalizes the interpolated partial and normal unit vectors and passes the results to Phong as the fragment unit normals and partials;

Fragment passes the interpolated magnitudes to Phong as the magnitudes associated with the fragment unit normals and partials;

Phong performs bump and lighting calculations using the interpolated unit vectors and associated magnitudes.

Another feature of the Phong block 14000 is that it does not interpolate L or H vectors. Instead, Phong receives from the Fragment block 11000 a unit light vector PI and a unit fragment vector V, both defined in eye space coordinates. Phong derives the light vector L without interpolation by subtracting V from P1. Phong is then able to derive the half-angle vector H from the light vector and a known eye vector E.

Compared to the prior art, advantages of the inventive system for performing tangent space lighting in a deferred shading architecture include:

lack of distortions due to surface parametrization caused in prior art by interpolation of vectors (i.e., partials, normals, L, H, N) of arbitrary magnitude;

lack of approximation errors due to triangulation (size of triangles) caused in prior art by interpolation of L and H vectors, especially for local lights;

reduction of calculations required in the prior art to transform L and H vectors from eye space to tangent space, especially for multiple lights;

simplification of Phong hardware as a result of recasting the matrix multiplication as multiplication of a fixed point matrix and a fixed point vector;

efficient use of Phong hardware to perform both lighting calculations and bump mapping in eye space even when the bump maps are defined in tangent space;

simplification of Phong hardware as a result of eliminating the need to perform vector interpolation in Phong.

Various features of the present invention are now described, first in summary and then at an appropriate higher level of detail.

5.11.2 Color Index Mode

Texture and fragment lighting operations do not take place in color index mode. In this mode the only calculations performed by the Phong Block are the fog calculations. In this case the mantissa of the R value of the incoming fragment color is interpreted as an 8-bit color index varying from 0 to 255, and is routed directly to the fog block for processing.

5.11.3 Pipeline Position

Referring to FIG. 34, there is shown a block diagram illustrating Phong's position in the pipeline and relationship to adjacent blocks.

The Phong Block 14000 is located after Texture 12000 and before Pixel 15000. It receives data from both Texture and Fragment 11000. Fragment sends per-fragment data as well as cache fill data that are passed through from mode injection. Texture sends only texel data 12000$1a$. In the illustrated DSGP the data from Fragment 11000 include: stamp x, y 14001$a$; RGBA diffuse data 14001$b$; RGBA spectral data 14001$c$; surface normals 14001$d$; bump basis vectors 14001$e$; eye coordinates 14001$f$; light cache index 14001$g$; and material cache index 14001$h$.

Only the results 14002 produced by Phong are sent to Pixel 15000; all other data 15002 required by Pixel 15000comes via a separate data path.

The Phong Block has two internal caches: the "light" cache 14154, which holds infrequently changing information such as scene lights and global rendering modes, and the "material" cache 14150, which holds information that generally changes on a per-object basis.

5.11.4 Phong Computational Blocks

The Phong procedure is composed of several sub-computations, or blocks, which are summarized here. Pseudo-code along with details of required data and state information are described later in this specification. FIG. 36 shows a block diagram of Phong 14000, showing the various Phong computations.

5.11.4.1 Texture Computation

Texture computation 14114 accepts incoming texels 14102 from the Texture Block and texture mode information 14151a from the material cache 14150. This computation applies the texture-environment calculation and merges multiple textures if present. The result is forwarded to the Light-environment subunit 14142 in the case of the conventional use of textures, or to other subunits, such as Bump 14130, in case the texture is to be interpreted as modifying some parameter of the Phong calculation other than color.

5.11.4.2 Material Computation/Selection

Material computation 14126 determines the source of the material values for the lighting computation. Inputs to Material computation 14126 include material texture values from Texture 14114, fragment material values 14108 from Fragment and a primary color 14106 originating in the Gouraud calculation. Using current material mode bits from the material cache 14150 the Material computation may decide to replace the fragment material 14126 with the texture values 14114 or with the incoming primary color 14106.

5.11.4.3 Bump Computation

Bump computation 14130 determines the surface normal to be used in the lighting calculation. Inputs to Bump include bump texture information 14122 from Texture 14114 and the surface normal, tangent and binormal 14110 from Fragment 11000. The Bump computation 14130 may simply pass through the normal as interpolated by Fragment, or may use a texel value 14122 in a calculation that involves a 3×3 matrix multiply.

5.11.4.4 Light-Texture Computation

Inputs to Light-Texture computation 14134include light texture information 14118 from the Texture computation 14114 and the fragment light information 14112 from Fragment. Light-Texture computation 14134 decides whether any of the components of the lights 14112 should be replaced by a texel 14118.

5.11.4.5 Fragment Lighting Computation

Fragment lighting computation 14138 performs the actual lighting calculation for this fragment using an equation similar to that used for per-vertex lighting in the GEO block. This equation has been discussed in detail in the Background section. Inputs to Fragment Lighting include material data 14128 from Material selection 14126, surface normal from Bump 14130 and light data from 14136from Light-Texture 14134.

5.11.4.6 Light Environment Computation

Light environment computation 14142 blends the result 14410 of the fragment lighting computation with the texture color 14118 forwarded from the Texture Block.

5.11.4.7 Fog Computation

Fog computation 14146 applies "fog"; modifies the fragment color 14144 using a computation that depends only on the distance from the viewer's eye to the fragment. the final result 14148 from Fog computation 14146 is forwarded to the Pixel Block.

5.11.5 Phong Hardware Details

The previous section has generally described the blocks composing the Phong computation and the data used and generated by those sub-blocks. The blocks can be implemented in hardware or software that meets the requirements of the preceding general description and subsequent detailed descriptions. Similarly, data can be transferred between the Phong blocks and the external units (i.e., Texture, Fragment and Pixel) and among the Phong blocks using a variety of implementations capable of satisfying Phong I/O requirements. While all of these alternative embodiments are within the scope of the present invention, a description is now provided of one preferred embodiment where the Phong blocks are implemented in hardware and data is transferred between top-level units (i.e., Texture, Fragment, Phong and Pixel) using packets. The content of the I/O packets is described first.

5.11.5.1 I/O packets

Referring to FIG. 35, there is shown a block diagram illustrating packets exchanged between Phong 14000, Fragment 11000, Texture 12000 and Pixel 15000 in one embodiment. The packets include:

- a half-rate fragment packet 11902;
- a full-rate fragment packet 11904;
- a material cache miss packet 11906 (from MIJ, relayed by Fragment);
- a light cache mss packet 11908 (from MIJ, relayed by Fragment);
- texture packets, or texels, 12902;
- a pixel output packet 14902.

Each of these packets is now described.

5.11.5.1.1 Input Packets From Fragment

The Phong block 14000 receives packets 11902, 11904 from the Fragment block 11000 containing information that changes per-fragment that cannot be cached. Generally, a packet from the Fragment 11000 contains for one fragment:

- pointers to cached information related to lighting and material associated with the fragment;
- one or more color values;
- fragment geometry data (fragment normal and, optionally, tangent and binormal); and
- optionally, eye coordinates for the lighting equation.

In the illustrated embodiment the information from Fragment 11000 is provided as full rate and half rate packets 11904, 11902. Each full-rate packet 11904 includes a reduced set of fragment information that is used by Phong to perform a simplified lighting computation that can be performed at the full DSGP cycle rate in a "full performance mode". Each half rate packet 11902 includes a full set of fragment information that is used by Phong to perform a full lighting computation at the half cycle rate. This distinction between full and half rate information is not an essential feature of the present invention but is useful in hardware and software implementations where it would not be possible to perform the full lighting computation at the half cycle rate. In such an implementation this distinction conserves bandwidth required for communications between the Phong and Fragment units.

Specific embodiments of full and half rate Fragment packets are now described.

5.11.5.1.2 Full rate packet from Fragment

In the full-performance mode, an "infinite viewer" condition is assumed in which:

- the viewer's position is characterized by a direction that is implicit in the definition of the eye coordinate system,
- the lights are at infinity,
- only a single texture can be used, and
- the single texture is not a bump map.

In this case the only data that varies per fragment is the surface normal direction and the Gouraud colors produced by the geometry engine.

In one embodiment, to reduce bandwidth and input queue size per-stamp information is shared among all the pixels of a visible stamp portion. This allows Fragment 11000 to send only one full-rate packet 11904 per VSP that also applies to up to four fragments composing the VSP). In this case, Phong needs to be told how many fragments make up the stamp, but has no need to know the screen space coordinates of the fragment.

In view of these aspects of the full performance mode, among other parameters, the full-rate packet 11904 provides:

information applicable to the stamp as a whole:
 the number of fragments in a stamp whose information is provided in the full-rate packet;
 indices into the material and light caches 14001g, 14001h (FIG. 34) applicable to the fragments described by the full-rate packet;
information for each fragment in the stamp:
 the fragment's unit normal 14001d (FIG. 34); and
 the fragment's primary and secondary color.

One embodiment of a full-rate packet 11904 from Fragment is described in Table P1. This table lists for each data item in the packet:

item name;

bits per item;

number of item in packet;

bits per packet used for the item;

bytes per packet used for the item;

shared factor; and bytes per fragment used for the item.

A key subset of the parameters/data items recited in Table P1 are defined below, in the section of the document entitled "Phong Parameter Descriptions". This full-rate packet embodiment is merely exemplary and is not to be construed to limit the present invention.

At the bottom of the table is an estimate of the bandwidth required to transfer the full-rate packets (3,812.50 M bytes per second) shown in Table P1 assuming the DSGP processes 250.00 M fragments per second.

5.11.5.1.3 Half Rate Packet From Fragment

At half-rate the illustrated Phong embodiment can perform bump mapping and local viewer (i.e., variable eye position) operations. An additional difference over the full-rate operations is that the normal provided by the Fragment block for these operations is not required to be of unit magnitude.

As a result of these differences, in addition to the information provided in the full-rate packet 11904, the half-rate packet 11902 provides for each fragment in a stamp:

normal unit vector and associated magnitude 14001d (FIG. 34);

surface tangent unit vector and associated magnitude (part of bump basis 14001e, FIG. 34);

surface binormal unit vector and associate magnitude (part of bump basis 14001e, FIG. 34);

eye coordinates 14001f.

As with the full-rate embodiment described above, Fragment 11000 can send one half-rate packet 11902 per VSP that also applies to up to four fragments composing the VSP.

One embodiment of a half-rate packet 11902 from Fragment is described in Table P2. A key subset of the parameters/data items recited in Table P2 are defined below, in the section of the document entitled "Phong Parameter Descriptions". This half-rate packet embodiment is merely exemplary and is not to be construed to limit the present invention.

At the bottom of the table is an estimate of the bandwidth required to transfer the half-rate packets (5,718.75 M bytes per second) of Table P2 assuming the DSGP processes 250.00 M fragments per second.

TABLE P1

| data item | item name | bits/item | items/packet | bits/packet | bytes/packet | shared factor | bytes/fragment | notes |
|---|---|---|---|---|---|---|---|---|
| Header=?????? | sHead | 6 | 1 | 6 | 0.75 | 2 | 0.38 | |
| Num Fragments | nFrags | 2 | 1 | 2 | 0.25 | 2 | 0.13 | |
| Num Textures | nTxtra | 4 | 1 | 4 | 0.5 | 2 | 0.25 | |
| Material index | MTIX | 5 | 1 | 5 | 0.625 | 2 | 0.31 | |
| Light index | LDIX | 3 | 1 | 3 | 0.375 | 2 | 0.19 | |
| VSP Pointer | VSPptr | 8 | 1 | 8 | 1 | 2 | 0.50 | |
| Pre-fragment data: | | | | | | | | |
| normal unit vector | nx,ny,nz | 16 | 3 | 48 | 6 | 1 | 6.00 | Up to 4 fragments |
| Primary color | cPrim[R,G,B,A] | 8 | 4 | 32 | 4 | 1 | 4.00 | |
| Secondary color | cSec[R,G,B] | 8 | 3 | 24 | 3 | 1 | 3.00 | |
| | | | | 132 | 16.5 to 55.5 | | 14.75 250.00M 3,687.50M | Fragments/sec Bytes/second |

TABLE P2

| data item | item name | bits/item | items/packet | bits/packet | bytes/packet | shared factor | bytes/fragment | notes |
|---|---|---|---|---|---|---|---|---|
| Header=?????? | sHead | 6 | 1 | 6 | 0.75 | 2 | 0.38 | |
| NumFragments | nFrags | 2 | 1 | 2 | 0.25 | 2 | 0.13 | |
| NumTextures | nTxtrs | 4 | 1 | 4 | 0.5 | 2 | 0.25 | |

TABLE P2-continued

| data item | item name | bits/item | items/packet | bits/packet | bytes/packet | shared factor | bytes/fragment | notes |
|---|---|---|---|---|---|---|---|---|
| Material Index | MTIX | 5 | 1 | 5 | 0.625 | 2 | 0.31 | |
| Light Index | LDIX | 3 | 1 | 3 | 0.375 | 2 | 0.19 | |
| VSP Pointer | VSPptr | 8 | 1 | 8 | 1 | 2 | 0.50 | |
| Per-fragment data: | | | | | | | | Up to 4 fragments |
| normal unit vector | nx,ny,nz | 16 | 3 | 48 | 6 | 1 | 6.00 | |
| Primary color | cPrim[R,G,B,A] | 8 | 4 | 32 | 4 | 1 | 4.00 | |
| Secondary color | cSec[R,G,B] | 8 | 3 | 24 | 3 | 1 | 3.00 | |
| normal magnitude | mn | 24 | 1 | 24 | 3 | 1 | 3.00 | |
| surface tangent s unit vector | dxs,dys,dzs | 16 | 3 | 48 | 6 | 1 | 6.00 | |
| surface tangent t unit vector | dxt,dyt,dzt | 16 | 3 | 48 | 6 | 1 | 6.00 | |
| surface tangent s magnitude | ms | 24 | 1 | 24 | 3 | 1 | 3.00 | |
| surface tangent t magnitude | mt | 24 | 1 | 24 | 3 | 1 | 3.00 | |
| eye x,y,z | xe,ye,ze | 24 | 3 | 72 | 9 | 1 | 9.00 | |
| | | | 372 | | 46.5 to 175.5 | | 44.75 125.00M 5,593.75M | Fragments/sec Bytes/second |

5.11.5.1.4 Material Cache Miss Packet From Mode Injection

The Phong block 14000 includes a material cache 14150 (FIGS. 34, 35) that holds material information for one or more objects likely to be an active subject of the illumination computation. This information generally changes per object, thus, when the Phong/Bump computation is to be performed for a new object, it is unlikely that the material characteristics of the new object is resident in the material cache 14150.

In the illustrated embodiment Fragment 11000 provides the material index 14001$h$ (FIG. 34) that identifies the particular material information associated with the fragment to be illuminated. In one embodiment this material index is transmitted as part of the half- and full-rate fragment packets 11902, 11904. When the material index 14001$h$ does not correspond to information in the material cache 14150, Phong 14000 issues a cache miss message that causes Fragment 11000 to return a material cache miss packet 11906 from Mode Injection 10000. The material cache miss packet 11906 is used by Phong 14000 to fill in the material cache data for the new object.

Generally, the information provided in a material cache miss packet 11906 includes:

a unique material cache index 14001$h$;

texture information for each texel associated with the object described by the material cache miss packet describing how to use the texel, including:

texel format (how to unpack texel information);
texel mode and sub-modes (how to apply the texel information to the associated fragments);

fragment material information, including:

emissive, ambient, diffuse, specular and shininess characteristics for the object;

color mode information.

The format of one embodiment of a material cache miss packet 11906 is described in Table P3. The information shown for the illustrated data items is the same as for Tables P1 and P2, except for the lack of a "shared factor" heading. A key subset of the parameters/data items recited in Table P3 are defined below, in the section of the document entitled "Phong Parameter Descriptions". This material miss packet embodiment is merely exemplary and is not to be construed to limit the present invention.

At the bottom of the table is an estimate of the bandwidth required to transfer the illustrated material packets. Assuming that material data for 2 new objects are required in each tile, then the number of misses per second is:

7500 tiles per frame*75 frames per sec*2 misses per tile=1.125 Million misses per sec.

Assuming each material cache miss packet is 105.25 bytes, the total bandwidth required to transmit material cache miss packets is 118.41M bytes per second.

TABLE P3

| data item | item Name | bits/item | items/packet | bits/packet | bytes/packet | notes |
|---|---|---|---|---|---|---|
| Header=?????? | sHead | 6 | 1 | 6 | 0.75 | |
| packet length in 16 bits | packLength | 8 | 1 | 8 | 1.00 | |
| Material cache index | MCIX | 5 | 1 | 5 | 0.63 | |
| Texel Data Format | txtrTxlDatFmt | 4 | 8 | 32 | 4.00 | |
| Txtr GL Base Internal format | txtrGlBaseIntlFmt | 3 | 8 | 24 | 3.00 | |
| Txtr apply mode | txtrApplyMode | 3 | 8 | 24 | 3.00 | |
| Txtr front/back face flag | txtrFront | 2 | 8 | 16 | 2.00 | |
| Txtr Apply sub-mode | txtrSubMode | 3 | 8 | 24 | 3.00 | 1 |
| Txtr env mode | txtrEnvMode | 3 | 8 | 24 | 3.00 | |
| Txtr env color | txtrEnvColor | 32 | 8 | 256 | 32.00 | |
| Txtr env bias | txtEnvBias | 32 | 8 | 256 | 32.00 | |
| Txtr env sign bits | txtrEnvSigns | 3 | 8 | 24 | 3.00 | |
| Fragment front/back flag | fragFront | 1 | 1 | 1 | 0.13 | |
| Fragment Material . . . | | | | 0 | 0.00 | |

TABLE P3-continued

| data item | item Name | bits/item | items/packet | bits/packet | bytes/packet | notes |
|---|---|---|---|---|---|---|
| emmisive | fragMatEmiss | 8 | 3 | 24 | 3.00 | |
| ambient | fragMatAmb | 8 | 3 | 24 | 3.00 | |
| diffuse | fragMatDiff | 8 | 4 | 32 | 4.00 | |
| specular | fragMatSpec | 8 | 3 | 24 | 3.00 | |
| shininess | FragMatShin | 24 | 1 | 24 | 3.00 | |
| Shininess Cutoff | ShinCutoff | 8 | 1 | 8 | 1.00 | |
| ColorMaterial enable | cmEnable | 1 | 1 | 1 | 0.13 | 2 |
| ColorMaterial front/back flag | cmFront | 2 | 1 | 2 | 0.25 | |
| ColorMaterialMode | cmMode | 3 | 1 | 3 | 0.38 | |
| | | | | | 105.25 | |
| | | | | | 1.1250M | Miss rate per sec |
| | | | | | 118.41M | Bytes per second |

1: Of these bits, 3 are needed to indicate which light for light-texture case
2: Color material may be infrequently used, could be put an optional area of a variable length packet if bandwidth becomes an issue.

5.11.5.1.5 Light Cache Miss Packet From Mode Injection

The Phong block 14000 includes a light cache 14154 (FIGS. 34, 35) that holds light information for one or more lights used in the illumination computation. This information typically changes once per frame. Thus, in contrast to the material cache, light cache misses are unlikely. Accordingly, the bandwidth for light cache misses should be negligible.

In the illustrated embodiment Fragment 11000 provides a light index 14001g (FIG. 34) that identifies the particular light information to be used in the illumination computation associated with the fragment to be illuminated. In one embodiment this light index is transmitted as part of the half- and full-rate fragment packets 11902, 11904. When the light index 14001g does not correspond to information in the light cache 14154, Phong 14000 issues a message that causes Fragment 11000 to return a light cache miss packet 11908 from Mode Injection 10000 that is written into the light cache 14154.

Generally, the light cache miss packet includes:

information regarding the general lighting environment that is common to all lights:

global ambient color;

light index 14001g fog mode;and fog color, etc;

information for each light:

light diffuse color;

light ambient color;

light specular color;

attenuation;

spotlight direction, etc.

The format of one embodiment of a light cache miss packet 11908 is described in Table P4. The information shown for the illustrated data items is the same as for Tables P1 and P2, except for the lack of a "shared factor" heading. A key subset of the parameters/data items recited in Table P4 are defined below, in the section of the document entitled "Phong Parameter Descriptions". This light miss packet embodiment is merely exemplary and is not to be construed to limit the present invention.

TABLE P4

| data item | item name | bits/item | items/packet | bits/packet | bytes/packet | notes |
|---|---|---|---|---|---|---|
| Header=?????? | sHead | 6 | 1 | 6 | 0.75 | |
| packet length in 16 bits | packLength | 8 | 1 | 8 | 1.00 | |
| Light cache index | LCIX | 3 | 1 | 3 | 0.38 | |
| Global mode info . . . | | | | | | |
| Global Ambient Color | glAmb | 8 | 4 | 32 | 4.00 | |
| Fragment light enable | flEnable | 1 | 1 | 1 | 0.13 | |
| Local Viewer enable | lvEnable | 1 | 1 | 1 | 0.125 | |
| Fog Mode | fogMode | 2 | 1 | 2 | 0.25 | |
| Fog Parameter 1 | fogParm1 | 24 | 1 | 24 | 3 | |
| Fog Parameter 2 | fogParm2 | 24 | 1 | 24 | 3 | |
| Fog Color | fogColor | 8 | 3 | 24 | 3.00 | |
| ColorIndexMode | colorIndexMode | 1 | 1 | 1 | 0.13 | RGBA (RGBA mode), single float (color index mode) |
| Per-Light info . . . | | | | | | ?? color ALL lights in the packet? |
| Kc (constant atten.) | kAttenConst | 24 | 1 | 24 | 3 | 1 |
| Kl (linear atten.) | kAttenLin | 24 | 1 | 24 | 3 | 1 |
| Kq (quadratic atten.) | kAttenQuad | 24 | 1 | 24 | 3 | |
| Sc (spot cutoff) | spotCut | 16 | 1 | 16 | 2 | |

TABLE P4-continued

| data item | item name | bits/item | items/packet | bits/packet | bytes/packet | notes |
|---|---|---|---|---|---|---|
| Se (spot exponent) | spotExp | 24 | 1 | 24 | 3 | |
| Spotlight Direction | spotDir | 16 | 3 | 48 | 6 | Unit vector |
| Acl (light ambient color) | cLAmb | 8 | 3 | 24 | 3 | |
| Dcl (light diffuse color) | cLDiff | 8 | 3 | 24 | 3 | |
| Scl (light specular color) | cLSpec | 8 | 3 | 24 | 3 | |
| Distance Cutoff | distCut | 24 | 1 | 24 | 3 | |
| | | | | | 47.75 | |
| | | | | | 75 | Miss rate per sec |
| | | | | | 3581.25 | Bytes per se |

1: For infinite light, these two fields hold 48-bit halfangle vector.

5.11.5.1.6 Texture Packet

The Texture Block 12000 emits one texture packet (or texel) 12902 (corresponding to the texture data 12001a shown in FIG. 34) for each texture to be applied to a fragment. The texture packet 12902 can provide a variety of texture information in a variety of formats to accommodate many possible uses of texture. For example, a texture packet can provide RGBA color values, conventional texture data, Blinn bump map data or SGI bump map data. In different embodiments there is no limitation on the number of textures that can be applied to a fragment nor on the type of texture information passed using use of a texture packet and texture information contained therein.

In the illustrated embodiment Phong Processing does not proceed until all textures 12902 (between 0 and 8) for the fragment have been received. Only the actual texel is sent by Texture 12000; all information describing the usage of the texture is held in the material cache 14150 since this usage information changes on a per-object basis rather than a per-fragment basis.

The format of one embodiment of a texel 12902 is described in Table P5. In this embodiment all texels 12902 comprise 36 bits. These 36 bits can be organized according to many different texel data formats to accommodate the different uses of texture in the illustrated embodiment. In one embodiment there are eleven different texel data formats, which are described in Table P11. Among other things, different texel data formats can be associated with different texel data types (e.g., RGBA or RGB) and different data ranges for a given data type. This embodiment is merely exemplary and is not to be construed to limit the present invention.

The bandwith required to transmit the texels 12902 in one embodiment is shown at the bottom right of Table P5. The result (1.13 E+09 bytes per second) presumes that one texel 12902 is sent for each fragment and there are 2.5E+08 fragments sent in the DSGP per second.

TABLE P5

| data item | item name | bits/item | items/packet | bits/packet | bytes/packet | notes |
|---|---|---|---|---|---|---|
| Texel Data | Txl | 36 | 1 | 36 | 4.5 | 1 |
| | | | | | 4.5 | |
| | | | | | 2.50E+05 | Fragments/sec |
| | | | | | 1.13E+09 | Bytes/sec |

1. Interpretation of data depends on flags in material cache. (0–8 textures may be present.)

5.11.6 Output Packets To Pixel

At the completion of the lighting/bump mapping operation for a stamp the Phong Block 14000 sends a color output packet 14902 (corresponding to the data 14002, FIG. 34) to Pixel 15000 that includes, for each fragment in the stamp, the final fragment color and a VSP pointer that allows the color to be synchronized with other mode data that comes to Pixel via other data paths.

When Phong has applied a depth-texture to the stamp the Phong Block 14000 can also send to Pixel 15000 a depth output packet 14904 that includes the corresponding Z value and a VSP pointer that allows the new Z value to be synchronized with other mode data. In this case, Pixel 15000 must abort its normal Z calculation and simply use the passed-in Z value for all sub-pixels.

Embodiments of the output packets 14902 and 14904 are described in Tables P6 and P7, respectively. A key subset of the parameters/data items recited in Tables P6 and P7 are defined below, in the section of the document entitled "Phong Parameter Descriptions". Bandwidth estimates for these embodiments are shown at the lower right of each table. That is, assuming 4.625 bytes per color packet and 2.5E+08 fragments per second, the color packet 14902 requires 1.16 E+09 bytes per second. Similarly, assuming 3.625 bytes per color packet and 2.5E+08 fragments per second, the depth packet 14904 requires 9.06 E+08 bytes per second.

These color and depth packet embodiments are merely exemplary and are not to be construed to limit the present invention. For example, in alternative embodiments the depth and color information could be passed in the same packet.

TABLE P6

| data item | item name | bits/item | items/packet | bits/packet | bytes/packet | shared factor | bytes/frag | notes |
|---|---|---|---|---|---|---|---|---|
| Header=?? | sHead | 2 | 1 | 2 | 0.25 | 2 | 0.125 | |
| VSP Pointer | VSPPtr | 8 | 1 | 8 | 1 | 2 | 0.5 | |
| Per fragment data: | | | | | | | | |
| Fragment color | cFrag[R,G,B,A] | 8 | 4 | 32 | 4 | 1 | 4 | |
| | | | | | | | 4.625 | |
| | | | | | | | 2.50E+08 | Frags/sec |
| | | | | | | | 1.16E+09 | Bytes/sec |

TABLE P7

| data item | item name | bits/item | items/packet | bits/packet | bytes/packet | shared factor | bytes/frag | notes |
|---|---|---|---|---|---|---|---|---|
| Header=?? | sHead | 2 | 1 | 2 | 0.25 | 2 | 0.125 | |
| VSP Pointer | VSPPtr | 8 | 1 | 8 | 1 | 2 | 0.5 | |
| Depth from texture | ZFrag | 24 | 1 | 24 | 3 | 1 | 3 | |
| | | | | | | | 3.625 | |
| | | | | | | | 2.50E+08 | Frags/sec |
| | | | | | | | 9.06E+08 | Bytes/sec |

5.11.7 Input Queue

In one embodiment shown in FIG. 35, Phong 14000 includes an input queue 14158. The input queue 14158 has two sections: an area 14162 containing packets from Fragment 11000 and an area 14166 containing packets from Texture 12000. The Fragment portion 14162 of the input queue must cover the latency through Texture, currently estimated at 150 clocks (150 texels), as well as providing for differing latencies of data paths through Fragment, estimated at another 50 clocks. In one embodiment the Texture portion 14166 of the queue is the same size as the Fragment queue 14162 to avoid ever having stalls in Texture 11000.

In the DSGP of the present invention each extra texture requires an additional clock cycle to process. As a result, the worst case storage size in the queues 14162, 14166 is when a single texture is being used, since, in this case, one fragment per texel must be stored in the Fragment portion 14162 of the queue. Additionally, for the half-rate case significantly more information is stored per fragment that in the full-rate case.

Given all this, an estimate of the input queue size for the full-rate and half-rate cases is shown in Table P8.

TABLE P8

| | bytes | | bytes |
|---|---|---|---|
| Single-fragment full-rate VSP storage | 17 | Half-rate VSP | 47 |
| Single-texel texture storage | 5 | | 5 |

TABLE P8-continued

| | bytes | bytes |
|---|---|---|
| Bytes per entry | 22 | 52 |
| Number of entries | 200 | 200 |
| Total Size | 4400 | 10400 |

Note that the maximum number of bytes in the texture input queue for a single VSP is:

8 txls/pixel* 4 pixels/stamp* 5bytes/texe.=160 bytes

5.11.8 Caches

Phong maintains cache information of two types: Information that characterizes global rendering mode (the "light" cache 14154), and information characterizing an object (the "material" cache 14150). As mentioned above in the cache miss packet sections, the former is expected to change little during a frame for typical applications and the latter is expected to change on a per-object basis.

Comments on expected cache miss rates are found above with packet bandwidth estimates in the Light and Material Cache Miss Packet discussions.

5.11.8.1 Light Cache

Figure 1:
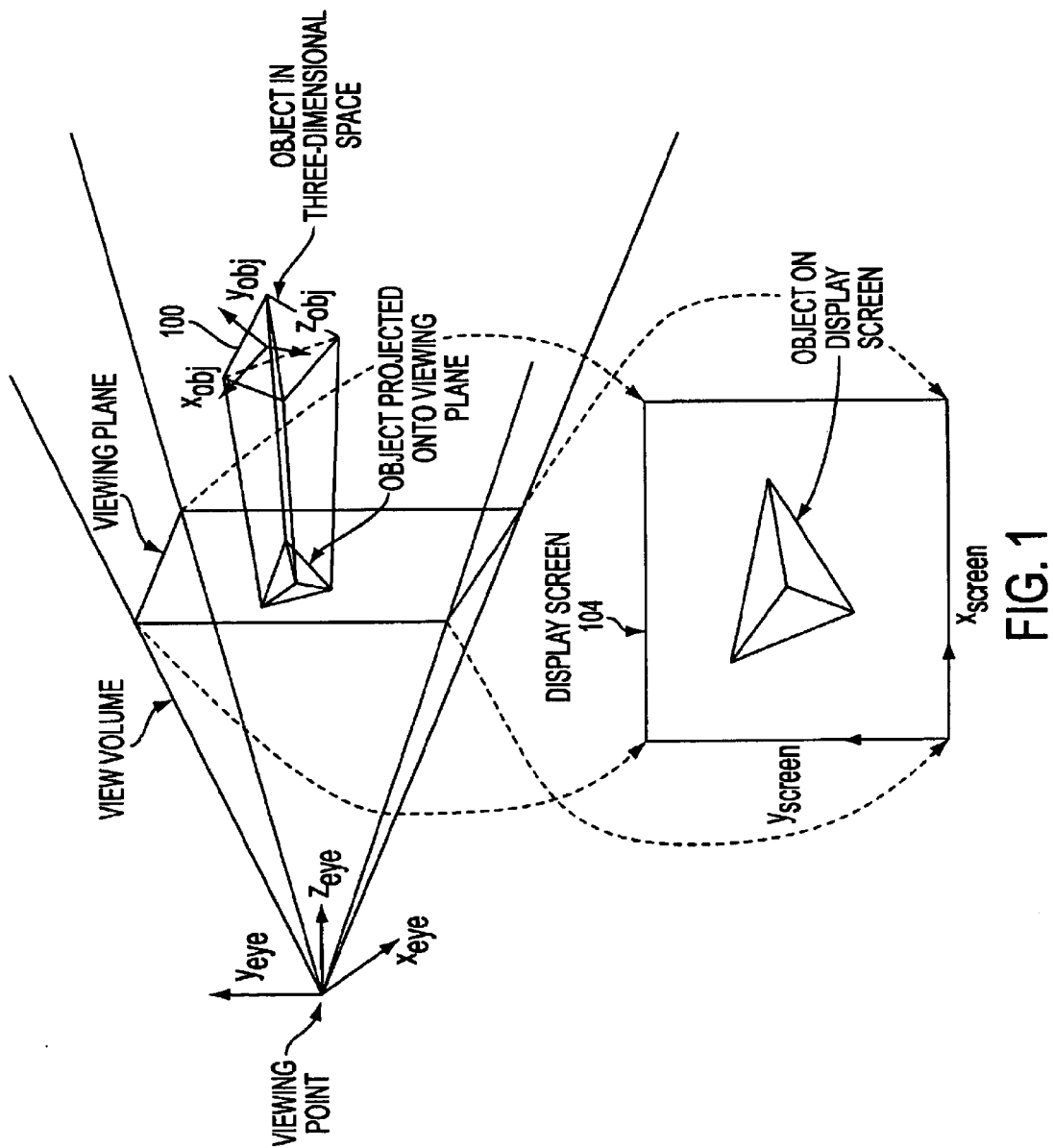
FIG. 1 is a diagrammatic illustration showing a tetrahedron, with its own coordinate axes, a viewing point's coordinate system, and screen coordinates.
Figure 2:
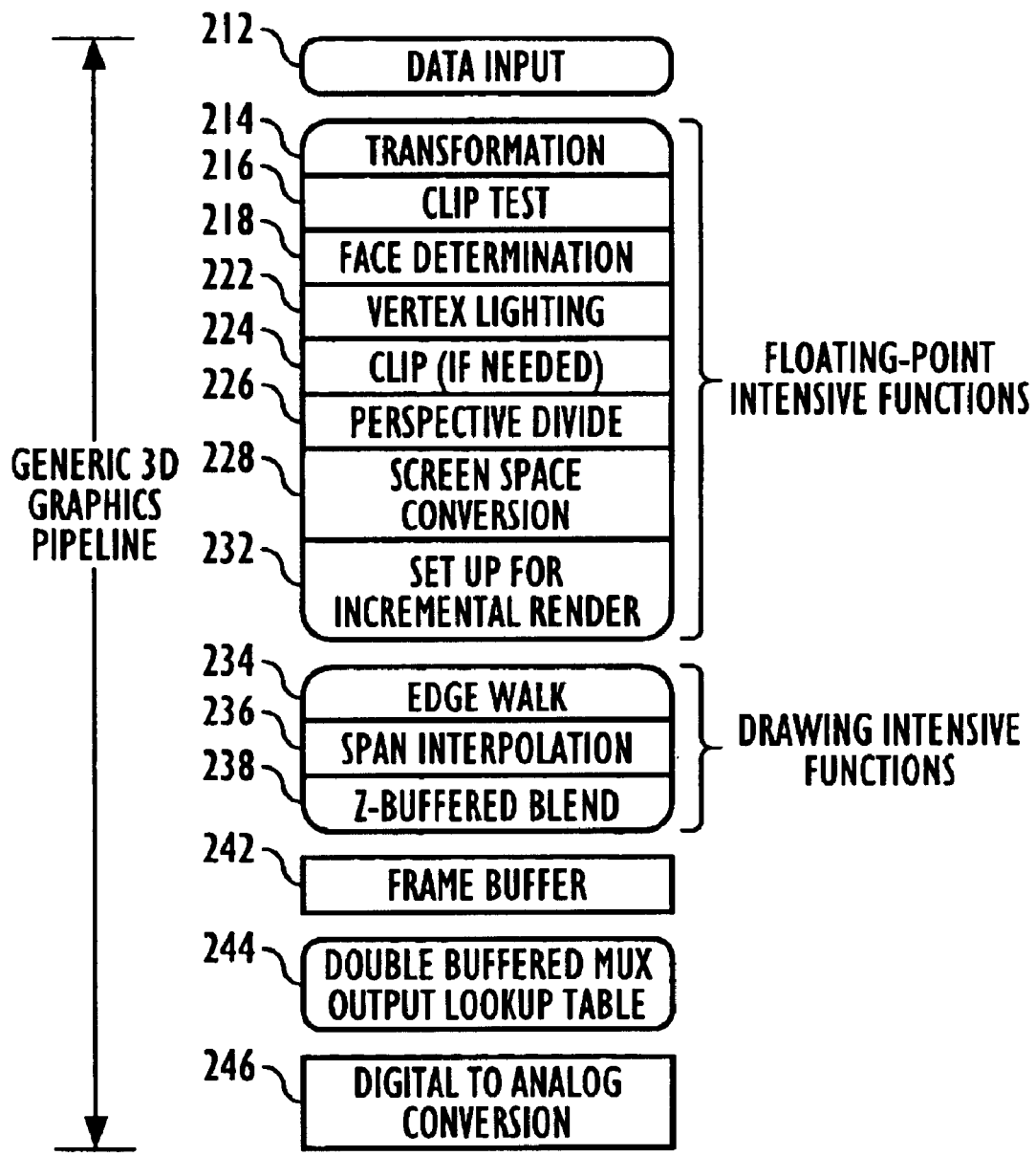
FIG. 2 is a diagrammatic illustration showing a conventional generic renderer for a 3D graphics pipeline.
Figure 3:
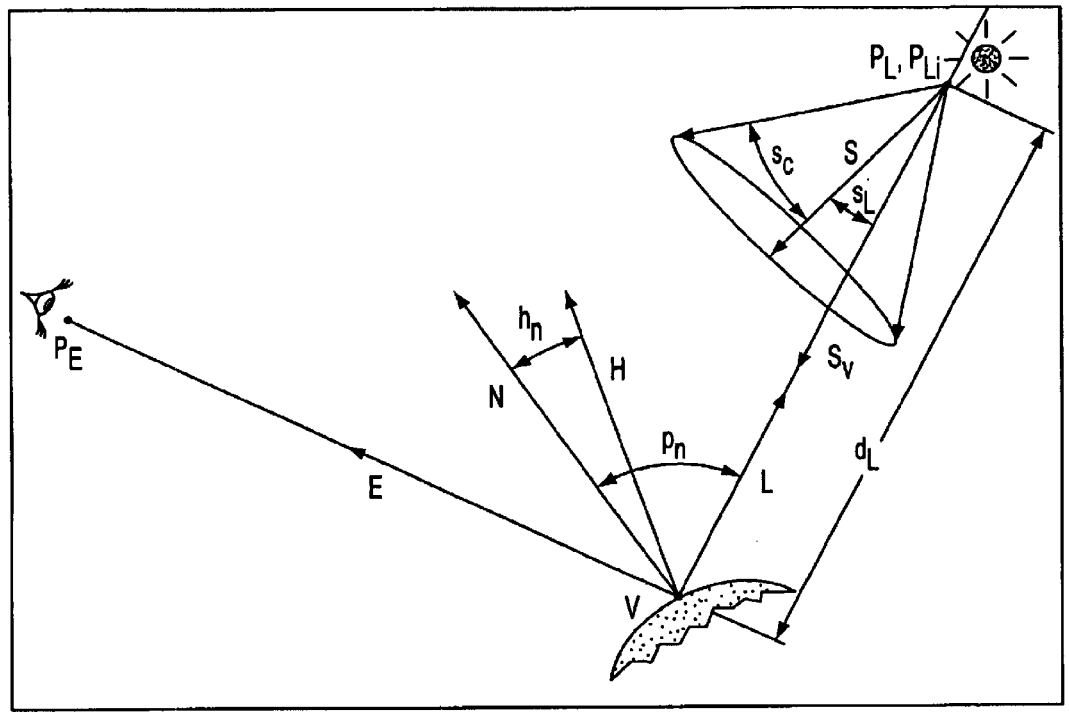
FIG. 3 is a diagrammatic illustration showing elements of a lighting computation performed in a 3D graphics system.
Figure 4:
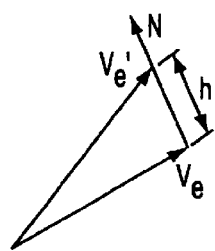
FIG. 4 is a diagrammatic illustration showing elements of a bump mapping computation performed in a 3D graphics system.
Figure 5A:
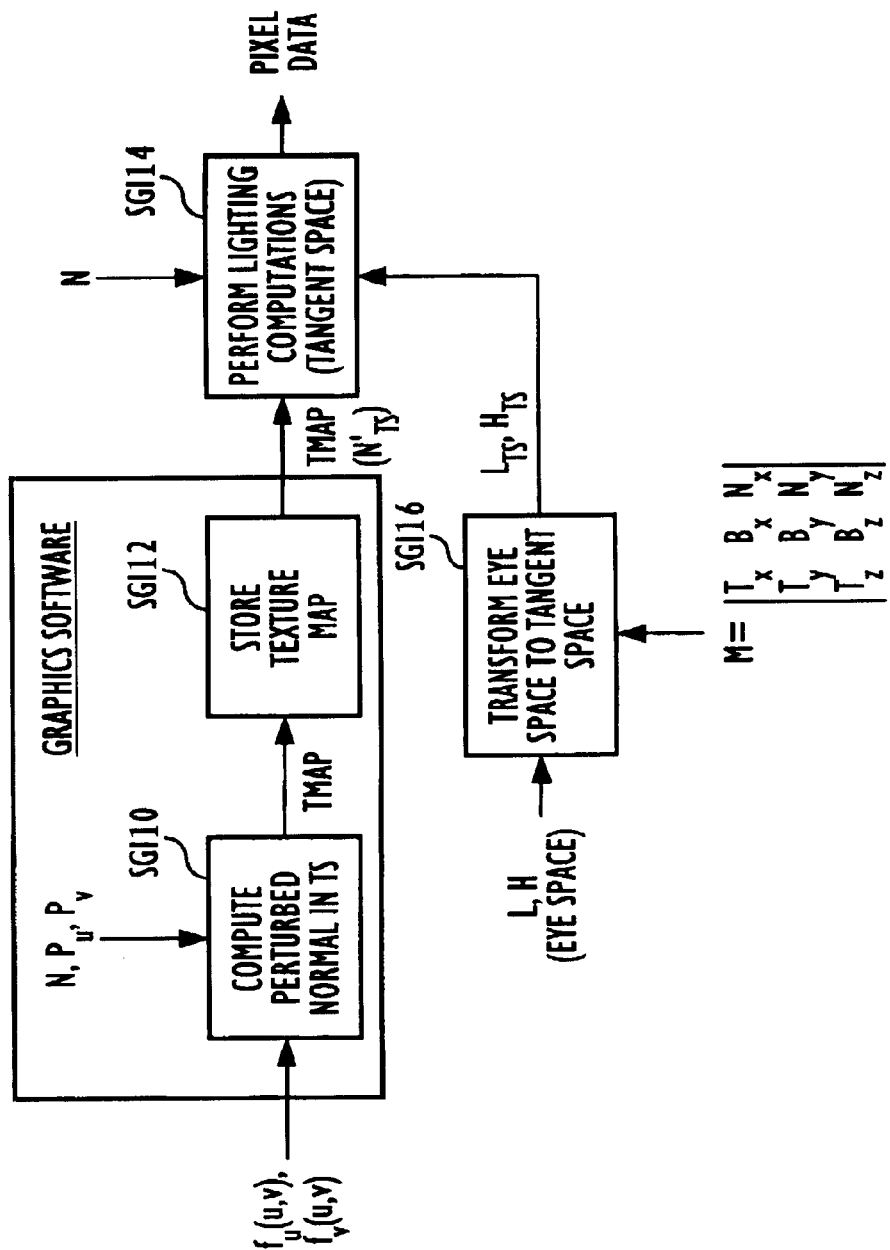
FIG. 5A is a diagrammatic illustration showing a functional flow diagram of portions of a 3D graphics pipeline that performs SGI bump mapping.
Figure 5B:
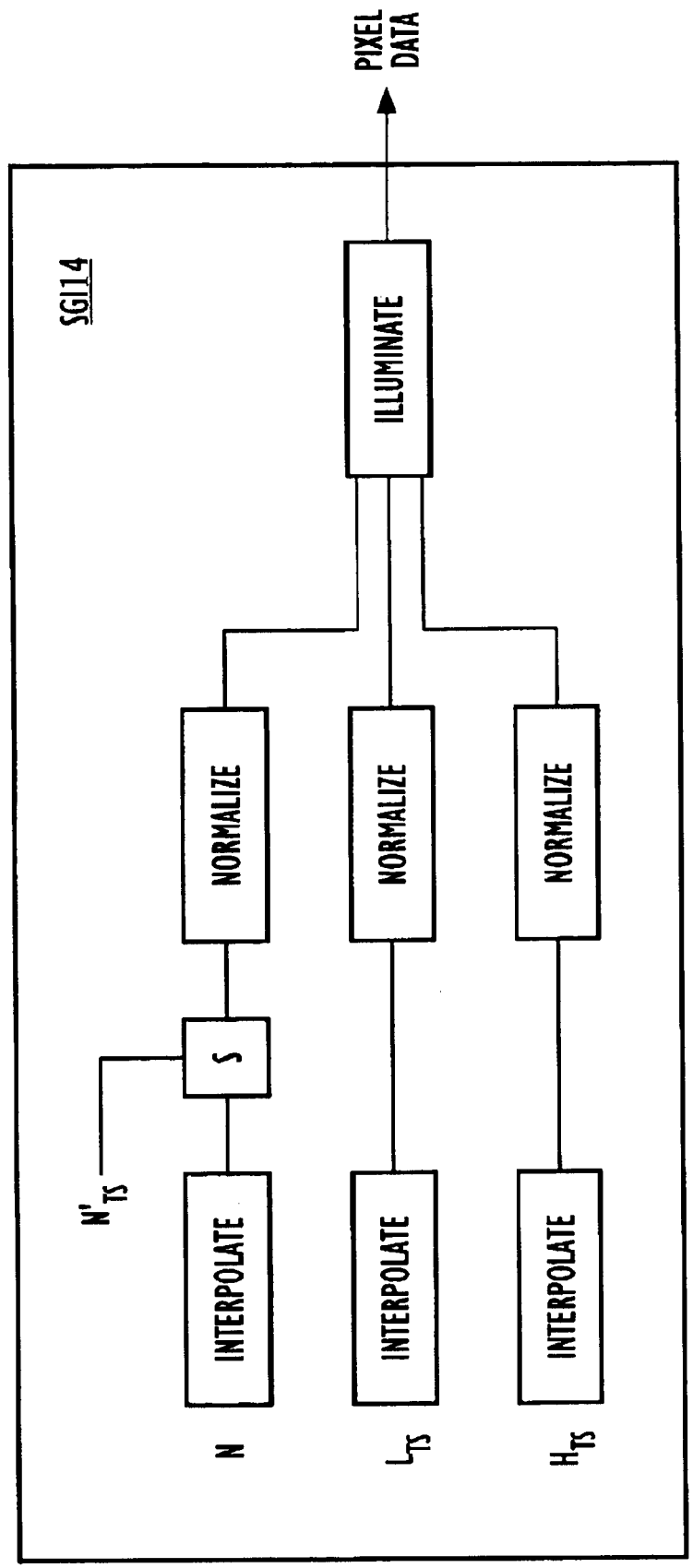
FIG. 5B is a diagrammatic illustration showing a functional block diagram of portions of a 3D graphics pipeline that performs Silicon Graphics Computer Systems.
Figure 6A:
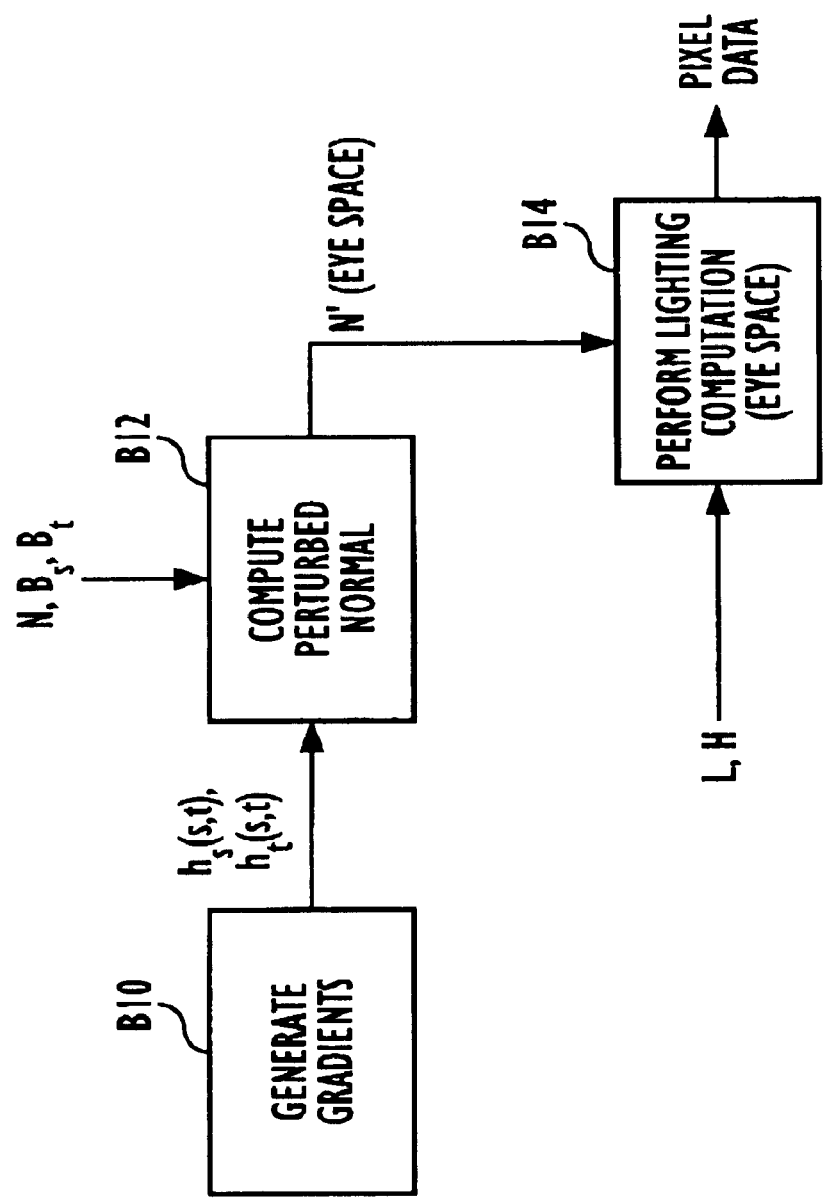
FIG. 6A is a diagrammatic illustration showing a functional flow diagram of a generic 3D graphics pipeline that performs "Blinn" bump mapping.
Figure 6B:
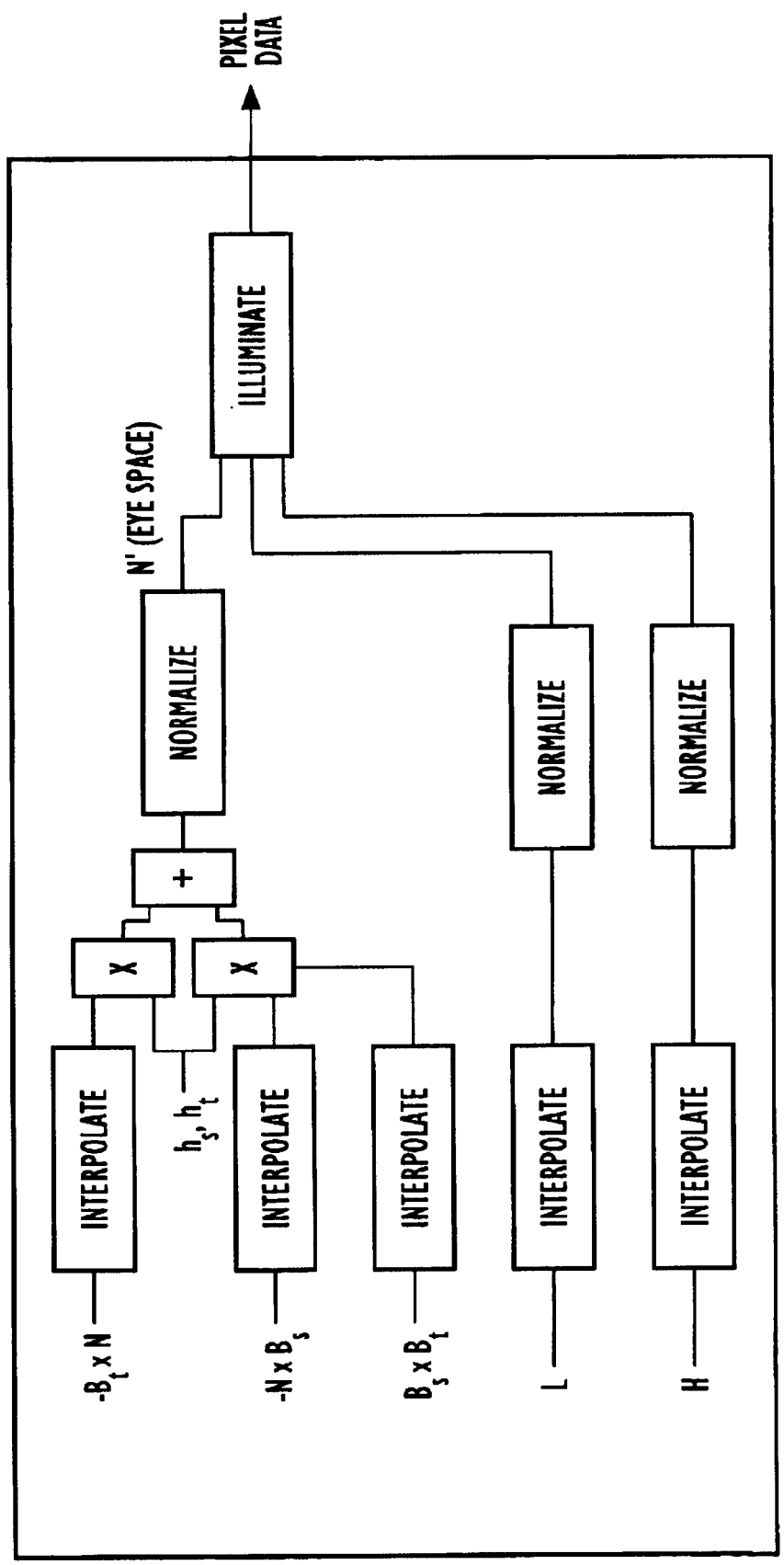
FIG. 6B is a diagrammatic illustration showing a functional block diagram of portions of a 3D graphics pipeline that performs Blinn bump mapping.
Figure 7:
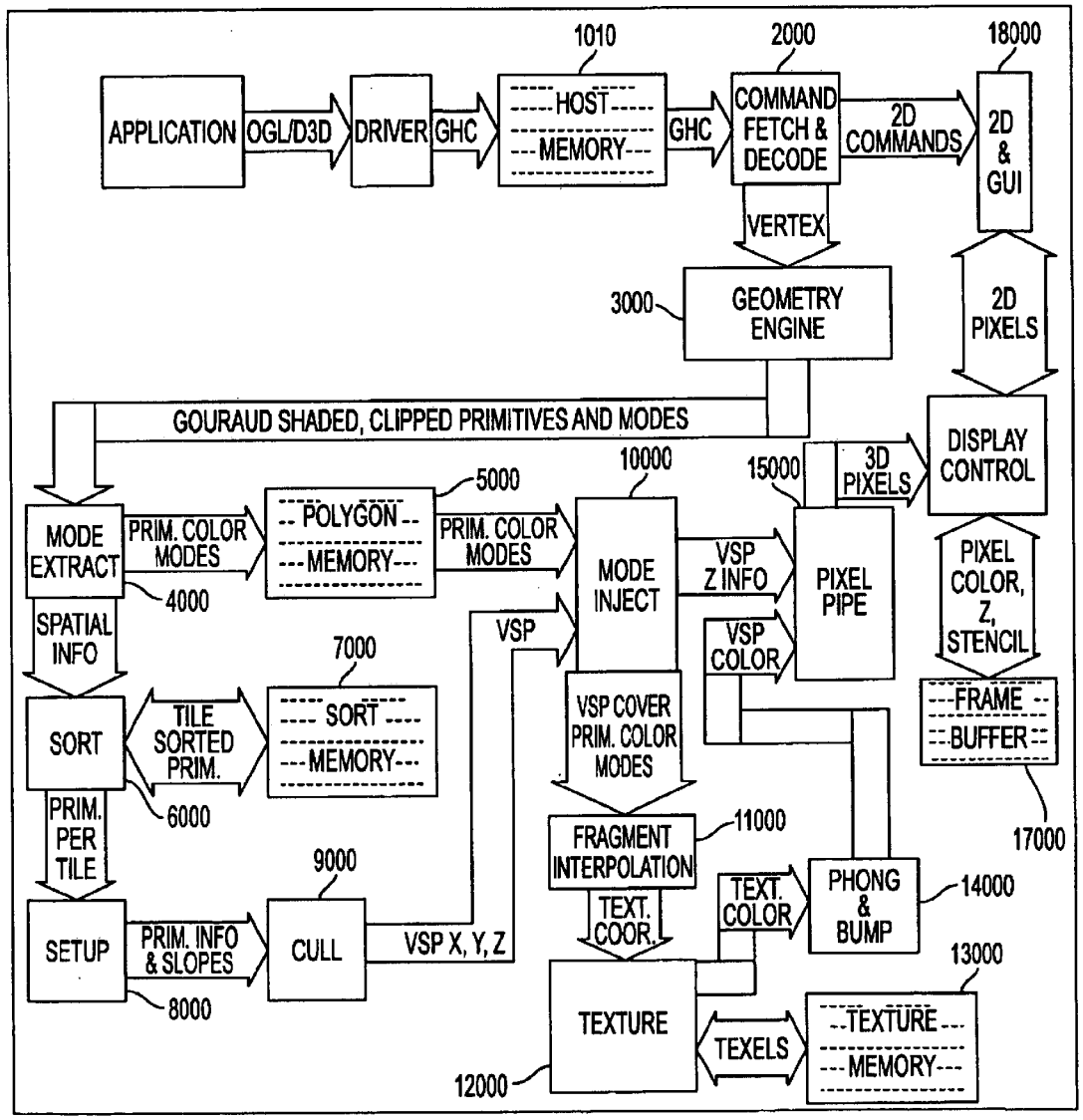
FIG. 7 is a diagrammatic illustration showing an embodiment of the inventive 3-Dimensional graphics pipeline, particularly showing the relationship of the Geometry Engine 3000 with other functional blocks and the Application executing on the host and the Host Memory.
Figure 8:
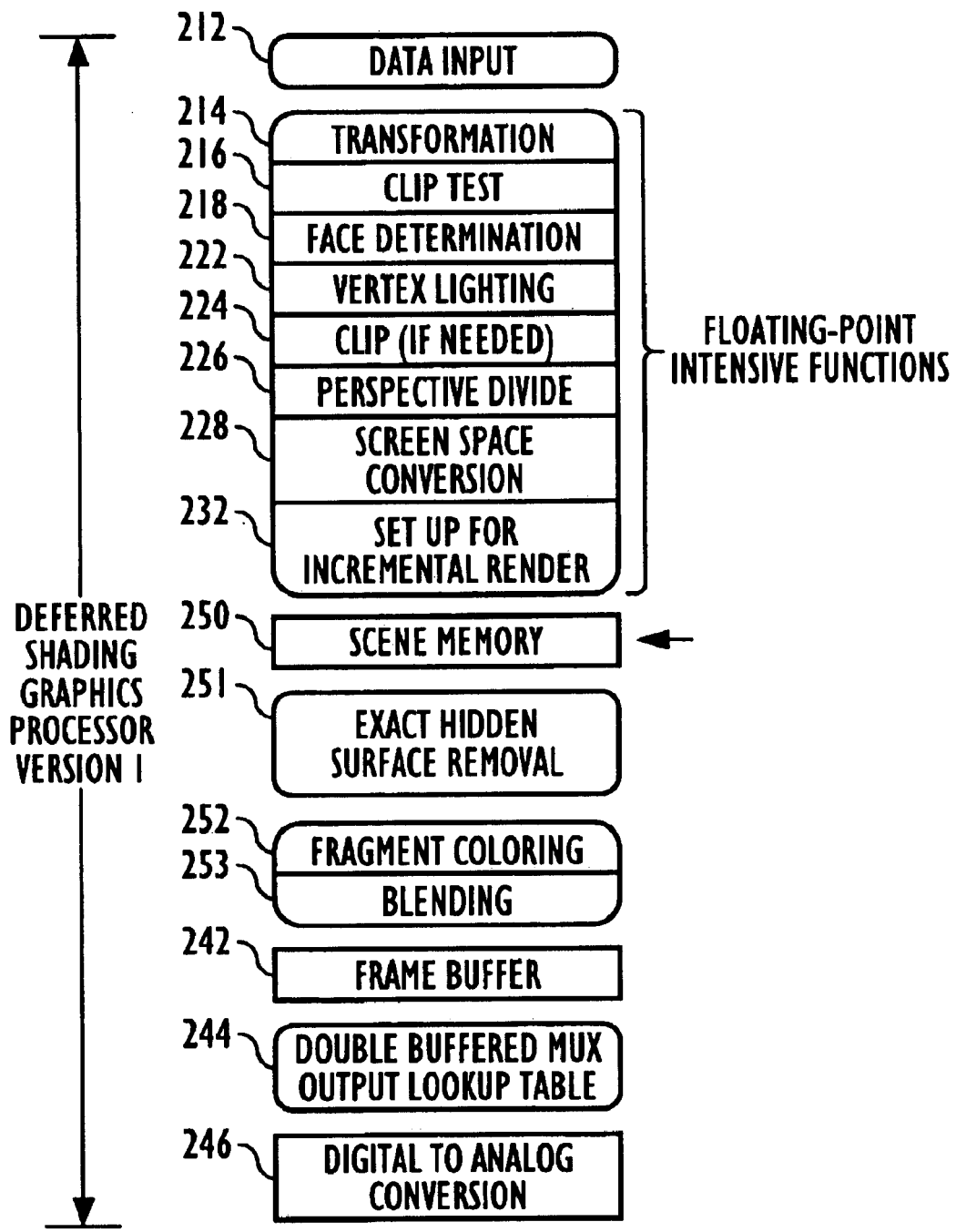
FIG. 8 is a diagrammatic illustration showing a first embodiment of the inventive 3-Dimensional Deferred Shading Graphics Pipeline (DSGP).

In the illustrated embodiment the light cache 14154 stores lighting information for all the active lights in the scene so there will not be a cache miss on every fragment. In one embodiment Phong allows 8 fragment lights, the additional lights being used only in the geometry engine. The information stored in the light cache 14154 for each of the 8 lights is shown in Table P9. In this embodiment the light cache 14154 holds the same information as the light cache miss packet described with reference to FIG. 4P.

TABLE P9

| data item | item name | bits/item | #items | total bits | total bytes | notes |
|---|---|---|---|---|---|---|
| Global Ambient Color | glAmb | 8 | 4 | 32 | 4.00 | |
| Fragment light enable | flEnable | 1 | 1 | 1 | 0.13 | |

TABLE P9-continued

| data item | item name | bits/item | #items | total bits | total bytes | notes |
|---|---|---|---|---|---|---|
| Local Viewer enable | lvEnable | 1 | 1 | 1 | 0.13 | |
| Fog Mode | fogMode | 2 | 1 | 2 | 0.25 | |
| Fog parameter 1 | fogParm1 | 24 | 1 | 24 | 3.00 | |
| Fog parameter 2 | fogParm2 | 24 | 1 | 24 | 3.00 | |
| Fog Color | fogColor | 8 | 3 | 24 | 3.00 | RGBA (RGBA mode), single float (color index mode) |
| ColorIndexMode | colorIndexMod | 1 | 1 | 1 | 0.13 | |
| | | | | | 13.63 | Sum of global state |
| Per-Light values . . . | | | | | | |
| Kc (constant atten.) | kAttenConst | 24 | 1 | 24 | 3.00 | |
| Kl (linear atten.) | kAttenLin | 24 | 1 | 24 | 3.00 | |
| Kq (quadratic atten.) | kAttenQuad | 24 | 1 | 24 | 3.00 | |
| Sc (spot cutoff) | spotCut | 16 | 1 | 16 | 2.00 | |
| Se (spot exponent) | spotExp | 24 | 1 | 24 | 3.00 | |
| Spot Direction | spotDir | 16 | 3 | 48 | 6.00 | Unit vector |
| Light Half-angle | H | 16 | 3 | 48 | 6.00 | Unit vector for infinite light/viewer |
| Acl (light ambient color) | cLAmb | 8 | 3 | 24 | 3.00 | |
| Dcl (light diffuse color) | cLDiff | 8 | 3 | 24 | 3.00 | |
| Scl (light specular color) | cLSpec | 8 | 3 | 24 | 3.00 | |
| Distance Cutoff | distCut | 24 | 1 | 24 | 3.00 | |
| | | | | | 38.00 | Sum of per-light state |
| | | | | | 64 | #per-light cache entries |
| | | | | | 2541 | Total storage |

5.11.8.2 Material Cache

The material cache 14150 can store material data for multiple objects. In one embodiment the material cache stores information for only one face (front or back) of a fragment. A front/back face flag stored for the fragment indicates whether the stored material data is for the fragment's front or back face. Mode Injection (MIJ) guarantees that the cache entry contains the correct values for the face of the fragment that is visible. The information stored in one embodiment of the material cache for each of 32 objects is shown in Table P10, which includes the same information as the material cache miss packet described with reference to Table P3.

TABLE P10

| data item | item Name | bits/item | #items | #bits | #bytes | notes |
|---|---|---|---|---|---|---|
| Txtr environment color | txtrEnvC | 32 | 8 | 256 | 32.00 | 8 texture, 4 color components |
| Texel Data Format | txtrTxlDataFmt | 4 | 8 | 32 | 4.00 | |
| Txtr GL Base Internal format | txtrGlBaseIntlFmt | 2 | 8 | 16 | 2.00 | |
| Txtr apply mode | txtrApplyMode | 3 | 8 | 24 | 3.00 | |
| Txtr front/back face flag | txtrFront | 2 | 8 | 16 | 2.00 | FRONT, BACK, or FRONT_AND_BACK |
| Txtr apply submode | txtrSubMode | 3 | 8 | 24 | 3.00 | 1 |
| Txtr envmode | txtrEnvMode | 3 | 8 | 24 | 3.00 | |
| Txtr envbias | txtrEnvBias | 32 | 8 | 256 | 32.00 | 8 textures, 4 color components |
| Txtr env sign bits | TxtrEnvSigns | 3 | 8 | 24 | 3.00 | |
| Fragment front/back flag | fragFront | 1 | 1 | 1 | 0.13 | |
| Fragment Material . . . | | | | 0 | 0.00 | |
| emmisive | fragMatEmiss | 8 | 3 | 24 | 3.00 | |
| ambient | fragMatAmb | 8 | 3 | 24 | 3.00 | |
| diffuse | fargMatDiff | 8 | 4 | 32 | 4.00 | |
| specular | fragMatSpec | 8 | 3 | 24 | 3.00 | |
| shininess | fargMatShin | 24 | 1 | 24 | 3.00 | |
| Shininess Cutoff | ShinCut | 8 | 1 | 8 | 1.00 | |
| ColorMaterial enable | cmEnable | 1 | 1 | 1 | 0.13 | |
| ColorMaterial front/back flag | cmFront | 2 | 1 | 2 | 0.25 | FRONT, BACK, or FRONT_AND_BACK |
| ColorMaterial Mode | cmMode | 3 | 1 | 3 | 0.38 | |
| | | | | 812 | 101.88 | |
| | | | | 32 | 32 | #cache entries |
| | | | | 25984 | 3260 | Total storage |

1: Of these bits, 3 are to select lights in light-texture ca

5.11.9 Phong Block Parameter Descriptions

The following are definitions of parameters employed by Phong 14000. These parameters are mentioned in the Tables accompanying the preceding Packet, Queue and Cache descriptions and are also used in the following pseudocode descriptions of Phong operations.

ColorMaterial enable: Enables replacement of the material value with the incoming Gouraud primary color ColorMaterial front/back flag: Tells whether replacement of the material value with the incoming Gouraud primary color should occur on the front or back face of the fragment.

ColorMaterial mode: Tells which material value is to be replaced with incoming Gouraud primary color.

Depth from texture: Z value, assumed to be in the same units used in the z-buffer, taken from a texel and replacing the z value used in depth compare operations.

Distance cutoff When the distance to a local light becomes too great, its lighting calculation is negligible and the rest of the lighting calculation can be avoided. This value, computed by the driver, is used for this cutoff.

Eye x,y,z: Position of the fragment in eye coordinates.

Fog Color In RGBA mode: an RGB value (A not affected) blended with fragment color if fog is enabled. In color index mode: A 24-bit float used in the color-index form of the fog equation.

Fog Mode, Fog Parameter 1, Fog Parameter 2: Parameters defining the fog calculation. If fog mode is linear, then parameter 1 is end/(end-start) and parameter 2 is 1/(end-start). If fog is exponential parameter 1 is the fog density, and parameter 2 is not used. If fog is exponential squared, parameter 1 is the fog density squared, and parameter 2 is not used.

Fragment ambient, Fragment emissive, Fragment diffuse, Fragment specular, Fragment shininess: Material properties of the incoming fragment, used in the lighting equation.

Fragment front/back flag: Tells if this fragment is from the front or the back of the triangle.

Fragment light enable: Boolean indicating whether the fragment-lighting mechanism is currently enabled by the application.

Fragment co/or Final result of the Phong calculation, R,G,B,A value to be sent to Pixel.

Global Ambient Co/or Constant color value applied uniformly to the scene.

Header Indicates packet type. Any other information needed to interpret the packet will be contained in a dedicated field.

Kc (constant atten.), Kl (linear atten.), Kq (quadratic atten.): Parameters defining attenuation term in light calculation. See GL spec.

Light ambient color, Light diffuse color, Light specular color Colors for a given light to be used in the different terms in the lighting computation. See GL spec.

Light cache Index: Index into cache holding per-light and global mode information.

Local Viewer enable: Boolean indicating whether the direction to the viewer position must be calculated rather than taken as constant.

Material cache Index: Index into cache holding per-object information.

Normal magnitude: Floating-point magnitude of the unit vector.

Normal unit vector 3 fixed-point components scaled to represent the direction of a normalized vector.

NumFragments: Tells the Phong Block how many fragments are included in this VSP. Needed to allow correlation of incoming textures with fragments.

Num Textures: Tells Phong how many texels per fragment to expect.

Packet Length: Used to facilitate pass-through for packets that are passed through Fragment from upstream.

Pixel Mask: Mask indicating which of the 4 pixels in the VSP are being colored.

Shininess Cutoff A value computed by the driver which allows us to avoid the exponentiation in the specular component:

Surface tangent s unit vector, Surface tangent t unit vector, Surface tangent s magnitude, Surface tangent t magnitude: Two vectors which, along with the normal, define the basis of a coordinate system which is used for perturbation of the normal vector.

Primary and Secondary Colors: If separate-specular-color is in effect, primary is the diffuse component from the Gouraud calculation and secondary is the specular component.

Otherwise, primary contains the sum of the diffuse and specular values and secondary contains zero.

Txtr apply mode: Tells how the texture should be interpreted: Conventional color, bump, texture-material, light-texture, or depth-texture.

Txtr apply sub-mode: Qualifies the texture apply mode when additional detail is required: tells which material component should be replaced by the texture value, which bump-mapping scheme is in effect, and which light-texture mode is used.

Txtr env mode: Tells how textures are to be combined with the incoming color value.

Txtr frontlback face flag: Does this texture apply to the front or back of the polygon?

Txtr GL base internal format: Tells how to apply the texture environment equations. Corresponds to the GL base-internal-format information.

Txtr Texel Data Format: Tells how data is to be unpacked from the 36-bit texel to form RGBA values for input to the texture environment.

Sc (spot cutoff), Se (spot exponent): Parameters defining attenuation due to spotlight geometry. See GL spec.

VSP Pointer Index into input buffer of Pixel Block where more mode info is stored.

5.11.10 Computation Pseudo-Code

The calculations performed in each of the above diagrammed subunits are described below using a pseudo-code approach to illustrate the control flow. Additional details of the processing performed in the Bump subunit follows these pseudo-code descriptions.

5.11.10.1 Texture Computation

The texture computation "gates" all the other computations since all the inputs to the lighting calculation may be modified by a texture value. If the texture subunit finds that there are no incoming textures it will forward a NULL indication to the other computational subunits which are blocked until the go-ahead is received from the texture subunit.

This discussion of texture processing clearly distinguishes between our internal data representation and the "base internal format" parameter defined by GL. The processing of a texel can be broken into 3 operations: unpacking, texture environment calculation and result routing. This processing is controlled by the following parameters (their allowed values are enumerated below), which are provided in the material cache 14150:

TexelDataFormat: This defines the data representation used by the 36-bit texel and specifies how it should be unpacked to form the 24-bit floats RGBA, but says nothing about how it is to be processed.

GIBaseInternalFormat: In the GL spec, this value defines both the number of components in the texture and the row in the table of texture environment equations used to process the texel. Note that although a given value of GIBaseInternalFormat may only make sense with certain values of TexelDataFormat, they are nevertheless distinct parameters.

GITexEnvMode: This comes from the GL spec and is used to select the column in the table of texture environment functions.

TexApplyMode: This is a Raycer-defined value that determines which functional unit the output of the texture environment is destined for.

TexApplySubMode: This is a Raycer-defined value that determines exactly how the texture is to be used within the functional unit selected by TexApplyMode.

Figure 42:
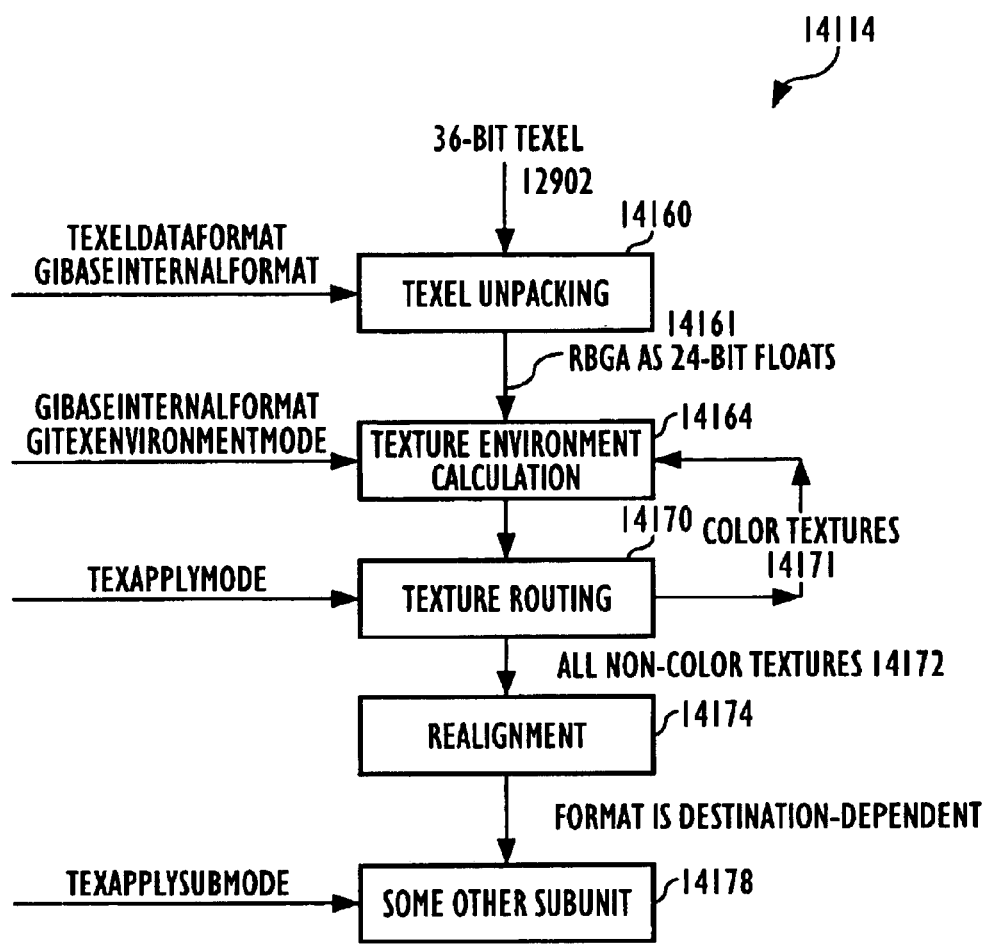
FIG. 42 is a diagrammatic illustration showing the a function flow diagram of processing performed by the Texture Computation block 14114 of FIG. 41.

FIG. 42 is a high level flow diagram that shows the processing flow of the texture computation 14114, which includes: texel unpacking 14160, texture environment calculation 14164, texture routing 14170, realignment 14174 and other subunits 14178. These steps interact with other Phong blocks, including the texture environment calculation 14142 and other sub-units 14178 (e.g., material selection 14126, bump 14130 or light texture 14134.

Based on the TexelDataFormat and the GIBaseInternalFormat the texel unpacking operation 14160 unpacks a 36-bit Texel 12902 to a set of 24-bit, floating point RGBA values 14161. Based on the GIBaseInternalFormat and the GITexEnvironmentMode the texture environment calculation 14142 then specifies the manner in which the input color (the RGBA value 14161) is blended with the "current color" 14171 from the texture routing step 14166. Based on the value of the TexApplyMode the texture routing step 14170 determines to which Phong computation the incoming texel should be routed. In particular, texture routing 14166 passes color textures directly to the texture environment calculation step 14164 and passes non-color textures to the realignment step (14174), which realigns this data and finishes routing the realigned texture data to other subunits 14178. For example, realignment 14174 passes bump textures to the bump subunit, material textures to the material computation unit and depth textures to the light-texture unit 14134.

The allowed data ranges in one embodiment are now described for the texture definition parameters (TexelDataFormat, GIBaseInternalFormat, TexApplyMode, TexApplySubMode). These data ranges are exemplary and are not to be construed to limit the present invention.
5.11.10.1.1 Allowed Ranges For Texture Definition Parameters TexelDataFormat Values In the illustrated embodiment a texel 12902 (FIG. 42) is a 36-bit word whose format is defined as follows:

TDF_nv_nd_s_dp where:
nv=Number of data values in the word;
nd=number of bits per value;
s=signed or unsigned;
dp=position of decimal point.

In the illustrated embodiment signed values have a sign-magnitude format rather than two's compliment. When texels are unpacked all 4 RGBA values are generated. In the unpacking operation 14160 values not found in the texel 12902 are filled with zeroes as indicated by the "Unpack To" column in the following table (Table P11), which describes eleven different TexelDataFormats used in one embodiment. Each format is characterized by the number of values it holds, number of bits per value, data range of each value and the information available after unpacking. For example, a texel in the format TDF_2_16_u_0 can be unpacked to two values: R (the first 16 bits of the texel) and A (the second 16 bits). Note that these formats are exemplary and are not be construed to limit the present invention, which can accommodate any number of texel formats.

TABLE P11

| TexelDataFormat | # values | #bits/ value | Range | Unpack To | Notes |
|---|---|---|---|---|---|
| TDF_4_8_u_0 | 4 | 8 | 0–1.0 | RGBA | |
| TDF_3_8_u_0 | 3 | 8 | 0–1.0 | RGB0 | |
| TDF_3_12_s_0 | 3 | 12 | –1.0–+1.0 | RGB0 | |
| TDF_2_16_u_0 | 2 | 16 | 0–1.0 | R00A | |
| TDF_2_16_s_0 | 2 | 16 | –1.0–+1.0 | R00A | |
| TDF_1_8_u_0 | 1 | 8 | 0–1.0 | R000 or 000A | 1) |
| TDF_1_12_s_0 | 1 | 12 | –1.0–+1.0 | R000 or 000A | |
| TDF_1_16_u_0 | 1 | 16 | 0–1.0 | R000 or 000A | |
| TDF_1_16_s_0 | 1 | 16 | –1.0–+1.0 | R000 or 000A | |
| TDF_1_16_u_9 | 1 | 16 | 0–128.0 | R000 or 000A | |
| TDF_1_24_u_0 | 1 | 24 | 0–1.0 | R000 or 000A | 2) |

Note 1) For texels containing a single value, the unpacked value should be routed to A (alpha) if the BiBaseInternalFormat is "Alpha", otherwise it is routed to R.
Note 2) When GITexEnvMode is REPLACE, the 24 bits must go through untouched, because Pixel will require a true depth value exactly as defined by the texel.

GIBaseInternalFormat Values

The illustrated embodiment supports six different types of color data: Alpha, Luminance, Luminance-Alpha, Intentisty, RGB and RGBA. Each of these different data types is assigned a unique GIBaseInternalFormatValue and is associated with a unique row of the texture environment table:

| Value | Associated row |
|---|---|
| A (Alpha) | Use row 0 of texture environment table |
| L (Luminance) | Use row 1 of texture environment table |
| LA (Luminance-Alpha) | Use row 2 of texture environment table |
| I (Intensity) | Use row 3 of texture environment table |
| RGB | Use row 4 of texture environment table |
| RGBA | Use row 5 of texture environment table |

Other embodiments may may support more or less GIBaseInternalFormats. The texture environment table is described below.

GITexEnvMode Values

The illustrated embodiment of the texture environment calculation 14164 supports five different color combining operations on the current and new colors 14171, 14161: Replace current with new, Modulate current with new, Decal, Blend current and new, and Add current and new. Each of these different operations is assigned a unique GITexEnvModeValue and is associated with a unique column of the texture environment table:

| Value | Associated column |
|---|---|
| REPLACE | Use column 0 of texture environment table |
| MODULATE | Use column 1 of texture environment table |
| DECAL | Use column 2 of texture environment table |
| BLEND | Use column 3 of texture environment table |
| ADD | Use column 4 of texture environment table |

Other embodiments may may support more or less GIBaseInternalFormats. The texture environment table is described below.

TexApplyMode Values

The illustrated embodiment supports five types of texture: Color, Bump map data, Material data, Light information and Depth information. The TexApplyMode is set to one of these values in accordance with the type of texture information in the input texel 12902. The texture routing module 14170 routes the information from the texel after unpacking 14160 to an appropriate subunit depending on the value of this parameter. The different TexApplyMode values and the associated routings are as follows:

| | |
|---|---|
| COLOR | Use output to replace fragment color as input to the texture environment calculation 14164 |
| BUMP | Route to Bump subunit 14130, reset fragment color to Gouraud primary color |
| MATERIAL | Route to Material subunit 14126, reset fragment color to Gouraud primary color |
| LIGHT | Route to Light subunit 14138, reset fragment color to Gouraud primary color |
| DEPTH | Route to Pixel Block, reset fragment color to Gouraud primary color |

TexApplySubMode Values

The enumerated values of the TexApplySubMode indicate the specific subtypes of a texel whose general type is provided by the TexApplyMode. Thus, the set of enumerated values of the TexApplySubMode parameter depends on the value of the TexApplySubMode parameter. These enumerated values are now described for the different texel types.

When TexApplyMode=BUMP, the following submodes apply:

| | |
|---|---|
| SGI BUMP | RGB values used as normal vector. |
| BLINN BUMP | RA values used as perturbation to normal vector. |

When TexApplyMode=MATERIAL the following submodes specify which material component to replace:
EMISSION
AMBIENT
DIFFUSE
SPECULAR
AMBIENT_AND_DIFFUSE
SHININESS When TexApplyMode=LIGHT the following submodes apply:

| | |
|---|---|
| AMBIENT | Replace light ambient value. |
| DIFFUSE | Replace light diffuse value. |
| SPECULAR | Replace light specular value. |
| ATTENUATION_SGIX | Replace light attenuation value |
| SHADOW_ATTENUATION | Us as additional shadow-attenuation value. |

Additional background information is available in the following materials, which are incorporated herein by reference:

GL 1.1 spec Section 3.8,
SGIS_multitexture,
SGIX_light_texture,
SGIX_fragment_lighting,
separate_specular_color,
SGIX_texture_add_env.

These materials describe extensions to the Open GL specification needed to support SGI bump mapping.

Texture Calculation Pseudo-Code

The following is a pseudo-code description of the one embodiment of texture processing written using C lanuage conventions well known to programmers and engineers and others skilled in the art of computer programming, generally, and computer graphics programming and processor design, specifically. This embodiment is exemplary and is not to be construed to limit the scope of the invention.

```
if(there are no incoming textures) {
    Forward Null colors to all non-color texture destinations.
    Combine primary and secondary colors and forward to
    the Light-Environment computation.
    Done.
}
Set current-color to primary color
("current-color" is the input to the texture environment.)
for(each incoming texture) {
    if(this is a 24-bit depth-texture and the texture environment
        mode is "replace") {
        forward the data to the Pixel Block with no changes.
        with next texture.
    }else{
        Apply TEXTURE ENVIRONMENT EQUATION to generate
        new current-color (see below) .
        if(this is a fragment-color texture) {
            Retain result as current texture-input-color.
        }else{
            if(this is a bump-texture) {
                Forward the current-color to the bump unit.
                Reset current-color to the original primary color.
            }else if(this is a material-texture) {
                Forward the current-color to the apply-texture-
                material unit.
                Reset current-color to the original primary color.
            }else if(this is a light-texture) {
                Forward the current-color to the apply-texture-
                light unit.
                Reset current-color to the original primary color.
            }else if(this is a depth-texture) {
                Forward the current-color to fragment-lighting
                computation.
                Reset current-color to the original primary color.
            }
        }
    }
}
Add in secondary color.
Forward current texture-input color to light-environment computation.
Done.
```

The following table provides sources and comments for a number of the inputs mentioned in the previous pseudo-code description:

| INPUT | SOURCE | COMMENTS |
|---|---|---|
| Cfs, Afs color | Input packet | Fragment(Gouraud) secondary color |
| Cfp, Afp color | Input packet | Fragment(Gouraud) primary color |
| Cc, Ac, Cb, Ab | Matrl cache | Texture env color from TexEnv and bias |
| Ct, $At | Input packet | Incoming texture color and alpha |
| Txtr internal format | Matrl cache | |
| Txtr apply mode | Matrl cache | For new texture types |
| Txtr Front/back face bit | Matrl cache | |
| Txtr apply submod | Matrl cache | |
| Txtr env. mode | Matrl cache | |

5.11.10.1.2 Texture Environment Equation.

The Texture Environment Equation specifies the manner in which the input color is blended with the "current color" as defined in the pseudocode above. This Equation can be used to perform a wide range of blending operations (e.g., Replace, Modulate, Decal, Blend, Add, etc.) using as inputs a wide variety of color data types (e.g, Alpha (A), Luminance (L), Luminance-Alpha, Intensity (I), RGB (C), RGBA, Luminance, etc.). The wide range of possible equations is efficiently represented in the present invention as cells within a two-dimensional Texture Environment table (Table P12) whose rows correspond to different color data types and whose columns correspond to different color blending operations. These equations use several subscripts (f, t, c, b) in conjunction with the color data type abbreviations. The subscript "f" refers to the current (fragment) color, "t" refers to the texture color, "c" refers to the texture environment color, and "b" refers to "bias", a constant offset to the texture value derived from the GL extension SGIX_texture_add_env. Also used in these equations are values S0, S1, and S2, which are signs, +/−1, that allow for subtraction as well as addition of textures. Note that the luminance (L) and intensity (I) values actually come from the "R" component of the texel.

5.11.11 Material Computation

Figure 41:
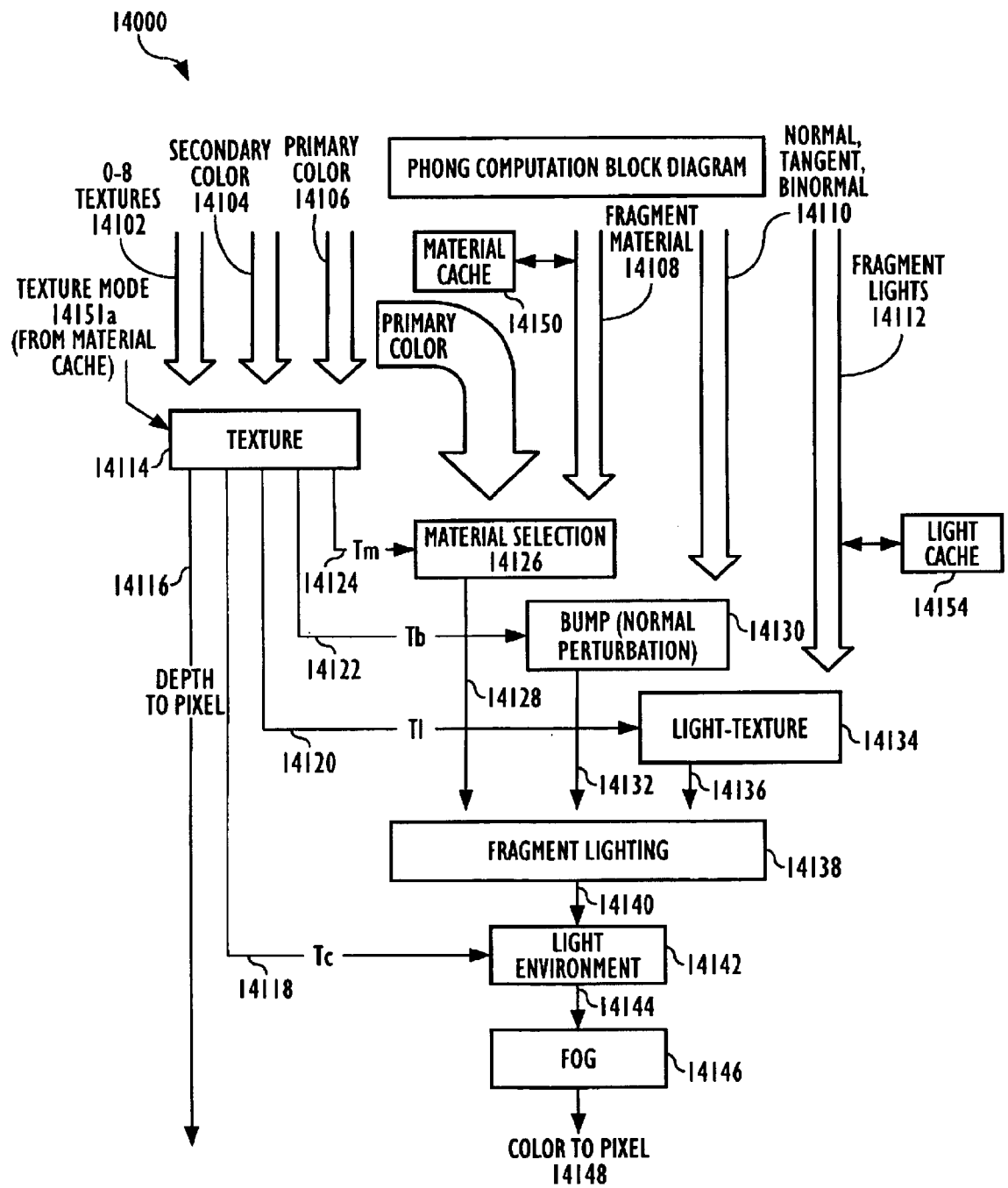
FIG. 41 is a diagrammatic illustration showing a block diagram of Phong comprising several sub-units.

Referring to FIG. 41, Material Computation 14126 replaces a material property of a fragment with a new value provided as a texture-material value 14124 (i.e., as a texel) or as a fragment-color-material value 14108 (i.e., as part of a fragment packet). In the illustrated embodiment, consistent with SGI extensions to the GL specification, the fragment-color-material takes precedence over the texture-material. If neither a texture-material or fragment-color-material is provided, material computation 14126 displays the fragment with the material values from the material cache entry identified by the fragment's material cache pointer. The material computation 14126 includes a number of sub-computations.

If a texture-material value 14124 has been forwarded, the first sub-computation compares the fragment's front/back flag to the front/back face attribute of the texture-material 14124 and, if there is a match, proceeds to replace the material property identified by the txtrApplySubMode parameter (either EMISSION, AMBIENT, DIFFUSE, SPECULAR, or AMBIENT_AND_DIFFUSE) with the texture-material value.

The second sub-computation determines whether fragment-color-material operation is enabled. If so, and there is a match between the fragment's front/back flag and the front/back face attribute of the fragment-color-material, this sub-computation replaces a material property of the fragment identified by the txtrApplySubMode parameter with the Gouraud primary color. Additional background information is available in the following materials, which are incorporated herein by reference:

GL 1.1 spec Section 3.8,
SGIX_light_texture,
SGIX_fragment_lighting.

These materials describe extensions to the Open GL specification needed to support SGI bump mapping.

The following is a pseudo-code description of one embodiment of the texture processing written using C lanuage conventions well known to programmers and engineers and others skilled in the art of computer programming,

TABLE P12

| Texture Map Base | Texture Function | | | | |
|---|---|---|---|---|---|
| Internal Format | RE-PLACE | MODU-LATE | DECAL | BLEND CC | ADD (Cc Ac), (Cb Ab) |
| ALPHA At | C = Cf A = At | C = Cf A = Af At | undefined | C = Cf A = Af At | C = Cf A = Af At |
| LUMI-NANCE Lt | C = Lt A = Af | C = Cf Lt A = Af | | C = Cf (1 − Lt) + Cc Lt A = Af | C = S0 Cf + S1 Lt Cc + S2 Cb A = Af |
| LUMI-NANCE_ALPHA Lt, At | C = Lt A = At | C = Cf Lt A = Af At | | C = Cf (1 − Lt) + Cc Lt A = Af At | C = S0 Cf + S1 Lt Cc + S2 Cb A = Af At |
| INTENSITY It | C = It A = It | C = Cf It A = Af It | | C = Cf (1 − It) + Cc It A = Af (1 − It) + Ac It | C = S0 Cf + S1 It Cc + S2 Cb A = S0 Af + S1 It Ac + S2 Ab |
| RGB Ct | C = Ct A = Af | C = Cf Ct A = Af | C = Ct A = Af | C = Cf (1 − Ct) + Cc Ct A = Af | C = S0 Cf + S1 Ct Cc + S2 Cb A = Af |
| RGBA Ct, At | C = Ct A = At | C = Cf Ct A = Af At | C = Cf (1 − At) + Ct At A = Af | C = Cf (1 − Ct) + Cc Ct A = Af At | C = S0 Df + S1 Ct Cc + S2 Cb A = Af At | generally, and computer graphics programming and processor design, specifically. This description is exemplary and is not to be construed to limit the present invention.

```
if(a texture-material value has been forwarded) {
    if(the front/back face attribute of the texture matches that of
the
    current fragment{
        switch (txtrApplySubMode) {
        case EMISSION:
            replace material EMISSION property
        case AMBIENT:
            replace material AMBIENT property
        case DIFFUSE:
            replace material DIFFUSE property
        case SPECULAR:
            replace material SPECULAR property
        case AMBIENT_AND_DIFFUSE:
            replace material AMBIENT and DIFFUSE properties
        case SHININESS:
            replace the shininess attribute with the the 16-bit
            texel value interpreted in the range 0–128.
        }
    }
}
if(fragment-color-material is enabled) {
    (Note that SGIX_light_texture specifies that fragment-
    color-material takes precedence over texture-material,
    hence the ordering of these two operations.)
    if(the front/back face attribute FragmentColorMaterialSGIX
matches
    that of the current fragment{
        Replace a material property with the Gouraud primary color as
follows:
        switch (colorMaterialMode) {
        case EMISSION:
            replace material EMISSION property
        case AMBIENT:
            replace material AMBIENT property
        case DIFFUSE:
            replace material DIFFUSE property
        case SPECULAR:
            replace material SPECULAR property
        case AMBIENT_AND_DIFFUSE:
            replace material AMBIENT and DIFFUSE properties
        }
    }
}
if(neither texture-material nor fragment-color-material is in
effect) {
    Use material value from the material cache
}
```

The following table provides sources and comments for a number of the inputs mentioned in the previous pseudo-code description:

| INPUT | SOURCE |
| --- | --- |
| Material | Matrl cache |
| Fragment Front/back flag | Input packet |
| Txtr apply submode | Matrl cache |
| Txtr apply mode | Matrl cache |
| Txtr Front/back | Matrl cache |
| ColorMaterial enable | Matrl cache |
| ColorMaterial front/back | Matrl cache |
| ColorMaterial mode | Matrl cache |
| Gouraud colors | Input packet |

5.11.12 Bump Computation

Figure 43:
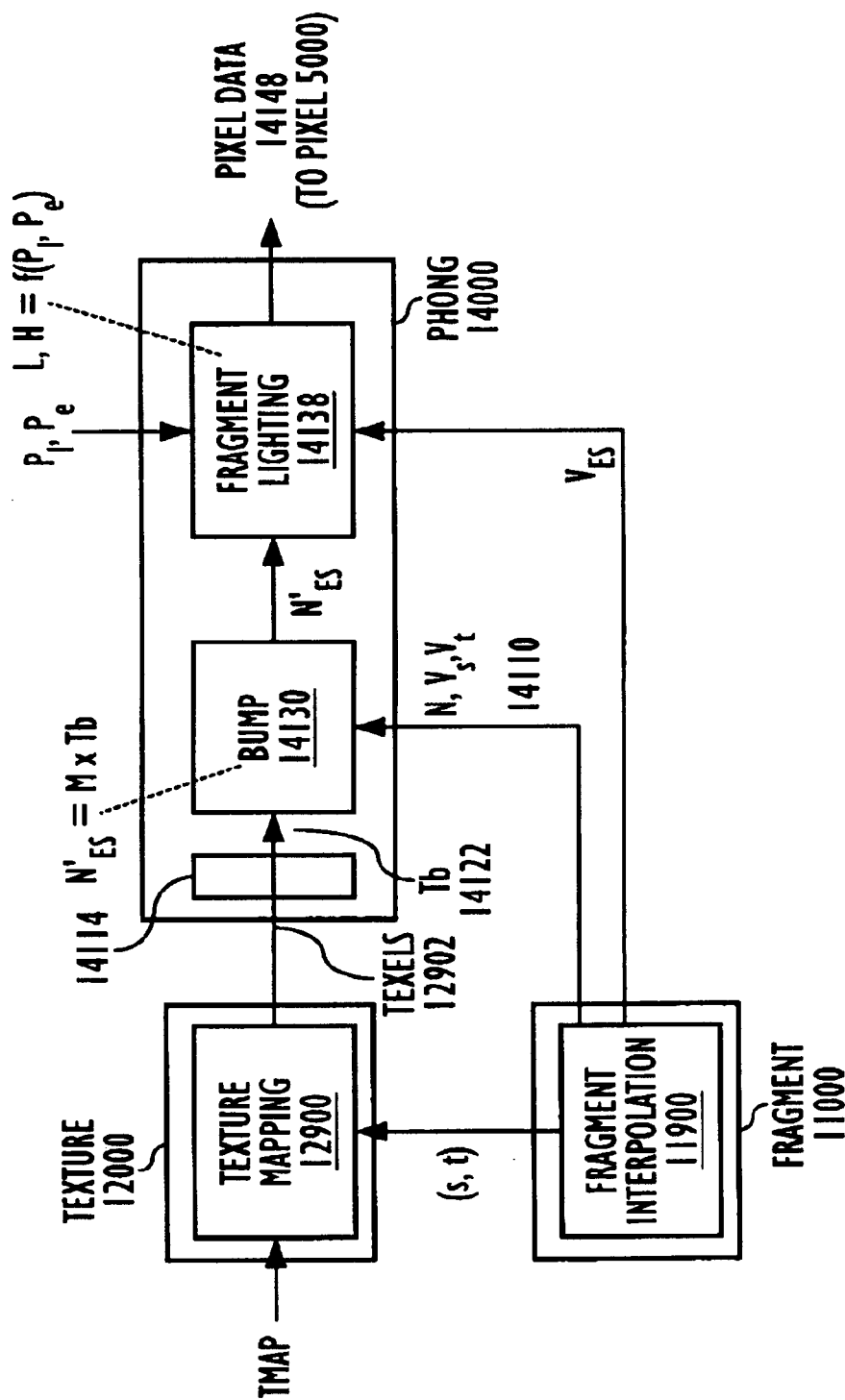
FIG. 43 is a diagrammatic illustration of a portion of the inventive DSGP involved with computation of bump and lighting effects, emphasizing computations performed in the Phong block 14000.

Referring to FIG. 43, there is shown a block diagram of components of the inventive DSGP that play a role in bump computation. These components include a Texture Mapping unit 12900 of the Texture block 12000; a Fragment Interpolation unit 11900 of the Fragment block 11000; and Texture computation, Bump and Fragment Lighting units 14114, 14130, 14138 of the Phong block.

As described in other sections of this document, Texture Mapping 12900 receives from Fragment Interpolation 11900 object space coordinates (s, t) of a fragment in need of texturing. The object space coordinates (s, t) correspond to the coordinate system (referred to as tangent, or object, space) of the texture map TMAP input to Texture 12000. Texture Mapping 12900 determines the texture associated with the coordinates (s, t) and passes the relevant texture information to the Phong block 14000 as a set of texels 12902 (up to 8 texels per stamp in one embodiment). As described above, the Texture computation 14114 unpacks the texels and dispatches the different types of texture information (e.g., texture-bump, texture-light, texture-material) to appropriate Phong units. In particular, Texture computation 14114 passes texture-bump (Tb) data 14122 for a fragment to the Bump unit 14130, which receives from Fragment Interpolation 11900 geometry information 14110 (surface normal N and tangents $V_s$, $V_t$) for the same fragment. Using this information Bump 14130 computes a perturbed, eye space normal $N'_{ES}$ reflecting perturbation of the normal N by the bump data Tb. The Bump unit 14130 outputs the perturbed normal $N'_{ES}$ to Fragment Illumination 14138, which uses the new normal $N'_{ES}$ in conjunction with material and lighting information 14128, 14136, derived light (L) and half-angle (H) vectors, and fragment position V to compute the color 14148 of one pixel corresponding to the fragment. The pixel color 14148 is output to the Pixel block 15000, which can combine that color with other colors for the same pixel.

As already described, bump map information can be specified in the texture map TMAP in a variety of formats (e.g., SGI, Blinn). In the Blinn format the TMAP specifies each point of the bump map using two bump gradients ($h_s$(s, t), $h_t$(s, t)). Texture Mapping 12900 packages this information as two components of an RGB texel. In one embodiment the RBG texel is provided in the texel data format TDF_3_12_s_0 (see Table P11 for definition of texel formats). The Phong Texture computation unit 14114 passes the bump information to Bump 14130 as a tangent space, texture-bump (Tb) vector 14122 whose components are ($h_s$(s, t), $h_t$(s, t), 1.0), where the scalar 1.0 corresponds to the length of a unit surface normal perturbed by the gradients.

In the SGI format the TMAP specifies at each point of the bump map the tangent space components ($n'_x$, $n'_y$, $n'_z$) of the perturbed surface normal $N'_{TS}$. Texture Mapping 12900 packages this information as three components of an RGB texel. In one embodiment the RBG texel is provided in the texel data format TDF_3_12_s_0 (see Table P11 for definition of texel formats). The Phong Texture computation unit 14114 passes this information to Bump 14130 as a tangent space, texture-bump (Tb) vector 14122 whose components are ($n'_x$, $n'_y$, $n'_z$).

Fragment illumination 14138 performs all lighting computations in eye space, which requires the Bump unit 14130 to transform the texture-bump (Tb) data 14122 from tangent space to eye space. In one embodiment the Bump unit does this by multiplying a matrix M whose columns comprise eye space basis vectors ($b_s$, $b_t$, n) by the vector Tb of bump map data. The components of the eye space basis vectors, which constitute a transformation matrix from tangent to eye space, are defined by Bump 14122 so that the multiplication (M×Tb) gives the perturbed normal N' in eye space in accordance with the Blinn bump mapping equation:

$$N'_{ES} = N + b_s h_s + b_t h_t. \tag{59}$$

In particular, when the texture-bump data 14122 is in the SGI format, the Bump unit 14130 computes the basis vectors using: $b_s=-V_s$ and $b_t=-V_t$. When the texture-bump information is in the Blinn format, the Bump unit 14130 computes the basis vectors using: $b_s=\hat{n} \times V_t$ and $b_t=V_s \times \hat{n}$, where $\hat{n}$ is the unit vector in the direction of the surface normal N. Using these definitions, the matrix multiplication (M×Tb) generates the appropriate perturbed surface normal in eye space, $N'_{ES}$. This matrix multiplication can be implemented in either hardware or software.

This approach is much more efficient than the bump mapping approaches of the prior art. For example, in contrast with SGI bump mapping, where the light and half-angle vectors (L, H) are both transformed to tangent space for each of one or more lights, the present invention only needs to transform the texture-bump vector Tb to eye space once, regardless of the number of lights. Moreover, because Fragment 11000 provides interpolated vectors, the illustrated embodiment does not need to interpolate normals or surface tangents, as is done in the prior art.

Figure 44:
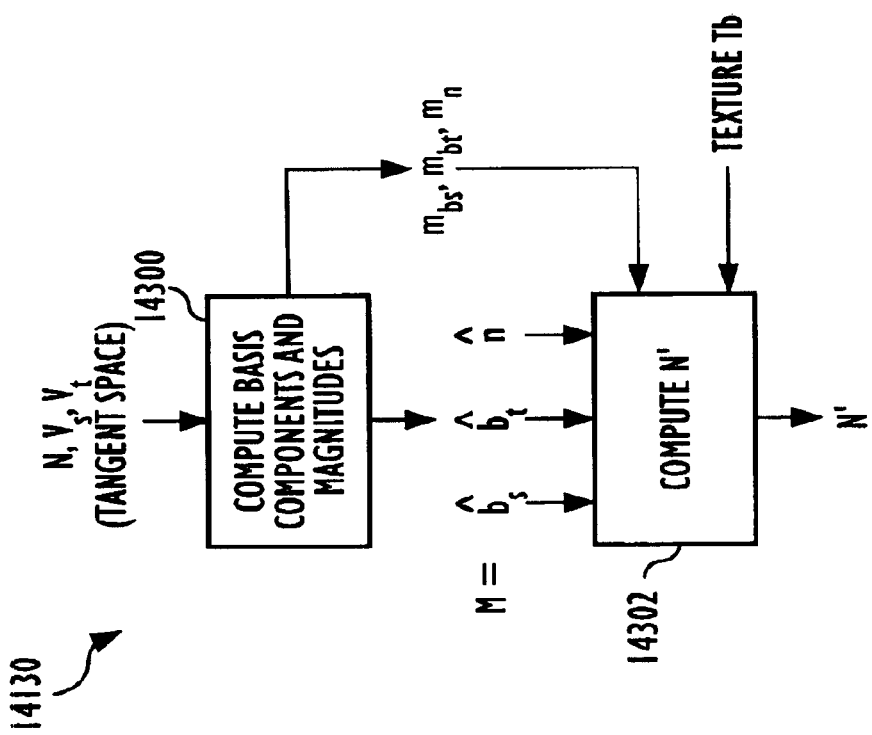
FIG. 44 is a diagrammatic illustration showing the functional flow of a bump computation performed by one embodiment of the bump unit 14130 of FIG. 43.

A high-level flow diagram of one embodiment of the Bump unit 14130 is shown in FIG. 44. In this embodiment the Bump unit first computes unit basis vectors and associated magnitudes from the fragment geometry vectors (N, Vs, Vt) (operation 14300) and then computes the perturbed unit normal $N_{ES}'$ in eye space 14302 using the unit basis vectors and associated magnitudes and information from the tangent space, texture-bump vector Tb (operation 14302).

This embodiment efficiently implements the matrix computation (M×Tb) partly using matrix multiplication hardware. The illustrated embodiment accomplishes this by first recognizing that the Blinn bump mapping equation can be rewritten as follows:

$$N'_{ES} = \hat{n} m_n + \hat{b}_s m_{bs} h_s + \hat{b}_t m_{bt} h_t, \quad (63)$$

where $(\hat{b}_s, \hat{b}_t, \hat{n})$ and $(m_{bs}, m_{bt}, m_n)$ are, respectively, unit vectors and associated magnitudes composing the basis vectors $(b_s, b_t, n)$. That is:

$$b_s = m_{bs}\hat{b}_s;\ b_t = m_{bt}\hat{b}_t \text{ and } n = m_n \hat{n}.$$

Applying basic linear algebra principles, the rewritten bump mapping equation can be represented as the following matrix multiplication for the Blinn bump method:

$$N' = |\hat{b}_s\ \hat{b}_t\ \hat{n}| \begin{vmatrix} m_{bs} h_s \\ m_{bt} h_t \\ m_n \end{vmatrix}, \quad (69)$$

where $|\hat{b}_s\ \hat{b}_t\ \hat{n}| = M'$ is expanded as:

$$\begin{vmatrix} \hat{b}_{xs} & \hat{b}_{xt} & \hat{n}_x \\ \hat{b}_{ys} & \hat{b}_{yt} & \hat{n}_y \\ \hat{b} & \hat{b} & \hat{n} \end{vmatrix}.$$

Note that, in this representation:

the components $\hat{b}_{xs}, \hat{b}_{xs}, \hat{b}_{xs}$ are the x, y and z components of the surface tangent vector in the s direction;

the components $\hat{b}_{xs}, \hat{b}_{xs}, \hat{b}_{xs}$ are the x, y and z components of the surface tangent vector in the s direction; and the components $\hat{b}_{xs}, \hat{b}_{xs}, \hat{b}_{xs}$ are the x, y and z components of the surface normal vector.

In one embodiment, the transformation matrix of unit vectors, M'=|b, b, n|, can be stored as a 3×3 matrix of fixed-point values, which enables fixed point multiplication hardware to be used at least partially in the Bump unit 14130. Such hardware is far simpler than the floating-point multiplication hardware that would otherwise be required to perform the original, non-normalized matrix multiplication (M×Tb). However, note that floating point hardware can be used in any of the described embodiments for any of computations performed therein.

Similarly, for the SGI bump method, the rewritten bump mapping equation can be represented as the following matrix multiplication:

$$N' = |\hat{b}_s\ \hat{b}_t\ \hat{n}| \begin{vmatrix} m_{bs} n_x \\ m_{bt} n_y \\ m_n n_y \end{vmatrix} \quad (71)$$

In the embodiment of FIG. 44, Fragment 11000 supports this implementation of bump mapping by providing the surface normal N and surface tangents $V_s, V_t$ as groups of unit vectors and associated magnitudes. For example:

surface normal N is provided as a magnitude $m_n$ and unit vector components $(\hat{n}_x, \hat{n}_y, \hat{n}_z)$;

surface tangent $V_s$ as a magnitude $m_s$ and unit vector components $(\hat{v}_{xs}, \hat{v}_{ys}, \hat{v}_{zs})$; and surface tangent $V_t$ as a magnitude $m_t$ and unit vector components $(\hat{v}_{xt}, \hat{v}_{yt}, \hat{v}_{zt})$.

The Bump unit 14130 generates the matrix of unit basis vectors $M'=|\hat{b}_s, \hat{b}_t, \hat{n}|$ and the associated magnitudes $m=(m_{bs}, m_{bt}, m_n)$ from the magnitudes and unit vectors composing the surface normal N and surface tangents $V_s$, Vt in a manner that is consistent with the content of the texels input to the Phong block 14000. In particular, when the texel-bump information is in the SGI format, Bump 14130 derives the unit vectors and associated magnitudes using:

$$\hat{b}_s = -\hat{v}_s,\ m_{bs} = m_{vs} \text{ and } \hat{b}_t = -\hat{v}_t,\ m_{bt} = m_{vt}.$$

When the texel-bump information is in the Blinn format, Bump 14130 derives the unit vectors and associated magnitudes using:

$$\hat{b}_s = -\hat{v}_s,\ m_{bs} = m_{vs} \text{ and } \hat{b}_t = -\hat{v}_t,\ m_{bt} = m_{vt}.$$

Given unit basis vectors and magnitudes derived in this manner the resulting matrix multiplication (M'×mTb) produces the desired eye space perturbed surface normal $N'_{ES}$ for use in the fragment lighting calculation. Stating this another way, the matrix M' defines a transformation from the different tangent space coordinate systems (i.e., Blinn or SGI) to the common eye space coordinate system.

In one version of the embodiment just described the Bump hardware 14130 is able to store each component of the matrix M' as a fixed-point value. However, the vector $(m_{bs}h_s, m_{bt}h_t, m_n)$ by which the matrix M' is multiplied cannot be represented as a fixed point vector. This is because, even though the Tb components (i.e, bump gradients $h_s, h_t$ or SGI perturbed normal components $n'_x, n'_y, n'_z$) can be fixed-point values, the magnitudes $m_{bs}, m_{bt}, m_n$ could be any size, necessitating floating point representation of the vector $(m_{bs}h_s, m_{bt}h_t, n)$. Because this vector is not fixed-point, the multiplication (M'×mTb) cannot be performed entirely with fixed-point hardware. An embodiment that addresses this issue is now described in reference to FIG. 45.

Figure 45:
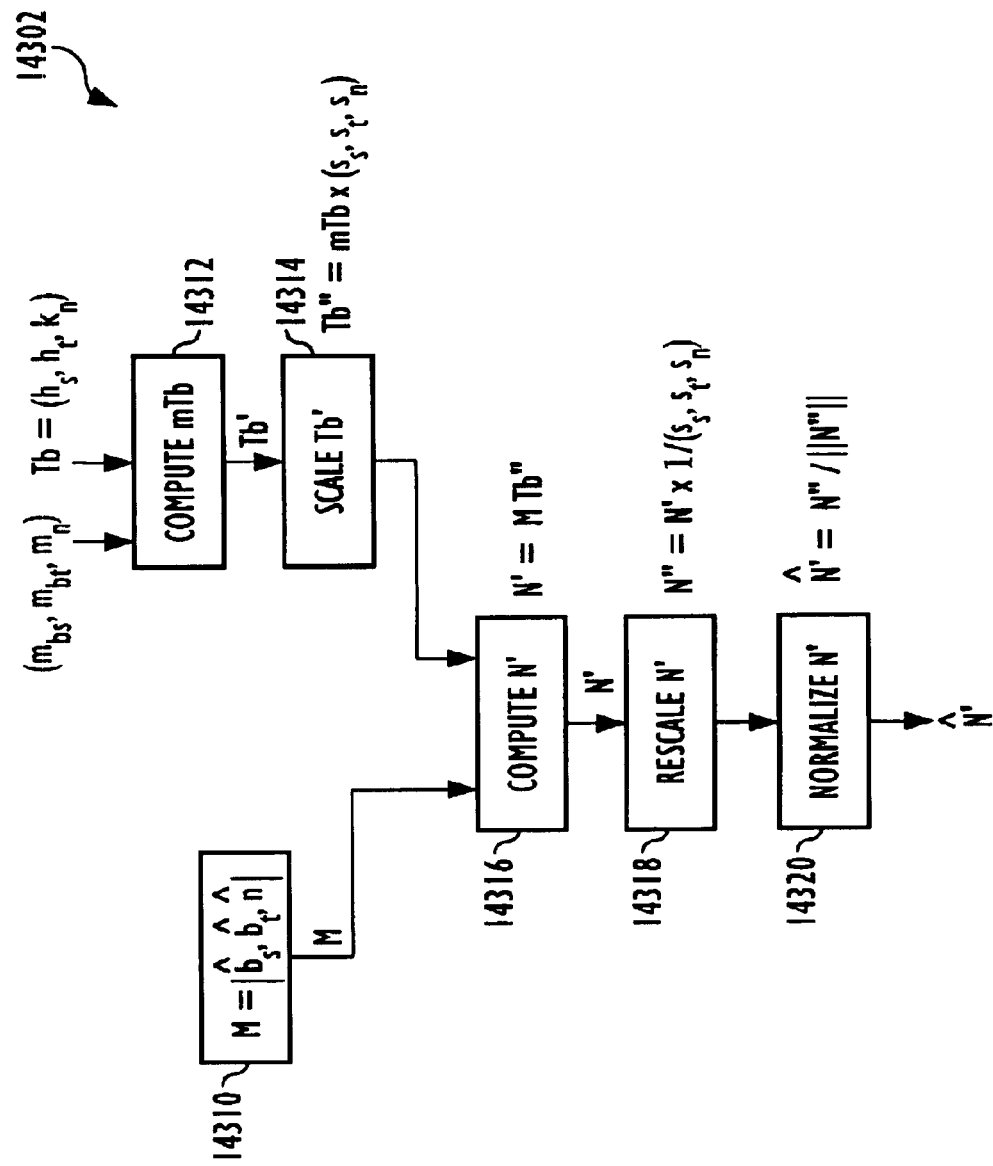
FIG. 45 is a diagrammatic illustration showing the functional flow of a method used to compute a perturbed surface normal within one embodiment of the bump unit 14130 that can be implemented using fixed-point operations.

FIG. 45 shows an implementation of the operation 14302 from FIG. 44 that computes the perturbed normal $N'_{ES}$ using only fixed-point hardware. This diagram represents the texture-bump vector generically as $(h_s, h_t, k_n)$, where, in Blinn-bump mapping, $h_s$ and $h_t$ are the bump gradients and $k_n=1.0$; and, in SGI-bump mapping, $(h_s, h_t, k_n)$ equal the components of the perturbed normal ($n'_x$, $n'_y$, $n'_z$). This implementation is based on the idea of scaling each of the components of the vector mTb so that the resulting scaled values can be represented as fixed-point values of a scaled vector mTb'. The matrix multiplication M'×mTb' is then entirely carried out using fixed point hardware, and the result then re-scaled and normalized to account for the different scale factors applies to respective components of the vector mTb. The resulting perturbed normal transmitted to the Fragment Lighting 14138 is a unit normal.

As shown in FIG. 45, the magnitude vector m=($m_{bs}$, $m_{bt}$, $m_n$) 14310 and the bump vector Tb=($h_s$, $h_t$, $k_n$) are multiplied to form an updated texture-magnitude vector m Tb' (14312). The components of mTb' are then scaled by a vector s of scalars ($s_s$, $s_t$, $s_n$) as follows (14314):

$$mTb''=(s_s \times m_{bs}h_s, s_t \times m_{bt}h_t, s_n \times m_n k_n).$$

The scalars s are selected so the resulting matrix mTb" can be represented as a fixed-point vector. The scalars can be the same but, in some situations, are likely to be different given the wide range of possible magnitudes m.

The scaled vector mTb" and the unit transformation matrix M', which also comprises fixed-point values, are multiplied entirely using fixed-point multiplication hardware to provide a perturbed normal N' (14316). The components of the perturbed normal N' are then re-scaled (14318) to re-establish the correct relationship between their magnitudes:

$$N''=N' \times 1/(s_s, s_t, s_n).$$

The rescaled vector N" is then normalized (14320) to provide a unit perturbed normal $\hat{N}'_{xs}$ that is output to Fragment Lighting:

$$\hat{N}'_{xs}=N''/\|N''\|.$$

Alternatively, the magnitude of the perturbed normal could be passed to Fragment Lighting along with the unit perturbed normal.

As in any of the described embodiments, any of the operations, steps or calculations described with reference to FIG. 9P can be performed entirely in floating-point hardware.

The following is a pseudo-code description of one embodiment of the bump computation processing written using C lanuage conventions well known to programmers and engineers and others skilled in the art of computer programming, generally, and computer graphics programming and processor design, specifically. This description is exemplary and is not to be construed to limit the present invention.

```
if(this is a backside fragment) {
    negate the normal and the basis vectors.
}
if(sgi bump) {
    Combine the normal and basis vectors into a matrix.
    Form a vector from the 3 values in the texel.
    Apply the matrix to the vector to generate a new normal.
    Renormalize (N)
}else if(blinn bump) {
    Combine the normal and basis vectors into a matrix.
    Form a vector from "1.0" and the 2 values in the
    texel (surface gradients).
    Apply the matrix to the vector to generate a new
    normal.
    Renormalize (N)
}
Forward the normal vector to fragment lighting.
In either the Blinn or SGI modes, the net result is a 3x3 matrix
multiply.
```

The following table provides sources and comments for a number of the inputs mentioned in the previous pseudo-code description:

| INPUT | SOURCE |
|---|---|
| Texture apply submode (blinn/sgi) | Matrl Cache |
| Bump Texels | Input packet |
| Normal unit | Input packet |
| Normal magnitude | Input packet |
| Tan, Binorm vectors | Input packet |

5.11.13 Light-Texture Computation

Referring to FIG. 41, the light-texture computation 14134 replaces a light property of a fragment with a new value provided as a texture-light value 14120 (i.e., as a texel). If a texture-light value 14120 is not provided, the light-texture computation 14134 displays the fragment with the material values from the light cache entry identified by the fragment's light cache pointer.

If a texture-light value 14120 has been forwarded, the texture-light computation replaces the light property identified by the txtrApplySubMode parameter (either EMISSION, AMBIENT, DIFFUSE, SPECULAR, or AMBIENT_AND_DIFFUSE) with the texture-light value 14120. The resulting new light value 14136 is forwarded to the Fragment Lighting computation 14138.

Additional background information is available in the following materials, which are incorporated herein by reference:

GL 1.1 spec Section 3.8,
   SGIX_light_texture,

These materials describe extensions to the Open GL specification needed to support SGI bump mapping.

The following is a pseudo-code description of one embodiment of the light-texture computation written using C lanuage conventions well known to programmers and engineers and others skilled in the art of computer programming, generally, and computer graphics programming and processor design, specifically. This description is exemplary and is not to be construed to limit the present invention.

```
if(a texture-light value has been forwarded) {
    switch(texture apply submode) {
        case AMBIENT:
            replace AMBIENT light component with texture value
        case DIFFUSE:
            replace DIFFUSE light component with texture value
        case SPECULAR:
            replace SPECULAR light component with texture value
```

-continued
```
    case ATTENUATION:
        Forward the attenuation value to the fragment-light unit
    case SHADOW_ATTENUATION
        forward the shadow factor to the fragment-light unit.
    }
}
Forward the light values to the FRAGMENT-LIGHTING UNIT
```

The following table provides sources for a number of the inputs mentioned in the previous pseudo-code description:

| INPUT | SOURCE |
|---|---|
| Current light values | Light cache |
| Txtr apply mode | Matrl cache |
| Txtr apply submode | Matrl cache |
| Light texture values | Input packet |

5.11.14 Fragment-Lighting Computation

The Fragment-Lighting computation implements the Lighting Equation set out in the Background in a manner that is substantially similar to the method used in the Geometry block to perform per vertex lighting. Additional details common to the prior art and the Fragment Lighting computation are provided in the background section of the present document. Referring to FIG. 41, inputs to Fragment Lighting 14138 include the selected material 14128 from Material Selection 114126, the perturbed normal (or, if no bump mapping is performed, the normal passed in by Fragment 11000 in a fragment packet) from Bump 14130 and the selected texture 14136 from Light-Texture 14134. Fragment Lighting 14138 combines this disparate information according to the Lighting Equation using the to generate a pixel color 14140 that is output to the Light-Environment calculation 14142.

Additional background information is available in the following materials, which are incorporated herein by reference:

GL 1.1 spec Section 3.8,
SGIX_fragment_lighting.

These materials describe extensions to the Open GL specification needed to support SGI bump mapping.

The following is a pseudo-code description of one embodiment of the Fragment Lighting computation written using C lanuage conventions well known to programmers and engineers and others skilled in the art of computer programming, generally, and computer graphics programming and processor design, specifically. This pseudo-code example begins with a comment that defines the parameters used in the code that implements the lighting computation, which follows. This description is exemplary and is not to be construed to limit the present invention.

Comment:

This lighting calculation is nearly identical to that performed per-vertex in the Geometry Block. From the SGIX_fragment_lighting extension we have . . .

Define:

| | |
|---|---|
| Nf | = the number of fragment light sources |
| N | = the fragment normal vector |
| L_i | = the direction vector from the fragment position to the light source for light #i |
| H_i | = the half angle vector for light #i |
| n | = the specular exponent (shininess) |
| Shad_i | = shadow attenuation term, defaults to 1.0 |
| pl | = unit vector towards light. |
| E | = Vector from fragment to eye position |
| De | = Distance from fragment to eye position |
| Dl | = Distance from fragment to light position. |
| Am,Dm,Sm | = Ambient, Diffuse, and specular material components |
| Al_i,Dl_i,Sl_i | = Ambient, Diffuse, and specular components of light #i |

Then the fragment lighting equation is:

```
Cl = Em                                         // emissive
   +Am*AS                                       // ambient
   SUM{_i = 0 through Nf-1} {
   +    shad_i *Atten_i*SpotL_i*{               // attenuation
        + Am*A;_i                               // ambient
        + Dm*Dl_i*(N.L_i)                       // diffuse
        + Sm*Sl_i*(N.H_i)^n                     // specular
        }
   }
```

Note on the "shininess cutoff factor" The specular term is:

Sm*Sl_i(N.H_i)^n

Note that the exponentiation is a waste of time if:

$N.H_{13}$ i*Sm*Sl_I<1/(2^8−1)

Or:

N.H_I<1/((2^8−1) *Sm *Sl_I)

This reciprocal is computed by the driver and stored as "shininess cutoff" for each material. In Principal it depends on the light, but we will use the value 1.0 as a worst case to avoid storing the cutoff on a per-light basis.

Pseudocode:

```
if(fragment lighting is off) }
    Assign the texture computation output to the fragment color.
    done.
}
If (local viewer) {
    Set eye vector E to (0, 0, 1)
}else{
    Compute fragment eye vector from:
    E = −V
    renormalize(E), saving magnitude for use by fog calculation.
}
Set accumulated sum to emission term:
Add product of global ambient and material ambient to accumulated
sum:
For(each enabled fragment-light) {
    if(light is local) {
        Find the vector from the fragment to the light:
        L = Pl−V
        Renormalize(L), saving the light distance Dl
        for use below.
    }else{
        Use light vector unchanged,
        L = Pl
    {
    if(either viewer or light is non-local) {
        Form the half-angle vector H:
        H = E + L
        renormalize (H)
    }else{
        Use the H vector for this light
        from the light cache.
```

-continued

```
{
   if(an attenuation factor has come from light-texture) {
      set the attenuation to the forwarded value
   }else{
      if(the light is local) {
         if(the light is nearer than its cutoff distance) {
            Compute the attenuation denominator from
               d = Kc + Kl*Dl + Kq*Dl*Dl
            Set the attenuation factor to the reciprocal of d.
         }else{
            Skip the remaining calculations for this light.
         }
      }else{
         set the attenuation factor to 1.0
      }
   }
   if(a shadow factor has come from light-texture) {
      multiply the attenuation factor by the shadow factor
   }
   if(the light is a spotlight) {
      Compute the spotlight factor:
      Find the dot product Sdv = −L * S
      if (the dot product is > the spotlight cutoff) {
         Raise Sdv to the power of the spotlight exponent
      }
   }else{
      set the spotlight factor to 1.0
   }
   Compute the ambient term Acm * Acl
   Find the dot product of the Light vector L and surface normal N.
   if(L.N is > 0) {
      Compute the diffuse term:
      Multiply L.N by the material and light diffuse components Dm
and Dl
      Compute the specular term:
      Find the dot product of H and the normal N:
      if(N dot H is greater than the shininess cutoff value) {
         Raise the dot product to the power of the material
specular
      }
      Multiply by fragment and light specular coefficients Sm and
Sl
   }else{
      Light is behind surface, set diffuse and specular to zero
   }
   Multiply this light's contribution by attenuation factor and
   add to total.
}
```

Forward final fragment color to Light environment computation.

The following table provides sources and comments for a number of the inputs mentioned in the previous pseudo-code description:

| INPUT | SOURCE | COMMENTS |
|---|---|---|
| Fragment lighting enable | Light cache | |
| Fragment Xe, Ye, ze | Input packet | Eye space coords, |
| Local viewer enable | Light cache | |
| Surface Normal | Bump comp. | |
| Global light info location, etc. | Light cache | Viewer |
| Per-light info | Light-Txtr comp | |
| Frament material info | Material comp. | |

5.11.15 Light-Environment Computation

Referring to FIG. 41, the Light-environment computation 14142 receives a fragment color (Rl,Gl,Bl,Al) 14140 from Fragment Lighting and a texture-color (Rf,Gf,Bf,Af) 14118 from Texture 14114 and blends the two colors according to the current value of the light-environment mode setting, which may be set to one of REPLACE, MODULATE, or ADD.

Additional background information is available in the following materials, which are incorporated herein by reference:

GL 1.1 spec Section 3.8,

SGIX_fragment_lighting.

These materials describe extensions to the Open GL specification needed to support SGI bump mapping.

The following is a pseudo-code description of one embodiment of the the Light-Environment computation written using C lanuage conventions well known to programmers and engineers and others skilled in the art of computer programming, generally, and computer graphics programming and processor design, specifically. This description is exemplary and is not to be construed to limit the present invention.

PseudoCode:

Blend the fragment light color (Rl,Gl,Bl,Al) with the texture color (Rf,Gf,Bf,Af) according to the current value of the light-environment mode setting, which may be set to one of REPLACE, MODULATE, or ADD . . .

| REPLACE | MODULATE | ADD |
|---|---|---|
| Rv = Rl | Rv = Rf * Rl | Rv = Rf + Rl |
| Gv = Gl | Gv = Gf * Gl | Gv = Gf + Gl |
| Bv = Bl | Bv = Bf * Bl | Bv = Bf + Bl |
| Av = Al | Av = Af * Al | Av = Af + Al |

Replace depth value in output packet if depth-texture was forwarded.

The following table provides sources for a number of the inputs mentioned in the previous pseudo-code description:

| INPUT | SOURCE |
|---|---|
| Light env mode | Matrl cache |
| Texture color | Texture comp. |
| Fragment Color | Fraglight comp. |
| Replacement Z | Txtr comp. |

5.11.16 Fog Computation

Figure 40:
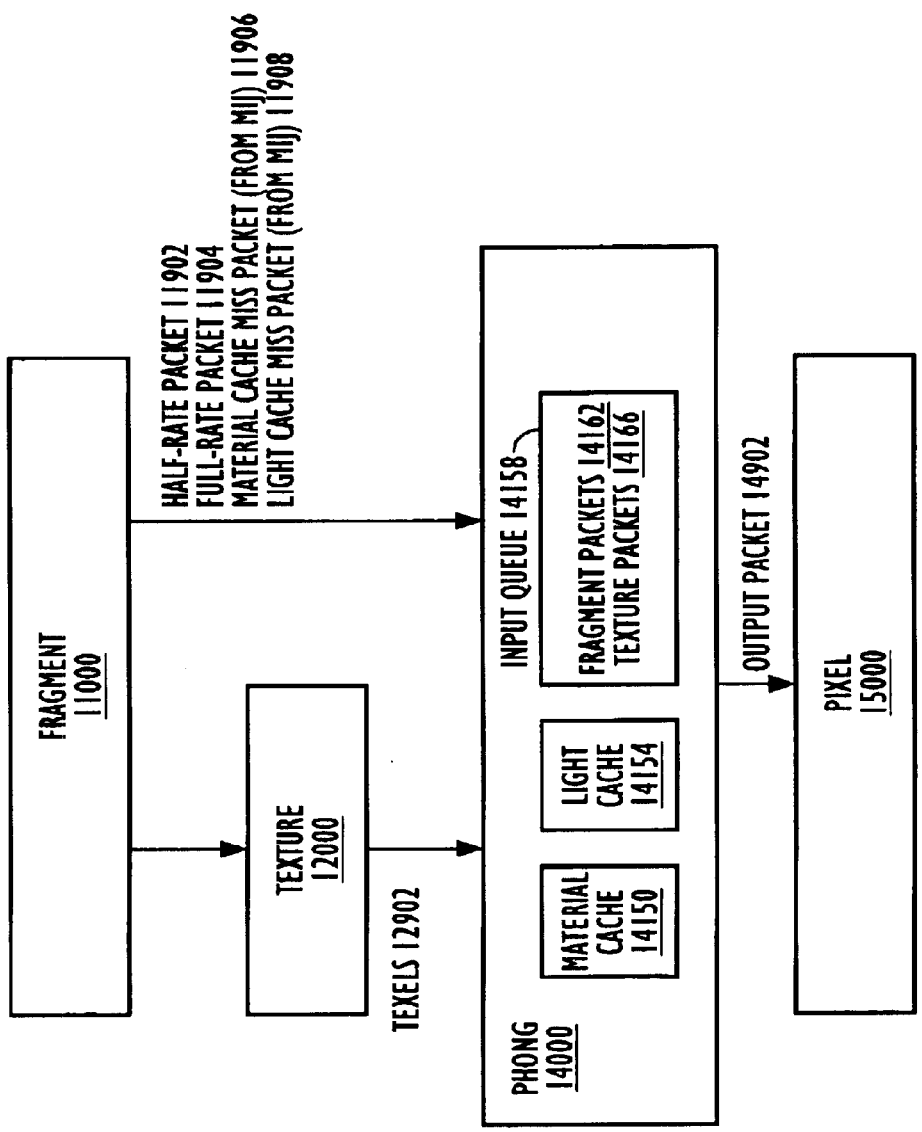
FIG. 40 is a digrammatic illustration shownling the flow of information packets to Phong 14000 from Fragment 11000, Texture 12000 and from Phong to Pixel 15000.

Referring to FIG. 41, the Fog computation 14146 receives the blended color 14144 from the Light-Environment computation 14142 and outputs the final pixel color 14148 to the Pixel block 15000. The Fog computation uses the current value of the fog mode (fogMode) from the light cache 14154 and the associated fog parameters 1 and 2 (fogParm1, fogParm2) and fog color (fogColor). Note that the Fog computation can only be performed in the half-rate mode as it requires eye coordinates, which are only provided in the half-rate fragment packet 11902 (FIG. 40).

The Fog computation modifies the fragment color 14144 using a computation that depends only on the distance from the viewer's eye to the fragment and the fog mode. In a particular embodiment the fog mode includes exponential, exponential squeared and linear. In this embodiment the Fog computation 14146 determines a fog factor that is either an exponential, exponential squared or linear function of the distance from the viewer's eye to the fragment. As described above (see Phong Block Parameter Descriptions), the fog parameters 1 and 2 define aspects of the fog computation that vary depending on the fog mode. For example, if the mode is exponential, then parameter 1 is fog density and parameter 2 is not used; if exponential squared, then parameter 1 is the fog density squared and parameter 2 is not used;

if linear, then parameter 1 is end/(end-start) and parameter 2 is 1/(end-start).

The Fog computation 14146 uses the computed factor to blend the fog color (fogcolor) from the light cache 14154 and the color 14144 from Light Environment 14142.

Additional background information is available in the following material, which is incorporated herein by reference:

GL 1.1 spec Section 3.9.

The following is a pseudo-code description of one embodiment of the Fog computation 14146 written using C lanuage conventions well known to programmers and engineers and others skilled in the art of computer programming, generally, and computer graphics programming and processor design, specifically. Like the preceding pseudo-code descriptions this example includes clarifying comments, notes and the actual pseudo-code.

Comments:

Use the current value of the fog mode to select between the exponent, exponent squared, and linear fog equations to compute a scale factor, then use the scale factor to blend the fragment color (RGBA) with the fog color (RGBA).

Notes:

If fog is enabled, we must go to half-rate packets regardless of other factors since we need eye-space coordinates to find the distance to the fragment.

Fog requires the distance from the fragment to the eye, which is not available in the performance case. Possible optimizations: The gl spec allows the eye-distance to be approximated with the eye-space Z value, but this does have noticeable artifacts.

Eye distance could be approximated with the formula:

$$De = Abs(Max(Ex, Ey, Ez)) + Abs(\text{remaining term1})/4. + Abs(\text{remaining term2})/4.$$

Fog could be calculated per-vertex in Geometry and interpolated.

Pseudocode:

```
If(the distance De from the fragment to the eye has not already been
computed) {
    Compute the distance as 1 / sqrt(EX*EX + Ey*Ey * Ez*Ez)
}
switch(mode) {
case EXPONENT:
    factor = exp(-density * De) ;
case EXPONENT_SQUARED:
    factor = exp(-(density * De)^2) ;
case LINEAR:
    factor = (end - De)/(end - start)
    (We store end/(end-start) and 1/(end - start) in the
    material cache)
}
if(color index mode is true) {
    Replace the color index using:
    I = fragment color index + (1 - factor) * fog color
    Where "fog color index" is stored as a float.
    And "fragment color index" is the lowest 8 bits of the
    Incoming mantissa of the R component of the primary color.
}else{
    Replace color components (but not alpha) using:
    Color = factor * fragment color + (1 - factor) * fog color
}
```

The following table provides sources and comments for a number of the inputs mentioned in the previous pseudo-code description:

| INPUT | SOURCE |
|---|---|
| Fragment color | Light env comp. |
| Fog mode | Light cache |
| Fog start, end, density | Light cache |
| Fog color | Light cache |
| Color index mode | Light cache |

5.11.17 Exceptions

Fragment lighting differs from vertex lighting in that parameters of type "color" are clamped to the range 0–1.0 when specified. This limits overflow scenarios. Dot products must be clamped to zero as mentioned in the GL spec describing the lighting equations, section 2.13. Overflow must be analyzed in the following cases:

5.11.17.1 Exponentiation

Exponentiation will not result in overflow because in all cases we are raising a value that is less than 1.0 (typically a dot product of normalized vectors) to a given power.

5.11.17.2 Renormalization of Surface Normal Vector

Set the vector to an arbitrary value, say (0, 0, 1).

Zero of this vector is a pathological case. Fragment provides a normalized value for the input, and the transform applied in bump consists either of a rotation or an offset in a plane perpendicular to the normal. It is possible for the user to create inverted or even zero normals through injudicious (i.e. really stupid) choice of the basis vectors. Too Bad.

5.11.17.3 Renormalization of Fragment-to-Eye Vector

Set the vector to (0, 0, 1).

Should be impossible because the eye location is excluded from the viewing frustum. The above value is a reasonable failsafe.

5.11.1 7.4 Renormalization of Fragment-to-Light Vector

Set the vector to (0, 0, 0).

This case may in fact occur, but will be limited to a single fragment. The light is coincident with the surface. For immediately adjoining fragments, this vector will be lying within the surface, and so it's dot product with the normal will be zero. Setting this vector to (0,0,0) will force the same result for this fragment, avoiding discontinuities in lighting.

5.11.17.5 Renormalization of Halfangle Vector

Set the vector to (1, 0, 0).

This case may occur if the light vector is parallel to the eye vector. In this case the half angle vector is determined only to lie in a plane perpendicular to the eye vector and (1, 0, 0) is as good as anything.

5.12 Pixel Block (PIX)

5.12.1 Overview of the Pixel Block

The Pixel Block (PIX) is the last block before the Backend in the 3D pipeline. It is responsible for OpenGL and Direct3D per-fragment operations. These operations include alpha test, stencil test, depth test, blending, dithering, and logic operations. The pixel ownership test is a part of the window system (see Ch. 4 of the OpenGL 1.1 Specification) and is done in the Backend. In addition to these operations, Pixel performs sample accumulation for antialiasing.

The pipeline stages before PIX convert the primitives into VSPs. A VSP corresponds to the visible portion of a polygon on the stamp. A stamp is a 2×2 pixel area of the image. The SRT block is responsible for collecting the primitives for each tile. The CUL block receives the data from the SRT block in tile order, and culls out parts of the primitives that definitely do not contribute to the rendered images. The CUL block generates the VSPs. The TEX and PHG units also receive the VSPs and are responsible for the texturing and lighting of the fragments respectively.

The PIX block receives input from the Mode Injection (MIJ) and Phong (PHG) Blocks. The VSPs and the mode packets are received from MIJ, while fragment colors for the VSPs are received from PHG. PHG may also supply per-fragment z values for VSPs. This happens when an object has a depth texture applied to it. Note is that the fragment colors for the VSPs arrive at the PIX block in the same order as the VSPs. The PIX block processes the data for each visible sample according to the applicable mode settings. When PIX finishes processing all stamps for the current Tile, it signals the PixelOut (PXO) unit to output the color, z-, and stencil buffers for the Tile. The PixelOut unit processes the pixel samples to generate color, z, and stencil values for the pixels. These pixel values are sent to the Backend (BKE) block. The RDRAM memory controller for the framebuffer is in the BKE block. The BKE block prepares the current tile buffers for rendering of geometry (VSPs) by PIX. This may involve loading of the existing color, z, and stencil values from the framebuffer.

Figure 46:
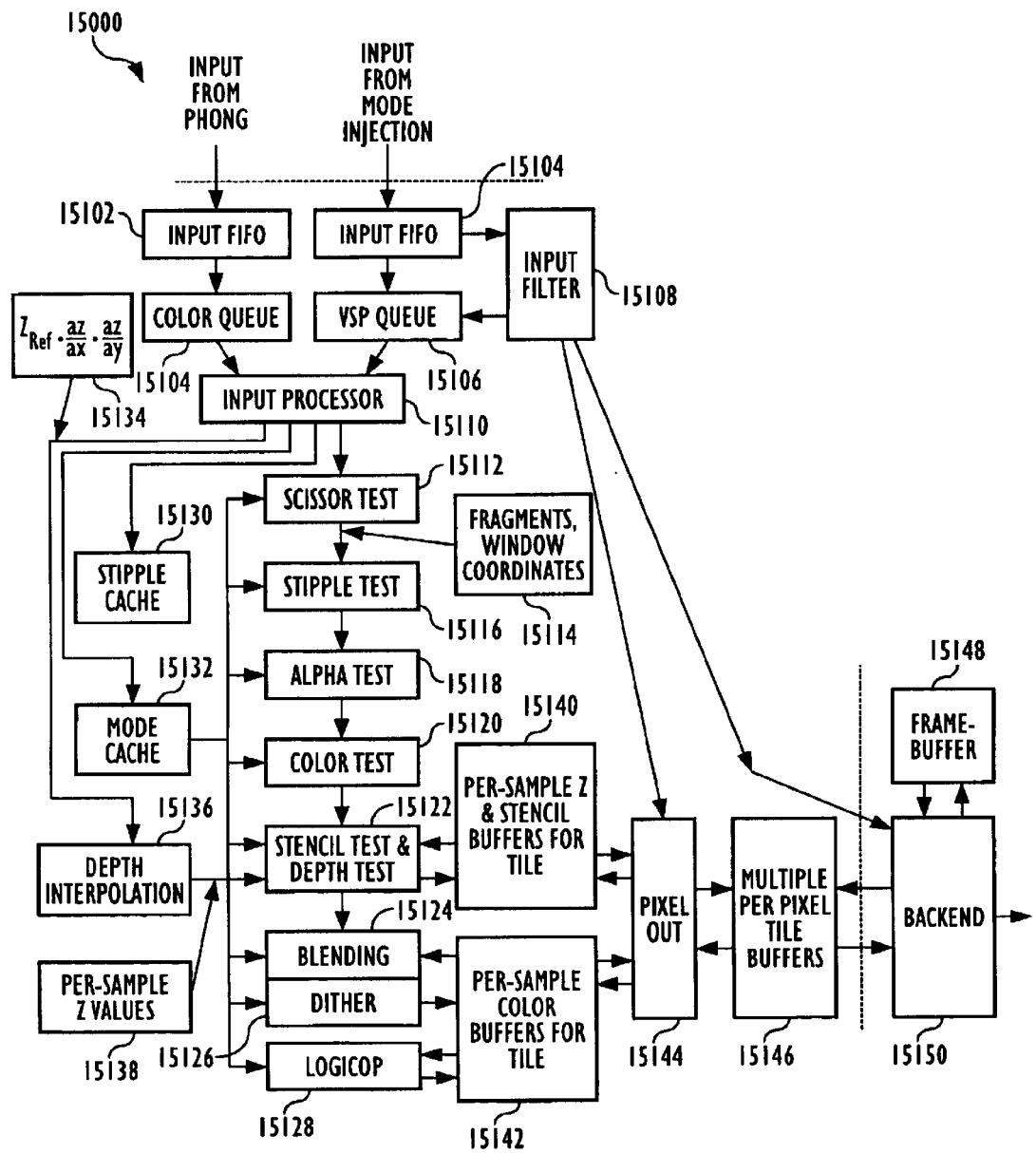
FIG. 46 is a diagrammatic illustration showing a block diagram of the PIX block.

FIG. 46 shows a block diagram of the Pixel Block (PIX) block.

The per-sample $z_w$, stencil and color buffer are double buffered. Thus, while PixelOut is sending one Tile to the backend, the depth and blend units may be writing to the second Tile. The per-sample color, z-, and stencil buffers are large enough to store one Tile's worth of data, i.e. 1024 samples. There is also a set of per-pixel z, stencil, and color buffers for each tile. These per-pixel buffers are used as intermediate storage for interfacing with the BKE block.

PIX also receives some packets bound for the backend (BKE) block from MIJ. The input filter appropriately passes these packets on to the Backend Prefetch Queue, where they are processed in the order received. Some packets are also sent to the queue in the PixelOut unit. As mentioned before, the PIX block receives input from the MIJ and PHG blocks. There are two input queues to handle these two inputs. The data packets from MIJ go to the VSP queue and the fragment Color/depth packets from PHG go to the Color queue. The PIX block may also receive some packets bound for the BKE block. Some of the packets are also copied into the input queue of the PixelOut unit. The BKE and PXO blocks process the data packets in the order received. MIJ places the data packets in the input FIFO. The input filter examines the packet header, and sends the data bound for the BKE block to the BKE block and the data packets needed by PIX to the VSP queue. Majority of the packets received from MIJ are bound for the VSP queue, some go only to the BKE block, and some are copied into the VSP queue as well as sent to the BKE and PXO units.

We digress a little to explain need and mechanism for tile preparation. A typical rendering sequence may have the following operations:

1. Initialize the color, z, and stencil buffers to their clear values if needed
2. Bit background image(s) into the buffer(s) if needed
3. Render geometry
4. Another Blt
5. Render some more geometry
6. Done and flip If the Blt operation in step 2 covers the entire window, then clearing operation for that buffer may not be needed. If the Bit covers the partial window then clear may be needed. Furthermore, the operations 1 and 2 may happen in reverse order, i.e. there may be a Blt to (perhaps) the whole window followed by a clearing of a part of the window. The pre-geometry Blts that cover the entire window and do not require scissor test, tile alignment, and scaling may be carried out by the BKE block as image read back into the tile buffers. The post-geometry Blts and the Blts that cover part of the window or involve scaling are implemented as textured primitives in the pipeline. Similarly, the Clear operation is broken into two kinds. The entire window Clear operation is carried out in the PixelOut unit and the Clear operation that covers only part of the window is carried out in the PIX pipeline. Both PIX (and PixelOut, which is part of PIX) and BKE are aware of the write masks for various buffers at the time the operation is invoked. In fact, BKE block uses the write masks to determine if it needs to read back the tile buffers. The readback of tile buffers may also arise when the rendering of a frame causes Polygon or Sort Memory to overflow. The pipeline breaks a user frame into two or more sequential frames. Thus for the same user frame, a tile may be visited more than once in the PIX block. The first time a tile is encountered, the PIX (perhaps the PixelOut unit) block may need to clear the on-chip tile buffers with the "clear values" prior to rendering. For rendering the Tiles in subsequent frames, the pixel color, z, and stencil values are read back from the framebuffer memory. Another very likely scenario occurs when z-buffer is cleared and the color and stencil buffers are loaded into tiles from a pre-rendered image. Thus as a part of the tile preparation, two things happens. The background image is read back from the framebuffer memory into the bit planes that are not enabled and the enabled bit planes (corresponding to the color, z, and stencil masks) are cleared. The pipeline stages upstream from PIX need to be aware of these functional capabilities, since they are responsible for sending the "Clear" information.

PIX compares the z values of the incoming samples to those of the existing pixels to decide which samples to keep. Pixel also provides state bits so that any color bleeding artifacts resulting from the splitting of a user frame due to overflow are minimized.

5.12.2 Functional Units Within the Pixel Block

For the functional units within the Pixel block, note that color, alpha, and stipple values are generated per-fragment, and therefore the results of corresponding test apply to all samples in the fragment. The same is true of the scissor test as well. It is tempting to implement optimizations based on the per-fragment and per-sample computations.

The major difference between pixel stencil operations and sample stencil operations lies in how the stencil value is retrieved from and written into the tile buffer.

5.13 Backend Block (BKE)

5.13.1 Functional Overview 5.13.1.1 Terminology

The following terms are defined below before they are used to ease the reading of this document. The reader may prefer to skip this section and refer to it as needed.

Pixel Ownership (PO BOX) is a sub-unit that determines for a given pixel on the screen the window ID it belongs. Using this mechanism, scanout determines if there is an overlay window associated with that pixel, and 3D tile write checks the write permission for that pixel.

BKE Bus is the interconnect that interfaces BKE with TDG, CFD and AGI. This bus is used to read and write into the Frame Buffer Memory and BKE registers.

Frame Buffer (FB) is the memory controlled by BKE that holds all the color and depth values associated with 2D and 3D windows. It includes the screen buffer that is displayed on the monitor by scanning-out the pixel colors at refresh rate. It also holds off screen overlay and p-buffers, display lists and vertex arrays, and accumulation buffers. The screen buffer and the 3D p-buffers can be dual buffered.

5.13.1.2 Main Functions

Figure 47:
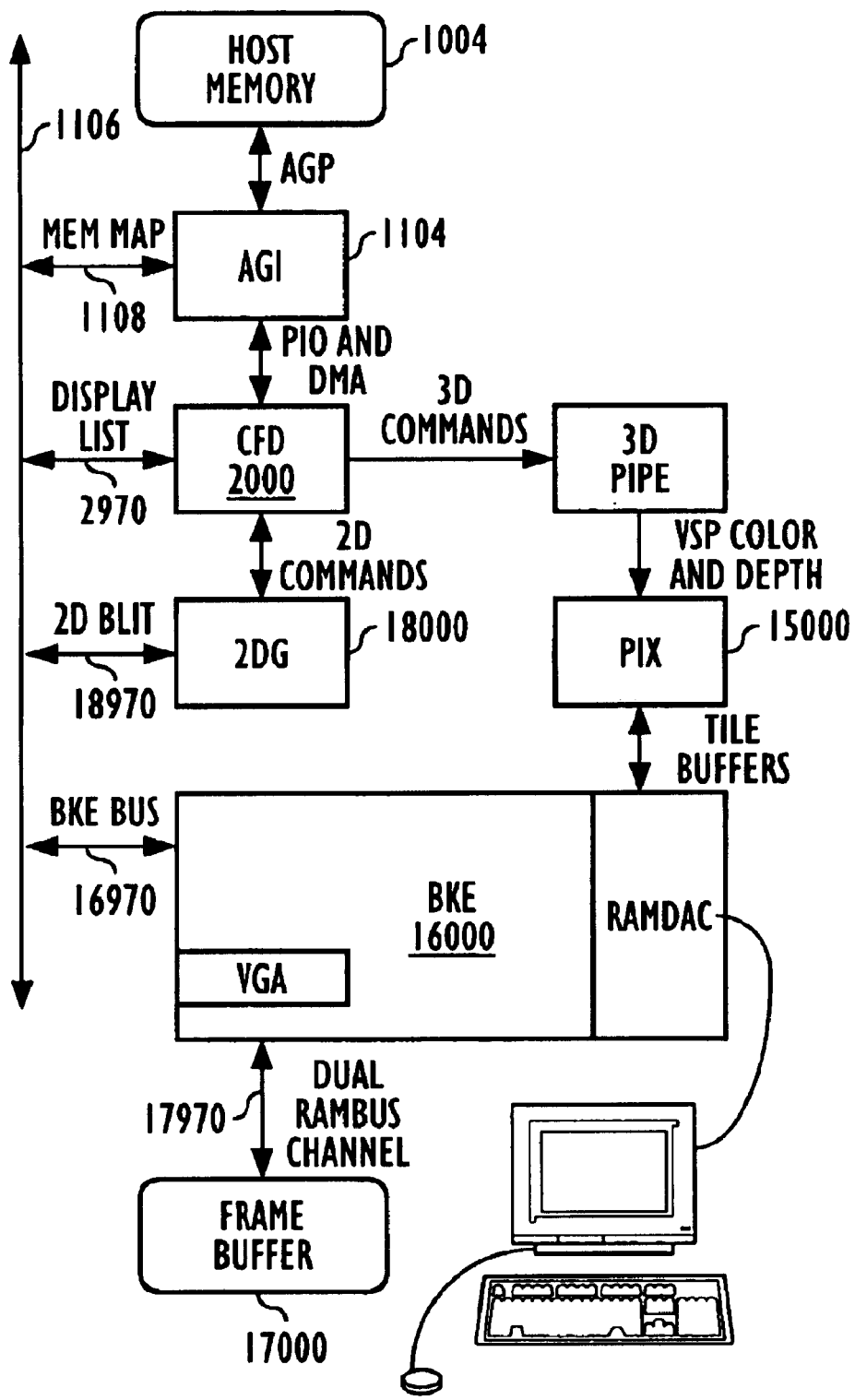
FIG. 47 is a diagrammatic illustration showing the Back-End Block (BKE) and units interfacing to it.
Figure 48:
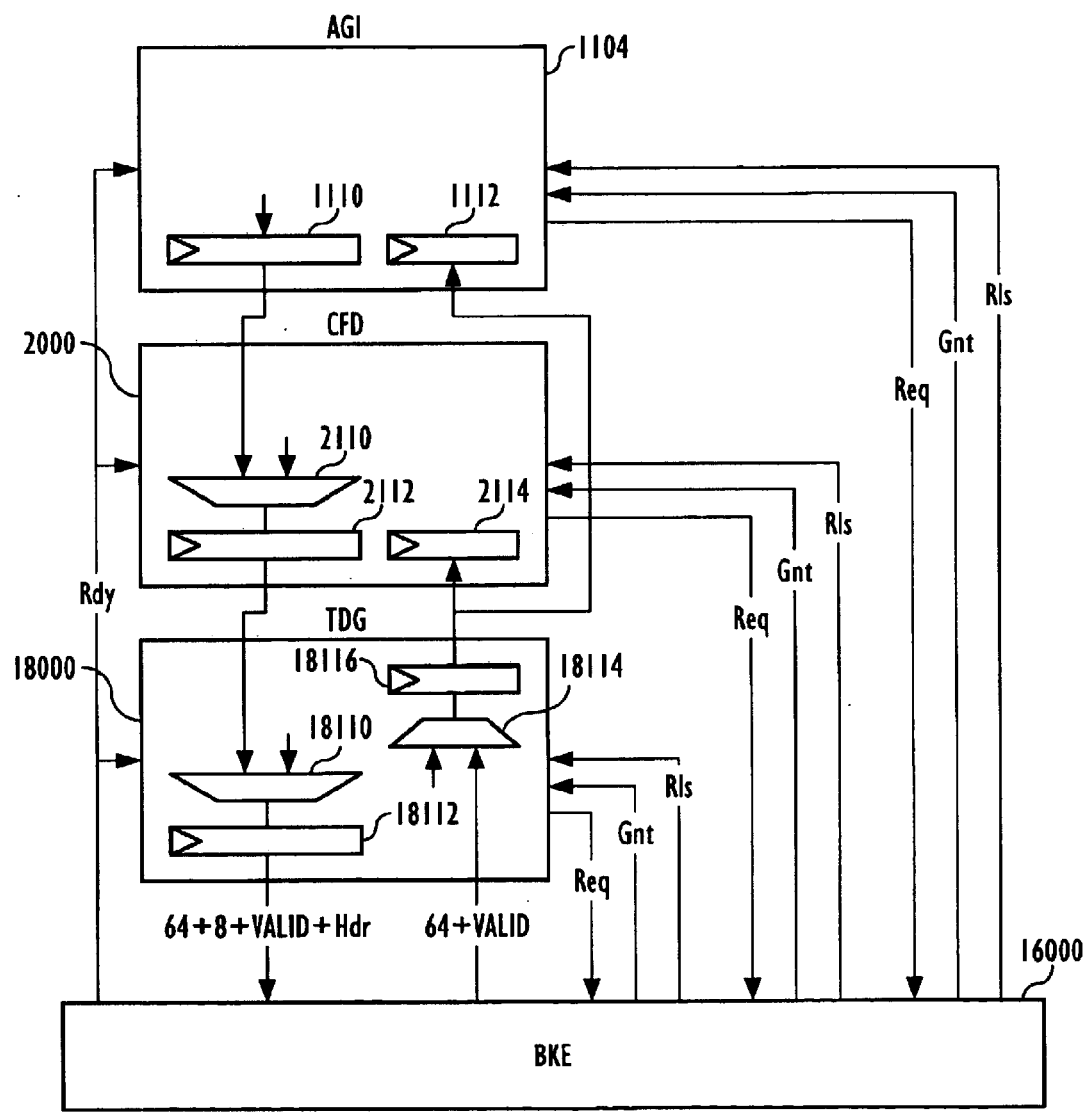
FIG. 48 is a diagrammatic illustration showing external client units that perform memory read and write through the BKE.

FIG. 47 shows the BackEnd with the units interfacing to it. As it is seen in the diagram, BKE mostly interacts with the Pixel Unit to read and write 3D tiles, and the 2D graphics engine 18000 (illustrated in FIG. 15) to perform Blit operations. The CFD unit uses the BKE bus to read display lists from the Frame Buffer. The AGI Unit 1104 reads and write BKE registers and the Memory Mapped Frame Buffer data.

The main BackEnd functions are:

3D Tile read

3D Tile write using Pixel Ownership

Pixel Ownership for write enables and overlay detection

Scanout using Pixel Ownership

Fixed ratio zooms

3D Accumulation Buffer

Frame Buffer read and writes

Color key to winid map

VGA

RAMDAC

5.13.2 3D Tile Read

BKE receives prefetched Tile Begin commands from PIX. These packets originate at SRT and bypass all 3D units to provide the latency needed to read the content of a tile buffer. The 3D window characteristics are initialized by the Begin Frame commands received earlier similarly from PIX. These characteristics include addresses for the color and depth surfaces, the enable bits for the planes (alpha, stencil, A and B buffers), the window width, height and stride, the color format, etc.

The pixel addresses are calculated using the window parameters. Taking advantage of tile geometry, 16 pixels are fetched with a single memory read request.

The Pixel Ownership is not consulted for 3D tile reads. If the window is in the main screen, the ownership (which window is on top) is determined during the write process.

Pixels are not extended to 24 bit colors for reduced precision colors, but unpacked into 32 bit pixel words. Depth values are read if needed into separate buffers.

Frequently Begin Tile command may indicate that no tile reading is required because a clear operation will be applied. The tile buffer is still allocated and pixel ownership for tile write will start.

5.13.3 3D Tile Write

3D Tile Write process starts as soon as a 3D tile read is finished. This latency is used to determine the pixel ownership write enables. The tile start memory address is already calculated during the 3D Tile Read process. The write enables are used as write masks for the Rambus Memory based Frame Buffer. The colors are packed as specified by the color depth parameter before written into the Frame Buffer.

5.13.4 Pixel Ownership

Pixel ownership is used to determine write enables to the shared screen and identify overlay windows for scanout reads.

The pixel ownership block include 16 bounding boxes as well as a per pixel window id map with 8 bit window ids. These window ids point to a table describing 64 windows. Separate enable bits for the bounding box and winid map mechanisms allow simultaneous use. Control bits are used to determine which mechanism is applied first.

Pixel ownership uses screen x and y pixel coordinates. Each bounding box specifies the maximum and minimum pixel coordinates that are included in that window. The bounding boxes are ordered such that the top window is specified by the last enabled bounding box. The bounding boxes are easy to set up for rectangular shaped windows. They are mostly intended for 3D windows but when a small number of 2D windows are used this mechanism can also be used to clip 2D windows.

For arbitrary shaped and larger number windows, a more memory intensive mechanism is used. An 8-bit window id map per pixel is optionally maintained to identify the window that a given screen pixel belongs.

For writes, if the window id of the tile matches the pixel id obtained by pixel ownership, the pixel write is enabled. For scanout, transition from screen to overlays and back are detected by comparing the pixel ownership window id with the current scanout window id.

To accelerate the pixel ownership process, the per pixel check is frequently avoided by performing a 16 pixels check. In case an aligned horizontal 16-pixel strip all share the same window id, this can be determined in one operation.

5.13.5 Scanout

Scanout reads the frame buffer color and sends the data to the RAMDAC for display. Scanout is the highest priority operation on the Frame Buffer. Pixels to be scanned out are passed through the read Pixel ownership block to do virtual blits, overlays, etc. A relatively large queue is used at the input to the RAMDAC to smooth out the irregular latencies involved with handling overlays and taking advantage of horizontal blanking periods.

Palette and Gamma corrections are performed by the RAMDAC. A fixed ratio zoom out function is performed by the backend during scanout.

Scanout has to be able to achieve 120 Hz refresh rates for a 1600 by 1200 screen with a reduced 3D performance. At full 3D performance, a minimum of 75 Hz refresh rate is required.

Scanout supports four different pixel color formats per window. All windows on the main screen share the same pixel color format. The supported color formats are:

32-bit RGBA (8-8-8-8)

24-bit RGB (8-8-8)

16-bit RGB (5-6-5)

8-bit color index

Scanout writes always 24 bits into the Scanout Queue (SOQ). No color conversion or unpacking is performed. The lower bits are cleared for 8 and 16-bit colors. Additional two bits are used to indicate the per-pixel color format.

Interlaced scanout is also supported for certain stereo devices.

Real time 3D applications need to speed up rendering by drawing to a small window and zooming the small image to a large window. This zooming with bilinear interpolation is done as the pixels are scanned out.

BKE supports certain fixed ratios for scaling: 16/n , n=1 . . . 15 in each direction. Sample points and interpolation coefficients are downloaded by software prior to the zoom operation.

Up to four window can be zoomed out using the same fixed ratio (same coefficients). Zoom bounding boxes are compared for scanned out pixels to determine if the pixels need to be taken from the zoom function output. The zoom logic is operational continuously to be able to sequence the coefficient table indices. Therefore the zoom output is ignored if the window id of the scanout does not match with the window id of the zoom boxes.

No overlap is allowed for the window zoom boxes.

Additional Description

The invention provides numerous innovative structures, methods, and procedures. The structures take many forms including individual circuits, including digital and circuits, computer architectures and systems, pipeline architectures and processor connectivity. Methodologically, the invention provides a procedure for deferred shading and numerous other innovative procedures for use with a deferred shader as well as having applicability to non-deferred shaders and data processors generally. Those workers having ordinary skill in the art will appreciate that although the numerous inventive structures and procedures are described relative to a three-dimensional graphical processor, that many of the innovations have clear applicability to two-dimensional processing, and to data processing and manipulation are involved generally. For example, many of the innovations may be implemented in the context of general purpose computing devices, systems, and architectures. It should also be understood that while some embodiments may require or benefit from hardware implementation, at least some of the innovations are applicable to either hardware or software/firmware implementations and combinations thereof.

A brief list of some of the innovative features provided by the above described inventive structure and method is provided immediately below. This list is exemplary, and should not be interpreted as a limitation. It is particularly noted that the individual structures and procedures described herein may be combined in various ways, and that these combinations have not been individually listed. Furthermore, while this list focuses on the application of the innovations to a three-dimensional graphics processor, the innovations may readily be applied to a general purpose computing machine having the structures and/or operation described in this specification and illustrated in the figures.

The invention described herein provides numerous inventive structures and methods, including, but not limited to structure and procedure for calculating the color of a fragment by combining the color, material, geometric, and lighting information from the Fragment Block with the texture information from the Texture Block. The result is a colored fragment that is forwarded to the Pixel Block where it is blended with any color information already residing in the frame buffer.

In accordance with the present invention the Phong Block embodies a number of features for performing tangent space lighting in a deferred shading environment. These features include:

performing bump mapping in eye space using bump maps represented in tangent space;

supporting tangent space bump maps without needing to interpolate and translate light and half-angle vectors (L and H) used in the lighting computation;

performing bump mapping using matrix multiplication;

performing bump mapping using a fixed point matrix of basis vectors derived by separating each basis vector into a unit vector and a magnitude and combining the magnitudes with respective tangent space bump map components;

performing bump mapping using fixed point matrix multiplication using the fixed point matrix of basis vectors and a fixed point vector of tangent space bump map components derived by scaling each bump map component by a respective scale factor;

using the Phong lighting matrix to perform bump mapping calculations;

compatibility with tangent space bump maps provided in a variety of API formats, including Blinn, SGI and 3D Studio Max;

deriving the basis vectors differently depending on the format of the provided bump map so the same matrix multiplication can be used to perform bump mapping regardless of the API format of the bump map;

performing lighting and bump mapping without interpolating partials, normals or basis vectors;

hardware implementation of Blinn bump mapping.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A bump mapping method for use in a deferred graphics pipeline processor the method comprising steps of:

receiving for a pixel fragment associated with a surface for which bump effects are to be computed:

a surface tangent, binormal and normal defining a tangent space relative to the surface associated with the fragment; and a tangent space texture vector representing perturbations to the surface normal in the directions of the surface tangent and binormal caused by the bump effects at the surface position associated with the pixel fragment;

computing a set of tangent space basis vectors from the surface tangent, binormal and normal that define a transformation matrix from the tangent space to eye space in view of the orientation of the texture vector;

computing a perturbed, eye space, surface normal reflecting the bump effects by performing a matrix multiplication in which the tangent space texture vector is multiplied by the transformation matrix whose columns comprise the basis vectors, giving a result that is the perturbed, eye space, surface normal; and performing lighting computations in eye space for the pixel fragment using the perturbed, eye space, surface normal, giving an apparent color for the pixel fragment that accounts for the bump effects without needing to interpolate and transform light and half-angle vectors (L and H) used in the lighting computations.

2. A variable scale bump mapping method for shading a computer graphics image, the method comprising steps of:

receiving for a vertex of polygon associated with a surface to which bump effects are to be mapped geometry vectors ($V_s$, $V_t$, N) and a texture vector (Tb) in tangent space;

separating the geometry vectors into unit basis vectors ($\hat{b}_s$, $\hat{b}_t$, $\hat{n}$) and magnitudes ($m_{bs}$, $m_{bt}$, $m_{bn}$), such that the unit basis vectors can be used to form a transform matrix for transforming vectors from tangent space to eye space;

multiplying the magnitudes and the texture vector to form a texture-magnitude vector (mTb');

scaling components of the texture-magnitude vector by a vector s to form a scaled texture-magnitude vector (mTb"); and multiplying the scaled texture-magnitude vector and the transform matrix formed from the unit basis vectors to provide a perturbed unit normal (N') in eye space for a pixel location.

3. A method according to claim 2, wherein the transformation matrix is computed with floating point arithmetic and converted to a fixed point representation, which enables fixed point multiplication hardware to be used when performing transforms.

4. A method according to claim 2, wherein the step of multiplying the magnitudes and the texture vector and the step of multiplying the scaled texture-magnitude vector and the transform matrix formed from the unit basis vectors produces a transformation matrix that defines a transformation from different tangent space coordinates systems to an eye space coordinate system.

5. A method according to claim 4, wherein the different tangent space coordinates systems is selected from a group consisting of: the Blinn coordinate system, and the SGI coordinate system.

6. A variable scale bump mapping method for shading a computer graphics image, the method comprising steps of:

receiving a gray scale image for which bump effects are to be computed;

taking derivatives relative to a gray scale intensity for a pixel fragment associated with the gray scale image;

programmatically selecting a bump map representation type, the choices for the bump map representation type comprising: tangent space; object space; and derivative of gray scale intensity;

computing, from the derivatives; a texture map in accordance with the selected bump map representation type;

associating the selected bump map representation type with the bump map so as to indicate how to generate an eye space normal from the texture map; and computing the eye space normal from one or more values in the texture map.

7. A method according to claim 6, wherein the step of computing the eye space normal comprises the step of forming a transformation matrix that defines a transformation from the selected bump man representation type for use in eye space lighting computations.

8. A method for bump mapping for shading a computer graphics image, the method comprising steps of:

receiving for a pixel fragment associated with a surface for which bump effects are to be computed: (i) a magnitude vector (m), and a bump vector (Tb) in tangent space; and (ii) a unit transformation matrix (M) for transforming bump vectors from tangent space to eve space;

multiplying the magnitude vector and the bump vector to form a texture-magnitude vector (mTb');

scaling components of the texture-magnitude vector by a vector s to form a scaled texture-magnitude vector (mTb");

multiplying the scaled texture-magnitude vector and the unit transformation matrix to provide a perturbed normal (N');

re-scaling components of the perturbed normal to form rescaled vector (N"); and normalizing the rescaled vector to provide a unit perturbed normal that is used to perform lighting computations to give the pixel fragment bump effects.

9. A method according to claim 8, wherein the step of scaling the components of the texture-magnitude vector comprises the step of selecting the scalars so the resulting matrix can be represented as a fixed-point vector.

10. A method for bump mapping for shading a computer graphics image, the method comprising steps of:

receiving for a pixel fragment associated with a surface for which bump effects are to be computed: (i) a magnitude vector (m), and a bump vector (Tb); and (ii) a unit transformation matrix (M);

multiplying the magnitude vector and the bump vector to form a texture-magnitude vector (mTb');

scaling components of the texture-magnitude vector by a vector s comprising scalars ($s_s$, $s_t$, $s_n$) to form a scaled texture-magnitude vector (mTb"), the scaling including multiplying texture-magnitude vector comprising s according to the expression:

$$mTb"=C \times (s_s \times m_{bs} h_s,\ s_t \times m_{bt} h_t,\ s_n \times m_n \times m_n k_n),$$

where C is a constant, $m_{bs}$, $m_{bt}$, $m_n$ are components of the magnitude vector m=($m_{bs}$, $m_{bt}$, $m_n$), and $h_s$, $h_t$, $k_n$ are components of the bump vector Tb=($h_s$, $h_t$, $k_n$);

multiplying the scaled texture-magnitude vector and the unit transformation matrix to provide a perturbed normal (N');

re-scaling components of the perturbed normal to form rescaled vector (N");

normalizing the rescaled vector to provide a unit perturbed normal that is used to perform lighting computations to give the pixel fragment bump effects.

11. A method according to claim 8, wherein the unit transformation matrix also comprises fixed-point values, and wherein the step of multiplying the scaled texture-magnitude vector and the unit transformation matrix comprises the step of multiplying using fixed-point multiplication hardware.

12. A method for bump mapping for shading a computer graphics image, the method comprising steps of:

receiving for a pixel fragment associated with a surface for which bump effects are to be computed: (i) a magnitude vector (m), and a bump vector (Tb); and (ii) a unit transformation matrix (M);

multiplying the magnitude vector and the bump vector to form a texture-magnitude vector (mTb');

scaling components of the texture-magnitude vector by a vector s to form a scaled texture-magnitude vector (mTb");

multiplying the scaled texture-magnitude vector and the unit transformation matrix to provide a perturbed normal (N');

re-scaling components of the perturbed normal to form rescaled vector (N"); and normalizing the rescaled vector to provide a unit perturbed normal that is used to perform lighting computations to give the pixel fragment bump effects;

wherein the step of re-scaling components of the perturbed normal comprises the step of multiplying by a reciprocal of vector s (1/($s_s$, $s_t$, $s_n$)) to re-establish a correct relationship between their values.

13. A bump mapping method for a computer graphics renderer, the renderer generating a rendered image from a plurality of polygons, the method comprising the steps:

receiving lighting information in eye coordinates;

receiving a texture map representing bumps on a surface, the texture map being associated with an object, the object comprising a plurality of the polygons, each of the polygons comprising a plurality of vertices, each vertex associated with texture coordinates in the texture map, each vertex associated with a surface normal;

receiving one of the polygons;

transforming the surface normals of the received polygon to eye coordinates;

selecting an interpolation location within the received polygon;

interpolating the texture coordinates of the received polygon at the interpolation location;

selecting bump values from the texture map associated with the interpolated texture coordinates;

if the texture map values are in tangent space, transforming the selected bump values from tangent space to eye space;

if the texture map values are in object space, transforming the selected bump values from object space to eye space; and perform lighting calculations in eye coordinates.

14. The method of claim 13, further comprising the step:

associating a parameter with the texture map, the parameter indicating one of a plurality of types of bump map representations, the parameter used to determine the type of computations needed to generate eye coordinate bump-mapped surface normals, the types of bump map representations comprising: tangent space normals; object space normals; and normal perturbation values.

15. The method of claim 13, further comprising:

the polygon vertices further comprising a tangent and binormal; and the transforming step further comprising the transforming of the tangent and the binormal to eye coordinates.

16. The method of claim 13, further comprising the step:

generating approximations of the tangent and binormal by computing the derivatives of the texture coordinates for the polygon.

17. The method of claim 13, further comprising the step:

performing hidden surface removal on the plurality of polygons to eliminate the portions of the polygons that do not contribute to the rendered image, the hidden surface removal being done for an area of the image before any of the lighting calculations are done for the polygons in the area of the image, thereby eliminating some of the lighting calculations.

18. The method of claim 13, the method further comprising the step:

generating a tangent-space-to-eye-space transform matrix by transforming object space normal, tangent, and binormal vectors to eye coordinates and using the transformed vectors as rows or columns in the tangent-space-to-eye-space transform matrix.

19. A bump mapping device for a computer graphics pipeline, the pipeline generating a rendered image from a plurality of polygons, the device comprising:

logic receiving lighting information in eye coordinates;

a memory storing a texture map representing bumps on a surface, the texture map being associated with an object, the object comprising a plurality of the polygons, receiving one of the polygons, the polygon comprising a plurality of vertices, each vertex associated with texture coordinates in the texture map, each vertex associated with a surface normal;

logic transforming the surface normals of the received polygon to eye coordinates;

logic selecting an interpolation location within the received polygon;

logic interpolating the texture coordinates of the received polygon at the interpolation location;

logic reading bump values from the texture map associated with the interpolated texture coordinates;

logic transforming the selected bump values from tangent space to eye space if the texture map values are in tangent space;

logic transforming the selected bump values from object space to eye space if the texture map values are in object space; and logic perform lighting calculations in eye coordinates.

20. The device of claim 19, further comprising:

logic associating a parameter with the texture map, the parameter indicating one of a plurality of types of bump map representations, the parameter used to determine the type of computations needed to generate eye coordinate bump-mapped surface normals, the types of bump map representations comprising: tangent space normals; object space normals; and normal perturbation values.

21. The method of claim 19, further comprising:

logic receiving a tangent and binormal for each of the vertices of the received polygon; and logic transforming of the tangent and the binormal to eye coordinates.

22. The method of claim 19, further comprising:

logic generating approximations of the tangent and binormal by computing the derivatives of the texture coordinates for the polygon.

23. The method of claim 19, further comprising:

logic performing hidden surface removal on the plurality of polygons to eliminate the portions of the polygons that do not contribute to the rendered image, the hidden surface removal being done for an area of the image before any of the lighting calculations are done for the polygons in the area of the image, thereby eliminating some of the lighting calculations.

24. The device of the claim 19, further comprising:

logic generating a tangent-space-to-eye-space transform matrix by transforming object space normal, tangent, and binormal vectors to eye coordinates and using the transformed vectors as rows or columns in the tangent-space-to-eye-space transform matrix.

25. A computer program for use in conjunction with a computer system, the computer program comprising a computer program mechanism embedded therein, the computer program mechanism, comprising:

a program module that directs the rendering of a graphics image from a plurality of polygons, to function in a specified manner, the program module including instructions for:

receiving lighting information in eye coordinates;

receiving a texture map representing bumps on a surface, the texture map being associated with an object, the object comprising a plurality of the polygons, each of the polygons comprising a plurality of vertices, each vertex associated with texture coordinates in the texture map, each vertex associated with a surface normal;

receiving one of the polygons;

transforming the surface normals of the received polygon to eye coordinates;

selecting an interpolation location within the received polygon;

interpolating the texture coordinates of the received polygon at the interpolation location;

selecting bump values from the texture map associated with the interpolated texture coordinates;

if the texture map values are in tangent space, transforming the selected bump values from tangent space to eye space;

if the texture map values are in object space, transforming the selected bump values from object space to eye space; and perform lighting calculations in eye coordinates.

26. The computer program of claim 25, further comprising a computer readable storage medium wherein the computer program product is stored on the computer readable storage medium.

27. The computer program of claim 25, the program module further including instructions for:

associating a parameter with the texture map, the parameter indicating one of a plurality of types of bump map representations, the parameter used to determine the type of computations needed to generate eye coordinate bump-mapped surface normals, the types of bump map representations comprising: tangent space normals, object space normals, and normal perturbation values.

28. The computer program of claim 25, the program module further including instructions for:

receiving a tangent and binormal associated with each of the vertices of the received polygon; and the transforming instructions further comprising instructions for transforming of the tangent and the binormal to eye coordinates.

29. The computer program of claim 25, the program module further including instructions for:

generating approximations of the tangent and binormal by computing the derivatives of the texture coordinates for the polygon.

30. The computer program of claim 25, the program module further including instructions for:

performing hidden surface removal on the plurality of polygons to eliminate the portions of the polygons that do not contribute to the rendered image, the hidden surface removal being done for an area of the image before any of the lighting calculations are done for the polygons in the area of the image, thereby eliminating some of the lighting calculations.

31. The computer program of claim 25, the program module further including instructions for:

generating a tangent-space-to-eye-space transform matrix by transforming object space normal, tangent, and binormal vectors, to eye coordinates and using the transformed vectors as rows or columns in the tangent-space-to-eye-space transform matrix.

32. A computing system for three-dimensional (3-D) graphics rendering, the system generating a rendered image from a plurality of polygons, the system comprising:

a general-purpose computer; and a 3-D graphics processor coupled to the general purpose computer; the 3-D graphics processor comprising:

a bump mapping device comprising:

logic receiving lighting information in eye coordinates;

a memory storing a texture map representing bumps on a surface, the texture map being associated with an object, the object comprising a plurality of the polygons;

receiving one of the polygons, the polygon comprising a plurality of vertices, each vertex associated with texture coordinates in the texture map, each vertex associated with a surface normal;

logic transforming the surface normals of the received polygon to eye coordinates;

logic selecting an interpolation location within the received polygon;

logic interpolating the texture coordinates of the received polygon at the interpolation location;

logic reading bump values from the texture map associated with the interpolated texture coordinates;

logic transforming the selected bump values from tangent space to eye space if the texture map values are in tangent space;

logic transforming the selected bump values from object space to eye space if the texture map values are in object space; and logic perform lighting calculations in eye coordinates.

33. The system of claim 32, the 3-D graphics processor further comprising:

a culling device comprising:

logic performing hidden surface removal on the plurality of polygons to eliminate the portions of the polygons that do not contribute to the rendered image, the hidden surface removal being done for one of a plurality of tile areas of the image before any of the lighting calculations are done for the polygons in the one tile area of the image, thereby eliminating some of the lighting calculations.

34. The system of claim 33, the 3-D graphics processor further comprising:

a sort unit comprising:

logic spatially sorting the plurality of polygons according the tile areas; and logic outputting the spatially sorted polygons according to their spatial sorting.

35. In a processor generating a rendered image for an object from received information including from received object lighting information specified in eye coordinates and received object texture information representing surface features associated with surface normals of the object, a method comprising:

transforming the surface normals to eye coordinate space;

interpolating the texture information at interpolation locations;

selecting values from the texture information associated with the interpolated texture information at the interpolation locations;

if the texture information values are specified in tangent coordinate space, transforming the selected values from tangent coordinate space to eye coordinate space;

if the texture information values are specified in object coordinate space, transforming the selected values from object coordinate space to eye coordinate space; and perform lighting calculations for said object in eye coordinate space.

* * * * *

UNITED STATES PATENT AND TRADEMARK OFFICE
CERTIFICATE OF CORRECTION

PATENT NO. : 6,771,264 B1
DATED : August 3, 2004
INVENTOR(S) : Jerome F. Duluk et al.

It is certified that error appears in the above-identified patent and that said Letters Patent is hereby corrected as shown below:

Title page,
Item [22], Filed, delete "Dec. 17, 1999" and insert -- Dec. 17, 1998 --.
Item [*] Notice, insert the following:
-- This application claims the benefit under 35 U.S.C. § 119(e) to provisional patent application no. 60/097,336, filed on August 20, 1998 --.
Item [57], ABSTRACT,
Line 10, before "represents in", delete "tangen/object" and insert -- tangent/object --.

Column 116,
Line 31, insert a comma -- , -- after "processor".

Column 117,
Line 39, delete the semi-colon ";" after "derivatives", and insert a comma -- , --.
Line 49, delete "man" and insert -- map --.
Line 59, delete "eve" and insert -- eye --.

Signed and Sealed this

Eleventh Day of January, 2005

JON W. DUDAS
*Director of the United States Patent and Trademark Office*